United States Patent [19]

Stahl et al.

[11] Patent Number: 5,080,809
[45] Date of Patent: Jan. 14, 1992

[54] POLYMERS USEFUL IN THE RECOVERY AND PROCESSING OF NATURAL RESOURCES

[75] Inventors: G. Allan Stahl; I. John Westerman; Henry L. Hsieh; Ahmad Moradi-Araghi; James H. Hedges; Geir Bjornson, all of Bartlesville, Okla. 74005

[73] Assignee: Phillips Petroleum Company, Bartlesville, Okla.

[21] Appl. No.: 756,851

[22] Filed: Jul. 18, 1985

Related U.S. Application Data

[63] Continuation-in-part of Ser. No. 568,363, Jan. 9, 1984, which is a continuation-in-part of Ser. No. 461,707, Jan. 28, 1983.

[51] Int. Cl.$^5$ .............................................. C09K 3/00
[52] U.S. Cl. ................................. 252/8.554; 166/275; 166/273; 166/274
[58] Field of Search .................... 204/159.11, 159.22; 523/130, 131; 526/264, 219, 291.1, 219.6, 227, 228; 210/728, 734, 735; 166/274, 273, 275; 252/855 R; 522/59, 66, 79, 84, 167, 175, 911, 60

[56] References Cited

U.S. PATENT DOCUMENTS

| | | | |
|---|---|---|---|
| 2,810,716 | 10/1957 | Markus | 166/275 |
| 2,827,964 | 3/1958 | Sandiford et al. | 166/275 |
| 2,923,734 | 2/1960 | Sheetz | 166/273 |
| 2,938,017 | 5/1960 | Grosser | 523/130 |
| 2,961,431 | 11/1960 | Kutner | 523/130 |
| 2,964,557 | 12/1960 | Niederhauser et al. | 166/274 |
| 3,006,900 | 10/1961 | Fikentscher et al. | 166/274 |
| 3,025,234 | 3/1962 | Canterino | 523/131 |
| 3,039,529 | 6/1962 | McKennon | 166/274 |
| 3,094,504 | 6/1963 | Murdock et al. | 166/273 |
| 3,129,210 | 4/1964 | Grosser et al. | 526/264 |
| 3,146,193 | 8/1964 | Sullivan | 526/264 |
| 3,148,729 | 9/1964 | Holbert et al. | 523/130 |
| 3,179,171 | 4/1965 | Beale, Jr. | 526/264 |
| 3,203,938 | 8/1965 | Beechtold | 523/130 |
| 3,215,680 | 11/1965 | Kolodny | 166/273 |
| 3,219,498 | 11/1965 | Nitzsche et al. | 523/130 |

(List continued on next page.)

FOREIGN PATENT DOCUMENTS

| | | |
|---|---|---|
| 403987 | 6/1966 | Australia. |
| 66650/65 | 5/1967 | Australia. |
| 0094898 | 4/1983 | European Pat. Off.. |
| 0095730 | 12/1983 | European Pat. Off.. |
| 1489341 | 8/1966 | France. |
| 2312516 | 12/1976 | France. |
| 83/02449 | 7/1983 | PCT Int'l Appl.. |
| 1591552 | 6/1981 | United Kingdom. |

OTHER PUBLICATIONS

Bleakley, "BP Faces North Sea Challenges", *Petroleum Engineer International*, pp. 29–32, 34–35, and 38, Oct., 1982.

*Primary Examiner*—Josephine Barr
*Attorney, Agent, or Firm*—Richmond, Phillips, Hitchcock & Umphlett

[57] ABSTRACT

Water-soluble polymers comprising an N-vinyl amide such as an N-vinyl lactam are found to be useful in processes wherein the polymer is introduced into a subterranean wellbore.

Polymers useful in the recovery of natural resources are prepared by polymerizing an N-vinyl lactam by free radical initiation with polymerization conducted in an aqueous solution polymerization medium preferably containing a mixture of dissolved electrolytes, or in a polymerization medium consisting essentially of a tertiary alkanol. Copolymers of such N-vinyl lactams with unsaturated amides, and terpolymers prepared by polymerizing an N-vinyl lactam and an unsaturated amide with a selected termonomer compound are also useful when prepared by these methods. The invention also broadly encompasses utilizing a water-soluble polymer comprising at least one of a hydrophilic vinyl-containing sulfonate, phosphonate or ester and/or a hydrophilic N-vinyl lactam for applications under hostile conditions.

77 Claims, 16 Drawing Sheets

U.S. PATENT DOCUMENTS

| | | | |
|---|---|---|---|
| 3,223,162 | 12/1965 | Burge | 523/131 |
| 3,256,141 | 6/1966 | Stephenson | 523/131 |
| 3,277,066 | 10/1966 | Grosser et al. | 523/130 |
| 3,336,269 | 8/1967 | Monagle et al. | 166/273 |
| 3,336,270 | 8/1967 | Monagle | 166/273 |
| 3,397,232 | 8/1968 | Takagi et al. | 523/130 |
| 3,397,744 | 8/1968 | Hort et al. | 523/131 |
| 3,405,106 | 10/1968 | Scanley | 523/131 |
| 3,421,584 | 1/1969 | Eilers et al. | 523/130 |
| 3,423,367 | 1/1969 | Merijan et al. | 166/273 |
| 3,434,971 | 3/1969 | Atkins | 523/131 |
| 3,450,680 | 6/1969 | Jursich et al. | 523/130 |
| 3,459,720 | 8/1969 | Grosser et al. | 166/273 |
| 3,468,832 | 9/1969 | Barabas et al. | 526/264 |
| 3,490,533 | 1/1970 | McLaughlin | 526/264 |
| 3,500,925 | 3/1970 | Beiswanger | 523/130 |
| 3,506,707 | 4/1970 | Miller et al. | 526/264 |
| 3,511,313 | 5/1970 | Ellers et al. | 166/273 |
| 3,537,520 | 11/1970 | Holm | 523/131 |
| 3,541,059 | 11/1970 | Schaper | 523/130 |
| 3,547,899 | 12/1970 | Arit et al. | 523/130 |
| 3,558,545 | 1/1971 | Lummus | 523/130 |
| 3,629,101 | 12/1971 | Mille et al. | 523/130 |
| 3,630,868 | 12/1971 | Marans | 523/131 |
| 3,679,000 | 7/1972 | Kaufman | 523/130 |
| 3,679,900 | 7/1972 | Kimura | 523/130 |
| 3,681,215 | 8/1972 | Peterson | 526/264 |
| 3,686,150 | 8/1972 | Barabas et al. | 523/130 |
| 3,689,439 | 9/1972 | Field et al. | 526/264 |
| 3,727,687 | 4/1973 | Clampitt et al. | 526/264 |
| 3,728,319 | 4/1973 | Kiesel et al. | 523/131 |
| 3,749,172 | 7/1973 | Hessert et al, | 526/264 |
| 3,776,310 | 12/1973 | Norton et al. | 526/264 |
| 3,795,276 | 3/1974 | Ellers et al. | 252/8.554 |
| 3,806,367 | 4/1974 | Lange et al. | 166/273 |
| 3,816,308 | 6/1974 | LeBlanc | 526/264 |
| 3,820,603 | 6/1974 | Knight et al. | 523/130 |
| 3,841,402 | 10/1974 | Knight et al. | 523/131 |
| 3,843,578 | 10/1974 | Logemann et al. | 523/130 |
| 3,849,165 | 11/1974 | Stahly et al. | 523/130 |
| 3,858,652 | 1/1975 | Rhudy et al. | 523/130 |
| 3,862,915 | 1/1975 | Fried et al. | 523/130 |
| 3,877,522 | 4/1975 | Knight et al. | 526/264 |
| 3,898,037 | 8/1975 | Lange et al. | 523/130 |
| 3,907,927 | 9/1975 | Guilbault | 523/130 |
| 3,908,760 | 9/1975 | Clampitt et al. | 523/131 |
| 3,909,423 | 9/1975 | Hessert et al. | 523/131 |
| 3,929,741 | 12/1975 | Laskey | 166/273 |
| 3,931,089 | 1/1976 | Karl | 526/264 |
| 3,935,303 | 1/1976 | Khromov | 523/131 |
| 3,937,633 | 2/1976 | Knight et al. | 526/264 |
| 3,948,740 | 4/1976 | Phalangas | 523/130 |
| 3,948,783 | 4/1976 | Szabo et al. | 523/130 |
| 3,953,341 | 4/1976 | Martin | 523/131 |
| 3,993,133 | 11/1976 | Clampitt | 523/131 |
| 4,016,932 | 4/1977 | Kalfoglou | 526/264 |
| 4,024,040 | 5/1977 | Phalangas et al. | 523/130 |
| 4,040,967 | 8/1977 | Nimerick et al. | 523/130 |
| 4,048,077 | 9/1977 | Engelhardt et al. | 523/130 |
| 4,048,377 | 9/1977 | Boschetti et al. | 523/130 |
| 4,057,533 | 11/1977 | Hort et al. | 523/130 |
| 4,066,524 | 1/1978 | Phalangas | 523/130 |
| 4,098,337 | 7/1978 | Argabright et al. | 166/275 |
| 4,137,969 | 2/1979 | Phalangas et al. | 523/130 |
| 4,190,109 | 2/1980 | Barton, Jr. | 166/275 |
| 4,207,946 | 6/1980 | Haltmar et al. | 523/130 |
| 4,210,205 | 7/1980 | Allen et al. | 523/130 |
| 4,219,429 | 8/1980 | Allen et al. | 523/130 |
| 4,236,545 | 12/1980 | Knight et al. | 523/130 |
| 4,246,124 | 1/1981 | Swanson | 526/264 |
| 4,248,304 | 2/1981 | Phillips | 526/264 |
| 4,254,249 | 3/1981 | Cottrell et al. | 166/273 |
| 4,260,713 | 4/1981 | Tanaka et al. | 523/130 |
| 4,277,580 | 7/1981 | Allen et al. | 166/273 |
| 4,294,949 | 10/1981 | Karrer | 166/275 |
| 4,300,634 | 11/1981 | Clampitt | 166/273 |
| 4,304,300 | 12/1981 | Watson | 166/275 |
| 4,309,523 | 1/1982 | Engelhardt et al. | 166/275 |
| 4,323,463 | 4/1982 | Morduchowitz | 166/275 |
| 4,326,970 | 4/1982 | Cottrell et al. | 166/275 |
| 4,337,215 | 6/1982 | Doi et al. | 166/274 |
| 4,353,806 | 10/1982 | Canter et al. | 166/273 |
| 4,404,111 | 9/1983 | Bi et al. | 166/273 |
| 4,423,123 | 12/1983 | Okamatsu | 252/8.551 |
| 4,440,228 | 4/1984 | Swanson | 252/8.554 |
| 4,451,351 | 5/1984 | Porter et al. | 252/8.554 |
| 4,461,351 | 7/1984 | Falk | 252/8.551 |
| 4,471,097 | 8/1984 | Uhl et al. | 526/240 |

Chatterjee, "Solvent Effects in Free Radical Copolymerization," *Canadian Journal of Chemistry*, vol. 49, pp. 3249–3251 (1971).

Chatterji, "Applications of Water-Soluble Polymers in the Oil Field," *Journal of Petroleum Technology*, Nov. 1981, pp. 2042–2056.

Davison and Mentzer, SPE 9300, "Polymer Flooding in North Sea Oil Reservoirs," Presented at 55th Annual Fall Technical Conf. of Society of Petroleum Engineers, AIME, Dallas, Tex., Sep. 21–24, 1980; Later Published in *Society of Petroleum Engineers Journal*, Jun. 1982, pp. 353–362.

(List continued on next page.)

U.S. PATENT DOCUMENTS

Foshee et al., SPE 6202, "Preparation and Testing of Partially Hydrolyzed Polyacrylamide Solutions" Presented at 51st Annual Fall Technical Conference of Society of Petroleum Engineers of AIME, New Orleans, Oct. 3–6, 1976.

Klemmensen and Bauer, "Water Soluble Acrylic Polymer for Enhanced Oil Recovery," Polymer Preprints, vol. 22, Aug. 1981, pp. 78–80.

Park, Scott and Lummus, "Obtaining Low Solids Drilling Fluids," *Oil and Gas Journal*, vol. 58, pp. 81–84, May 30, 1960.

Dept. of Energy Report, DOE/BETC/5603-10, Published Jun. 1980, pp. 5/6, 117/118 and 137.

Jennings, Rogers and West, "Factors Influencing Mobility Control by Polymer Solutions," *Journal of Petroleum Technology*, Mar. 1971, pp. 391–401.

*Encyclopedia of Polymer Science and Technology*, vol. 14, "Viscometry", pp. 717–722, 1971.

Kir K-Othmer, *Encyclopedia of Chemical Technology*, Third Edition, vol. 18, pp. 734–736 (1982).

Kirk-Othmer, *Encyclopedia of Chemical Technology*, Third Edition, vol. 18, "Polyelectrolysis," pp. 495–530 (1982).

POLYMERS USEFUL IN THE RECOVERY AND PROCESSING OF NATURAL RESOURCES

This application is a continuation-in-part of copending application Ser. No. 568,363 filed Jan. 9, 1984, which is a continuation-in-part of copending application Ser. No. 461,707, filed Jan. 28, 1983.

This invention relates to new and useful polymers. Further, this invention relates to the preparation of such polymers and their use in the recovery and processing of natural resources, such as for example in such applications as enhanced oil recovery, well drilling, workover and completion; the treatment and thickening of water for use in various applications, and minerals beneficiation. Still further, this invention relates to the introduction of certain polymers of the prior art as well as the inventive polymers of the present invention into subterranean well bores where high temperatures and/or salinity and/or hardness of formation waters are encountered.

BACKGROUND

Many synthetic polymers have been developed and used in processes for the recovery of natural resources. Generally a desirable property is that such polymers impart to a liquid an increased viscosity when a relatively small quantity of the polymer is added, and preferably at a minimal cost. There is an increasing demand for such polymers which will withstand hostile environments including, e.g. high temperatures, high salinity and high content of multivalent metal cations, commonly known as "hardness ions", as well as the high acidity, temperature and shear conditions encountered in processes such as acid fracturing. Various polymers may be used in the processes for recovery or treatment of natural resources disclosed below as pertinent to this invention.

ENHANCED OIL RECOVERY

Oil accumulated within a subterranean oil-bearing formation is recovered or produced therefrom through wells, called production wells, drilled into the subterranean formation. A large amount of such oil is left in the subterranean formations if produced only by primary depletion, i.e., where only formation energy is used to recover the oil. Where the initial formation energy is inadequate or has become depleted, supplemental operations, often referred to as secondary, tertiary, enhanced or post-primary recovery operations, are employed. The term "enhanced" will be used herein to refer to all such operations. In the most successful and most widely used of these operations, a fluid is injected into the formation by pumping it through one or more injection wells drilled into the formation, oil is displaced within and is moved through the formation, and is produced from one or more production wells drilled into the formation. In a particular recovery operation of this sort, field water or field brine is usually employed as the injection fluid and the operation is referred to as a waterflood. The injection water is often referred to as flooding liquid or flooding water as distinguished from the in situ formation, or connate water. Fluids injected later can be referred to as driving fluids. Although water is the most common, injection and drive fluids can include gaseous fluids such as steam, carbon dioxide, and the like.

In one embodiment of this invention the polymers described herein are used as the polymeric viscosifier in steam stimulation. This is particularly desirable under conditions of a hostile environment. In a steamflood operation crosslinked or uncrosslinked polymeric viscosifiers in an aqueous surfactant solution and steam are injected into subterranean formations to effect permeability correction by transporting foamed surfactant into high permeability zones to divert subsequently injected steam to the relatively oil-rich less permeable zones. The polymeric viscosifier thereby greatly enhances the thermal stability of the foamed surfactant solution thus prolonging the effective time period of the permeability correction operation.

In another steam stimulation technique, the steam is injected into the reservoir followed by an extended shut in period of for instance 1-2 weeks. The steam is followed by a hot aqueous surfactant active composition. The well is put back in production immediately and any steam channelling through the surfactant causes it to foam and block the steamflow. The steam finds an alternate lower temperature zone where the heat will be transferred to the oil and formation thus providing a more efficient steam stimulation process. As the steam condenses and the foam collapses, the channels open up to produce oil. The presence of the polymers described herein (gelled or ungelled) with the steam stabilizes the foam. The foam processes to which this invention can be applied described in U.S. Pat. No. 3,993,133, the disclosure of which is hereby incorporated by reference.

Although conventional waterflooding is effective in obtaining additional oil from oil-bearing subterranean formations, the technique does exhibit a number of shortcomings. Foremost among these shortcomings is the tendency of flooding water to "finger" through an oil-bearing formation and to thus bypass substantial portions thereof. By fingering is meant the development of unstable water stream fronts which advance toward the production wells more rapidly than the remainder of the flooding water. Furthermore, when fingering is encountered, the water does not normally displace as much oil in the portions of the formations which it contacts as it is potentially capable of displacing.

It has been established that waterfloods perform less satisfactorily with the more viscous oils than with relatively nonviscous oils. The fingering and bypassing tendencies of water are related to the ratio of the viscosity of the oil to the viscosity of the flooding water, and also related to fractures and/or high permeability zones in the formation. The viscosity of these oils varies from as low as one or two centipoise to 1,000 centipoise or higher. Water generally has a viscosity of about 1 centipoise at room temperature.

In order to restrict the mobility of the flooding water to no greater than the mobility of the oil, water thickening agents have been added to increase the viscosity of the water. Suitable agents for increasing the viscosity of the flooding water are water-soluble or water-dispersible, high molecular weight polymers. These polymers may adsorb on the formation surfaces, and accumulate in (or absorb) and reduce permeability through the rock pores. Consequently, the polymers cause the flooding water (which can contain polymer or other agents) injected therebehind to flow into previously uninvaded portions of the formation. However, these polymers are susceptible to adverse effects present in some subterranean formations, such as high temperature and dissolved electrolytes, which cause the polymers to precipitate and/or lose their viscosity-enhancing effectiveness, thus increasing flood water mobility, and generally become less effective as mobility control agents.

To maximize the recovery of oil in post-primary oil recovery operations, a substantially uniform permeability should exist throughout the strata. If the formation permeability is heterogeneous, the flooding fluids will seek areas of high water permeability, producing channeling and the passage of excess driving fluid to the producing well. As the more water-permeable strate are depleted of oil, the driving fluid thus has a tendency to follow such channels and further increase water production, reflected in an increased water/oil ratio at the producing well. More uniform flood fronts can be obtained in formations of nonuniform permeability by permeability correction of the more water-permeable strata of the formation. One method for reducing the water permeability of these more permeable strata is the injection of plugging materials into the formation strata to at least partially plug the more water-permeable zones and achieve reduced water permeability in said zones. Plugging materials can be formed in situ in the formation by the injection of one or more reactant substances which chemically react to form bodies of reduced water permeability, particularly polyvalent metal-crosslinked polymeric viscosifiers, alternatively monomers or prepolymers which are polymerizable under formation conditions.

DRILLING, WORKOVER AND COMPLETION FLUIDS

In the art of drilling wells to tap subterranean deposits of natural resources, such as gas, geothermal steam or oil, especially when drilling by the rotary method or the percussion method wherein cuttings must be removed from the bore hole, it is necessary to use a drilling fluid, as is well known to those skilled in the art. The subject is discussed more fully in U.S. Pat. No. 3,025,234. In addition to having the desirable rheological properties such as viscosity and gel strength, it is very important that such drilling fluids exhibit a low rate of filtration or water loss, that is, the drilling fluid must prevent excessive amounts of fluid, or "filtrate", from flowing from the bore hole into the surrounding formation. The loss of water or other fluid from the drilling fluid is prevented by the formation of a filter cake which deposits from the drilling fluid and seals the wall of the bore hole.

To produce an effective drilling mud, the clays mixed with water should disperse to a certain extent, not exceeding an acceptable operating range. That is, the individual clay particles should hydrate and repel each other and will remain in suspension (forming a "mud" or viscous drilling fluid) and filter out to form a relatively less permeable coating on the borehole walls. Excessive flocculation, however, causes larger particles to form, with the result that none of the objects of a "drilling mud" are achieved. Numerous formulations, compositions and additives to optimize the performance of drilling fluids for various applications have been developed. For instance, U.S. Pat. No. 3,816,308 discloses compositions comprising mixtures of carboxylic acid polymers and soluble metal salts with the object of increasing the "yield" (defined as the number of barrels of 15 centipoise mud which can be prepared from one ton of clay) of relatively low-grade bentonite clays.

High-yielding bentonite clay, when treated with high molecular weight polyacrylamide and polyacrylate polymers or copolymers of vinyl acetate and maleic anhydride, can be made to produce about the same viscosity as twice the amount of untreated bentonite. See Park et al, Oil & Gas Journal, May 30, 1960, pp. 81–84.

Excessive fluid loss from the drilling fluid may contaminate the producing formation, permanently displacing oil and blocking production. If the formation penetrated is of the heaving shale type, such shale may absorb water from the drilling fluid and by a caving or swelling action, common to bentonite materials, close the bore hole around the drill stem, choke off circulation of drilling fluid, and seize the drill string. Similar results may occur simply from the abrupt increase in viscosity of the drilling fluid which is caused by excessive fluid loss. The adverse consequences of excessive fluid loss in the drilling of very deep wells are more severe due to the high temperatures and pressures encountered in such drilling operations. To increase the density of the drilling fluid so that it will exert sufficient hydrostatic pressure on the walls of the borehole, weighting agents such as heavy insoluble metal salts are added to the fluid. Drilling fluids must be of sufficient viscosityto maintain the weighting agent in suspension, but a relatively small decrease in fluid content may increase such viscosity to the point where the drill string binds. The tendency to lose liquid in a borehole is greatly increased by the high temperatures and pressures encountered.

Since most drilling fluids are "non-Newtonian" fluids, the apparent viscosity at given conditions of shear rate and shearing stress may change in a non-linear manner with certain parameters. This property makes it difficult to provide drilling fluids which will perform within acceptable ranges during the entire process of drilling a well.

In the mixing of drilling fluids in preparation for drilling operations, agitation at a certain degree of shear for some period of time is normally required to achieve the desired degree of thickening, but excessive agitation may cause the apparent viscosity to decrease. Since the degree of shear achieved in most drilling fluid circulating systems is low, it is important that a minimum of mixing time at a relatively low rate of shear produce the desired thickening, so that maximum thickening is obtained under operating conditions. Measurable variables which may characterize the apparent viscosity of a drilling fluid include the plastic viscosity, yield point and the rate and degree of gelation. The viscosity of a fluid normally decreases with an increase in temperature, but certain polymer additives or deflocculating agents may reduce, or even reverse, this tendency. However, the long-chain polymers which are most effective in achieving this effect are the most vulnerable to breakdown through oxidation, shear and thermal effects, i.e. the duration of exposure to high temperature drilling operations. Also, many such polymers tend to precipitate and/or lose viscosity as well as effectiveness as water loss additives when exposed to dissolved electrolytes, particularly when divalent metal cations such as $Ca^{++}$ and $Mg^{++}$ are present. In drilling fluids, the resulting vulnerability to breakdown is exacerbated by the density of the mud, which is directly related to the weighting agents required for a given formation pressure. The extremely high temperatures encountered in drilling geothermal wells also tend to cause early breakdown of mud additives.

Breakdown of water loss control polymers or deflocculants causes a large increase in the fluid loss accompanied by an increase in filter cake thickness. The thickness of filter cake will be determined by the solids content of the mud. High density drilling fluids with large amounts of weighting materials produce very thick filter cakes when fluid loss control is lost. These conditions often result in differential sticking of the drill string. It is desirable to develop additives which will enable drilling fluids to retain their proper viscosity and fluid content over a broader range of conditions.

Drilling fluids are used in the drilling of various types of wells. Workover and completion fluids, in contrast, are those fluids used in the completion and servicing of such wells. Completion fluids are those fluids used after drilling is complete and during the steps of completion, or recompletion, of the well. Completion can include cementing the casing, perforating the casing, setting the tubing and pump, etc.

Workover fluids are those fluids used during remedial work in the well. This can include removing tubing, replacing a pump, cleaning out sand or other deposits, logging, reperforating, etc.

Further with regard to sand consolidation, the polymers described herein are particularly useful because of their stability under hostile environment conditions. Sand consolidation is broadly disclosed in U.S. Pat. No. 3,978,928 the disclosure of which is hereby incorporated by reference. The in situ gelation of the polymeric viscosifier can involve crosslinking through the use of polyvalent metal ions such as aluminum or chromium or a sequestered metal system such as aluminum citrate, as described in detail herein.

In one embodiment of this invention the polymers disclosed can be used as thickening agents in hydraulic fracturing processes of the type described, for instance, in U.S. Pat. No. 3,727,689 the disclosure of which is hereby incorporated by reference. The use of polymeric viscosifiers comprising N-vinyl-2-pyrrolidone copolymers such as 50/50 wt/wt poly (N-vinyl-2-pyrrolidone-co-acrylamide) imparts excellent thermal stability to said fracturing fluids even in the presence of hard brines and high temperature, i.e. hostile environments. Other ratios of monomers can also be used, generally from 70:30 to 30:70 weight percent poly(N-vinyl-2-pyrrolidone:acrylamide). Polyvalent metal crosslinking of said copolymers can be effected by a redox couple e.g., sodium dichromate/sodium bisulfite or with aluminum cation sequestered with citrate as further described herein.

In one embodiment, this invention is used in fracture plugging of subterranean formations as disclosed in U.S. Pat. No. 3,845,822 the disclosure of which is hereby incorporated by reference. In a fracture plugging process the in situ polyvalent metal crosslinking of the polymeric viscosifiers is triggered by the sequential injection of (1) an oxidant composition containing a reducible polyvalent metal such as chromium +6 as sodium dichromate and (2) a water-soluble sulfur-containing reducing agent such as sodium bisulfite (redox system). The stability to hostile environment conditions of the polymers described herein make them particularly suited to use in fracture plugging.

Workover also broadly includes steps used in preparing an existing well for secondary or tertiary oil recovery such as polymer additions, micellar flooding, steam injection, etc.

Both workover and completion fluids are used in part to control well pressure, to prevent the collapse of casing from overpressure, and to prevent or reduce corrosion of casing. A drilling fluid may be suitable for completion or workover applications in some cases, but not in all cases. When a special workover or completion fluid is used, it is usually a poor or unsuitable drilling fluid.

The compositions of workover and completion fluids can differ from the compositions of drilling muds, since workover and completion fluids have functions which differ from those of drilling fluids. A workover or completion fluid differs from a drilling fluid in several ways. A workover fluid does not have to be compatible with drilled solids. Usually, a workover fluid is used in cased holes, and the formation is exposed only at perforations. Whereas a drilling fluid must protect the formation from swelling or disintegration, a workover fluid must not damage the permeability of the formation. Ideally, a workover fluid would contain no solids. If solids must be used, they should be acid soluble. Similarly, the compositions, properties and functions of workover fluids can differ from those of completion fluids.

Although there has been considerable progress in the field of workover and completion fluids, there is significant room for further improvement. For example, wells are being completed and serviced in increasingly hostile environments involving, e.g., high temperatures and high levels of salinity and/or hardness in the formation water. Thus, new additives for workover and completion fluids which retain their properties at elevated temperatures and high concentrations of dissolved electrolytes are in demand.

TREATMENT OF MINERALS AND WATER

In processing mineral ores it is often necessary to separate finely divided solids from aqueous suspension; conversely, in treating water for use, e.g., for municipal water supplies or industrial applications, it is often necessary to remove finely divided solids which may be suspended therein. Improvements in the ease of separation of finely divided solids from aqueous suspension either by sedimentation or by filtration have been accomplished by incorporating small amounts of high molecular weight water-soluble polymers in such suspensions. Among such polymers high molecular weight polyacrylamide and hydrolysis products thereof have proven to be effective on a wide variety of ore suspensions. Improved polymers have been developed for this purpose; for example, Sullivan discloses in U.S. Pat. No. 3,146,193 (1964) certain high molecular weight water-soluble copolymers of certain vinyl substituted, nitrogen-containing, heterocyclic ring compounds with acrylamide which can be incorporated in aqueous suspensions of finely divided inorganic solids to facilitate the concentration and separation of such solids.

Further improved polymers are in demand for applications involving concentrated brine solutions, e.g., potash ore processing. The American potash industry annually treats more than 18 MM tons of ore from which more than 3 MM tons of potash concentrate is recovered. Most of this product is used as fertilizer; however, nearly all of the potassium required by other U.S. industries comes from this concentrate.

A typical potash ore consists of sylvite (20–25%), halite (60–75%), and clay (4–20%). The potassium containing mineral is sylvite (KCl). The major impurities are halite (NaCl) and clay. The mixed ore is processed at the mine site. The processing varies with the level of clay, the higher clay ores requiring a more extensive treatment. This extensive treatment is becoming more widely utilized as the mines grow more mature and use lower grade ores.

The adverse effect of clay is caused by the high affinity of potash collectors for clay, which diminishes their cost effectiveness. In the processing, which consists of subsequent crushing, grinding, hydrolytic clay removal, and flotation, the time, cost and steps required depend upon the clay content. When more than a few percent of clay is present, the clay must be "blinded" by polyacrylamide, guar gum, or potato starch before collector addition.

A preferred step would be clay removal by flocculation with a brine soluble polymer, since all processing is conducted in saturated brine to prevent mineral dissolution. This polymer, in addition to brine solubility, must retain its activity and thus cost effectiveness in the presence of the high ionic strength brine medium. The effectiveness of most polymers, such as the polyacrylamides, are reduced, and in many cases the polymers are actually precipitated in such brines. Thus, effective flocculating agents which will withstand such saturated brines are in demand.

POLYMER ADDITIVES

In some cases, various polymers have been found useful in more than one application, such as those described above. However, among the most severe applications is enhanced oil recovery, in which polymer additives must form stable and viscous aqueous solutions while exposed to high temperatures and dissolved electrolytes for as long as several years, often requiring retention of a solution viscosity of at least about 10 centipoises at room temperature, and must reduce the permeability of rock to the flooding water by adsorbing on the rock in the formation. Many commercial water-soluble polymers have been tested for applicability in enhanced oil recovery, but prior to the present invention no such polymer has fully satisfied the requirements referred to above.

Polyacrylamide, for example, provides the desired viscosity and reduces rock permeability in many instances, but it frequently loses viscosity in water containing dissolved electrolytes. Polyvinylpyrrolidone, although stable in the presence of dissolved electrolytes including multivalent cations at the temperatures high enough to cause hydrolysis of polyacrylamide at significant rates (i.e., <200° F.), has only been available in grades of low viscosity. Polyvinylpyrrolidone also demonstrates undesirable adsorption on rock, thus an undesirable resistance factor and residual resistance factor. Furthermore, polyvinylpyrrolidone is much more expensive than polyacrylamide and many other commercial polymers. Thus, it is apparent that as the demand for recovery and processing of natural resources increases, improved polymer additives for such processes as enhanced oil recovery will be in demand. See, e.g., Davison and Mentzer, "Polymer Flooding in North Sea Oil Reservoirs," paper SPE 9300, presented at Fall Conference of Society of Petroleum Engineers of AIME, Dallas, TX, Sept. 21-24, 1980 and published in the Society of Petroleum Engineers Journal, June 1982, pp. 353-62. Davison and Mentzer evaluated over 140 polymers (generally classified as polyacrylamides, polyvinylpyrrolidones, hydroxyethyl celluloses, cellulose sulphate esters, guar gums, xanthans and scleroglucans) for viscosity retention and porous media flow performance under high temperature (90° C., 194° F.), high salinity, and high pressure conditions. For polymer flooding in North Sea oil reservoirs, the criteria were that a polymer solution should be five times more viscous than sea water and lose less than 20 percent of its viscosity in 500 days at 90° C. Scleroglucan polymers gave the best performance in the tests, producing the required viscosity in polymer solutions of about 500 ppm and retaining most of this viscosity through 500 days' aging at 90° C. Polyacrylamides were "particularly unsuitable", as they precipitated within 60 days in 90° C. seawater, apparently due to the presence of calcium and magnesium ions. Polyvinylpyrrolidones were very stable but had to be used in high concentrations (20,000 ppm) to give adequate viscosity. There is no indication that copolymers of vinylpyrrolidones and acrylamides were tested at high temperatures. McCormick et al DOE/BETC/5603-10, p. 5, 117 prepared such copolymers but concluded that they had "low solution viscosity and appear of little value in EOR." Thus they were not tested. Thus, there is a substantial need for polymers which would be useful in the recovery of natural resources in hostile environments, such as in North Sea oil reservoirs, and in various operations for processing natural resources in hostile environments.

SUMMARY OF THE INVENTION

Among the objects of the invention are polymers suitable for use in the recovery and processing of natural resources, such as in enhanced oil recovery operations, in drilling, workover, and completion fluids, and in the treatment of minerals and water. Other objects of the invention are polymers suitable for use in subterranean well bores and reservoirs, such as oil-bearing reservoirs, and in the treatment of minerals and water when the polymers are exposed to severe conditions, including high temperatures and/or highly saline environments and/or water with a high concentration of hardness ions.

Other objects of the invention are processes for the recovery and processing of natural resources as described above. Further objects of the invention are processes for the recovery and processing of natural resources in which polymers are employed that are suitable for exposure to severe conditions as described above.

Other objects, advantages and features of the invention will be readily apparent to one skilled in the art from the following detailed description of the invention, the drawings, and the appended claims.

According to this invention, novel processes are provided comprising the introduction of polymers comprising an N-vinyl lactam and an unsaturated amide into a subterranean well bore, such that said polymers are exposed to hostile conditions such as temperatures of at least about 120° F. Said polymers are stable when exposed to water of significant salinity and/or hardness. The polymers can be at least partially dissolved in various fluids, including for example an aqueous fluid, or in a fluid containing at least one composition selected from the group consisting of bases, polymeric viscosifiers, surfactants and cosurfactants, and combinations of any two or more of said compositions. The polymers can be crosslinked with various crosslinking agents. The polymers are preferably water-soluble or water-dispersible.

Further according to this invention, novel methods are provided for the preparation of novel polymers of N-vinyl lactams, preferably N-vinyl-2-pyrrolidone, including homopolymers, copolymers and terpolymers. In one embodiment of the invention, such polymers are prepared using particular polymerization media and polymerization initiators or radiation sources, which produce polymers useful in the recovery and processing of natural resources, such as introducing such polymers into a subterrnean well bore as above described. When the polymers are prepared in preferred polymerization media such as water containing mixed electrolytes with a free radical initiator, novel polymers are obtained which have relatively high viscosity and molecular weight, and maintain these properties even in harsh environments having high temperature and/or salinity and/or hardness. Also according to the invention, a polymerization medium consisting essentially of a tertiary alkanol and a free radical initiator can be employed.

Further according to this invention, novel methods are provided for the production of terpolymers, consisting essentially of the comonomers as described above polymerized with a minor amount of a termonomer of a hydrophobic or non-anionic character.

When these copolymers and terpolymers are prepared by combining the monomer units in certain preferred proportions in preferred polymerization media such as water containing mixed electrolytes, or a neat tertiary alkanol such as t-butyl alcohol, with a free radical initiator selected from certain organic azo compounds or organic peroxides, or using electromagnetic radiation such as gamma radiation, polymers are obtained which have high viscosity and molecular weight and which maintain their viscosity, thus their usefulness, even in harsh environments having high temperature, salinity and/or hardness, and when subjected to shear conditions. Certain of these polymers can be characterized by K values of greater than 140. (K values are related to relative viscosity, as discussed fully herein.) By using slightly different proportions of monomer units and different molecular weights in some cases, it has been discovered that the resulting copolymers and terpolymers are generally useful in processes for the recovery and processing of natural resources comprising enhanced oil recovery, use as additives for drilling, workover and completion fluids, selective plugging of zones of excess permeability in subterranean formations by in-situ polymerization, the treatment of minerals in their recovery and processing, flocculation of suspended solids, and the thickening and treatment of water for various uses.

Further in accordance with this invention, it has been discovered that polymers of superior properties can be prepared by a method of polymerizing a monomer mixture comprising N-vinyl pyrrolidone and acrylamide employing electromagnetic or nuclear radiation, preferably in an aqueous polymerization medium.

Furthermore, it has been discovered that in processes comprising the introduction of a polymer into a subterranean well bore so that said polymer is exposed to a temperature of at least about 120° F., especially in waters of high salinity and/or hardness, the copolymers and terpolymers of the prior art comprising monomers and termonomers as described herein can be used as well as the inventive analogous polymers prepared by the methods of this invention in the specified polymerization media. Further advantages are apparent when such polymers are exposed to temperatures of at least about 150° F., particularly for temperatures above about 200° F., including temperatures of 250° F., 275° F. and even 300° F.

Further in accordance with the present invention, polymers prepared in accordance with this invention are added to a liquid containing solids to aid in flocculating such solids, wherein the temperature of the liquid is at least about 150° F. and/or the liquid has a salinity of at least about 10 grams per kilogram of solution.

In accordance with one process of this invention, a polymerization inhibitor is introduced into an oil-bearing formation under conditions designed to allow permeation of the polymerization inhibitor into both the more permeable zones and the less permeable zones, followed by a flush which selectively removes the polymerization inhibitor from the more permeable zones. After this, a mixture of N-vinyl lactam, unsaturated amide and optionally, a minor portion of a termonomer, and a polymerization catalyst are introduced into said formation together or independently to form a fluid diversion plug in the absence of the polymerization inhibitor, thus selectively plugging the more permeable zones in the formation. The preferred monomers of this invention polymerize well in polymerization media similar to the connate water found in the oil-bearing formations, and the polymers thus formed in situ retain their viscosity well under the conditions encountered in "hostile" formation environments, e.g. high temperature, high salinity and/or high concentration of hardness ions.

Still further according to this invention polymer compositions of at least one of a hydrophilic N-vinyl lactam and a hydrophilic vinyl-containing sulfonate and optionally an unsaturated amide are used to thicken water used to recover oil under hostile conditions.

Still yet further in accordance with this invention a polymer which is not capable of imparting as high a viscosity to water as a polyacrylamide is used under hostile environment conditions where acrylamide polymers are useless because of precipitation.

DETAILED DESCRIPTION OF THE INVENTION

Polymers

Figure 1:
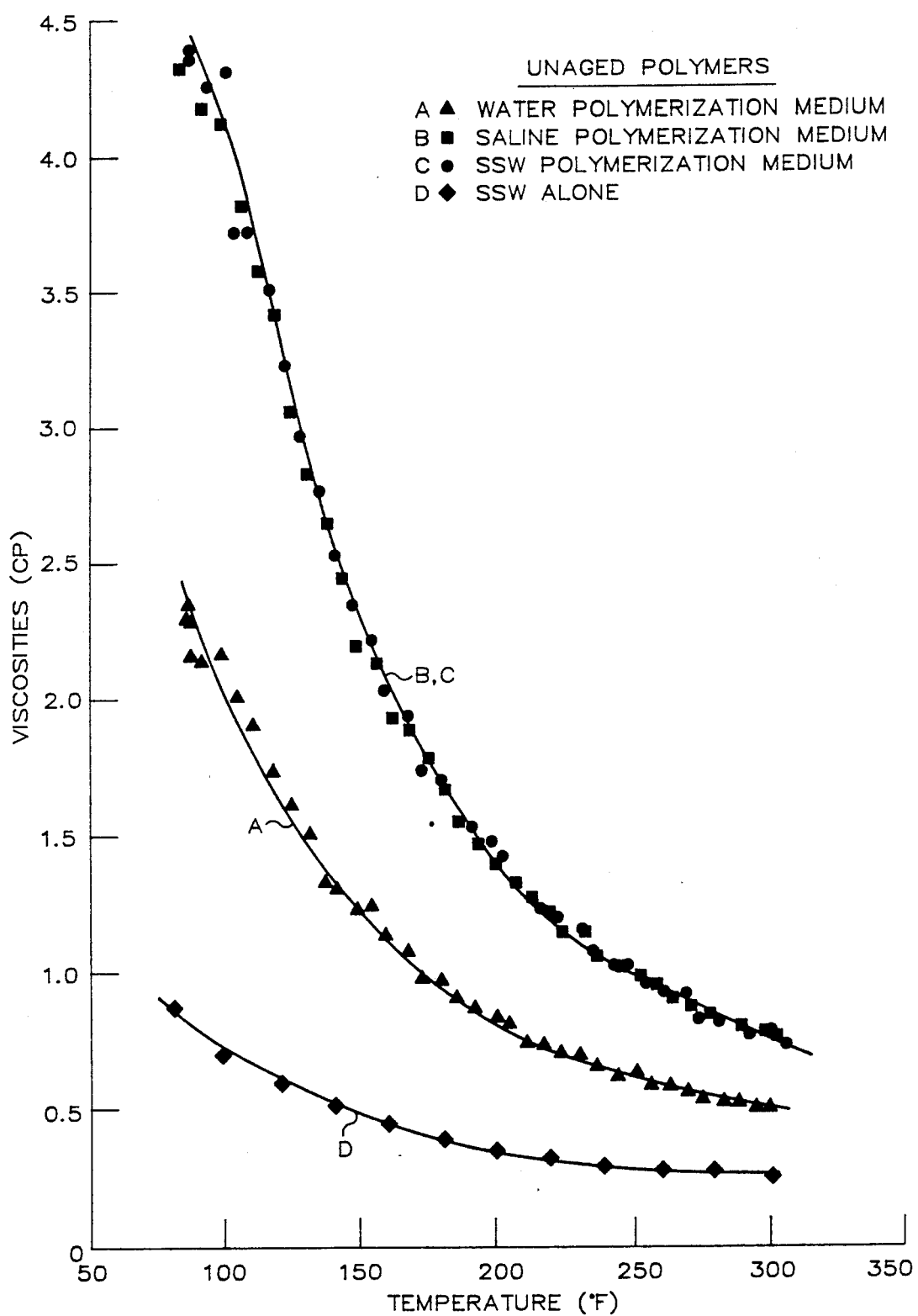
FIG. 1 shows the variation of viscosity with temperature of unaged polymers of this invention compared with polymers of the prior art and synthetic sea water.

As used herein the term "polymers" is used generically, unless otherwise indicated, to mean homopolymers, copolymers and terpolymers and thus includes polymers prepared using any number of monomers.

The homopolymers of N-vinyl lactams prepared in accordance with this invention have improved viscosity, and maintain this viscosity well under adverse conditions such as high temperature, high salinity and/or high concentrations of "hardness" ions. Thus, despite their relatively high cost compared to some commercial polymeric viscosifiers, these polymers are suitable for certain processes for the recovery of natural resources under such adverse conditions.

The copolymers and terpolymers of this invention appear to be well suited for various applications including enhanced oil recovery (EOR), drilling fluid water loss additives, workover and completion fluid additives, selective plugging of "thief zones", minerals beneficiation, water thickening, water treatment, and the like. In a presently preferred embodiment, the copolymers and terpolymers, to be described subsequently, are well adapted because of their outstanding viscosity stability in hostile, saline, hard water environments, for polymer-flooding purposes. A hostile environment for the purpose of this application is one in which the temperature, salinity and/or hardness cation content is high enough to cause precipitation, loss of viscosity and/or similar adverse effects within a nominal period of time in conventional polymers otherwise suitable for use in such applications. Such conventional polymers include, for example, polyacrylamides. The advantages of the polymers of this invention are apparent when they are employed in hostile environments of at least 120° F. or as more specifically defined in FIG. 14. Brackish and/or hard aqueous fluids having a salinity of at least about 10 grams per kilogram of solution and/or a fraction of divalent hardness ions to total cations of at least about 1 weight percent and particularly at least about 5 weight percent in combination with temperatures of at least about 120° F. are considered hostile environments. Since hardness cations such as $Ca^{+2}$ and $Mg^{+2}$ are particularly damaging to many such polymers, when the salinity and hardness cation content are relatively high the hostile zone is defined by a relatively lower temperature. A hostile environment, for example, is one wherein the reservoir temperature can be as low as 150° F. and the electrolyte concentration of dissolved salts in the available water, both injection water (which may be seawater) and formation water, is at least about 35,000 ppm (with about 1750 ppm combined calcium and magnesium ions), i.e., about 3.5 weight percent or higher, equivalent to a salinity of about 35 grams per kilogram of solution. At lower reservoir temperatures, from e.g. about 120° F. up to about 150° F., a relatively higher salinity and/or content of hardness cations would create such a hostile environment, say, for example a salinity of at least about 50–100 grams per kilogram with a fraction of divalent hardness cations to total cations of at least about 20 weight percent. At temperatures of at least about 120° F., a hostile environment for polymeric viscosifiers can also be created by a strongly basic environment, e.g., concentrations of at least about 5 weight percent of strong base, which accelerates the hydrolysis process in many polymers. Such conditions are encountered in processes comprising, e.g., caustic flooding of oil-bearing subterranean formations.

A hostile environment can best be viewed as one in which conventionally used thickening agents are unstable. Polyacrylamides are such conventionally used thickening agents.

Polyacrylamides as commonly used for Enhanced Oil Recovery (EOR) hydrolyze at elevated temperatures and will eventually precipitate in the presence of divalent cations. The following is the method by which the limits of a hostile environment are determined using this criteria. That is, the boundary below which this polymer remains in solution indefinitely and above which in days or months it falls out of solution, resulting in loss of polymer viscosity and plugging of the formation defines a hostile environment.

Figure 12:
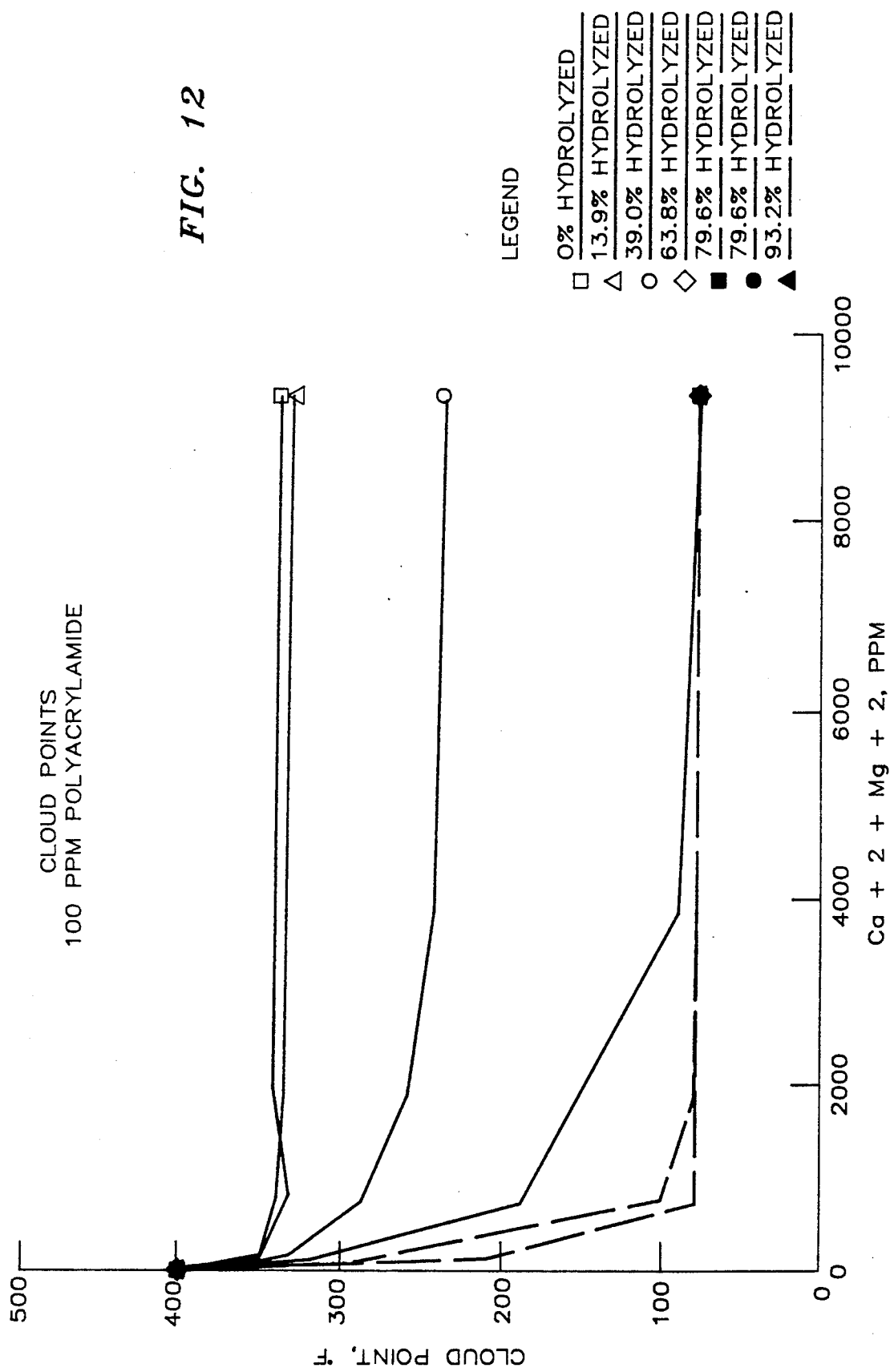
FIG. 12 is a plot of cloud point versus multivalent cation concentration.

Any polyacrylamide in hard brines will eventually turn cloudy (i.e., begin to precipitate if its temperature is raised high enough). FIG. 12 shows the cloud point as a function of divalent cation concentration for 1000 ppm by weight originally unhydrolyzed commercial polyacrylamide in various brines. These solutions were thermally hydrolyzed to different levels in 5% saline solution prior to addition of divalent cations (equal amounts of calcium and magnesium in ppm by weight) and making cloud point measurements. In the absence of divalent cations (a condition not found in petroleum reservoirs), this polymer stays in solution up to 400° F. (the limits of the measurement) regardless of the level of hydrolysis. The presence of divalent cations, on the other hand, affects the cloud point depending on the hydrolysis and hardness level. That is, the higher the hydrolysis level and divalent cation concentration, the lower the cloud point.

Figure 13:
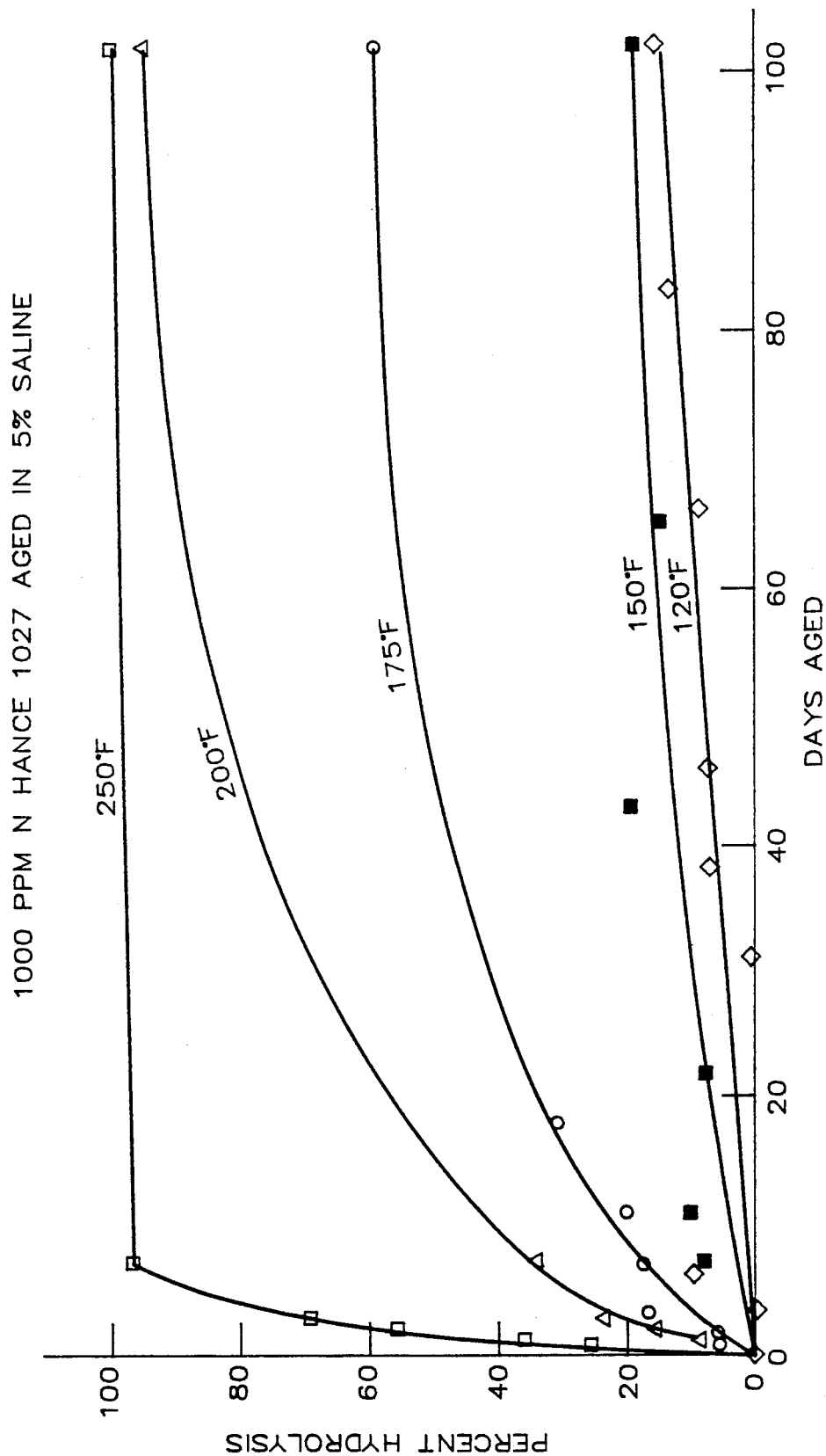
FIG. 13 is a plot of per cent hydrolysis versus days aged.

FIG. 13 shows the effects of time and temperature on the hydrolysis of 1000 ppm of the same unhydrolyzed commercial polymer. This figure indicates that at a given temperature the level of hydrolysis increases with time, but eventually reaches an equilibrium. Using a standard thermodynamic treatment of an equilibrium reaction, where $K_{eq}$ is the equilibrium constant, $\Delta S°$ and $\Delta H°$ are the standard entropy and enthalpy changes for the reaction, R is the gas constant and T is the absolute temperature $$\text{Ln } K_{eq} = \frac{\Delta S°}{R} - \frac{\Delta H°}{RT} \tag{1}$$

Fitting this equation to $K_{eq}$ and T values derived from FIG. 13 gave values of $\Delta S°$ and $\Delta H°$, which were then used to calculate $K_{eq}$ and equilibrium level of hydrolysis for any desired temperature. A standard analysis of the kinetics of hydrolysis gives the following equation $$\frac{Ao - Ae}{Ao + Ae} \ln \frac{Ao^2 - AAe}{(A - Ae)Ao} = k_f t$$

where Ao, Ae and A are the amide concentrations at zero time, at equilibrium and at t, respectively, and $k_f$ is the rate constant for the forward (hydrolysis) reaction. By fitting amide concentrations to equation (2) $k_f$ values were calculated for the five temperatures represented in FIG. 13. A fit of these results to the Arrhenius equation $$k_f = Ce^{-Ea/RT} \qquad (3)$$

gave values for C, the pre-exponential factor and Ea, the activation energy. The forward rate constant for any desired temperature could then be calculated. Using the $k_f$ value for a given temperature and equation (2), the time required to achieve a given degree of hydrolysis can be calculated. This can be done so long as the desired hydrolysis level is lower than the equilibrium level of hydrolysis for that temperature, that is as long as A > Ae in equation (2). For A = Ae this equation predicts time to approach infinity, and for A < Ae time is undefined. In other words the hydrolysis level at any temperature cannot exceed the equilibrium value for that temperature.

FIG. 12, with appropriate interpolation, can be used to define the hydrolysis level that causes the onset of precipitation for any given temperature and hardness level. Equations (1), (2), and (3) predict the time taken to reach this level of hydrolysis. If the equilibrium hydrolysis level is less than the level causing instability, the time is infinite. In other words, an initially unhydrolyzed polyacrylamide will be indefinitely stable under the chosen conditions. If the equilibrium hydrolysis level is greater than the level causing instability, the polymer will ultimately precipitate and the calculation gives the time to the onset of instability. If the two hydrolysis levels are exactly equal, the stability limit has been defined.

Figure 14:
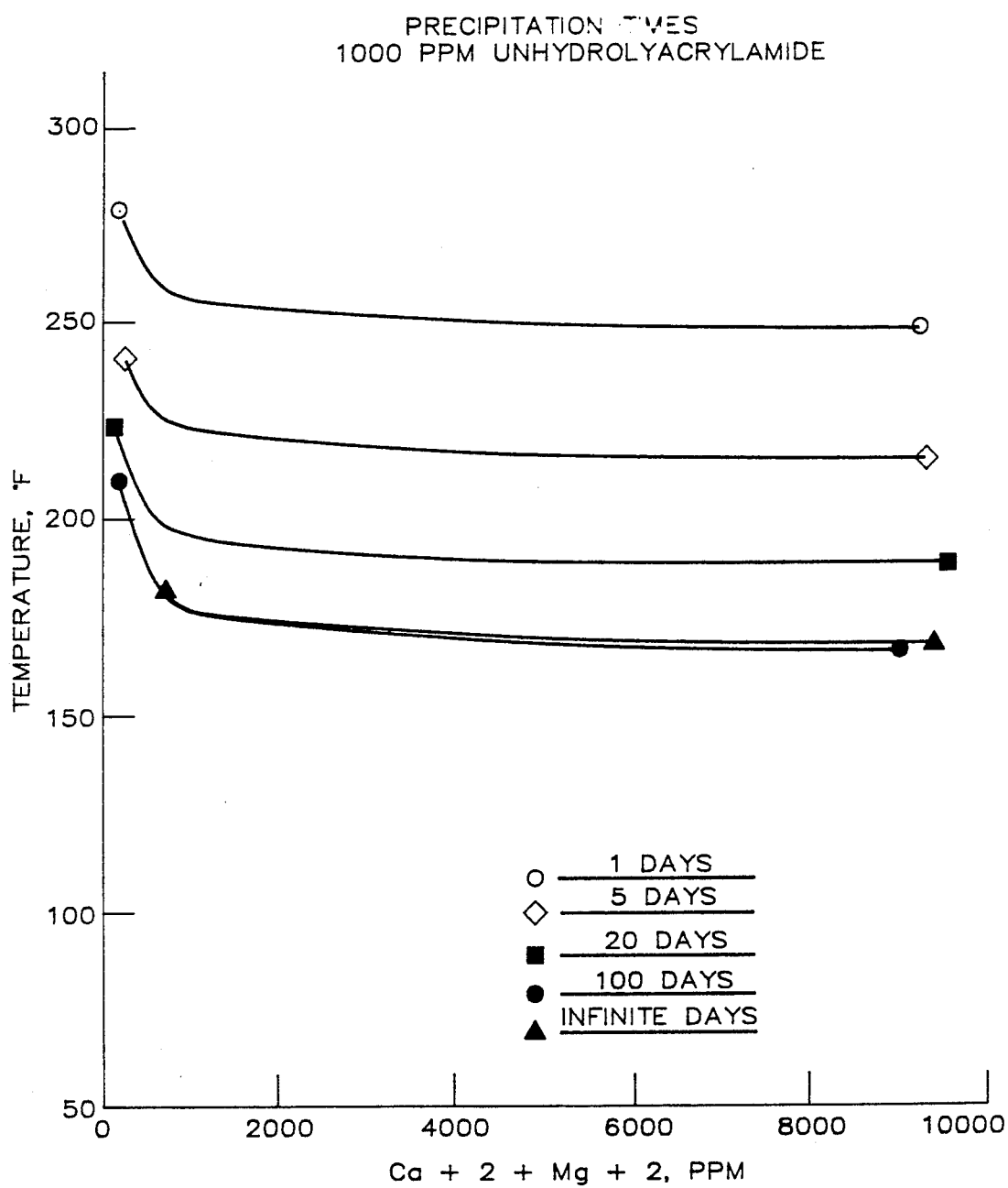
FIG. 14 is a plot of precipitation times as a function of temperature and divalent ion concentration.

By repeated calculations at closely spaced temperatures for many hydrolysis levels, FIG. 14 was generated. This gives contour lines of equal precipitation time as a function of temperature and hardness level. Any conditions above and to the right of the infinity line represent hostile environments for polyacrylamides in the sense that the polymer will eventually precipitate. Note that the 100 days line lies very close to the infinity line, indicating that within a practical range of times for EOR projects the actual stability time is not much of an issue.

It must be pointed out that FIG. 14 is for an unhydrolyzed polymer and the stability times represented are much longer than for already partially hydrolyzed (~30%), polyacrylamides commonly used in EOR. Furthermore, the polymer used in this study has a moderate molecular weight (MW) and those commonly used in EOR with higher MW will precipitate at lower temperatures under the same hardness and hydrolysis levels. It must also be mentioned that polymer concentration may play a role in precipitation of polymer and FIG. 14 represents stability limits for 1000 ppm of polymer.

Since there is so little difference between the 100 day curve and the infinity curve, there is no need to make an arbitrary designation of a time limit for the time parameter but rather infinity can be used. Also, since almost all formations where there is an otherwise hostile environment will have at least 400 to 1000 ppm multivalent cations, and since the infinity curve becomes almost flat after about 1000 ppm, the hardness parameter can simply be anything greater than 500-1000 ppm by weight multivalent cations. This leaves the temperature as the significant factor, the temperature being anything over about 170° F. at greater than 1000 ppm multivalent cations although, of course, defining the hostile environment as above (i.e. above and to the right) of the infinity line is more precise. Generally the temperature will be within the range of 170°-400° F. or at least 170°-300° F. and the multivalent cation concentration will be within the range of 500 to 220,000 or more likely 1000 to 10,000 ppm by weight based on the weight of water.

Although several biopolymers have been reported to be stable in sea water for extended periods at temperatures up to a range of from about 150° F. to nearly 200° F., above about 200° F. the only water-soluble polymer known to maintain its solution viscosity under these conditions is polyvinylpyrrolidone (PVP). However, PVP is relatively expensive and it requires high concentrations, e.g. about 2 weight percent or more, to obtain suitable viscosities for polymer flooding.

The copolymers and terpolymers of this invention are generally water-soluble or water-dispersible and cheaper to prepare than PVP. These polymers can be retained in solution in the aqueous polymerization medium in which they are prepared. When prepared by radiation polymerization in a viscous polymer mass (commonly known as a "gel log") the polymers are also water-soluble. However, when the polymer is separated from such an aqueous medium and dried, it is generally expected to be water-dispersible and/or swellable, but may not be completely water-soluble. On the other hand, the polymers separated from a polymerization medium consisting essentially of a tertiary alkanol in accordance with this invention and dried appear to be generally water-soluble, which can be an advantage when a granular, water-soluble polymer material is desired. They have been found to provide adequate solution viscosity with exceptional thermal stability and resistance to electrolyte effects, thus are superior to PVP for EOR in hot, saline environments, especially those containing "hardness" or multivalent metal cations such as $Ca^{+2}$, $Mg^{+2}$, etc. Their preparation and properties are described in Examples I, II, III, IV, V, VI, VII, VIII, XIV, XV, XVI, XVII, XVIII, XIX, XX, XXI, and XXII.

The polymers of this invention are derived from monomer units of N-vinyl lactams preferably having the formula

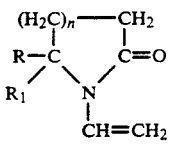

where R and $R_1$ are selected independently from the group consisting of hydrogen, methyl and ethyl and n is an integer of from 1 to 3. These monomers are generally water-soluble or water-dispersible. A more preferred class of compounds are those of the formula

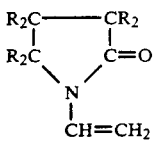

where R is hydrogen, methyl or ethyl. The monomer unit presently most preferred is N-vinyl-2-pyrrolidone. Preparation and properties of the homopolymers are described in Examples XI and XII.

Alternatively, in place of or in addition to the N-vinyl lactams, i.e., N-vinyl cyclic amides, open chain N-vinyl amides suitable for use in the present invention are described by the formula

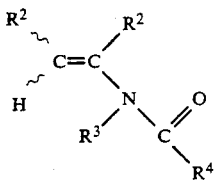

wherein each $R^2$ is independently selected from H and 1-6 preferably 1-2 carbon atom alkyl groups; $R^3$ and $R^4$ are selected from 1-3 carbon atom alkyl groups. The preferred monomer is N-methyl-N-vinylacetamide because of the exceptional resistance to hydrolysis of copolymers made therewith in combination with the unsaturated amide monomers and/or vinyl-containing sulfonate monomers described herein. Such polymers are particularly suited for reservoirs of 190° F. or greater (88° C.) in the presence of 400 or more ppm multivalent cations such as $Ca^{+2}$ or $Mg^{+2}$.

Although the $R^2$, $R^3$, and $R^4$ groups can be independently selected as noted, the resulting monomer must be hydrophilic as defined herein to be used as the N-vinyl amide component of compositions of this invention. These alternative N-vinyl amide components can be viewed as open chain or with the $R^3$ and $R^4$ groups fused as the lactam component. Hence the generic term N-vinyl amide is used to include both the lactam and the open chain N-vinyl amide, these both being hydrophilic.

Copolymers of this invention are produced by copolymerizing a comonomer of an unsaturated amide having the formula

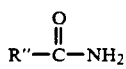

where R" is an unsaturated radical selected from 1-alkenyl groups such as ethenyl (vinyl), propenyl, isopropenyl, 1-butenyl, isobutenyl (2-methyl-1-propenyl), 1-pentenyl, 1-isopentenyl (3-methyl-1-butenyl), and 1-methyl-1-butenyl with a comonomer of at least one N-vinyl lactam as described above. These unsaturated amides are generally water-soluble or water-dispersible. The monomers presently preferred are N-vinyl-2-pyrrolidone (VP) and acrylamide (Am). For convenience, the terms VP and Am will be used to refer to the first and second monomers, respectively, in the discussions herein.

A more preferred class of unsaturated amide monomers are those of the formula

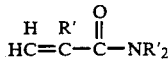

wherein each R' is individually selected from H and methyl. Especially suitable in addition to acrylamide are N-methylacrylamide and N,N-dimethylacrylamide (DMAm). For both the vinyl lactam and unsaturated amide the scope can be viewed functionally as including the replacement of hydrogens with hydrocarbon groups so long as the monomer remains hydrophilic. By hydrophilic is meant if the monomer were homopolymerized, the polymer would be water soluble. A monomer which may not form a water-soluble homopolymer but which, in the amount used in a copolymer results in a water-soluble copolymer is also viewed in a broader sense within the definition of hydrophilic.

The minimum amount of N-vinyl lactam comonomer required is that amount necessary to provide the desired polymer properties, e.g. viscosity and stability, under the expected environmental conditions. For example, polymers containing a minor amount, up to about 10 weight percent, of the vinyl lactam could be effective in the recovery and processing of natural resources, such as for example in enhanced oil recovery in reservoirs having temperatures in the range of about 120° F. to about 150° F. and/or formation waters of significant salinity and/or hardness. Polymers of these proportions could also be useful under more adverse conditions if exposed for shorter periods of time.

The monomer weight ratios of the copolymers can vary rather widely. Generally, VP:Am ratios in the range from about 10:90 to about 90:10 are employed depending upon the intended application, but preferably VP:Am weight ratios in the range of about 25:75 to about 75:25 are employed, more preferably from about 40:60 to about 70:30. The optimum VP:Am weight may vary according to the application. For example, in EOR the range presently preferred is from about 65:35 to about 50:50, based on prolonged aging studies conducted with the copolymers, but for in situ polymerization applications a relatively broad range of from 25:75 to 75:25 is preferred. A copolymer presently particularly preferred for certain applications after heat aging at 250° F. contains about 60 weight percent VP and about 40 weight percent Am, corresponding to a 1:1 molar ratio. The VP:Am weight ratios of 10:90 to 90:10 correspond to molar ratios of about 6:94 to 85:15.

After heat aging, copolymers of these 60:40 proportions have been found to retain their viscosity well in hot, saline environments. On the other hand, when the copolymers are to be used without such pre-aging, higher, if less persistent, viscosities have been obtained with copolymers having VP:Am weight ratios in the range of from about 45:55 to about 55:45, or preferably about 50:50. Since the VP:Am weight ratios are expressed in terms of 100 parts by weight of the copolymer, the weight percentages of the monomer units in the copolymer can be read directly.

Further in accordance with this invention, novel and useful terpolymers can be prepared by copolymerizing a first monomer unit of an N-vinyl lactam and a second monomer unit of an unsaturated amide as described above with a minor portion of a third monomer selected from the group consisting of hydrophobic compounds, vinyl pyridines and hydroxyalkyl esters of ethylenically-unsaturated carboxylic acids and combinations of any two or more thereof. Particularly suitable second monomers are acrylamide and N-substituted unsaturated amides such as N,N-dimethylacrylamide. For convenience, the third monomer will hereinafter be referred to as a termonomer, as distinguished from the first and second monomer units described above, which are referred to as comonomers, or VP and Am for convenience. The hydrophobic compounds suitable for the termonomers are generally selected from the group consisting of monovinyl aromatic hydrocarbons having from 8 to about 12 carbon atoms such as styrene, vinyl esters of saturated carboxylic acids having from 3 to about 6 total carbon atoms such as vinyl acetate, alkyl esters of ethylenically-unsaturated monocarboxylic acids having from 3 to about 22 carbon atoms, such as ethyl acrylate, and ethylenically-unsaturated nitriles having from 3 to about 5 total carbon atoms, such as acrylonitrile. Other suitable hydrophobic monomers are N-vinyl acetamide and 2-vinyl quinoline. Also suitable hydrophobic monomers are acryloyl pyrrolidones, diacetoneacrylamide and N- and N,N-alkylacrylamides where the alkyl groups contain more than two carbon atoms. By hydrophobic is meant that if the monomer were homopolymerized it would be water insoluble although in amounts up to 25 percent it can be present herein and the total polymer is still water soluble. Other suitable compounds (hydrophilic but not anionic) include vinyl pyridines such as 4-vinyl pyridine, acryloyl morpholine, methyl vinyl ether, ethyl vinyl ether, dimethylallyl ammonium chloride, dimethylaminoethyl acrylate, N-vinyl urea, acryloyl urea, N,N-diethylaminoethyl acrylate, N-methyol acrylamide, tert-butylaminoethyl acrylate, dimethylaminopropyl methacrylamide, methacrylamidopropyl trimethyl ammonium chloride, and hydroxyalkyl esters of ethylenically-unsaturated monocarboxylic acids having from 3 to about 22 carbon atoms, such as hydroxyethyl acrylate. Termonomers which are presently preferred comprise (meth)acrylic acids and their monovalent salts and their esters such as methyl acrylate, butyl acrylate, methyl methacrylate and lauryl methacrylate, acrylonitrile, diacetone acrylamide and styrene for increasing the hydrophobic character of the terpolymers, vinyl pyridines, hydroxypropyl methacrylate and hydroxyethyl methacrylate and hydroxyethyl acrylate as water soluble monomers which increase the hydrophilic character of the terpolymers without introducing termonomers which are sensitive to metal cations (and because good results have been obtained with 4-vinylpyridine and 5-methyl-2-vinylpyridine); and vinyl acetate due to its low cost and ready availability.

As with the copolymers, the monomer weight ratios of the terpolymers can vary rather widely, depending upon the intended application, but preferably the termonomer will be present as no more than about 10 weight percent of the monomer units charged. More broadly, however, particularly with non-ionic hydrophylic termonomers up to 25 weight per cent can be used. The first and second monomer units can be present in approximately the range of weight ratios disclosed for the copolymers, constituting the major portion of the terpolymer, with the termonomer providing the remaining minor portion. For example, the terpolymer can consist of 45 weight percent each of the first and second monomers, with 10 weight percent of the termonomer, 49 weight percent each of the first and second monomers with 2 weight percent of the termonomer, and so on. These examples contain the first and second monomer units in weight ratios of 50:50, but as disclosed above, the three monomer units can be combined in any combination, provided the termonomer does not exceed 10 weight percent, but preferably is at least 1 weight percent, and the first and second monomer units are within the range of weight ratios as disclosed for the copolymers. Based on the examples, the termonomer is preferably present as from about 2 to about 8 weight percent, or more preferably, from about 3 to about 5 weight percent, based upon total monomers.

As the copolymerization reaction produces polymer in near-quantitative yield, the desired ratios of VP to Am can be obtained by controlling the ratios of VP monomer and Am monomer charged to the reactor and the rates at which the monomers are fed into the reactor.

Another significant aspect of this invention is described as follows. Polyacrylamide has historically been a standard material for thickening water for oil recovery. At a concentration of, for instance, 0.25 weight percent in sea water, polyacrylamide imparts a viscosity to the resulting solution which is about ten to twenty times the viscosity of sea water at the same temperature. For instance, sea water at room temperature has a viscosity of approximately 1 compared with 10 to 25 for the same water containing a quarter weight percent polyacrylamide and this viscosity remains essentially unchanged on aging at room temperature. At 250° F. (121° C.) sea water has a viscosity of about 0.3. The same water with 0.25 weight percent acrylamide initially has the viscosity of about 10 but on aging the acrylamide precipitates rendering it totally useless with the resulting sea water not having a viscosity increased any after the precipitation.

Figure 15:
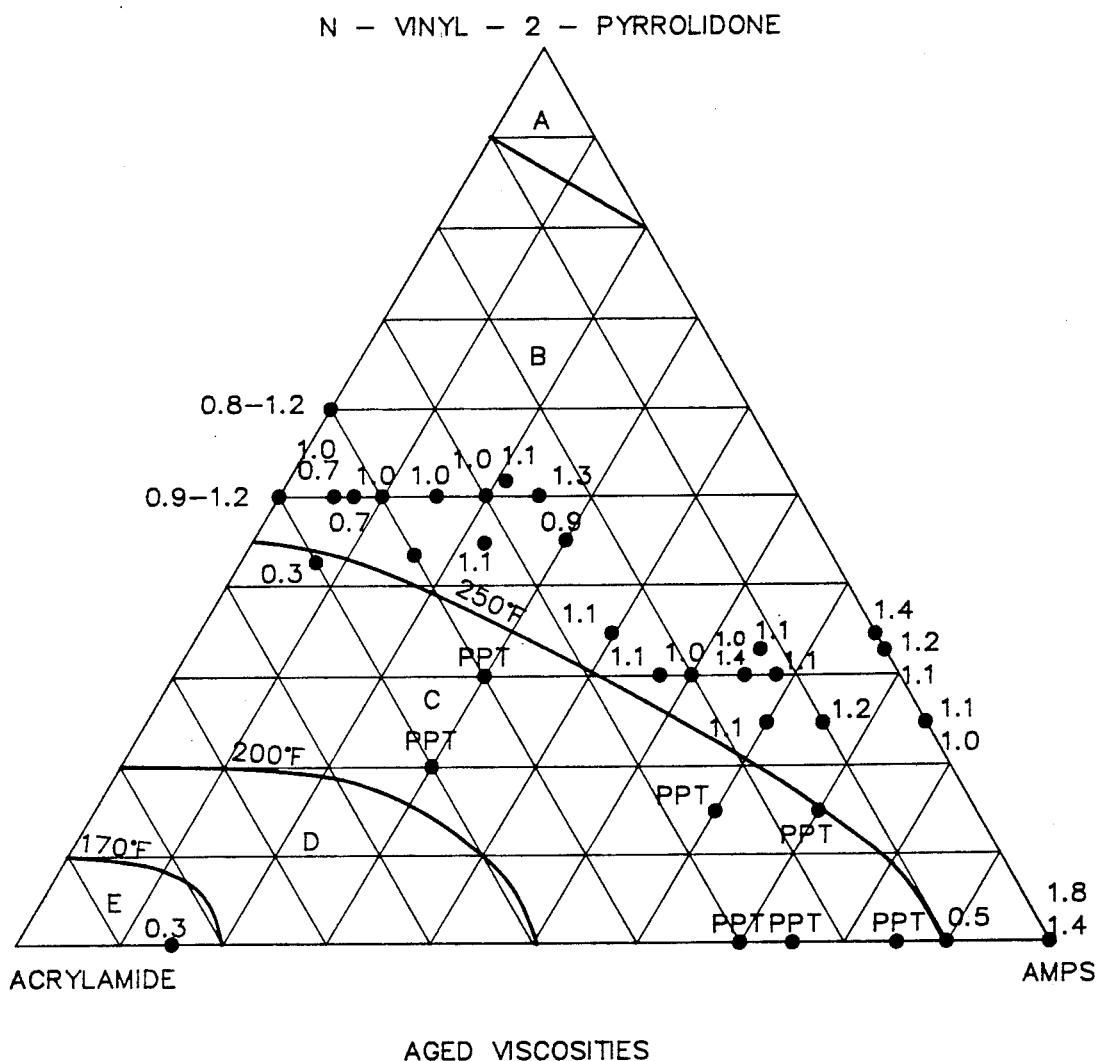
FIG. 15 is a plot of aged viscosity data on polymers having monomer ratios of components as shown on the triangular graph.
Figure 16:
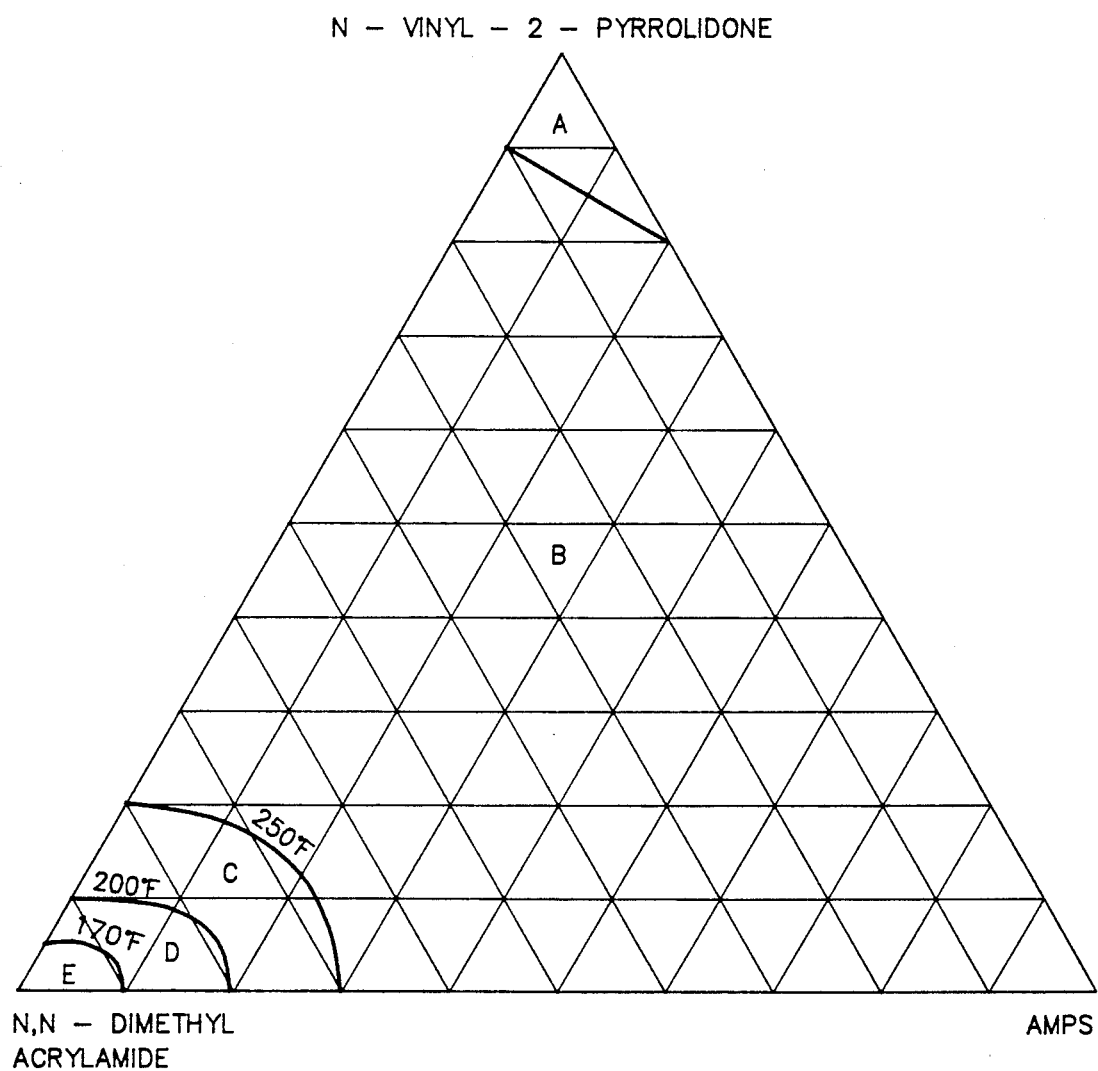
FIG. 16 is a plot similar to FIG. 15 except the unsaturated amide is N,N-dimethylacrylamide.

The following description of FIGS. 15 and 16 show that in accordance with the invention, significant enhancement of the viscosity of polymer flood water is possible even when the water is to be used in reservoirs exhibiting hostile conditions.

In FIGS. 15 and 16 the viscosity data is for polymer aged 7 days at 300° F. and then the viscosity determined at 250° F. The 300° F. aging test is carried out as follows. Synthetic sea water (SSW) is prepared from distilled water to which salts are added as described hereinafter. The polymer is dissolved in the SSW to form a 0.25 weight percent solution. It is then subjected to vacuum and if necessary nitrogen purge to remove oxygen. It is then sealed under 100 psig nitrogen pressure in a glass lined container and aged 7 days at 300° F.

As can be seen from FIG. 15, polymer compositions depicted therein have aged viscosities of 0.7 (i.e. better than 2 times sea water) or greater, generally 1.0 (about 3 times sea water) or greater. Thus in accordance with this invention for the first time the psychological barrier has been crossed to utilizing polymers which do not impart the 10 to 20 fold increase in viscosity associated with standard materials such as acrylamide. The inventors have surprisingly discovered that the water soluble polymers described herein because of their resistance to precipitation on aging at high temperatures are effective in spite of their apparent poor performance in standard room temperature viscosity tests. In high temperature applications the only significant factor is the viscosity imparted after aging.

The polymers shown in area B of FIG. 15 represent compositions which are preferred because of stability even at 250° F. Those of area E are useless because of precipitation at hostile environment temperatures of 170° F. Areas D and C represent polymers stable up to at least 170° F. and 200° F. respectively. The area encompassed by area B can be increased somewhat by utilizing N,N-disubstituted acrylamide as shown in FIG. 16. The area encompassed in region A is less preferred because the viscosity imparted to the sea water is so low that higher concentrations are required to give effective solutions. Such compositions are not useless, however, and can be used if desired with best results obtained using the highest molecular weight polymers obtainable.

As stated hereinabove the unaged viscosity at an arbitrary test temperature of 250° F. (121° C.) for a solution containing 0.25 weight percent polyacrylamide unaged is about 10. For polymers as shown in FIG. 15 having aged viscosities of 1 the unaged viscosity is about 1.5. Other polymers depicted as being encompassed by the useful polymers in accordance with this invention can have unaged viscosities at 250° F. (121° C.) of about 2 or slightly more (some specific compositions are higher than this). Thus the invention in one aspect can be viewed as utilizing a polymer in a hostile environment which polymer in an unaged test at 250° F. in a concentration of 0.25 weight percent imparts to sea water a viscosity of less than one third (i.e. a viscosity of no more than 2 or no more than 3) the viscosity imparted by the same amount of a standard unaged acrylamide polymer such as N-Hance 1027 by Hercules.

In another aspect, the invention resides in the surprising relationship wherein the N-vinylamide such as VP imparts a disproportionate stability to the polymers containing pendant amide groups such as Am derived polymers as well as copolymers of unsaturated amides such as acrylamide and vinyl-containing sulfonate monomers such as AMPS, i.e. VP/Am/NaAMPS. Yet VP does not stabilize the esters discussed hereinafter (such as SPM). In fact, the VP/SPM is not as effective as the SPM homopolymer. SPM represents, e.g., potassium or sodium 3-methacryloyloxy propanesulfonate or (3-sulfopropyl)methacrylic ester, sodium or potassium salt.

In order to distinguish between the N-vinyl lactam and unsaturated amide comonomers which are hydrophilic and non-ionic or neutral on the one hand and the sulfonate comonomer which is also hydrophilic but anionic on the other hand, the sulfonate is arbitrarily referred to as the "third comonomer". This then further distinguishes from the monomers referred to as termonomers which are generally hydrophobic or if hydrophilic are not anionic.

The third comonomer is referred to as a vinyl-containing sulfonate which is meant to encompass the acid also. They are represented by the following formula.

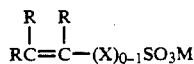

Also the analogous phosphonate compounds as represented by the following formula can be used

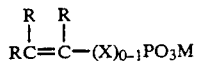

where in each formula R is methyl, ethyl or H preferably methyl or H and provided further that at least one of the R groups on the terminal carbon of the vinyl group is H and the other is H or methyl. In another embodiment, the non-terminal R can be a group which will make the vinyl group more reactive. As an example, R can be a nitro group.

M in each formula is H, $Na^+$, $K^+$, $Li^+$, $R''''_4N^+$, $Ca^{++}$ or $Mg^{++}$ and
X in each formula is

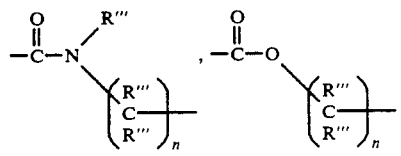

or

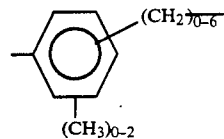

where n is an integer of 1–5 preferably 1–3 and $R'''$ is individually selected from 1–3 carbon atom alkyl groups, or H, $R''''$ is selected individually from H, —ROH or a 1–3 carbon atom alkyl radical.

In a broader embodiment, M can be selected from those cations recited above and in addition can be other polyvalent metals such as $Zn^{++}$, $Sr^{++}$, $Fe^{++}$, and $Mn^{++}$. Other cations are organic cations of the formula $^+NH_3R^1NH_3^+$ where $R^1$ is 1–20 carbon atom divalent hydrocarbon radical. Examples of organic cations are those formed from methylamine, diethylamine, ethylene diamine, tetramethyl ethylene diamine, long chain diamines such as $C_{12}$ diamines and N-propylaminodiethanol. Polyether diamines are particularly suitable. Such materials are sold under the tradename Jeffamine ED-600, ED-900 and ED-2001 and have the following general structure.

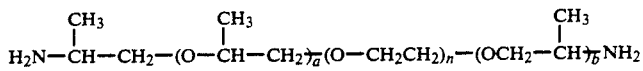

where a+b is 2–3 and n is 8–41. Another particularly desirable class of amines is the multi-basic amines such as poly(ethylenimine). The acid form of the monomer can be reacted with the polyether diamines in water or a solvent such as DMF, DMSO, alcohol or mixtures thereof and the salt precipitated and isolated. In the case of aqueous systems, the monomer generally is added last. In some instances, there may be a preference for tertiary amines instead of the primary.

In the case of polyvalent cations the resulting monomer units which are $[CR_2=CR(X)_{0-1}—SO_3]_2M$ and a small amount of $[CR_2=CR(X)_{0-1}—SO_3]M^+$ have a greater molecular weight and also have the potential for crosslinking in the resulting polymer. While not wishing to be bound by theory, the use of such divalent cations can be viewed as creating an ionic crosslinking of two or more monomer units, i.e.

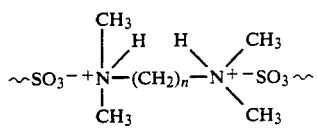

After polymerization this in effect gives crosslinking between polymer chains thus increasing the molecular weight and hence increases the viscosity the resulting polymer will impart to water. However, surprisingly the most dramatic effect is to give more stable polymer in copolymerizations with unsaturated amides such as acrylamide. While not wishing to be bound by theory, apparently the polyvalent cation monomer is more nearly equal to or greater than the acrylamide in reactivity and thus avoids long segments of polyamide homopolymer blocks from being formed which render the entire molecule unstable. This increased stability is particularly remarkable in polymer compositions having 10 weight percent or greater, i.e., 10–90, preferably 10–50 weight percent of the unsaturated amide. Indeed, the difference in hydrolysis resistance of copolymers produced from monomer salts of the various metals, primary, secondary, and tertiary or diamines allows fine tuning of the properties of the final polymer to suit a particular end use.

Salts of the metals and amines listed above such as chlorides, sulfates and carbonates, e.g. NaCl, CaCl$_2$, MgCl$_2$, Na$_2$SO$_4$, and especially (NH$_4$)$_2$CO$_3$ or combinations thereof can be added to the already produced polymer to improve ease of drying, to make the polymer more easily redissolved and to inhibit imide formation. Examples of suitable monomers are

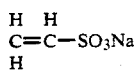

vinyl sulfonate, sodium salt

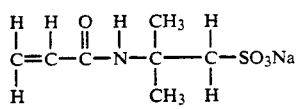

sodium-2-acrylamido-2-methylpropane sulfonate (sodium AMPS)

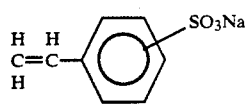

styrene sulfonate, sodium salt

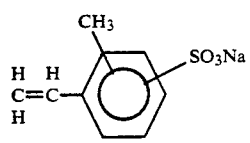

sodium vinyl toluene sulfonate

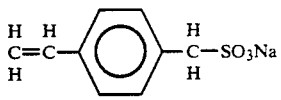

sodium p-vinylbenzyl sulfonate

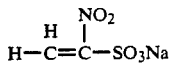

1-nitroethylene sulfonic acid, sodium salt

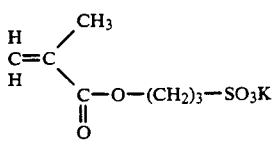

(3-sulfopropyl)methacrylic ester, potassium salt (SPM)

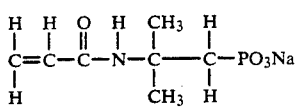

2-acrylamido 2-methylpropane phosphonic acid, sodium salt.

The first two formulae for X can be viewed as

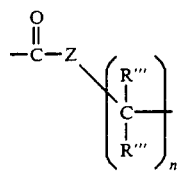

wherein Z is

or —O—, i.e., amides or esters. Of course, mixtures of these amides and esters can also be used.

These are known monomers and can be produced as is known in the art. Particularly with regard to the N-sulfohydrocarbon-substituted acrylamides, they are disclosed in U.S. Pat. No. 3,679,000 assigned to the Lubrizol Corporation, the disclosure of which patent is incorporated by reference. The 2-acrylamido-2-methylpropanesulfonicacid is available from Lubrizol under the designation AMPS.

Purified AMPS monomer results in surprisingly superior polymer. While not wishing to be bound by theory, it is believed the higher purity results in higher molecular weight which is responsible for the increased viscosity imparted to water by polymer made from purified monomer. Preferably the monomer is purified to contain less than 150 ppm, preferably less than 50 ppm by weight chain transfer-promoting impurities such as allylic compounds. This is done by recrystallization from hydrous acetic acid or lower alcohols, chromatographic techniques or other standard purification procedures.

Thus useful compositions can be described as polymers produced from a monomer composition comprising at least one of a hydrophilic N-vinyl lactam (more broadly an N-vinyl amide) or a hydrophilic vinyl containing sulfonate salt or the corresponding acid, optionally containing in addition a hydrophilic unsaturated amide and if desired a termonomer as disclosed hereinabove, said polymer being stable. Not precipitating after 7 days at 300° F. (149° C.) is one way of defining stability which has been definitely correlated with long term stability at 250° F. for N-vinyl lactam/unsaturated amide polymers. Particularly with the N-vinyl lactam containing polymers, after a modest initial drop in viscosity on aging, the viscosity on continued aging remains essentially unchanged. Because of this enhancement of stability on extended aging these N-vinyl lactam containing polymers are particularly suitable for extremely harsh environments as defined for instance by the area above the 20 day line or even the 5 day line or 1 day line at FIG. 14. By N-vinyl lactam containing polymers as used in this context of extremely harsh environment stability is meant polymers having at least 20 weight percent combined N-vinyl lactam and unsaturated amide, at least half of which is N-vinyl lactam.

In certain applications it is believed there is an advantage to polymer compositions having at least 20 weight percent each of the vinyl-containing sulfonate and the N-vinyl lactam (more broadly N-vinyl amide) and 0-40 weight percent of the unsaturated amide. In other instances compositions having at least 10 weight percent of all three monomers (lactam, amide and sulfonate are preferred).

Polymers of 80-95, preferably 85-90 weight percent sodium AMPS and 5-20 preferably 10-15 weight percent VP are particularly suitable for water loss polymers. Such polymers are of particular utility in high temperature geothermal drilling fluids particularly those not employing the clay usually associated with drilling fluids. These polymers are also especially suited for coating weighting agents to reduce abrasion of Densimix-type iron ore. Densimix is a registered trademark of Densimix, Inc. for a variety of hematite iron oxide ($Fe_2O_3$).

The following is a more detailed discussion of the phosphonate-containing compositions. The 2-acrylamido-2-methylpropanephosphonic acid (AMPP) or its salts (the metal being as defined for M hereinbefore) can be prepared as described in German Offenlegungsschrift DE 3,210,775 Sept. 29, 1983), the disclosure of which is hereby incorporated by reference.

For reservoirs with temperatures in the range of 170° to about 230° F. the homopolymer of AMPP or its copolmers (including 3 or more monomer combinations) with acrylamide (Am), AMPS or its salts, methacrylamide, N,N-dimethylacrylamide, vinyl acetate, acrylonitrile, or 2-vinylpyrrolidone (VP) may be used. However, as the temperature increases within this range the Am content in the copolymers must be reduced.

For reservoirs with higher temperatures and appreciable hardness levels, the 2-acrylamido-2-methyl-propanephosphonate co- and terpolymers with VP are preferred because of their improved retention of viscosity. Thus, with phosphonate copolymers, reservoirs with temperatures of about 230° F. or higher require copolymers of AMPP with VP; terpolymers of AMPP, AMPS (salts, especially Na+), and VP; terpolymers of AMPP, VP, and low amounts of Am (5-20 wt. %); or four-component copolymers of AMPP, AMPS (salts), VP, and Am or DMAm.

These phosphonate-containing polymers may be prepared in the manner described hereinafter in more detail, i.e., by solution polymerization in water, in gel log form, in suspension or slurry or by inverse-emulsion polymerization. Initiation may be accomplished by typical chemical agents such as azo compounds, hyponitrites, paramenthane hydroperoxide+$FeSO_4 \cdot 7H_2O$, potassium persulfate, etc. or by radiation ($\gamma$-rays, electron beam, UV, etc.). The preferred method will be the one that supplies the highest molecular weight in a conveniently used physical form.

In a different aspect of this invention, phosphonic acid or a composition containing phosphonate groups can be added to a preformed polymer which contains pendent nitrile (—C≡N) units, along with $H_2SO_4$ or some other strong acid in water at −25° to 80° C., i.e.:

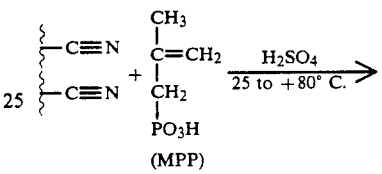

(MPP)

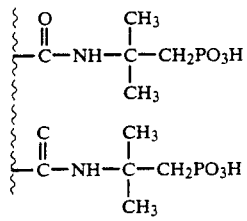

The 2-methylpropenephosphonic acid (MPP) shown above can be synthesized from isobutylene, $PCl_5$, and $SO_2$ as described in said DE 3,210,775. Other phosphonated alkenes also may be used, however, for stability the carbon which is attached to the nitrogen in the functionalized polymer must be disubstituted. That is,

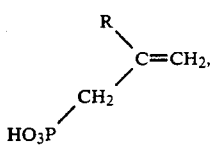

where R=alkyl, phenyl, etc. R=H.

Various derivatives of the phosphonic acid may also be made prior to the reaction onto the polymer, provided these derivatives are stable in the presence of strong acid.

Polymers with pendant nitrile groups consist of polyacrylonitrile and copolymers of acrylonitrile such as:

poly(acrylonitrile-co-styrene)
poly(acrylonitrile-co-acrylamide)
poly(acrylonitrile-co-N-vinyl-2-pyrrolidone-co-acrylamide)
poly(acrylonitrile-co-methacrylic acid)
poly(acrylonitrile-co-acrylic acid)
poly(acrylonitrile-co-N-vinyl-2-pyrrolidone)
poly(acrylonitrile-co-methylmethacrylate).

Polymer Characterization

The polymers of this invention can be characterized as to relative molecular weight and viscosity by K values calculated from measured relative viscosities $\eta_{rel}$ at various concentrations. In this calculation, $K = 1000k$, where k is Fikentscher's constant, obtained from the equation $$\frac{\log \eta_{rel}}{C} = \frac{75 k^2}{1 + 1.5 kC} + k,$$

where $\eta_{rel}$ is the viscosity of the solution compared with its solvent and C is concentration in grams per 100 milliliters (or 1 deciliter) of solution. The development and significance of K values are discussed more fully in Example VIII.

In contrast to the copolymers of 50-99 mole percent N-vinyl-2-pyrrolidone and 1-50 mole percent acrylamide, with K values of 10 to 140, disclosed and claimed by U.S. Pat. No. 3,500,925, the copolymers of this invention have K values of more than 140 when measured at concentrations of 1 gram/deciliter or less. The highest K values generally correlate with the preferred methods of preparation and testing of the copolymers of this invention, as described in Example VIII. Copolymer solutions prepared and tested by the methods presently considered optimum can have K values in the range from of about 150 to at least about 250.

The polymers of this invention can be further characterized by measuring the cloud point temperature, as defined and more fully discussed herein and in Examples V, VI and XVII. The polymers are preferably tested for cloud point temperature after heat aging for a period of time which produces an equilibrium cloud point temperature representative of the polymer's performance in, e.g., enhanced oil recovery in reservoirs of equivalent temperatures. The equilibrium cloud points appear to correspond to an equilibrium degree of hydrolysis, as defined elsewhere herein, generally limited to about 70-80 percent, which may partially account for the superior properties of the preferred copolymers.

Polymerization

The polymers of this invention can be formed using solution, emulsion, inverse emulsion (water-in-oil) or slurry polymerization processes. In one embodiment of the invention, a process for producing the polymers comprises carrying out the polymerization in a homogeneous solution process in which the polymerization medium is water containing certain dissolved mixed electrolytes, or presently most preferably, water containing appropriate dissolved salts such as found in sea water, to provide a simulated or synthetic sea water (SSW). Natural sea water and formation brines can also be used in the polymerization media and can be filtered to remove solid material if desired or necessary. Brines containing a high percentage of dissolved solids can be diluted with fresh water to provide an appropriate concentration of dissolved solids. Alternatively, salts can be added, if deemed necessary to obtain the desired salt level. In another embodiment, slurry polymerization is preferably conducted with a polymerization medium consisting essentially of an alcohol, preferably a neat tertiary alkanol which generally has from 4 to about 8 carbon atoms, most preferably t-butyl alcohol, since the polymeric product is insoluble in the alcohol and can thus be conveniently separated.

In accordance with one embodiment of the invention, the inventive processes can be used to prepare the inventive polymers by carrying out the polymerization out in a polymerization medium using monomer concentrations ranging broadly from the minimum required to produce a polymer solution of the desired viscosity, e.g., as low as 0.1 weight percent, up to very concentrated solutions which amount to admixtures of the monomers with a minor amount of the polymerization medium, e.g., as high as 80 weight percent monomers based on the monomers plus medium. The polymers prepared in the preferred media in monomer concentrations over this broad range will all exhibit stable viscosities, when exposed to hostile environments of high temperature and/or salinity and/or hardness, but will not be as viscous as those prepared at optimum monomer concentrations. However, the polymers are generally produced from solutions of total monomer concentrations ranging from about 5 to about 50 weight percent. Preferably, polymerization is carried out in a solution of total monomer concentration in the range from about 10 to about 40 weight percent, since the use of monomer concentrations below about 10 weight percent tends to be uneconomical, and optimum polymer viscosity is generally obtained at less than about 35 weight percent monomers. Also, when a high concentration of electrolytes is to be used in an aqueous medium, the higher concentrations of monomers may inhibit the solubility of the electrolytes. For free radical initiation in aqueous media containing electrolytes, monomer concentrations in the range of from about 15 to about 35 weight percent are most effective, with concentrations of about 20 to 30 weight percent particularly preferred. For alcoholic media, monomer concentrations in the range of from about 15 to about 35 weight percent are most effective, with concentrations of about 20 to 30 weight percent particularly preferred.

For a given polymer and set of polymerization conditions, the viscosity obtained will reach a maximum for a certain range of monomer concentrations in the polymerization medium, generally lying between about 20 to about 50 weight percent. Reaction rate increases, thus reaction time decreases, as the weight percent of monomers is increased. Thus, it is generally desirable to use a concentration of monomers which will produce a polymer of maximum viscosity in a reasonable reaction time. Other considerations are the actual viscosity required of the polymer in its applications, solubility of the polymer in its applications, solubility of the polymers in water, and transportation/handling expenses.

The SSW used for preparation of many of the polymers described herein (unless otherwise indicated), for example, was prepared with the ingredients tabulated below to contain the following quantities of dissolved salts.

| Compound | Quantity |
|---|---|
| NaHCO$_3$ | 3.69 g |
| Na$_2$SO$_4$ | 77.19 g |
| NaCl | 429.00 g |
| CaCl$_2$.2H$_2$O | 29.58 g |
| MgCl$_2$.6H$_2$O | 193.92 g |
| H$_2$O, distilled | to 18.0 liters mark |

This "recipe" was calculated to produce the ionic concentrations tabulated below:

| Ion | Concentration, ppm |
|---|---|
| $Na^+$ | 10,550 |
| $Ca^{+2}$ | 437 |
| $Mg^{+2}$ | 1,256 |
| $HCO_3^-$ | 145 |
| $Cl^-$ | 18,540 |
| $SO_4^{-2}$ | 2,828 |
| Total | 33,756 |

This was equivalent to a total concentration of dissolved salts of about 3.4 weight percent, or an ionic strength of about 0.7. The divalent hardness cations ($Ca^{+2}$ and $Mg^{+2}$) amounted to about 16 weight percent of the total cations. Various combinations of such salts can be used to prepare solutions with ionic concentrations approximating those of sea water from various locations.

Electrolyte-containing SSW polymerization media employed in the invention can have salinity values ranging from about 10 to 100 g per kg, and preferably from about 30 to about 43 g/kg, of the solution. Salinity is defined as the total dissolved solids in sea water. In natural sea water, salinity and chlorinity are related by the expression: salinity = 1.835 × chlorinity, according to "The Oceans, Their Physics, Chemistry and General Biology", by H. V. Sverdrup, M. W. Johnson and R. H. Fleming, Prentice-Hall, Inc. 1942, p. 51. Thus, calculated chlorinities corresponding to salinities of 30 to 43 g/kg of solution range from about 16 to about 23 g/kg of solution. The ionic strengths of the solutions corresponding to these ranges vary from about 0.6 to about 0.9. It can readily be seen that a salinity of 100 g/kg is approximately equivalent to 10 percent dissolved solids, based upon the weight of the solution.

The Sverdrup reference, on p. 55, states that salinity in the oceans generally lies between about 33 to 37 g/kg sea water but may reach 40 g/kg sea water or more in certain locations such as the Red Sea. However, the reference states, on p. 165, that regardless of the absolute concentration of dissolved solids, the ratios between the more abundant substances remain virtually constant. Preferably, synthetic sea water compositions should have approximately this ratio, although the overall concentration can vary.

A composition for simulated sea-salt for preparation of "substitute ocean water" (SOW) is disclosed in ASTM D-1141 (1982, part 31, p. 1074). The composition contains the following compounds which when dissolved in water at the quantities shown to make a liter of solution will provide a substitute ocean water for testing purposes. The materials and the quantities required to make a liter of solution are shown in the table.

TABLE 1

| Substitute Ocean Water - ASTM D 1141 | | |
|---|---|---|
| Compound | g/L | Weight Percent |
| NaCl | 24.53 | 68.08 |
| $MgCl_2$ | 5.20 | 14.43 |
| $Na_2SO_4$ | 4.09 | 11.35 |
| $CaCl_2$ | 1.16 | 3.22 |
| KCl | 4.695 | 1.93 |
| $NaHCO_3$ | 0.201 | 0.56 |
| KBr | 0.101 | 0.28 |
| $H_3BO_3$ | 0.027 | 0.07 |
| $SrCl_2$ | 0.025 | 0.07 |

TABLE 1-continued

| Substitute Ocean Water - ASTM D 1141 | | |
|---|---|---|
| Compound | g/L | Weight Percent |
| NaF | 0.003 | 0.008 |
| Totals | 36.032 | 99.998 |
| $Ba(NO_3)_2$ | 0.0000994 | |
| $Mn(NO_3)_2$ | 0.0000340 | |
| $Cu(NO_3)_2$ | 0.0000308 | |
| $Zn(NO_3)_2$ | 0.0000096 | |
| $Pb(NO_3)_2$ | 0.0000066 | |
| $AgNO_3$ | 0.00000049 | |

The compounds above the line generally comprise those used in making substitute ocean water. Such a product is commercially available as "sea salt" from Lake Products Co., Inc., Ballwin, Mo. Substitute ocean water at a concentration of about 4.1 weight percent was used in Example XXII. The trace amounts of the compounds listed below the line can be optionally included to more closely approximate ocean water when desired.

The chlorinity of the 10 component system (Table 1) used in preparing the substitute ocean water is about 19.26 g/kg solution, counting the bromide and fluoride ions as chloride ions. This corresponds to a calculated salinity of about 35.3 g/kg solution. The total dissolved solids are 36.03 g/L of solution, which amount to about 3.5 weight percent of the solution.

At a constant weight ratio of components as indicated in Table 1, the weights of each component can be calculated at various salinities for the 10 component system. The calculated weights, total dissolved solids and estimated weight percent thereof based on 1 liter of solution and the calculated ionic strengths thereof are given in Table 2.

TABLE 2

| Calculated Component Ranges for Substitute Ocean Water | | | | |
|---|---|---|---|---|
| | Salinities | | | |
| Component | 30 | 33 | 40 | 43 |
| NaCl, g | 20.85 | 22.93 | 27.80 | 29.88 |
| $MgCl_2$, g | 4.42 | 4.86 | 5.89 | 6.33 |
| $Na_2SO_4$, g | 3.47 | 3.82 | 4.63 | 4.98 |
| $CaCl_2$, g | 0.986 | 1.08 | 1.31 | 1.41 |
| KCl, g | 0.591 | 0.650 | 0.788 | 0.847 |
| $NaHCO_3$, g | 0.171 | 0.188 | 0.228 | 0.245 |
| KBr, g | 0.086 | 0.094 | 0.114 | 0.123 |
| $H_3BO_3$, g | 0.023 | 0.025 | 0.031 | 0.033 |
| $SrCl_2$, g | 0.021 | 0.023 | 0.028 | 0.030 |
| NaF, g | 0.0025 | 0.0028 | 0.0034 | 0.0037 |
| Total Dissolved Solids, g | 30.62 | 33.67 | 40.88 | 44.28 |
| Wt. % Solids | 3.0 | 3.3 | 4.0 | 4.3 |
| Calculated Ionic Strength | 0.60 | 0.67 | 0.81 | 0.87 |

The data presented in Table 2 show that the calculated ionic strengths for salinities varying from 30 g to 43 g per liter of solution range from about 0.6 to about 0.9.

At a constant weight ratio of the 5 component SSW system generally used in the invention, the weights of each component are calculated for salinities ranging from 30 g to 43 g per liter of solution. The calculated weights, total dissolved solids and estimated weight percent thereof based on 1 liter of solution and the calculated ionic strengths thereof are given in Table 3.

TABLE 3

Calculated Component Ranges For Synthetic Sea Water (SSW)

| Component | Salinities | | | |
|---|---|---|---|---|
| | 30 | 35.3 (SSW) | 38 | 43 |
| NaCl, g | 19.950 | 23.830 | 25,650 | 29.030 |
| MgCl$_2$, g | 4.288 | 5.046 | 5.432 | 6.147 |
| Na$_2$SO$_4$, g | 3.644 | 4.288 | 4.616 | 5.223 |
| CaCl$_2$, g | 1.396 | 1.643 | 1.769 | 2.001 |
| NaHCO$_3$, g | 0.174 | 0.205 | 0.221 | 0.250 |
| Total Dissolved Solids, g | 29.452 | 35.012 | 37.688 | 42.651 |
| Wt. % Solids | 2.9 | 3.4 | 3.7 | 4.1 |
| Calculated Ionic Strength | 0.59 | 0.70 | 0.76 | 0.86 |

The presently preferred polymerization medium used to produce the polymers of this invention is the 5 component system shown in Table 3 above having a calculated ionic strength of about 0.7 and about 3.4 weight percent dissolved solids. It is expected that polymerization media shown in the various tables, regardless of the number of components present in the media, which have calculated ionic strengths ranging from about 0.6 to about 0.9, will also be highly suitable in preparing the various outstanding polymers of this invention. Also, more concentrated or more dilute versions of these SSW compositions, having ionic strengths in the range from about 3.0 to 0.2, can be prepared and used as polymerization media for this invention.

On the other hand, the aqueous polymerization media of this invention can be based on oil field brines, at natural or dilute strength. Such brines can be filtered or otherwise purified to remove undersirable solid matter.

Oil field brines can contain up to about 25% by weight, based on water, of dissolved inorganic salts. In addition to NaCl, brines usually contain up to about 10% by weight, based on the total amount of salts present, of Ca$^{+2}$ and Mg$^{+2}$. Small amounts of other soluble Periodic Group I and Group II salts are also frequently present, e.g., NaHCO$_3$, KCl, BaCl$_2$ and the like. Typical brines contain from about 1 to 14 wt. %, based on water, of dissolved salts.

Although the reasons for the superiority of aqueous polymerization media containing electrolytes are not presently understood, polymers prepared in such media have been found to have higher viscosities and higher K values than similar polymers prepared in conventional media such as distilled water. Also, these polymers are more resistant to high temperature, salinity and hardness ions, retaining their viscosity longer under such conditions than the polymers prepared using media such as distilled water, even under the imposition of high shear, as seen by the screen tests of Example IX.

A presently preferred electrolyte mixture for the aqueous polymerization media of this invention contains at least one electrolyte selected from a first group consisting of alkali metal salts and, at least one electrolyte selected from a second group consisting of alkaline earth metal salts, as an approximation to a synthetic sea water. Although not presently understood, it appears that the combination of monovalent and divalent cations is at least one property of synthetic sea water which enhances the properties of copolymers prepared in such media. Thus, it is believed that a fraction of divalent hardness cations to total cations of at least about 1 weight percent will improve a polymerization medium containing NaCl or other alkali metal electrolytes. Since the synthetic sea water used successfully contained about 16 weight percent hardness cations (based upon total cations), the polymerization media of this invention should preferably contain such a fraction of at least about 10 weight percent hardness cations, but can contain up to about 50 weight percent or even more, as with simple mixtures of the alkali metal and alkaline earth salts. The presence of certain anions may also enhance the effect of the polymerization media described herein, perhaps through a buffering action. Various concentrations of the salts can be used, generally ranging from about 0.1 to about 10 weight percent or more, preferably at least 1 weight percent, based upon the total weight of the polymerization medium. For polymers to be used in certain applications, such as, e.g., minerals recovery or beneficiation, salt concentrations of up to saturation can be advantageously used.

In addition to the use of a specified concentration of a mixture of electrolytes containing both alkali and alkaline earth metal salts, the aqueous polymerization media containing such electrolytes can be characterized by the resulting Ionic Strength, given by the formula $$I.S. = \tfrac{1}{2}\Sigma C_1 Z_1^2 + C_2 Z_2^2 + \ldots C_n Z_n^2$$

where $C_1$, $C_2$, etc. each represent the molar concentration of a different ion in the polymerization media, $Z_1$, $Z_2$, etc. are the charges of the respective ions, both positive and negative, and n equals the number of different ions in the polymerization medium.

For further discussion of Ionic Strength, see, e.g., Fritz and Schenk, "Quantitive Analytical Chemistry", Second Edition (Allyn & Bacon, Boston, 1969), pages 9–10.

Generally, aqueous polymerization media with electrolyte Ionic Strengths in the range of from about 0.4 to about 3.0 are effective in improving the properties of the polymers of this invention; preferably, amounts of mixed electrolytes sufficient to produce an Ionic Strength of in the range from about 0.5 to about 2.0 are used, as Ionic Strengths in this range have been found to produce significant improvements in the polymers prepared in such polymerization media. Aqueous polymerization media having Ionic Strengths of in the range from about 0.6 to about 0.8 are presently preferred for most applications, as polymers having viscosities higher than otherwise obtainable and excellent heat stability can be prepared therein. These ionic strengths "bracket" the Ionic Strength of natural sea water, which for, e.g., the North Sea, is about 0.7.

The pH of the aqueous polymerization media employed in this invention should be controlled during the polymerization process, as excessive acidity or alkalinity can adversely affect the polymerization process or result in excessive hydrolysis of the product polymer, copolymer or terpolymer. Generally a pH in the range of from 4 to about 10 is acceptable, with a range of from about 6 to about 8 preferred. An added benefit of the use of electrolytes in the polymerization media of this invention is that the combinations of electrolytes used generally will buffer the pH to a value within the preferred range, as with natural sea water.

It has been found that with copolymerization of N-vinyl lactams and unsaturated amides superior results are obtained by carrying out the polymerization at a pH within the range of 5 to 10.5. preferably 8.5 to 10.5. With vinyl containing sulfonate (or the corresponding acid) monomer systems the pH should be from 7 to 10.5 except where the "M" of the sulfonate is $R'''_4N^+$, i.e.

NH4+, in which case the pH can be as low as 4.5. Thus in all instances a pH of 7 to 10.5 is satisfactory. In those systems not having a significant amount of the vinyl containing sulfonate the pH can be as low as 4 although generally it will be at least 5. Within this range, the resulting polymer imparts greater viscosity to water. As described in greater detail elsewhere herein, the polymerization is carried out in aqueous media preferably containing monovalent electrolytes and initiated by radiation or chemical initiators or both.

If the polymer is to be made on or near an offshore oil recovery site natural sea water would predictably be the preferred polymerization medium, due to its suitable properties and ready availability at low cost. Sea water may require treatment to render it suitable for use as a polymerization medium and/or oil recovery flooding fluid, such as, for example, filtering to remove extraneous solids such as sand and microorganisms and treatment with a biocide to prevent the growth of microorganisms. Flooding fluids should preferably be similar to and/or compatible with the formation water, as is known to those skilled in the art.

Polymerization Initiators

The polymers of this invention can be prepared by processes using various free radical polymerization initiators known to those skilled in the art. Preferred initiators include chemical polymerization initiators, the introduction of electromagnetic or nuclear radiation to generate free radicals, and combinations of both techniques.

Chemical polymerization initiators employable in the polymerization processes are oil or water soluble compounds known in the art to generate free radicals for this purpose selected from azo compounds and organic peroxides such as 2,2'-azobisisobutyronitrile (commercially available as Vazo-64 ® from E. I. Du Pont), 2-t-butylazo-2-cyanopropane, 2,2'-azobis(2,4-dimethyl-valeronitrile) (Vazo-52 ® from E. I. Du Pont), 2,2'azobis(2-amidinopropane) hydrochloride (V-50 from Wako) 2-t-butylazo-2-cyanopropane, 2-t-butylazo-2-cyanobutane, 2-t-butylazo-1-cyanocyclohexane, benzoyl peroxide, di-t-butyl peroxide, t-butyl peroxy- acetate, t-butyl peroxypivalate, 2-t-butylazo-2-cyano-4-methoxy-4-methylpentane (commercially available as Luazo ® 55 from Lucidol Div., Pennwalt Corp.), and hyponitrites such as t-butyl hyponitrite and t-amyl hyponitrite 2-t-butylazo-2-cyano-4-methylpentane (Luazo ® 70, available from same source), 4,4'-azobis(4-cyanovaleric acid), 4-t-butylazo-4-cyanovaleric acid and the like. The azo compounds are presently preferred for most applications, as some peroxides appear to have a tendency to adversely affect the polymer; however, some peroxides are effective at lower temperatures than those at which most azo compounds are useful. A particularly suitable lower temperature initiator is 2,2'-azobis(2,4-dimethyl-4-methoxy-valeronitrile) commercially available as Vazo 33 from E. I. Du Pont. Presently preferred compounds include t-butyl peroxypivalate (t-BPP) (particularly for the polymerization media of t-alkanols), Luazo 55, Luazo 70, p-methane hydroperoxide activated by FeSO4.7H2O complexed with ethylene diamine tetracetic acid and reduced with sodium formaldehyde sulfoxylate (this initiator is sometimes referred to as p-menthane hydroperoxide activated with SBR, SBR being defined as FeSO4, questex, and sodium formaldehyde sulfonate), and especially azo-bis-isobutyronitrile (AIBN), since polymers prepared in its presence generally yield more viscous solutions, e.g., higher molecular weight polymer, than those prepared in the presence of t-butyl peroxypivalate. Luazo 70 has been found to give excellent results because, as a liquid, it is more uniformly dispersible in aquo than solids such as AIBN. Luazo 55, also a liquid, should display a similar advantage. The 4-cyanovaleric acid compounds are preferred because they are water soluble. An inert atmosphere substantially free of free oxygen or other known inhibiting materials should be provided when chemical polymerization initiators are used. Mixed initiator systems of any of the preferred initiators and a peroxide such as potassium persulfate which can be activated at low temperatures by reducing agents can be used. In this regard, the preferred initiators are Vazo 33 and the para-menthane hydroperoxide referred to hereinabove. Other preferred initiators are water-soluble azo compounds containing amidine moieties such as V-56 2,2'-Azobis(N,N'-dimethyleneisobutyramidine)dihydrochloride

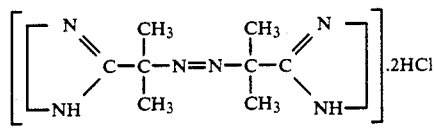

V-50 2,2'-Azobis(2-amidinopropane)dihydrochloride

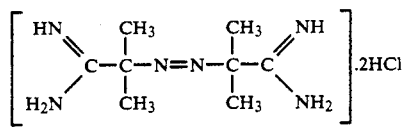

which are commercially available from Wako Pure Chemicals Industries. Another preferred group of initiators are the alkylhyponitrites commercially available from Catalyst Resources, Incorporated. Alkylhyponitrites are low temperature thermal and photochemical sources of alkoxy radicals. The parent compound is actually a trans-alkylhyponitrite with the following structural formula

wherein $R^a$ is a $C_3$ to $C_{12}$ carbon atom hydrocarbyl radical.

Chemical polymerization initiators which are substantially soluble in the polymerization media of this invention can be added directly to the monomer solution, or dissolved or dispersed in a small amount of solvent which is miscible or soluble therein before being added to said monomer solution.

Chemical polymerization initiators which are insufficiently soluble in the polymerization media of this invention in the concentration required for initiation can be added in the commercially available state or dispersed as a fine powder, but are generally more effectively employed if dissolved in a liquid soluble or miscible in the medium. For example, a water-miscible solvent such as acetone or an alcohol can be used to solubilize azobisisobutyronitrile, the preferred chemical initiator, and to disperse it in the aqueous polymerization media or alternatively it can be dissolved in the vinyl lactam monomer.

The polymers of this invention can also be prepared in processes where initiation can be achieved at least partially by irradiation by electromagnetic or nuclear radiation, e.g., gamma radiation, as known to those skilled in the art. The resulting polymers when diluted with water or SSW to a common solids level, for example 2 weight percent or less, are generally found to exhibit solution viscosities comparable to or greater than similar polymers prepared by chemical initiation. Such irradiation can be used to initiate polymerization either alone or in conjunction with the chemical initiators already mentioned as well as other commonly used free radical initiators and sensitizers. In contrast to the inert atmosphere required when chemical initiators are used, free oxygen can be present when radiation alone is used to initiate polymerization, although superior results are obtained when oxygen is excluded. While gamma radiation from sources such as Cobalt 60, Cesium 137 and Iridium 192 is presently preferred, other sources of radiation can be used, including X-rays, beams of neutrons, electrons or other charged particles, or ultraviolet light from sunlight or artificial sources. An amount and intensity of such radiation should be used effective to provide the desired viscosity and an essentially complete polymerization.

In general, ionic strength of the polymerization medium, i.e. the presence of salts enhances the viscosity of the resulting polymer with chemical initiation. The use of an ionic (salt) medium, a low level of chemical initiator in conjunction with gamma ray irradiation can be used to give a high molecular weight, linear polymer with a low degree of crosslinking. Any sequence can be used but preferably the reaction medium containing the chemical initiator is first irradiated and thereafter the polymerization is completed by the chemical means.

The intensity of the radiation, thus the dosage rate, can be varied during the process. Dose and dose rate are interdependent variables, and should be selected in tandem, and in conjunction with other relevant variables as known to those skilled in the art.

Radiation methods can be used to initiate polymerization in various aqueous and organic media. The inventive polymers can be prepared by radiation polymerization in aqueous media containing mixed electrolytes, as previously disclosed, or in media consisting essentially of at least one alcohol, preferably a neat tertiary alkanol, as previously disclosed.

It has been discovered that polymers of exceptional viscosity and resistance to the adverse effects of hostile environments, e.g., high temperature, salinity, hardness ion content or alkalinity, can be prepared by a method comprising polymerizing a monomer mixture comprising N-vinyl pyrrolidone and acrylamide by free radical initiation at least partially carried out by the introduction of electromagnetic or nuclear radiation, preferably gamma radiation. Preferably an aqueous polymerization medium is used, with media comprising a synthetic sea water or mixed electrolytes as previously disclosed particularly preferred.

Radiation polymerization can be carried out over a broad range of polymerization temperatures (taken as the average temperature of the monomer solution), ranging from just above freezing to just below the boiling point of the monomer solution. However, as shown in Example XXIII, chilling the monomer solution to counteract the heating effect of the polymerization reaction can produce advantages such as higher molecular weight. Thus, in one embodiment, it is preferred to chill the monomer mixture to a temperature above freezing before, during, and/or after irradiation.

Such cooling can be facilitated by carrying out the polymerization in plastic bags or other containers with center holes and submersing the containers in a cooling bath.

Normally, about 0.05 to about 2.0 weight percent of chemical initiator based on total monomer weight is used for chemical initiation alone, with a reaction temperature in the range of about 20° to about 80° C., preferably about 50° C.

In many instances there has been found a preference for lower temperature initiation, i.e. $-10°$ to 60° C. preferably $-10°$ C. to 50° C., more preferably 5° C. to 25° C. At these lower temperatures a higher viscosity polymer is obtained. These lower temperatures are suitable for both chemically initiated polymer and irradiation initiated polymer, or combinations thereof. The low temperature initiation particularly lends itself to "on site" polymerization at room or ambient temperature which can even be done without any temperature control. This is of particular value where gel logs of only 20–30 weight percent solids are prepared since transportation costs are reduced. The polymerization temperature is selected based on the decomposition behavior of the initiator and the polymerization characteristics of the monomer used. Surprisingly, in spite of the limited solubility of the low temperature initiator 2,2'-azobis (2,4-dimethyl-4-methoxyvaleronitrile) excellent results are obtained in aqueous media.

The reaction is generally substantially complete, e.g. providing substantially quantitative monomer conversion, after about 1 to about 10 hours. Smaller quantities of initiator require longer polymerization time, but produce higher molecular weights. A reaction time of about 2 hours is normally employed in bench scale processes. The resulting polymers are not necessarily isolated. Instead, the solutions are further diluted as formed to obtain the desired concentration of polymer. However, the polymers generally can be isolated, dried and redissolved or dispersed at or near the location where they are to be used, thus minimizing transportation costs. Generally, the polymers formed in an alcoholic medium are more readily isolated, if desired, than those formed in aqueous media.

Monomer Proportions

The first and second monomer proportions for copolymers of this invention can vary widely, as previously disclosed. Generally, VP:Am weight ratios of about 10:90 to about 90:10, as applied to the mixture of monomers polymerized, are used, but copolymers having VP:Am weight ratios as low as 5:95 and as high as 99:1 can be prepared and employed for specialized applications. As used in this paragraph the term VP is meant to be generic to N-vinyl lactams and N-vinyl amides as broadly disclosed and Am is generic to unsaturated amides as broadly disclosed herein (i.e., to set out the weight ratios broadly for first monomer:second monomer) and the ratios are intended to cover "mixed" copolymers, i.e. N-vinyl pyrrolidone/acrylamide/N,N-dimethylacrylamide. Generally, the minimum amount of the VP monomer required to produce copolymers of the desired characteristics will be used. The polymers of vinyl-containing sulfonate salts, phosphonate salts (or the corresponding acids) or esters as the third comonomer or vinyl lactams (more broadly N-vinyl amides) as the first component and unsaturated amides, if present, as the second component can have monomer ratios as shown in FIGS. 15 and 16 excluding area E, although of course, proportions shown are most preferred for the specific monomers set out.

Thus, the first component (the N-vinyl amide) can be present in an amount within the range of 0–100, preferably 10–90, more preferably 30–70 weight percent based on the weight of all monomers incorporated into the polymer. The second component (the unsaturated amide) in an amount within the range of 0–80 (up to 85 in VP/Am) preferably 10–55 weight percent and the third component (the sulfonate, phosphonate or ester) in an amount within the range of 0–100, preferably 10–95, more preferably 40–90 weight percent. In all instances, there can be a termonomer present in the amount set out elsewhere herein based on the total weight of the other components, the ratios just set out hereinabove thus being the relative proportions of the first, second, and/or third components to each other.

A 90/10 NaAMPS/VP is particularly suitable for water loss control in drilling muds. Drilling fluids in which all the hostile environment-resistant polymers described herein can be used are well known in the art. Generally, they contain finely divided clays such as bentonites, kaolin (kaolinite) or illites and also organo-colloids such as carboxymethyl cellulose or sodium polyacrylate. Frequently, quebracho and/or a sulfonated asphalt is a constituent. The polymers described herein can be present in such fluids in an amount within the range of 0.5 to 10, preferably 1 to 5 based on weight. These polymers are also capable of performing in high temperature geothermal drilling fluids, which generally have no clay, where other polymers under the same circumstances break down. The high temperature can be defined as a hostile environment defined as a temperature and divalent ion concentration above the infinite days line of FIG. 14, or more broadly, in some instances, a temperature above 170° F. or more preferably above 200° F.

In addition any of the polymers having a ratio of monomers as shown can also have a termonomer present in an amount up to 25 weight percent based on the total weight of monomers as discussed hereinbefore.

For enhanced oil recovery applications, the preferred copolymers of this invention comprise copolymers of N-vinyl-2-pyrrolidone (VP) and acrylamide (Am) in which the weight ratios of VP:Am preferably range from about 30:70 to about 70:30. The higher proportions of VP are preferred for reservoirs having more "hostile" conditions, e.g., higher temperature, salinity and hardness of the formation water. For example, copolymers for use at over 260° F. should preferably contain at least about 60 weight percent VP, while copolymers for use at about 250° F. can have about 50 weight percent VP or more. For lower temperatures, copolymers with lower proportions of VP can be tolerated; e.g., for temperatures of about 220° to about 250° F., about 40 weight VP or more should suffice, while for temperatures as low as 200° F., the copolymers can contain at least about 30 weight percent VP. Copolymers having VP:Am monomer weight ratios in the range of from about 65:35 to about 55:45, or about 60:40, are particularly preferred for use in high temperature EOR as these copolymers will produce the highest viscosity relative to sea water after a short equilibration time in the high temperature reservoir. For applications requiring shorter stability times, greater viscosity can be obtained from copolymers of higher acrylamide content, although these are less stable than the 60:40 compositions. While 60:40 (VP:Am) copolymers are presently preferred for long-term high temperature applications, 50:50 weight percent copolymers have displayed exceptional thermal stability in aging studies conducted in water, and particularly in SSW, at temperatures ranging from about 200° to about 300° F. See Examples I and II. For example, such 50:50 copolymers, employed as 2 weight percent solutions in SSW, have given clear solutions after aging at 250° F. for more than 918 days (487 plus 431) while the solution viscosities remain about the same or somewhat higher than when first tested. Although the majority of testing has involved the 50:50 copolymers, which are presently preferred for use at temperatures of about 240°–260° F., tests of aged 60:40 (VP:Am) copolymers show that they are generally superior at temperatures above about 250° F. Additional tests of the 50:50 copolymers conducted at 300° F. in SSW have shown that the solutions may turn cloudy without loss of most viscosity after a few days aging, but that the cloudiness disappears upon slight cooling. The cloudiness typically first appears at a temperature between about 260° and about 280° F. Based on these observations, it appears that a preferred upper temperature limit for long-term thermal stability for the preferred inventive 50:50 copolymers is in the range of about 280°–300° F. Cloud points for the 60:40 copolymers are in the range of 290°–320° F., suggesting 320° F. as the upper preferred use temperature for these compositions. For certain applications, e.g., drilling fluids, some of the preferred aged or unaged polymers can be subjected to temperatures as high as at least about 330° F. for periods of a few days, or temperatures as high as at least about 400° F. for periods of a few hours.

While preaged copolymers of approximately 60:40 VP/Am weight ratios are presently preferred for use in high temperature enhanced oil recovery, the copolymers of this invention can be "designed" and prepared in proportions which result in properties which are optimal for various other applications. Copolymers useful in drilling wells, including use as additives for drilling, workover and completion fluids, can have any desired weight ratio, but generally such weight ratios will be from about 30 to about 60 weight percent VP with the balance Am. The exact proportions can be chosen to produce properties comprising high viscosity and resistance to high temperatures, salinity and hardness ions which are optimal for the environment in which the drilling, workover or completion fluid is to be used. As mentioned earlier, the requirements for drilling, workover and completion fluids differ significantly; e.g., drilling fluids are normally thickened with clay, while workover fluids are preferably clay-free.

In general, when conditions are less severe, e.g., the fluids are to be exposed to high temperatures, salinity and/or hardness ion concentrations for shorter periods of time, a lower proportion of VP can be used in the copolymer, thus reducing costs and increasing the viscosity attainable per unit of copolymer.

Conversely, for very hostile environments and extended exposures, as in, e.g., the polymer flooding of a North Sea reservoir, a higher proportion of VP will generally be required for effectiveness, regardless of the relative cost.

For applications requiring mainly a flocculant, as, e.g., water treatment and/or thickening, clarification of beverages, or minerals beneficiation, lower proportions of VP can be used, e.g. in the range of from about 20 to 50 weight percent, with the remainder Am. In example XXIII, a copolymer having 30% VP and 70% Am was successfully used to flocculate and remove clay from a turbid river water sample.

The terpolymers of this invention can also be tailored for certain applications by adjusting the proportions and types of monomers charged. For simplicity, the term "termonomer" is used herein to mean a monomer or monomers other than the principal monomers of N-vinyl lactam and unsaturated amide, although it is recognized that technically N-vinyl lactam and unsaturated amide are also termonomers. A minor portion of a termonomer, for example a hydrophobic compound, is included to alter characteristics of the polymer such as its tendency to adsorb on or absorb in a rock formation. (Adsorption refers to the attachment of polymer molecules to the rock surface by physical or chemical means, while absorption refers to such larger scale phenomena as imbibing of the polymer solution within the pore structure of the formation rock.) Other polymer characteristics which can be altered by incorporating such a termonomer in the polymer include solubility in water, brine and oils, as well as crosslinking ability. The terpolymers of this invention have been found to be as stable as the copolymers under conditions of high temperature and/or salinity and/or hardness, as shown in Examples XV through XXI, and thus provide stable polymers with various useful properties.

The termonomer can be added in a quantity in the range of from about 0.1 to not more than about 25 weight percent, generally not more than 10 weight percent of the total monomers charged. The major portion of the terpolymer consists essentially of the first monomer and second monomer as disclosed for the copolymers, with their relative proportions or weight ratios variable over the same range as in the copolymers to adapt the polymers for various applications.

Generally, the terpolymers can contain in the range of from about 10 to about 90 weight percent of an N-vinyl lactam or more broadly N-vinyl amide such as N-vinyl-2-pyrrolidone as a first monomer, with a second monomer of an unsaturated amide such as acrylamide in the range of from about 90 to about 10 weight percent and the termonomer as disclosed above present as an amount in the range of from about 0.1 to about 10 weight percent, preferably from about 1.0 to about 10 weight percent. Preferably, the terpolymers contain about 25 to about 75 weight percent N-vinyl lactam, about 75 to about 25 weight percent unsaturated amide, and about 2 to 8 weight percent termonomer. A termonomer content of about 3 to about 5 weight percent is presently most preferred. For enhanced oil recovery applications at reservoir temperatures of above about 250° F., it is presently preferred that the proportions of said first monomer and said second monomer be approximately or nearly equal, i.e., that the weight ratio of the first and second monomers be in the range of about 45:55 to about 65:35.

In addition to varying the monomer proportions, the molecular weight of all the inventive polymers can be varied according to the amount of initiator used or by initiation by gamma irradiation, for example. Thus, a relatively high molecular weight may be suitable for EOR, or for flocculating suspended solids, while for drilling fluids, a lower molecular weight can be used to limit the degree of flocculation of suspended clay.

The various processes of the invention for the recovery or processing of natural resources can be improved by the use of the novel polymers prepared by the methods of this invention, as disclosed earlier, although the polymers of the prior art prepared from the same monomers can be employed as well. The advantages of employing the polymers of this invention become more apparent when the polymer is exposed to a temperature of at least about 150° F. or higher. Generally, in carrying out the various processes for recovery of natural resources according to this invention, the polymer is generally at least partially dissolved in an aqueous fluid, and can be introduced into subterranean formations with a fluid comprising at least one composition selected from the group consisting of bases, polymeric viscosifiers, crosslinking agents, surfactants and cosurfactants, and combinations of any two or more of said compositions. The polymers can also be used in conjunction with carbon dioxide in carbonated waterflooding. In the various processes, said polymer can be crosslinked with various crosslinking agents. The aqueous fluid to which the polymer is exposed can have a significant salinity and/or hardness, e.g. a salinity of at least about 10 grams per kilogram of solution with a fraction of divalent hardness cations to total cations of at least about 1 weight percent, or particularly, a fraction of divalent hardness ions of at least about 5 weight percent. The polymer can be exposed to various aqueous fluids in the preparation of the polymer and polymer solutions for use in the process, in the introduction into the well bore and/or formation, or in contact with subterranean formation water. The polymers which can be used in the various processes for the recovery of natural resources include copolymers produced from monomer mixtures of N-vinyl lactams and unsaturated amides and terpolymers prepared by incorporating a minor amount of at least one termonomer, generally amounting to about 10 weight percent or less based on total weight of monomers, into the monomer mixture. The proportions of the monomers in the monomer mixture can vary over a broad range, as disclosed for the polymers produced by the methods of this invention. The termonomers can be selected as indicated elsewhere herein for the inventive terpolymers. The polymers used in these processes and compositions of the invention will hydrolyze, and when heated in solution to a temperature such as at least about 150° F. for a suitable period of time, will reach an equilibrium degree of hydrolysis and an equilibrium cloud point temperature. Generally, an equilibrium degree of hydrolysis for a given temperature (thus indicating long term stability at that temperature) will be obtained by heating at a higher temperature for a short time. For instance, heating at 300° F. for 7 days gives the equilibrium degree of hydrolysis for 250° F. Heating at about 250° F. for at least about 7 days gives the equilibrium degree of hydrolysis and equilibrium cloud point temperature for about 180° F. Hydrolysis of the polymers to the desired degree can also be obtained by contacting them with a base or acid, optionally while heating, as explained more fully below.

The polymer can be at least partially dissolved in a liquid which is circulated in a well bore used in certain processes of the invention, such as for example when said polymer is used as a drilling fluid, a workover fluid, or a completion fluid.

It has been discovered that the various polymers prepared in accordance with this invention, as well as some of the corresponding polymers of the prior art, can be useful in various processes such as for instance for recovery or processing of natural resources, comprising enhanced oil recovery, the drilling, workover and completion of wells for the recovery of natural resources such as oil, gas and geothermal wells, the thickening and/or treatment of water for use, and minerals beneficiation. For example, in accordance with one embodiment of the invention a process for the enhanced recovery of oil from at least one high temperature production well comprises injecting an aqueous fluid thickened with a VP/Am polymer into at least one injection well to improve the recovery of oil from the production well. In such novel applications, the VP/Am polymers can be used in conjunction with various other materials, such as bases, surfactants, cosurfactants, polymeric viscosifiers, crosslinking agents and the like, used singly or in combination.

For example, the bases can be water-soluble bases selected from the group consisting of alkali and alkaline earth metal hydroxides, ammonium hydroxide, alkali metal carbonates and chemical buffer salts which dissolve with hydrolysis to yield alkaline fluids, such as sodium phosphate, sodium borates and sodium silicates, or combinations of at least two of said bases.

Surfactants can be selected from anionic, cationic or nonionic surfactants, suitable anionic surfactants include petroleum sulfonates, alkali metal carboxylates such as sodium oleate, carboxyalkylated or sulfated polyethoxylated alkyl phenols, carboxylated or sulfonated polyethoxylated alkyl phenols, carboxylated, sulfated or sulfonated polyethoxylated alcohols or carboxylic acids, and carboxylated, sulfated or sulfonated polyethoxylated thiols. Suitable cationic surfactants include long chain fatty amines and quaternary ammonium salts of fatty amines. Suitable nonionic surfactants include polyalkoxylated compounds prepared from substrates of long chain alcohols, alkyl phenols, carboxylic acids, amines and thiols. These surfactants can be used in combinations or mixtures.

Suitable cosurfactants can be polar organic compounds selected from the group consisting of saturated and unsaturated alcohols having from 3 to about 10 carbon atoms, phenols, amines, esters, mercaptans, aldehydes, ketones, amides, sulfoxides, organic nitro compounds, organic nitriles, sulfones, urea, and polyethoxylated alcohols. These cosurfactants can be used in combinations or mixtures.

The polymers, copolymers and terpolymers discussed herein are of applicability in the mobility buffer following a micellar or microemulsion slug of the type disclosed in Hedges et al U.S. Pat. No. 4,265,308 (May 5, 1981) the disclosure of which is hereby incorporated by reference. In this embodiment a microemulsion slug is formed in a hostile environment followed by a mobility buffer comprising water and 0.05 to 1 preferably 0.1–0.25 wt. percent polymer, followed by drive water. For instance a surfactant system, generally comprising a petroleum sulfonate surfactant and a $C_3$–$C_6$, preferably $C_4$–$C_5$ alcohol cosurfactant, is injected into a reservoir to form a microemulsion in situ. Thereafter the mobility buffer is injected followed by injection of a conventional drive fluid comprising water, generally saline water. Oil is recovered at a production well spaced apart from the injection well as the drive fluid pushes the mobility buffer slug which pushes the microemulsion which sweeps the oil out of the pores in the formation and to the production well. Polymeric viscosifiers can be, for example, biopolysaccharides, cellulose ethers, acrylamide-derived polymers, or mixtures thereof.

Crosslinking agents can be selected from various suitable crosslinking agents. Examples include various aldehydes and trivalent metal cations such as $Al^{+3}$, $Cr^{+3}$, and $Fe^{+3}$. Also suitable are multifunctional amines such as diamines. For example, aluminum citrate can be used admixed with the polymer or in slugs alternating with polymer slugs. Soluble compounds of $Cr^{+3}$ or $Fe^{+3}$ can be used, or oxidizable compounds of divalent iron such as $FeCl_2$ can be used in conjunction with a gaseous oxidant such as air or oxygen. Phenols or phenolic materials such as lignites can be used. Formaldehyde, acetaldehyde, chromium$^{+3}$ and aluminum$^{+3}$ are particularly useful in unsaturated amide and/or N-vinyl lactam polymers.

The formaldehyde can be used alone or with a phenolic compound such as phenol. The specific combination of formaldehyde and phenol requires a relatively high temperature to effect gelation. By using OH substituted phenols the reactivity can be speeded up or the reaction carried out at a lower temperature. Examples of such phenolic compounds are recorcinol and catechol, conversely, a meta director such as $-C \equiv N$ or chlorine can be substituted onto the phenol to slow down the reaction. Salicylic acid can also be used.

Suitable phenolic compounds include phenol, resorcinol, catechol, hydroquinones, trihydroxyphenols, o-, m-, or p-cresol, xylenols, bisphenol A, and tannins.

More specifically, with regard to aldehydes such as formaldehyde, it has been found that phenol or a phenolic compound must be used in addition to the formaldehyde to give a gel in a reasonable time at a temperature within the range of room temperature to 300° F. (149° C.). However, because the polymers are inherently stable, the gels, too, are surprisingly stable even in the presence of water containing high (greater than 500, generally greater than 1000–100,000 parts per million by weight) divalent metal cation concentrations. The phenol or phenolic compound may have to be used in only trace amounts to give stable gels, i.e., gels that do not set up too quickly, at higher temperatures and with particular polymer compositions. Generally, the formaldehyde is used in an amount within the range of 0.02 weight percent to 100 weight percent, and the phenol is used in an amount within the range of 0.02 weight percent to 100 weight percent, based on 100 weight percent polymer.

That is, in the most preferred embodiment, the mole ratio of formaldehyde to phenol is about 3:1 which is about the same as a 1:1 weight ratio. Most generally, the formaldehyde is present in an amount of about 1–10 weight percent based on polymer, which if the polymer is a 1 weight percent solution in water is 100–1000 ppm based on total solution. Mole ratios of 1:1 to 5:1, preferably 2:1 to 4:1, also work quite well as does the entire range described hereinabove under the proper conditions. It is noted that the crosslinking with formaldehyde utilizes amide groups in the polymer chain. At least about 4 weight percent amide comonomer is required to effect gelation.

Gelling with multivalent cations occurs when there are pendant carboxylic acid or acid salt groups in the polymer chain either from hydrolysis of acrylamide or from copolymerizing with an acid or acid salt such as acrylic acid or sodium acrylate as described in detail hereinafter.

Alternatively, a urea-formaldehyde crosslinking system can be prepared by reacting formaldehyde with urea in a mole ratio of 2–6 moles formaldehyde to one mole of urea, more preferably a mole ratio of about 4:1 is used. The reaction is carried out in aqueous medium.

This mixture, with phenol, forms gels. In operation, then, a water slug, thickened with a polymer having crosslinking sites such as pendant carboxamide groups in admixture with the gelling agent is injected into a well to form a gel to effect permeability contrast correction to divert subsequent drive fluids or steam to relatively oil-rich less permeable zones. Examples of suitable polymers are NaAMPS/Am and VP/NaAMPS/Am either partially hydrolyzed or containing acrylic acid or an acrylate as described hereinafter. Alternatively, the components can be injected sequentially (preferably the polymer is injected first) so as to effect all of the gelation in-situ.

By varying the amount of crosslinking ingredients, particularly the phenol or phenolic compound, the amount thereof and the pH (preferably at greater than 7.5) the gelation rate can be tailored to the particular reservoir. In addition to near-well treatment, these crosslinked polymers are also useful in steam flood operations, as for instance where an aqueous surfactant system and a polymeric thickener are injected with steam to give a foam to divert subsequent drive fluid. For in-situ gelation, any one of three components: polymer, phenolic compound or formaldehyde can be withheld and injected later to cause gelation.

For crosslinking with trivalent metals, some acid must be present. This can come from acid produced through preparation and/or aging because of hydrolysis or acid such as acrylic acid can be added during the preparation.

More specifically with regard to bivalent metal/oxygen gelling systems for permeability correction, in a water permeability correction process involving the in situ polyvalent metal crosslinking of polymeric viscosifiers such as polyacrylamide triggered by the sequential injection of (1) an oxidizable bivalent metal such as in a bivalent iron compound (e.g. $FeCl_2$) and (2) a gaseous oxidant such as air or oxygen, viscosifiers prepared by the reaction of N-vinyl-2-pyrrolidone with one or more ethylenically unsaturated comonomers such as acrylamide, methacrylamide, vinyl acetate, acrylic acid, acrylate esters and the like are used. This system is of particular value under hostile environment conditions. This crosslinking procedure is more specifically described in U.S. Pat. No. 3,658,129, the disclosure of which is hereby incorporated by reference. That is, the presence of the carboxylic acid or more preferably the salt during polymerization gives pendant carboxylate groups from the polymer chain which form crosslinking cites.

Also, redox systems such as sodium dichromate and sodium bisulfite as disclosed in U.S. Pat. No. 3,749,172, the disclosure of which is hereby incorporated by reference can be used.

Alpha-, beta-carboxylic acid such as acrylic acid, particularly in the salt form can also be used as a fourth comonomer with the N-vinyl amide, unsaturated amide and vinyl-containing sulfonate, or simply as a comonomer with the N-vinyl amide and the unsaturated amide or vinyl-containing sulfonate, or as a comonomer with the vinyl-containing sulfonate and the unsaturated amide.

It has been found that the salt of acrylic acid imparts far greater stability to the polymer as measured by shelf life (ability to remain water-soluble on standing at room temperature or temperatures likely to be found in storage) than the acid itself. Any salt can be used including salts of divalent metal cations but generally sodium acrylate is used. Thus the result can be obtained by copolymerizing a salt of acrylic acid with the other monomers or by hydrolyzing an unsaturated amide-containing polymer under alkaline conditions, the former being preferred. In emulsion polymerization, the acid can be used quite satisfactorily.

The use of acrylic acid or an acrylate can be viewed as replacing 5-50, preferably 8-40 weight percent of one of the other monomers (generally the unsaturated amide with the acrylic acid or acrylate to provide crosslinking sites. Of particularly suitable composition is a 30/10/55/5 weight percent VP/Am/NaAMPS/sodium acrylate polymer. That is compared with a 30/15/55 composition, the 30/10/55/5 has 33⅓ percent of the acrylamide with sodium acrylate. Broadly the acrylic acid or acid salt can be used in an amount within the range of 1-30, preferably 2-15 weight percent, the remainder including at least one of a hydrophilic N-vinyl amide or a hydrophilic vinyl containing sulfonate salt or sulfonic acid. Salts of substituted acrylic acid such as methacrylic acid can also be used as well as salts of higher unsaturated acids including those with up to 8 carbon atoms. In such cases the same conditions and concentrations set out for the acrylate also apply. In absolute terms the copolymer will contain about 1-20, preferably 2-15 weight percent of the acrylic acid or acrylate salt monomer.

The acrylate salt can also be used simply as a comonomer to provide the polymers used in this invention. It has been found that with otherwise identical monomer systems, those using the acrylic acid monomer are unsuitable because the polymers produced have a shortened shelf life; whereas, those systems using the acrylate salt monomer produce polymers possessing a much longer shelf life.

Thus, while either the acid or salt form can be used to produce gelled polymer, only the salt form has the long shelf life desired.

Any suitable amount of the polymers, including the polymers of the invention as well as analogous polymers of the prior art, can be used in the embodiments of the invention concerning the recovery and processing of natural resources. Generally, the inventive polymers prepared by the novel methods of this invention can be used in smaller quantities due to their superior properties, and are thus preferred.

For example, in the introduction of the polymers (of the invention or prior art) into a subterranean well bore and a subterranean formation in processes for enhanced oil recovery, a small but effective amount of polymer should be used to produce the desired viscosity or other properties in the injection fluid. Based upon the properties of the formation and the intended nature and duration of the process, the type and amount of the polymer should be selected to achieve the desired effects over the appropriate time period. As a general guide, the amount of polymer used will be in the range of from about 500 ppm to about 10,000 ppm, preferably 1,000 ppm to about 3,000 ppm, based on the weight of the injection fluid. For gelation, 5,000 to 10,000 ppm polymer is preferred. Generally the goal will be to select an economical amount and type of polymer to produce the desired effect for the required time. Those skilled in the art can determine the amount of polymer to be used by suitable experiments carried out in light of this disclosure.

In some cases the use of polymers prepared in accordance with this invention in conjunction with such other materials can present particular advantages. For example, because of like charge interchain repulsion (including the polymer-surfactant complex) when such polymers are in an electrolyte solution with a surfactant, these systems should demonstrate increased saline resistance, and thus increased viscosity stability. The polymers of this invention can be used to improve the process of drilling a borehole in a subterranean formation, by circulating in the borehole a drilling fluid comprising the polymer, so that the high temperature water loss of the drilling fluid is reduced and improved viscosity and/or gel strength are obtained. Polymers of this invention can be used in drilling fluids comprising fresh or salt water, clays, weighting agents and other drilling fluid ingredients. These polymers are particularly suitable for drilling fluid additives in formations having high temperatures, salinity content and content of hardness ions, since they tend to retain their viscosity well even when aged at elevated temperatures in saline and/or hard water. In addition to use as a drilling fluid additive, the polymers of this invention can be effectively used as additives in various workover and completion fluids, e.g., for reducing the loss of a fluid pumped into a subterranean borehole, by maintaining a suitable viscosity, and improving the fluid's ability to suspend weighting agents.

When introduced into a well bore in processes for the drilling, completion or workover of wells, the polymers can be used in small amounts effective to achieve the effects desired, such as reduction of high temperature water loss, suspension of weighting agents and the like. As a general guide, the amount of polymer used will be in the range from about 0.10 to about 5, preferably 0.5 to about 2 pounds per barrel of fluid. Those skilled in the art can determine the amount of polymer to be used by suitable experiments in light of this disclosure. The polymers are useful in such applications at temperatures up to at least about 400° F. In one embodiment, the polymers can be added to a workover/completion fluid to provide a fluid which is substantially clay free, with a pH in the range from about 7 to about 10.

The in situ polymerization embodiment of this invention is applicable to any situation wherein it is desired to selectively plug the more permeable zones in a subterranean formation by in situ polymerization of a polymer. The invention is primarily directed to the selective plugging of the more permeable zones, known as thief zones, to improve the sweep efficiency of postprimary oil recovery processes.

The preferred plug-forming materials of this invention are water-soluble, polymerizable monomers comprising an N-vinyl lactam as previously disclosed. The polymers of N-vinyl-2-pyrrolidone are presently preferred. For most applications it is presently preferred that the polymer be a copolymer produced in situ by copolymerizing the N-vinyl lactam with an unsaturated amide as previously disclosed, preferably acrylamide. Copolymers preferably contain an amount ranging from about 25 to about 75 weight percent of the N-vinyl lactam, the remainder being the unsaturated amide. For certain applications the copolymer can comprise an additional monomer, or termonomer, producing a terpolymer containing major portions of the N-vinyl lactam and the unsaturated amide in the proportions previously disclosed, with the termonomer selected from the group consisting of hydrophobic and nonanionic compounds as disclosed previously.

This embodiment of the invention preferably involves injecting into the formation a polymerization inhibitor or poison for the particular monomer(s) to be polymerized. For instance, materials to inhibit the polymerization of acrylamide, such as potassium ferricyanide, hydroquinone and the like can be injected in the formation. Polymerization inhibitors for the N-vinyl lactam can be injected into the formation in addition to or in lieu of the inhibitor for the unsaturated amide, such as for example, those selected from the group consisting of benzoquinone, nitrosobenzene and alkyl- substituted derivatives and the like. An appropriate catalyst or free radical initiator selected from the materials disclosed elsewhere herein is injected into the formation with the monomer(s) to cause polymerization in situ, as described in Example XIII. Methods for the introduction and selective removal of polymerization inhibitors for permeability correction in subterranean formations are disclosed by Barton in U.S. Pat. No. 4,190,109, issued Feb. 26, 1980, and assigned to Phillips Petroleum Company, Bartlesville, Okla.

When monomers are injected into a formation for employment in this embodiment of the invention, the amount of monomers used is not critical so long as at least an effective amount is present, and the concentration of the resulting monomer solution does not produce a viscosity so great as to cause difficulties in emplacing the monomers in the portion of the formation where they are to polymerize. The effective amount can be very small, as where the permeability of a zone is to be decreased slightly, or larger where fractures, voids, etc. are to be plugged. A concentration and amount of monomer solution should be used which will permit an effective amount of the monomers to polymerize in situ in the desired zones and have the desired effect on the permeability of those zones.

Optionally, a suitable difunctional or other multifunctional monomer such as for example divinylbenzene or bis-methylene-acrylamide can be employed as a crosslinking agent in the process of in-situ polymerization.

The advantage obtained by using the inventive polymers through in-situ polymerization in a subterranean formation is that polymers of enhanced viscosity and stability to the effects of high temperatures, e.g. at least about 150° F., salinity and/or concentration of hardness ions are obtained when the monomers are polymerized in the presence of electrolytes, preferably a mixture of electrolytes selected from the groups of alkali metal salts and alkaline earth metal salts. Such an electrolyte solution can be introduced as the polymerization medium in the process of flushing out the polymerization inhibitor, or in certain formations the formation water can be used at least partially as the polymerization medium, with or without filtering or other treatment. The formation water and/or fluid flush material preferably have a salinity of at least about 10 grams per kilogram solution and/or a fraction of divalent hardness cations of at least about 1 weight percent, based upon the total cations. By forming a viscous and stable polymer in the more permeable zones of the formation, the permeability of the formation is made more uniform with a smaller quantity of monomers, and the permeability correction can be expected to be longer lasting.

FLOCCULATION

Other applications for the polymers of this invention include methods for concentrating finely divided organic or inorganic solids from an aqueous suspension thereof by admixing with the suspension an effective amount of the copolymer to cause accelerated sedimentation of the suspended solids and maintaining the treated suspension under quiescent conditions to separate a clarified supernatant liquid layer and a concentrated solid suspension layer.

In carrying out the flocculation embodiment of the invention, the inventive polymer is distributed in a suspension of finely divided inorganic solids in any fashion by which rapid, thorough mixing may be accomplished without excessive agitation. In a preferred method of operation, the copolymer is dissolved in water and introduced into the suspension in the form of a dilute aqueous solution. Following the introduction of the polymer solution, the treated suspension is transferred with a minimum of agitation and shearing action into a quiescent zone such as a sedimentation vessel to allow the development and settling of agglomerates of the finely divided solids. In practice, the polymer solution may be sprayed or otherwise introduced into a flume or other conduit through which the suspension is moving. In such operations the conduit may be equipped with baffle plates or other means of mild agitation at or immediately following the point of introduction of the polymer solution to assure thorough mixing. Preferably the polymer solution is added portionwise or at a plurality of sites to accomplish thorough distribution of flocculant without local overtreatment.

Following the mixing of the solution of polymer with the suspension of finely divided solids, as set forth above, the treated suspension may be submitted to various conventional procedures for the concentration or separation of solids from the suspension. For example, the treated suspension may be fed into a settling tank or thickner to effect the separation of a concentrated slurry of solids as an underflow product and a clarified aqueous effluent as an overflow product.

The amount of polymer to be employed will vary depending upon the type of inorganic solids, the degree of subdivision thereof and the rate of settling required. With highly amenable solids, such as certain chemical precipitates, excellent improvement in settling rate and clarity of supernatant liquid can be obtained when employing only 0.001 pound of polymer per ton of suspended solids. For most finely ground materials, good results can be obtained when employing about 0.01 to about 0.1 pound of polymer per ton of suspended solids, although loadings ranging up to 1 or 2 pounds of polymer per ton of solids may sometimes be required, particularly when the solids are to be filtered following treatment. In any case, an amount sufficient to increase the rate of sedimentation of the solids is employed. In some cases the inventive polymers are conveniently employed in conjunction with other flocculants such as polyacrylamides or natural polymers.

Scale Prevention

It is known to use polyacrylamide in aqueous systems to remove and/or prevent the formation of scale as shown for instance in Booth et al U.S. Pat. No. 3,463,730 Aug. 26, 1969). However, in systems having multivalent ions and/or high temperature, polyacrylamide precipitates out after a time. The polymers described herein, however, can be used in boilers, evaporators, cooling towers, heat exchangers, and other devices where a thermal gradient exists or where areas are catalytically active and thus induce scale formation into aqueous systems. Thus in a utility of the type just described wherein the temperature and divalent metal cation concentration is above the infinite days line of FIG. 14, compositions described in this invention make the difference between a successful and an unsuccessful system.

The polymer can be used in the same concentrations as those polymers of the prior art, i.e., from 0.1 to 500 parts per million, preferably 1 to 20 parts per million, for instance, as disclosed in said U.S. Pat. No. 3,463,730 and for the utilities described in said patent, the disclosure which is hereby incorporated by reference. Other similar utilities for the polymers described in this invention where conditions such as high temperature and multivalent ions exist include inhibiting scale formation on the surfaces of membranes in reverse osmosis apparatuses, to fluidize and disperse insoluble alluvium deposits such as silt from water systems as for instance, deposits of silt alluvium and the like left by water systems in cooling towers, once through cooling systems and similar devices and gas scrubbers. These latter are meant to include wet scrubbers being used to clear effluent from boiler stacks, incinerator stacks, lime kilns, foundries, blast furnaces, basic oxygen furnaces, open-hearth units, coke plants, paper mill recovery boilers, pet food manufacturing facilities, electric furnaces, smelters, and asphalt plants. Another utility is aqueous hydraulic fluids under circumstances where the fluids encounter high temperatures and/or multivalent ions.

Hydraulic Fluid Viscosifier

The water soluble polymers described herein are used to thicken water-based hydraulic fluids allowing these fluids to be used directly in pumps designed for the more viscous oil-based fluids. Thickened water-based fluids also can be used at higher pressures than unthickened fluids because of the lower internal leakage in the hydraulic pump. Polymer shear stability is an important property in this application because of the shearing nature of the pump on the fluid.

Drag Reduction Agent

The water-soluble polymers described herein are also useful as drag reducing agents. Dray reducing agents are polymeric materials that are added to flowing liquid streams to reduce friction losses. They accomplish this by reducing turbulence and increasing laminar flow in the system. Again, because the fluid will likely pass through a pump, polymer shear stability is an important attribute.

Cloud Point Measurements

When an aqueous solution of a water-soluble polymer such as an acrylamide-derived polymer is heated, it turns cloudy at higher temperature. This cloudiness disappears upon cooling and reappears as a result of additional heating. The temperature at which such cloudiness first appears is a property related to the solubility of the polymer, and is known as the cloud point. Cloud point corresponds to the lower critical solution temperature described by Billmeyer in his Textbook of Polymer Science, Second Edition (Wiley-Interscience, New York, 1971) at pages 39–43. The lower critical solution temperature is the higher temperature at which a solvent, such as water, in a given single-phase polymer-solvent system, such as PVP-Am in a synthetic sea water, is no longer a good solvent. At this temperature, the single phase system undergoes phase separation, as shown by FIG. 2-8 in Billmeyer. Such phase separation is often marked by clouding, hazing or precipitation of the polymer. Such phase separation, and thus the lower critical solution temperature or cloud point, can be observed visually or measured by various apparatus, including turbidimetry. Since chemical modification of the polymer or solvent does not necessarily occur at or near the lower critical solution temperature, redissolution of the cloud, suspension or precipitate is noted when the temperature decreases below the lower critical solution temperature.

Apparatus has been developed in connection with the research on this invention to measure cloud points at high temperatures (up to about 325° F. or even 400° F.). Unless otherwise noted, this apparatus and the method described were used to determine the cloud points herein. To determine the cloud point of a given polymer with this apparatus, a solution of the polymer comprising 0.25 or 0.5 gram (as indicated) per deciliter of polymer in SSW is produced and a 35 ml aliquot of this solution is placed in a 45 ml ampule and torch-sealed under vacuum. The ampule is then placed in a protective chamber immersed in a silicone oil bath containing Dow Corning 200 Fluid. A Brinkman Model PC-801 probe colorimeter is used to supply a source of light and a detector. The light from the colorimeter is passed through a 30 inch Brinkman fiber optic light guide (No. 2023602-F) and then directed through the solution. The transmitted light is passed by another identical fiber optic light guide to the detector. The sample is heated from a temperature where the polymer solution is clear to a temperature where cloudiness exists, and is then allowed to cool. For example, to measure cloud points in the range of about 250°–275° F., the silicone oil bath containing the ampule is heated from 200° F. to 280° F. and cooled back to 200° F. in approximately one (1) hour with the heating cycle taking about 30 minutes. Use of a pressure cell allows going to 400° F. To detect the onset of cloudiness, the absorbance of the polymer solution is measured and recorded (on a strip chart recorder) as a function of temperature for the heating-cooling cycle. (Absorbance is outputted by passing the transmittance signal through a logarithmic amplifier and on to the recorder.) The average of the temperatures at which the first trace of cloudiness appears and the last trace of cloudiness disappears employing the above described apparatus and method is the numerical average cloud point temperature, hereinafter "cloud point," as that term is used in the specification and claims unless otherwise indicated. This measurement appears to be quite reproducible to within ±3% with the apparatus presently in use.

Figure 5:
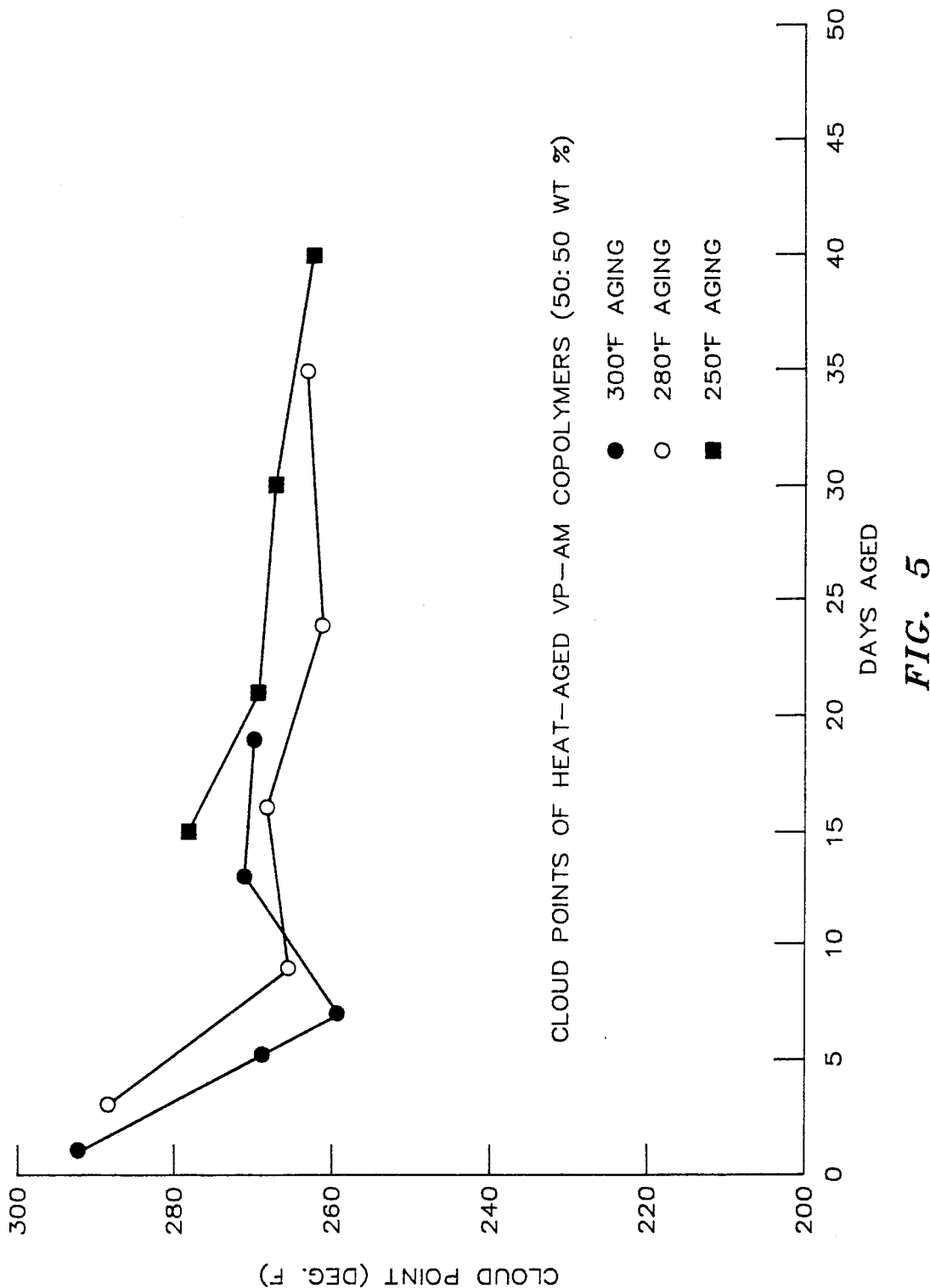
FIG. 5 illustrates equilibrium cloud point temperatures for copolymers of the invention aged at different temperatures.

It has been noted that the cloud points of the copolymer solutions of this invention can be correlated with desirable properties comprising the resistance of the copolymers to high temperatures. Generally speaking, the higher the cloud point of a freshly-prepared polymer, the higher the temperature (which can be as much as about 50° F. or more (but generally no more than 10° F. above the cloud point) which the copolymer can be expected to withstand without suffering a significant loss in its capacity to impart viscosity to the test solution. See Example V. Furthermore, tests to determine cloud point after aging can be used to indicate the prospects of the copolymers withstanding further aging under such conditions, or under less severe conditions. As shown in FIG. 5 and discussed in Example VI, although the cloud points measured for copolymer samples aged at different temperatures initially vary, as aging exceeds about 20 days, the cloud points approach a common equilibrium value. This equilibrium value is believed to be an excellent indicator of the copolymer's resistance to degradation (precipitation) at high temperatures.

The VP:Am copolymers and terpolymers of this invention hydrolyze. As is known, hydrolysis of an amide alters the amide functionality to an acid (or its salts). In the case of acrylamide, acrylic acid or its salts are formed. In the case of polyacrylamide or its copolymers, including VP-Am, the polymer is altered to contain monomer units of carboxylic acids or their salts, thus introducing ionic character to the polymer. The degree of hydrolysis has been found to increase to a maximum equilibrium value of about 70 to 80 percent at 250° F. based on the acrylamide content. It has been noted that the cloud point temperature also changes over the same time frame and equilibrates. The inference is that the cloud point temperature reflects the basic polymer nature, and that the stability of the equilibrium cloud point temperature (corresponding to the stability of the degree of hydrolysis of the copolymer) probably indicates a constant polymer makeup.

The utility of cloud point measurements as predictors of the performance and/or stability of polymer compositions in high temperature environments is disclosed in U.S. Pat. No. 4,016,932, which states that in surfactant systems for oil recovery comprising at least one anionic and at least one nonionic surfactant, superior results are obtained when the nonionic surfactant is chosen to have a cloud point slightly above the formation temperature. Similarly, measurement of the cloud points of the copolymers suitable for use in the processes of this invention, before and/or after aging at elevated temperatures, facilitates the selection of polymers which will provide superior performance and stability for the various applications disclosed herein. For the best prediction of polymer performance, it is preferred that the cloud points be determined in aqueous solutions similar to the proposed enviroment for employement, e.g. in salinity and hardness, and at standardized concentrations of the polymer. For use in enhanced oil recovery in hot saline formations, for example, polymers having cloud points in brine of at least as high as the formation temperature after short-term aging at elevated temperature are preferred. Since long-term viscosity stability at high temperatures is required in enhanced oil recovery, and since polymers having relatively high cloud points after aging correlate well with polymers having such stability, polymers with relatively high cloud points are preferred for use in enhanced oil recovery processes. Conversely, polymers used in drilling fluids and the like are subjected to high formation and/or well bore temperatures, salinity and hardness ions for shorter periods of time. Thus, polymers with cloud points relatively lower with regard to formation and/or well bore temperature than those required in polymers selected for, e.g., enhanced oil recovery, can be utilized in drilling fluids, etc. For example, a polymer with a cloud point somewhat lower than the maximum formation and/or well bore temperature may perform adequately and retain the desired properties such as viscosity for a period of use limited to weeks, days or even hours. This is particularly important when drilling or servicing deep and/or hot wells, such as geothermal wells.

Based on the relatively stable properties of the polymers suitable for use in the processes of the invention after short-term heat aging, for applications where maximum stability in hot, saline environments is desired, the polymers can be pre-aged or hydrolyzed before use. That is, the polymers are hydrolyzed in solution by heat aging at a suitable temperature until an equilibrium value of hydrolysis is attained. The aging temperature must be less than the decomposition temperature of the polymer. The polymers can be aged in any available aqueous medium, but media similar to the environments in which the polymers are to be employed are presently believed to produce optimum results. Since the aging time and temperature are interdependent, to fully stabilize polymer properties such as viscosity, the polymers must be aged for long enough at the temperature selected to produce an equilibrium degree of hydrolysis. The polymers can also be at least partially hydrolyzed by treatment in solution with a base, an acid, a polyacid such as polyacrylic acid, a polyelectrolyte such as polyvinyl-pyrrolidone or an electrolyte such as an alkali or alkaline earth metal salt.

Figure 6:
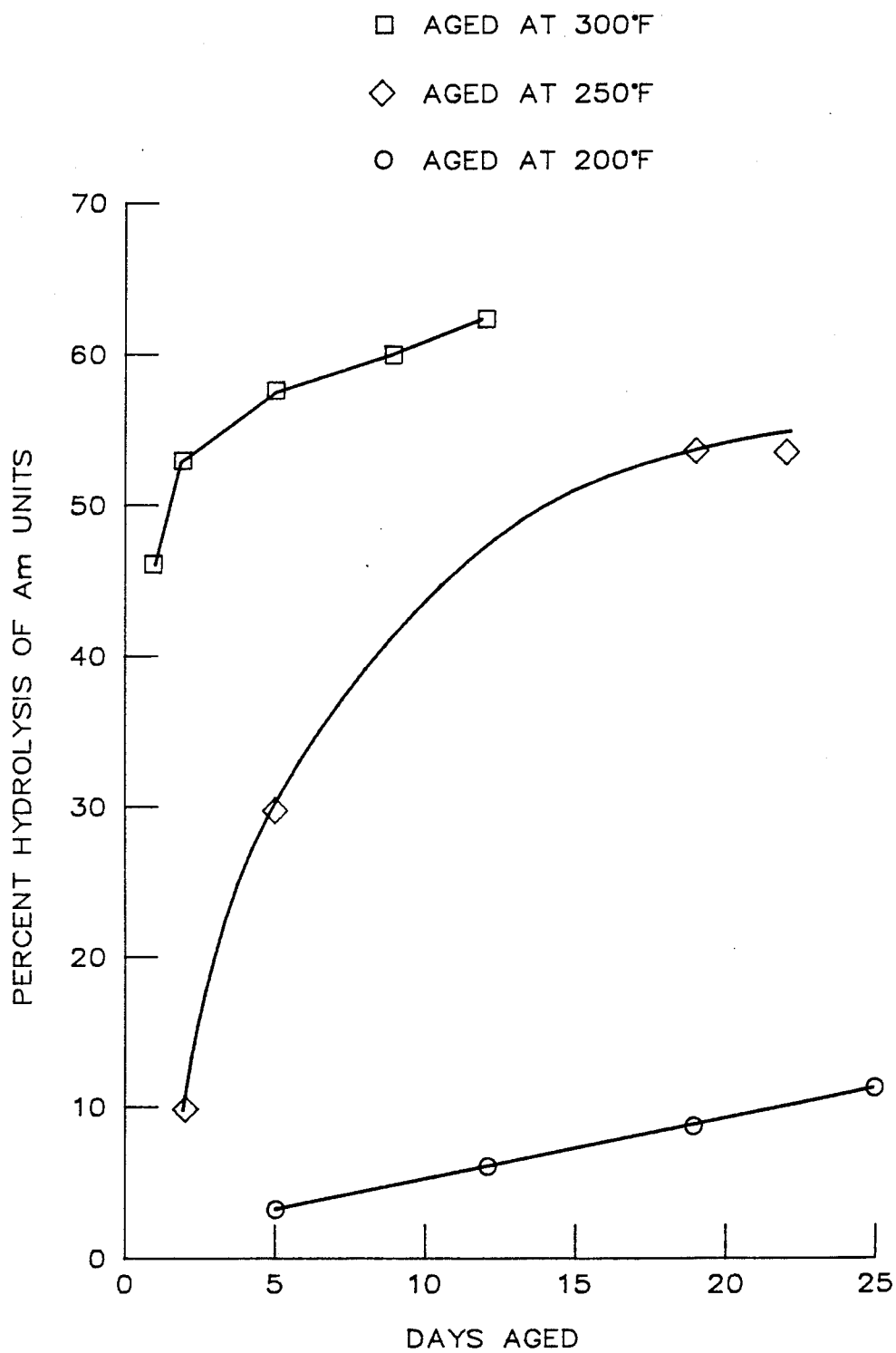
FIGS. 6 and 7 illustrate the degree of hydrolysis of the acrylamide units attained in copolymers of the invention aged at different temperatures.

The degree of hydrolysis can be tested directly by the Dow Color Test, as described in Example VII herein, or can be estimated by the equilibrium cloud point temperature, as described in Example VI. The minimum temperature suitable for this pre-aging is a temperature high enough to produce a hydrolysis rate which allows pre-aging to be completed in a reasonable time. As seen in FIG. 6, temperatures of at least 150° F., preferably in the range of about 250° F. to about 300° F. should generally produce suitable hydrolysis rates for the inventive polymers. Temperatures higher than 300° F. can be used, provided suitable equipment is available and the decomposition temperature of the polymer is not exceeded. In the production and pre-aging of a given polymer, the relationship between the times and temperatures appropriate for pre-aging can be readily determined. When a temperature of at least about 250° F. is used, the polymers are preferably aged for at least about 7 days.

The invention is further illustrated by the following examples, which should not be regarded as more limiting than the appended claims. Unless otherwise noted, all percentages and/or parts are by weight.

EXAMPLE I

Copolymer Preparation and Testing

The polymer preparations were carried out in 10 ounce crown top glass beverage bottles. Each bottle was charged under an inert atmosphere with 20.0 g total of the monomer(s), 200.0 g of the reaction medium (t-butyl alcohol, distilled water, water containing salts or SSW, as specified) and 0.02 g of initiator, or the specified amount in terms of weight percent, based on the total monomer weight and desired solution viscosity. Each bottle was purged for about 10 to 20 minutes with an argon stream to remove oxygen and capped. The SSW was prepared as described earlier.

The bottles were placed in a bath maintained at 50° C. and rotated for at least 4 hours to achieve substantially complete polymerization of the monomers. The bottles were removed and the resulting solutions in aqueous media were diluted with the specified test medium to obtain the desired viscosities for the tests. Polymers prepared in t-butyl alcohol were separated from the alcohol medium by elutriation, then diluted with the test media for viscosity tests.

Aging of the samples was conducted in torch-sealed glass ampules containing about 30 to 35 mL of polymer solution, e.g., 2 weight percent or as specified in the Tables, in an oven maintained at the specified temperature. At various time intervals, ampules were removed, observed for any evidence of precipitation and cooled to room temperature. Each seal was broken and the viscosity of the solution as a function of shear rate was measured at 77° F. (ambient room temperature) with a Brookfield LVT model viscometer equipped with an UL adapter for viscosity measurements at different shear rates. Each viscosity listed is an average of three measurements at each shear rate.

Screen factors, when reported, were determined by measuring the time required for passage of an aliquot of aqueous polymer solution by gravity flow through five 100-mesh stainless steel screens, and dividing this time by the time required for passage of the same amount of solvent through these screens under identical conditions. Screen factors are related to viscosity of the polymer solution, thus the higher the factor the higher the viscosity. The test method is detailed by Foshee, W. C.; Jenning, R. R. and West, J. J. in Paper SPE 6202 entitled "Preparation and Testing of Partially Hydrolyzed Polyacrylamide Solutions" presented at the 51st Annual Fall Meeting of the Society of Petroleum Engineers in New Orleans, Oct. 3-6, 1976.

In Table IV, footnote f, the cloud point was visually estimated with an aged sample tested at an elevated temperature by placing the ampule containing the polymer in another bath maintained at a lower temperature, so that the polymer solution was cooled sufficiently to allow redissolving of the precipitated polymer. The bath temperature was then slowly raised and the temperature at which cloudiness visually reappears was recorded as the cloud point. For example, the cloud point of a polymer solution aged at 250° F. that had become cloudy was determined to be 215° F. (see footnote f, Table IV) by cooling the hot mixture to about 180° F., thus allowing the precipitated polymer to redissolve. The temperature was slowly raised until 215° F. was reached, at which point the cloudiness visually reappeared. This temperature was recorded as the cloud point.

As discussed earlier, it has been found that cloud point can be correlated with the maximum temperatures at which such polymers can be expected to retain their viscosity when aged. Thus, newly-formulated polymers can be quickly evaluated as to their suitability for laboratory or field tests for retention of viscosity under aging at elevated temperatures.

The viscosities of the aged polymers are listed in Table I.

TABLE I

Aging Results For Homopolymers and Copolymers of
N-Vinyl-2-Pyrrolidone and Acrylamide Prepared in SSW
with 0.5 Weight Percent AIBN[j] and Different
Monomer Ratios and Aged in SSW

| Sample | Weight Percent VP | Am | Concentration in SSW | Days aged | Brookfield[k] Viscosity, centipoise, after aging at 200 F. | 250 F. |
|---|---|---|---|---|---|---|
| 1 (homopolymer) | 100 | 0 | 2.0 | 0 | 16.1 | 16.1 |
| | | | | 21 | 14.2 | 13.8 |
| | | | | 48 | 14.0 | 13.6 |
| | | | | 125 | —[a] | —[b] |
| 2 (copolymer) | 87.5 | 12.5 | 2.0 | 0 | 55.4 | 55.4 |
| | | | | 21 | 60.1 | 61.9 |
| | | | | 48 | 60.5 | 60.9 |
| | | | | 124 | —[a] | —[b] |
| 3 (copolymer) | 75 | 25 | 2.0 | 0 | 46.8 | 46.8 |
| | | | | 17 | 42.9 | 42.8 |
| | | | | 44 | 43.0 | 41.9 |
| | | | | 120 | —[a] | —[b] |
| 4 (copolymer) | 62.5 | 37.5 | 2.0 | 0 | 108.4 | 108.4 |
| | | | | 27 | 124.9 | 105.0 |
| | | | | 48 | 129.0 | 117.0 |
| | | | | 105 | 127.0 | 112.0 |
| | | | | 120 | —[a] | —[a] |
| 5 (copolymer) | 50 | 50 | 2.0 | 0 | 331 | 331 |
| | | | | 26 | 457 | 478 |
| | | | | 47 | 476 | 386 |
| | | | | 119 | —[a] | —[a] |
| 6 (copolymer) | 37.5 | 62.5 | 2.0 | 0 | 860 | 860 |
| | | | | 24 | 1934 | 1376 |
| | | | | 45 | 1686 | 1038[c] |
| | | | | 101 | 1624 | 910[d] |
| | | | | 117 | —[a] | —[e] |
| 7 (copolymer) | 25 | 75 | 2.0 | 0 | 1330 | 1330 |
| | | | | 20 | >2000 | 1220[f] |
| | | | | 43 | >2000 | 813[f] |
| | | | | 99 | 1988 | 142[f] |
| | | | | 113 | —[a] | —[g] |
| 8 (copolymer) | 12.5 | 88.5 | 2.0 | 0 | >2000 | >2000 |
| | | | | 20 | >2000 | >1857[f] |
| | | | | 42 | >2000 | 660[f] |
| | | | | 100 | >2000 | 650[f] |
| | | | | 112 | —[a] | —[g] |
| 9 (control) | 0 | 100 | 0.4 | 0 | 19.1 | 19.1 |
| | | | | 4 | 3.0[h] | 2.1[h] |
| | | | | 18 | — | 1.4[h] |
| | | | | 56 | 24.4[h] | 1.3[h] |
| | | | | 87 | 1.3[h] | 1.6[h] |

Notes:
[a]Clear, aging continuing
[b]Hazy, very small amount of precipitate, test continuing
[c]Cloudy at 250 F., clear at 78 F.
[d]Very hazy, white precipitate. At 78 F., clear with a little floating material.
[e]Very hazy with white precipitate on ampule sides, test continuing
[f]Very cloudy with much white precipitate on ampule side. At 78 F., clear with clear gel.
[g]Very cloudy with much white precipitate on ampule side, test continuing.
[h]Clear with powdery white precipitate at aging temperatures and at 78 F.
[j]azobisisbutyronitrile, based on weight of monomers
[k]Determined at shear rate of 7.3 sec$^{-1}$ or lower at 25° C. (e.g. 7.3, 3.7 and 1.8 sec$^{-1}$) in terms of centipoise (cP).

The aging results presented in Table I show that the invention VP and VP/Am polymers are more thermally stable under the test conditions at 200° F. than the polyacrylamide control. The solution viscosities of the copolymers generally increase with increasing Am content. The lower solution viscosities of sample 3, 75/25 VP/Am, compared with those of sample 2, 87.5/12.5 VP/Am, are believed to be anamolous, since later work shows viscosity results intermediate to those of samples 2 and 4 of Table I. The various copolymers, however, show consistently good thermal stability in this test.

The higher the level of Am in the copolymer, the greater the probability of precipitation at a test temperature of 250° F. For example, when the Am level is higher than about 75 weight percent, precipitation occurs at some time less than about 20 days. When the Am level is lower than about 65 weight percent, the results show much less to no precipitation occurring, even after up to about 125 days at 250° F. Based on both the viscosity and the stability results, the data in Table I indicate that suitable copolymers for EOR have VP/Am levels ranging from about 60/40 to about 40/60 at the temperatures tested. Such copolymers provide reasonably viscous solutions at relatively low polymer concentrations which are very resistant to thermal degradation. The higher proportions of VP are generally preferred for use in reservoirs having more "hostile" conditions, e.g., higher temperature, salinity and hardness of the formation water.

TABLE II

Viscosity of 2 Weight Percent Solutions of 50:50 VP-Am Copolymers Prepared with Different Initiators in Distilled Water and Diluted in SSW

| Run No | Initiator Description | Weight Percent[a] | Brookfield Viscosity,[b] cP |
|---|---|---|---|
| 1 | AIBN[c] | 1.0 | 157 |
| 2 | " | 0.5 | 226 |
| 3 | " | 0.25 | 233 |
| 4 | " | 0.13 | 280 |
| 5 | t-BPP[d] | 1.0 | 11.2 |
| 6 | " | 0.5 | 52.3 |
| 7 | " | 0.25 | 42.8 |
| 8 | " | 0.13 | 69.7 |

[a]Based on weight of monomers
[b]Same as described in footnote k of Table I.
[c]azobisisobutyronitrile
[d]t-butylperoxypivalate

TABLE III

Viscosity of 2 Weight Percent Solutions of 50:50 VP-Am Copolymers Prepared with Different Initiators in SSW and Diluted in SSW

| Run No | Initiator Description | Weight Percent[a] | Brookfield Viscosity,[b] cP |
|---|---|---|---|
| 1 | AIBN[c] | 1.0 | 530 |
| 2 | " | 0.5 | 657 |
| 3 | " | 0.25 | >2000 |
| 4 | " | 0.13 | >2000 |
| 5 | t-BPP[d] | 1.0 | 17.4 |
| 6 | " | 0.5 | 15.4 |
| 7 | " | 0.25 | 19.8 |
| 8 | " | 0.13 | 24.4 |

[a]Based on weight of monomers.
[b]Same as described in footnote k of Table I.
[c]azobisisobutyronitrile
[d]t-butylperoxypivalate The results in Tables II and III show rather dramatically that the viscosities of the polymers prepared in SSW with AIBN are substantially higher in comparison to the viscosities of corresponding polymers, prepared in water using AIBN initiator. It is also clear from the data that AIBN is preferred over the t-BPP as the initiator, based on the much higher polymer solution viscosities obtained. The data in Tables II and III also show that the viscosities of polymers prepared with an AIBN initiator or inversely proportional to the amount of initiator employed, as would be expected by those skilled in the art. This trend is not consistent in the polymers prepared with t-BPP, suggesting that some interaction may take place between the polymer produced and the t-BPP in the solution.

TABLE IV

Aging Results for Several 50:50 PV-Am Copolymers Prepared in SSW or t-Butyl Alcohol and Aged in SSW at 200 F.

| Sample No. | Reaction Medium | Initiator Description | Weight Percent[g] | Copolymer Concentration Wt. % | Days Aged | Brookfield Viscosity[a] cP |
|---|---|---|---|---|---|---|
| 1[b] | SSW | AIBN | 1.0 | 2.0 | 0 | 530 |
|  |  |  |  |  | 28 | 670 |
|  |  |  |  |  | 54 | 664 |
|  |  |  |  |  | 111 | 719 |
|  |  |  |  |  | 320 | —[e] |
| 2[c] | SSW | AIBN | 0.13 | 0.5 | 0 | 19.5 |
|  |  |  |  |  | 28 | 28.0 |
|  |  |  |  |  | 61 | 28.6 |
|  |  |  |  |  | 98 | —[e] |
| 3[d] | SSW | t-BPP | 0.25 | 2.0 | 0 | 19.8 |
|  |  |  |  |  | 35 | 25.5 |
|  |  |  |  |  | 94 | 26.8 |
|  |  |  |  |  | 190 | —[e] |
| 4 | t-butyl alcohol (TBA) | t-BPP | 1.0 | 2.0 | 0 | 18.6 |
|  |  |  |  |  | 32 | 27.0 |
|  |  |  |  |  | 63 | 27.0 |
|  |  |  |  |  | 173 | 27.8[f] |

Notes:
[a]Same as described in footnote[k] of Table I.
[b]Same polymer as in run 1, Table III.
[c]Same polymer as in run 4, Table III.
[d]Same polymer as in run 7, Table III.
[e]Clear solution in a parallel test at 250 F., test continuing.
[f]Tested at 250 F. The polymer solution became cloudy after 13 days at 250 F. The cloudiness disappeared on cooling to room temperature and apparently did not affect solution viscosity. The cloud point was determined to be 215 F.
[g]Based on weight of monomers The data given in Table IV show typical results obtained with 50:50 PV-Am copolymers prepared in SSW or t-butyl alcohol and aged at 200° F. or 250° F. Sample 1 has been aged for over 1467 days at 250° F. with clear solutions obtained, indicating the exceptional stability of the polymer in a saline hard water environment under the test conditions employed.

Since t-BPP is believed to interact with the polymer produced, it would not be appropriate to draw any conclusions from the results of samples 3 and 4.

EXAMPLE II

50:50 VP:Am Copolymers Prepared by Gamma-Irradiation

A series of 50:50 weight percent VP:Am copolymers was prepared by gamma-irradiation. A 20 weight percent solution of monomers in distilled water (control runs 1, 3 and 5) or synthetic sea water (SSW) (inventive runs 2, 4 and 6) were irradiated at room temperature, e.g. 25° C. Each sample, containing water and monomers, weighed about 15 g. The dosage rate was 600 kilorads per hour. The nature of the polymerization media, irradiation times and results obtained are given in Table V. The SSW was prepared as disclosed in earlier.

TABLE V

Gamma Irradiation of VP-Am Solutions at 25° C.

| Sample No. | Polymerization Conditions | | | Description of Polymerized Mixture |
|---|---|---|---|---|
| | Medium | Time Minutes | Dosage KRads | |
| 1 | H$_2$O | 60 | 600 | Clear, soft gel-like |
| 2 | SSW | " | " | Yellow, soft gel-like |
| 3 | H$_2$O | 90 | 900 | Clear, stiff gel |
| 4 | SSW | " | " | Yellow, stiff gel |
| 5 | H$_2$O | 30 | 300 | Clear, very thick solution |
| 6 | SSW | " | " | Yellow, easily flow solution |

Samples 5 and 6 apparently did not receive enough radiation to give polymers of sufficient molecular weight to provide desirable solution viscosities when diluted. No further testing of these samples was done. However, 14 g portions of samples 1 to 4 were individually admixed with 266 g portions of water or SSW, corresponding to the polymerization medium employed, to produce solutions containing 1.0 weight percent polymer, with each mixture placed in a closed container and tumbled for 4 days. It was noted that samples 1 and 2 completely dissolved to give solutions 1A and 2A, each containing about 1 weight percent solids. Samples 3 and 4 contained crosslinked gel suspended in the solution and were deemed to have received an overdose of radiation. No further testing of these was done.

The viscosities of solutions 1A and 2A were determined with a Brookfield viscometer provided with a U.L. adaptor at 6 RPM and 24° C. Solution 1A had a viscosity of about 46.5 cp and solution 2A had a viscosity of about 38.8 cp, which under the conditions employed are considered comparable.

The above results demonstrate that the copolymers of this invention can be prepared in SSW by gamma-irradiation.

EXAMPLE III

Inherent Viscosities of 50:50 VP-Am in Various Media

Viscosities of the polymer solutions disclosed in the examples herein have been expressed variously as Brookfield viscosity, relative viscosity, inherent viscosity, intrinsic viscosity or specific viscosity. Definitions and discussions of these terms can be found in Example VIII or "Viscometry," Encyclopedia of Polymer Science and Technology, Vol. 14, pp. 717–22 (John Wiley & Sons, New York, 1971), and in J. R. Fried, "Molecular Weight and its relation to properties," Plastics Engineering, August, 1982, pp. 27–30.

A series of 50:50 (by weight) VP-Am copolymers was prepared as before by solution polymerization at 50° C. using about 0.1 g (0.50 weight percent based on total components) AIBN as initiator, 10 g each of VP and Am and 200 g of polymerization medium. The polymerization media employed ranged from distilled water to water containing one or more dissolved salts as indicated below. The Ionic Strength (I.S.) of each solution containing a dissolved salt or salts was about 0.7, the I.S. of SSW.

Each polymerization run was conducted overnight, e.g. about 15 hours. The inherent viscosity of each copolymer solution containing 9.1 weight percent copolymer was determined by means of an Ubbelohde viscometer at 25° C. in distilled water and in water containing one or more dissolved salts.

The results are given in Table VI.

TABLE VI

Inherent Viscosity of 50:50 VP-Am in Various Media
All Salt-Containing Media at 0.7 Ionic Strength

| Run No. | Polym. Medium | Inherent Viscosity Medium Inherent Viscosity, dL/g$^a$, 25 C. | | | | | |
|---|---|---|---|---|---|---|---|
| | | Water | SSW | NaCl/MgCl$_2$ | NaCl | CaCl$_2$ | MgCl$_2$ |
| 1 | Water | 5.4 | 5.7 | — | 5.2 | 5.6 | 5.6 |
| 2 | SSW | 7.0 | 7.3 | 6.9 | 7.1 | 7.1 | 7.2 |
| 3 | NaCl aq | 6.5 | 6.7 | 6.5 | 6.8 | 6.6 | 6.6 |
| 4 | CaCl$_2$ aq | 6.3 | 6.5 | 6.3 | 6.5 | 6.4 | 6.5 |
| 5 | MgCl$_2$ aq | 6.4 | 6.5 | 6.4 | 6.5 | 6.4 | 6.4 |
| 6 | NaCl/MgCl$_2$ aq$^b$ | 6.7 | 6.8 | 6.2 | 6.5 | 6.3 | 6.1 |

$^a$All samples for inherent viscosity measurements were at 0.05 weight percent total solids. Each value in the table is the average of three determinations. Reproducibility was within about 0.2 deciliters per gram.
$^b$1.96:1 weight ratio NaCl:MgCl$_2$. Prepared by mixing equal volumes of 0.7 I.S. NaCl and 0.7 I.S. MgCl$_2$.
aq = aqueous The inherent viscosity results for the 50:50 VP:Am copolymer prepared in SSW of 0.7 I.S. are consistently higher than those prepared in the other polymerization media employed. Generally, the copolymers prepared in such media exhibited about the same viscosity results regardless of the inherent viscosity media chosen for their determinations. While the inventive polymers prepared in SSW or mixed electrolyte media have higher viscosities, polymers prepared in the other media can be used in certain process embodiments of this invention.

EXAMPLE IV

Effects of Heat Aging on Viscosities

Several 50/50 VP/Am copolymers were prepared at 50° C. in the manner previously described using 0.25 weight percent AIBN as the initiator in an aqueous polymerization medium as follows: Polymer A was prepared in distilled water. Polymer B was prepared in 0.7 I.S. NaCl solution. Polymer C was prepared in 0.7 I.S. SSW. A portion of each polymer was diluted to the 0.25 weight percent polymer level in the same medium employed in its preparation.

Each diluted polymer solution was divided into 2 portions to give 6 test samples in all. In series 1, the three dissimilar unaged polymer solutions were individually tested to determine how solution viscosity changed over the temperature range of about 80° to 300° F. In series 2, the three dissimilar polymer solutions were aged for 7 days at 300° F. in an essentially oxygen-free atmosphere.

Aliquots of each polymer solution were passed through a capillary viscometer, a 40 foot length of 0.069 inch inner diameter stainless steel tubing. The solution viscosities, in terms of centipoise (cP), were calculated from the viscometer results by applying the Poiseuille equation as known in the art.

Figure 2:
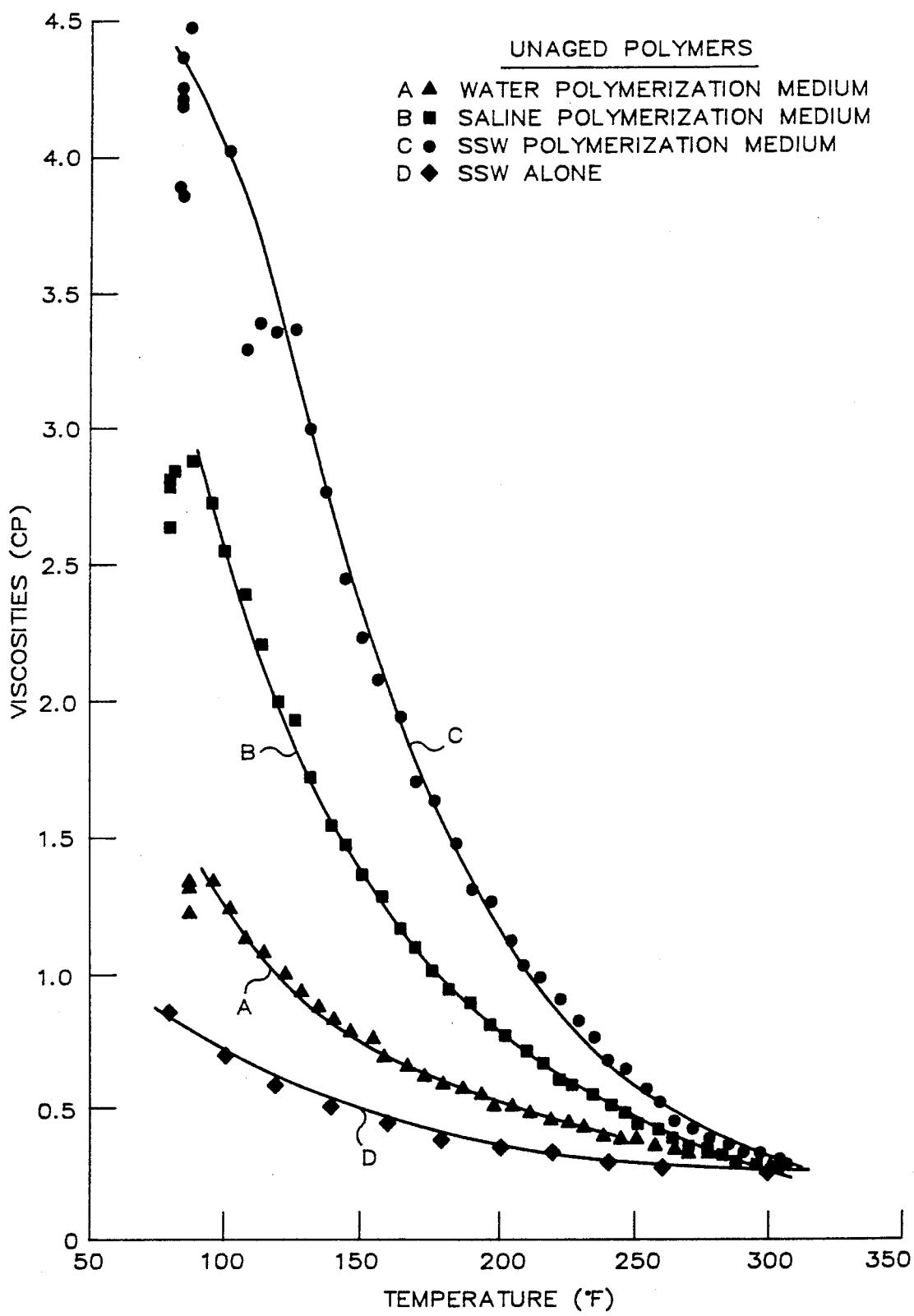
FIG. 2 shows the variation of viscosity with temperature of heat-aged polymers of FIG. 1.

The viscosity results obtained for unaged polymers are tabulated in Table VII and shown in FIG. 1; results for the aged polymers are tabulated in Table VIII and shown in FIG. 2. The results obtained with the unaged polymers, shown in FIG. 1 as curves A, B, and C show that they have significantly greater solution viscosities than does SSW containing no polymers, shown in FIG. 1 as curve D, over the 80° to 300° F. temperature span tested. (Curve D was drawn from the properties of SSW listed in Table IX.) The polymers prepared in either saline, I.S. of 0.7, (curve B) or SSW, I.S. of 0.7, (curve C) have significantly greater viscosities than does the polymer prepared in distilled water (curve A) over the entire temperature range tested.

The results obtained with the polymer aged for 7 days at 300° F. are shown in FIG. 2. They indicate again that all of the polymers (curves A, B, C) have greater solution viscosities than does SSW (curve D) over the temperature range tested.

The results also show that polymers prepared (curve C) in SSW are substantially more resistant to the effects of heat than polymers prepared in saline (curve B) or in distilled water (curve A), based on their significantly greater solution viscosities over all temperatures in this test. However, even the polymers prepared in saline or distilled water are potentially useful in certain process embodiments of this invention.

As shown in FIG. 2, the viscosities of all the polymers prepared approach that of SSW above 300° F. However, it should be noted that even at these temperatures the polymers are present as homogenous solutions. In contrast, other polymers such as polyacrylamide precipitate as solids at about 200° F. or below. Furthermore, the viscosity of the inventive VP-Am copolymers relative to that of SSW at 200° F. can be increased by using higher concentrations of the copolymers, and/or copolymers of higher molecular weight.

TABLE VII

| Unaged Polymers | | | | | |
|---|---|---|---|---|---|
| Polymerized in Distilled Water | | Polymerized in NaCl | | Polymerized in SNSW | |
| Temp (F.) | Visc (cP) | Temp (F.) | Visc (cP) | Temp (F.) | Visc (cP) |
| 85 | 2.35 | 81 | 4.32 | 83 | 4.39 |
| 98 | 2.17 | 90 | 4.17 | 89 | 4.25 |
| 110 | 1.91 | 103 | 3.81 | 100 | 3.71 |
| 117 | 1.74 | 110 | 3.57 | 113 | 3.49 |
| 124 | 1.61 | 123 | 3.05 | 119 | 3.22 |
| 136 | 1.33 | 129 | 2.82 | 133 | 2.76 |
| 147 | 1.23 | 142 | 2.44 | 139 | 2.52 |
| 159 | 1.14 | 148 | 2.19 | 152 | 2.22 |
| 166 | 1.07 | 161 | 1.93 | 158 | 2.03 |
| 179 | 0.97 | 167 | 1.88 | 171 | 1.74 |
| 185 | 0.91 | 180 | 1.67 | 177 | 1.70 |
| 198 | 0.83 | 193 | 1.47 | 189 | 1.52 |
| 204 | 0.80 | 199 | 1.40 | 202 | 1.41 |
| 217 | 0.73 | 212 | 1.26 | 209 | 1.46 |
| 224 | 0.70 | 219 | 1.21 | 222 | 1.19 |
| 237 | 0.65 | 232 | 1.13 | 229 | 1.15 |
| 244 | 0.61 | 245 | 1.01 | 242 | 1.02 |
| 256 | 0.58 | 251 | 0.97 | 253 | 0.95 |
| 269 | 0.55 | 264 | 0.89 | 260 | 0.92 |
| 275 | 0.53 | 277 | 0.84 | 273 | 0.82 |
| 288 | 0.51 | 289 | 0.79 | 292 | 0.76 |
| 300 | 0.49 | 302 | 0.75 | 305 | 0.72 |

TABLE VIII

| Aged Polymers | | | | | |
|---|---|---|---|---|---|
| Polymerized in Distilled Water | | Polymerized in NaCl | | Polymerized in SSW | |
| Temp (F.) | Visc (cP) | Temp (F.) | Visc (cP) | Temp (F.) | Visc (cP) |
| 88 | 1.34 | 80 | 2.81 | 84 | 4.36 |
| 96 | 1.33 | 95 | 2.72 | 96 | 4.62 |
| 109 | 1.12 | 107 | 2.38 | 108 | 3.28 |
| 123 | 0.99 | 119 | 1.99 | 119 | 3.35 |
| 135 | 0.87 | 132 | 1.71 | 131 | 2.99 |
| 147 | 0.78 | 145 | 1.46 | 145 | 2.44 |
| 160 | 0.68 | 157 | 1.27 | 157 | 2.07 |
| 174 | 0.62 | 170 | 1.08 | 170 | 1.70 |
| 182 | 0.56 | 183 | 0.93 | 184 | 1.45 |
| 200 | 0.50 | 196 | 0.80 | 197 | 1.26 |
| 212 | 0.47 | 209 | 0.70 | 209 | 1.02 |
| 226 | 0.43 | 221 | 0.59 | 221 | 0.89 |
| 239 | 0.38 | 233 | 0.53 | 234 | 0.75 |
| 251 | 0.37 | 246 | 0.47 | 247 | 0.64 |
| 264 | 0.33 | 258 | 0.40 | 259 | 0.51 |
| 277 | 0.31 | 270 | 0.34 | 271 | 0.41 |
| 289 | 0.28 | 282 | 0.30 | 284 | 0.34 |
| 300 | 0.26 | 301 | 0.25 | 303 | 0.29 |

TABLE IX

| SSW Viscosities | |
|---|---|
| Temperature F. | Viscosity (cP) |
| 80 | 0.85 |
| 100 | 0.69 |
| 120 | 0.58 |
| 140 | 0.50 |
| 160 | 0.435 |
| 180 | 0.375 |
| 200 | 0.34 |
| 220 | 0.31 |
| 240 | 0.28 |
| 260 | 0.26 |
| 280 | 0.245 |
| 300 | 0.23 |

EXAMPLE V

Cloud Points and Viscosity

A series of VP/Am copolymers having VP/Am weight ratios of 90/10, 80/20, 70/30, 60/40, 55/45, 50/50 and 45/55 as before was prepared as before in 0.7 I.S. saline with 0.25 weight percent AIBN (based on the total monomer) as the initator. A portion of each polymer solution was diluted to 0.25 weight percent copolymer in 0.7 I.S. SSW in series A and to 0.50 weight percent copolymer in 0.7 I.S. SSW in series B. The series A solutions were subsequently aged for 1 week at 300° F. in the absence of oxygen and the polymer viscosity of each solution determined at 300° F. using a capillary viscometer as previously described. The series B solutions were divided into two portions. Portion 1 was aged for 7 weeks in SSW at 250° F. in the absence of oxygen. Portion 2 was aged in SSW at 300° F. for 7 weeks in the absence of oxygen. The cloud point of each solution in series B was determined in the manner previously described.

Figure 3:
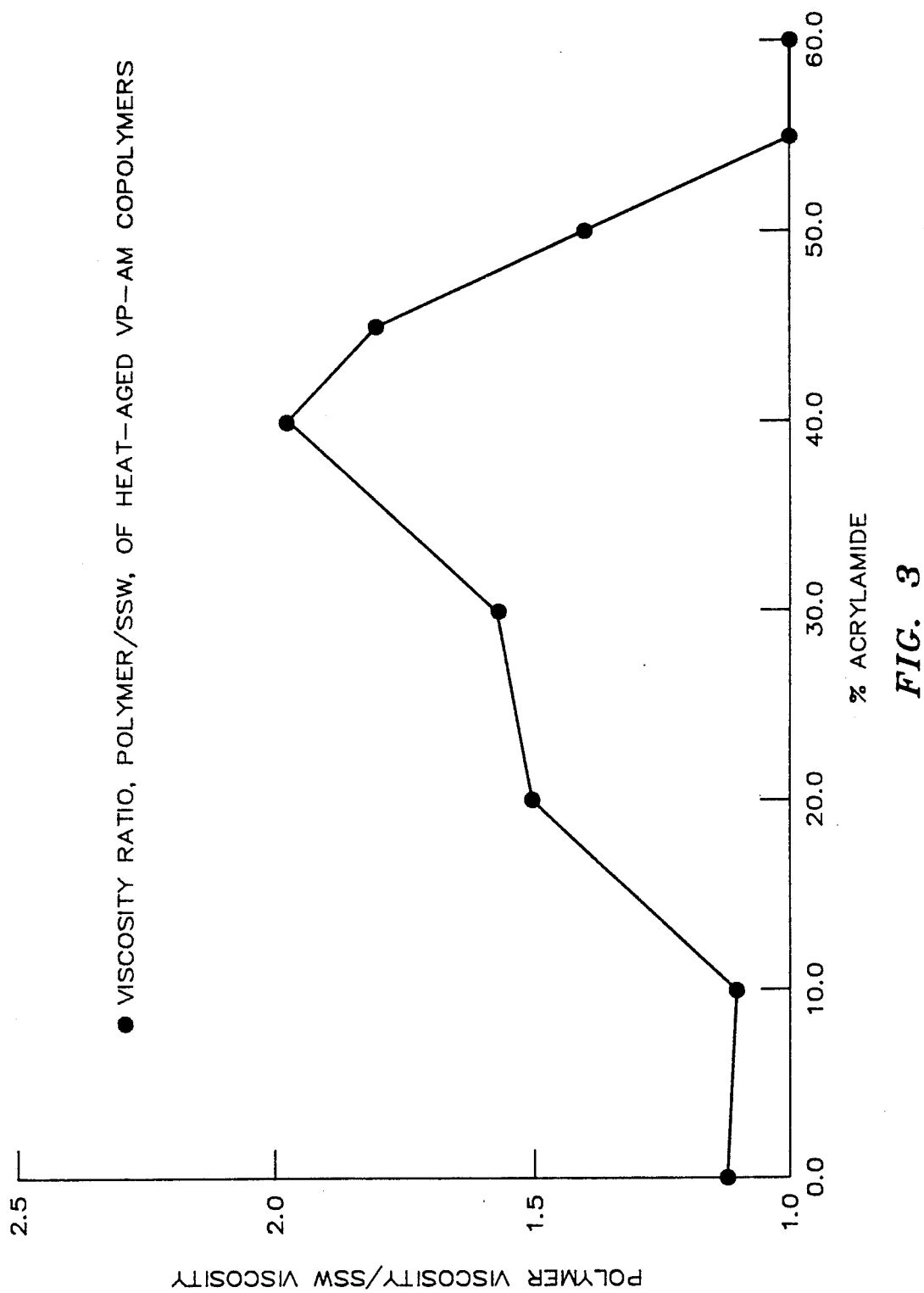
FIG. 3 illustrates the viscosity ratio of aged copolymers of the invention as a function of comonomer proportions.

The series A viscosity results are shown in FIG. 3, plotted as polymer viscosity/SSW viscosity ratio vs. copolymer composition. The series B cloud point results are plotted in FIG. 4. The viscosity results indicate that the most viscous polymer solutions were obtained at VP/Am weight ranges varying from about 80/20 to about 50/50. The optimum range, with these polymers as the basis, appears to be about 65/35 to about 55/45, with 60/40 giving the best results. Although copolymers prepared in synthetic sea water should be more viscous, the optimum range of monomer proportions should be similar to that obtained here.

Figure 4:
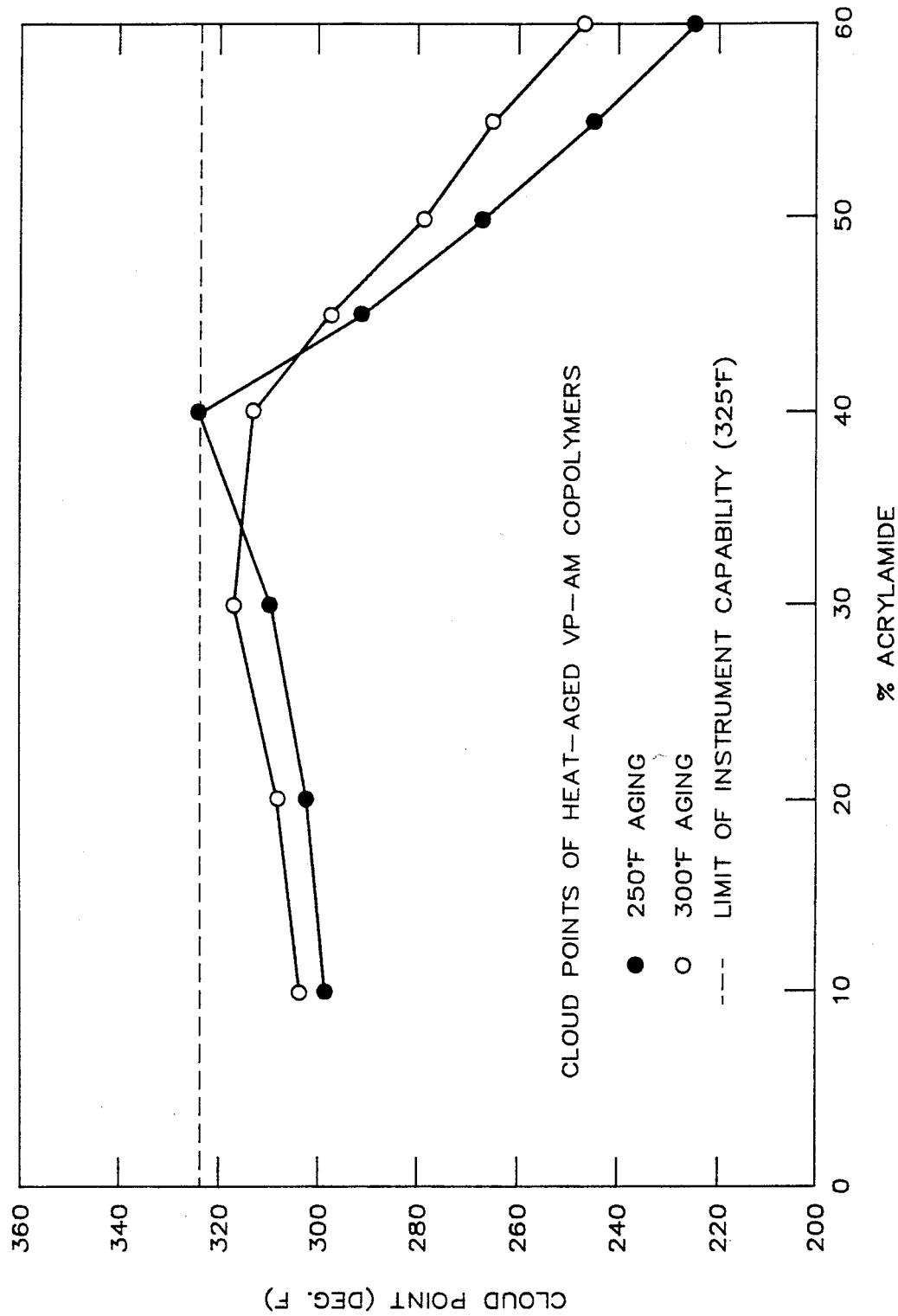
FIG. 4 illustrates cloud point temperatures for copolymers of the invention aged at different temperatures.

The cloud point results plotted in FIG. 4 indicate that the most degradation-resistant copolymers are formed with a VP/Am weight range varying from about 90/10 to about 55/45. That is, the cloud point varied from about 295° F. for 55/45 PVP/Am copolymer to about 300° F. for the 90/10 VP/Am copolymer. However, the peak cloud point temperature, for the 60/40 copolymer, was above 325° F., the limit of the apparatus used for that run, for the sample aged at 250° F. These results, in light of the highest solution viscosity results obtained with heat-aged 60/40 copolymer (FIG. 3), suggest that this copolymer is about optimum in composition for EOR applications in reservoirs with temperatures at least about 250° F. On the other hand, the results obtained at 300° F. suggest that copolymers having about equivalent performance can be expected when the VP/Am weight ratios vary from about 70/30 to about 60/40. As noted above, although copolymers prepared in synthetic sea water should display superior viscosity and stability, the optimum ranges of monomer proportions should correspond to those determined here.

Generally, better results were obtained with the copolymers aged at 300° F. (except for the 60/40 copolymer) than at 250° F. The degree of hydrolysis appears to stabilize at about 80% Am hydrolyzed. At 80% Am hydrolyzed the VP-Am (aged) sample is completely soluble in SSW at the temperatures below the cloud point. This equilibrium value, or consistency of degree of hydrolysis with time, permits a safe prediction that the polymer properties, specifically solubility and viscosity, will not change appreciably with time.

The viscosities and cloud points obtained for copolymers prepared in saline solution indicate that such copolymers would be useful in certain process embodiments of this invention, even if not as viscous or stable as copolymers prepared in synthetic sea water.

EXAMPLE VI

Equilibrium Cloud Points

A 50/50 (weight ratio) VP/Am copolymer was prepared as before in 0.7 I.S. SSW using 0.125 weight percent AIBN (based on the total monomer) as the initiator. The polymer solution was diluted with SSW to obtain a solution containing 0.5 weight percent copolymer. Individual portions of the diluted copolymer solution were aged for the specified time at the specified temperatures (250° F., 280° F. and 300° F.) in the absence of oxygen, and the cloud point of each copolymer solution determined as previously described. The results obtained are plotted in FIG. 5.

The curves indicate that the cloud point temperatures decline, e.g., perhaps 25°-30° F., in the first 10 days aging, regardless of the aging temperature. The copolymer solution exposed to the highest temperature, 300° F., showed the steepest decline. After about 10-15 days, however, the cloud point temperatures of samples aged at the higher temperatures remained about the same for the duration of the test, e.g., 25 days. The cloud point temperatures thus appear to stabilize at an equilibrium value of about 260°-270° F., whether tested at 250°, 280° or 300° F., indicating that the copolymer should be resistant to degradation in hot, saline environments at temperatures at least as high as the equilibrium cloud point temperature.

EXAMPLE VII

Hydrolysis of the Copolymers

Figure 7:
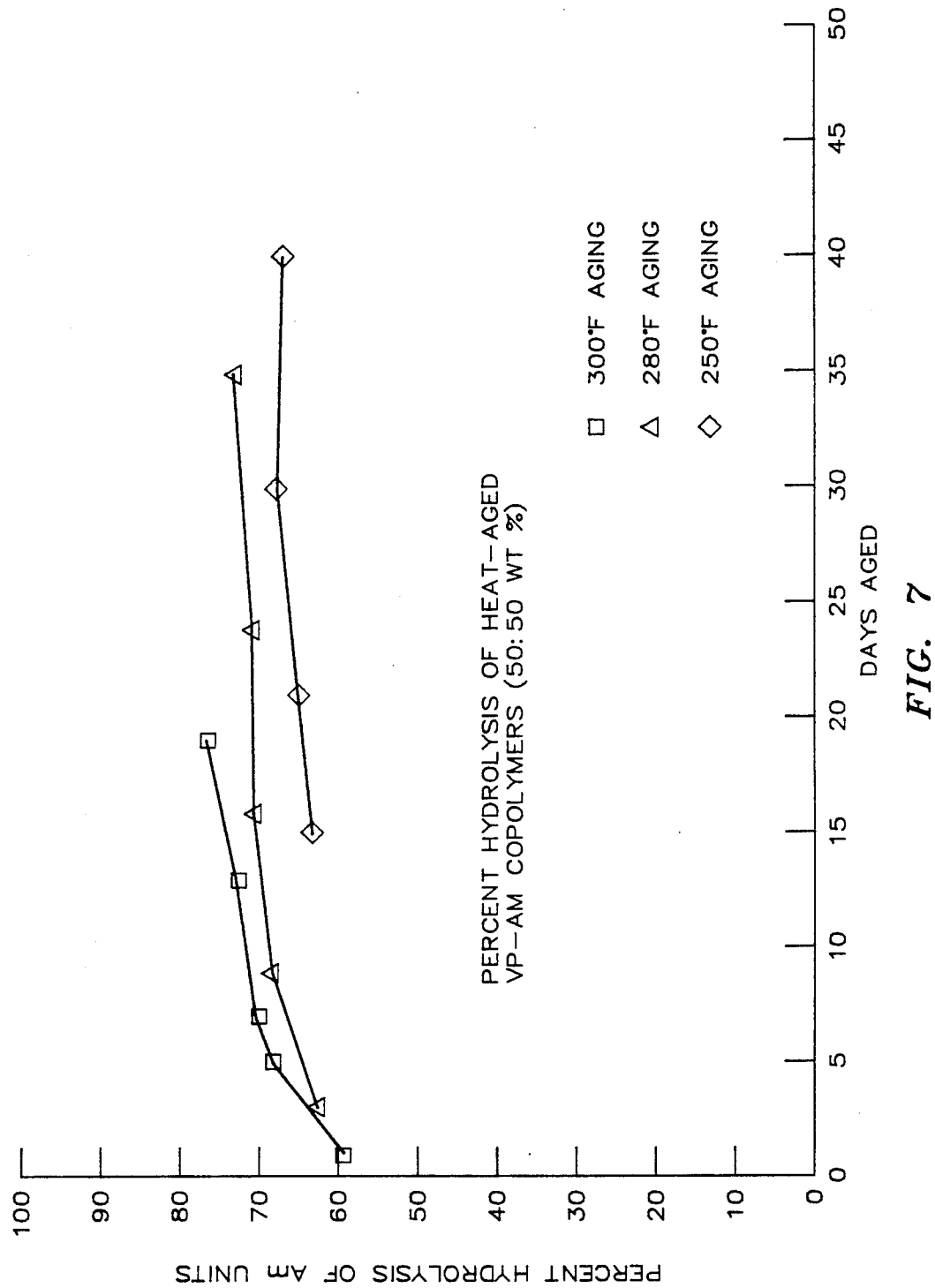

As mentioned earlier herein, the equilibrium cloud points and resultant properties of the aged copolymers are believed related to the degree of hydrolysis of the copolymers. Selected samples of the copolymers were tested for degree of hydrolysis by the Dow color test, described more fully by Foshee, et al, in Paper SPE6202 (New Orleans, 1976), previously cited. To determine the percent hydrolysis, the concentration of amide surviving the hydrolysis is determined by an iodometric method, converting the amide groups to N-bromoamide, followed by a reaction with potassium iodide to form iodine which is then complexed with starch. The amount of this iodine-starch complex is then spectrophotometrically measured. The degree of hydrolysis can also be determined by the titration of ammonium ions produced as a result of the hydrolysis with sodium hydroxide, but the Dow color test has been found to be more convenient and sufficiently accurate. In FIG. 6, the effect of aging in SSW on the degree of hydrolysis of a 0.5 weight percent solution of a 50:50 PVP-Am copolymer prepared in SSW is plotted for three different aging temperatures. It is apparent that the hydrolysis process is relatively slow when the polymer is aged at 200° F. but exceeds the 50 percent point after about 15 days at 250° F. When the copolymer is aged at 300° F., 40 percent hydrolysis is attained almost immediately, and 60 percent is exceeded within ten days. However, as seen in FIG. 7 and as described earlier herein, these copolymers tend to attain an equilibrium degree of hydrolysis eventually, no matter what the aging temperature. As seen in FIG. 7, samples of a 0.5 weight percent 50:50 copolymer of VP-Am prepared in SSW and aged in SSW at the temperatures of 250°, 280° and 300° F. all attain a percent hydrolysis in the range from about 65 to 75 percent after about 15 days aging.

EXAMPLE VIII

K Values as Indicators of Relative Viscosity and Molecular Weight

Fikentscher K values were developed to relate the relative viscosity of any polymer solution to concentration, and are functions of molecular weight of the polymers. This K equals 1000 k, where k is given by "Fikentscher's formula", $$\frac{\log \eta_{rel}}{C} = \frac{75 k^2}{1 + 1.5 kC} + k,$$

where C is concentration in grams per deciliter solution. The development and uses of these K values are described by K. H. Meyer in "Natural and Synthetic High Polymers", pp. 24–26 (Interscience, New York, 1942) and Schildknecht in "Vinyl and Related Polymers", p. 676 (John Wiley & Sons, New York, 1952).

The relative viscosity (viscosity ratio), $\eta_{rel}$, is the ratio, $t/t_o$, which can be determined from the average efflux times measured for the solution, t, and for the solvent, $t_o$.

With sufficiently long efflux times, e.g., about 100 seconds or longer, the specific viscosity, $\eta_{sp}$, can be determined from the relationship $$\eta_{sp} = \frac{(t - t_o)}{t_o}.$$

(Generally, for the solutions employed, the value $\eta_{sp}$ is determined by subtracting 1 from $\eta_{rel}$.)

The ratio, $\eta_{sp}/C$, is called the reduced viscosity (viscosity number).

The intrinsic viscosity can be determined by plotting reduced viscosity vs concentration and extrapolating to measure the intercept for zero concentration.

For greater detail, see ASTM D 2857 and/or Polymer Technology—Part 3, pages 27–33, Plastics Engineering, August 1982.

K values have been used for years to describe the viscosity grades of commercially marketed cellulosic polymers as well as polyvinylpyrrolidones and other polymers. The use of K values has become well established and is retained as a means of expressing relative molecular weight; for example, K values for solutions of homopolymers of vinyl alkyl ethers are reported in Kirk-Othmer, *Encyclopedia of Chemical Technology*, Second Edition, Volume 21, pp. 419–420. As previously discussed herein, U.S. Pat. No. 3,500,925 discloses and claims homopolymers and copolymers of N-vinyl lactams, including N-vinyl-2-pyrrolidone, having K values of 10 to 140. Fikentscher, et al disclose in U.S. Pat. No. 3,006,900, issued Oct. 21, 1961, copolymers of methacrylamide and N-vinylpyrrolidone, and "mixed copolymers" including at least one other monomer such as acrylamide, characterized by K values of at least about 35.5.

Examples of inventive and control copolymers of 50:50 VP:Am composition were prepared by methods disclosed herein, tested for relative viscosity ($\eta_{rel}$), and characterized by K values calculated in accordance with the above formula.

Relative Viscosity Measurement

Relative viscosities ($\eta_{rel}$) of the VP-Am copolymers were determined by comparing the flow time of polymer solution at a given polymer concentration with the flow time of the neat solvent. The following relationship of flow times describes Relative Viscosity.

$$\eta_{rel} = \frac{t}{t_o}$$

t = flow time polymer solution
$t_o$ = flow time of neat solvent

In all examples herein, relative viscosity was measured in an Ubbelohde #1 capillary viscometer at 25.0° C. Flow times were taken by stop watch, and the times recorded in most cases to the nearest 1/100th second or in all cases to the closest 1/10th second. The precision of this time measurement was assured by repeating each flow through the viscometer three times, and an average flow time, from range of values of no more than 2/10th second, reported.

Based upon the precision of these and other measurements, the precision of the calculated K values is estimated to be ± less than about one K value unit.

Surprisingly, the K values calculated for even copolymers prepared in a distilled water polymerization medium were higher than those reported in U.S. Pat. No. 3,500,925, and the K values for copolymers prepared by the inventive methods disclosed herein were substantially higher. Over the ranges tested, the K values were found generally to vary inversely with polymer concentration in the test solution, e.g., the lower the concentration, the higher the K value. Some variation was also found depending upon the nature of the solution in which the polymers were tested for relative viscosity before calculating the K values. For polymers prepared in the same polymerization media, measurement of relative viscosity in synthetic sea water (SSW) generally produced higher K values than for those tested in $H_2O$, with polymers tested in a solution of mixed salts producing K values lower than the synthetic sea water but slightly higher than solutions of NaCl.

Figure 8:
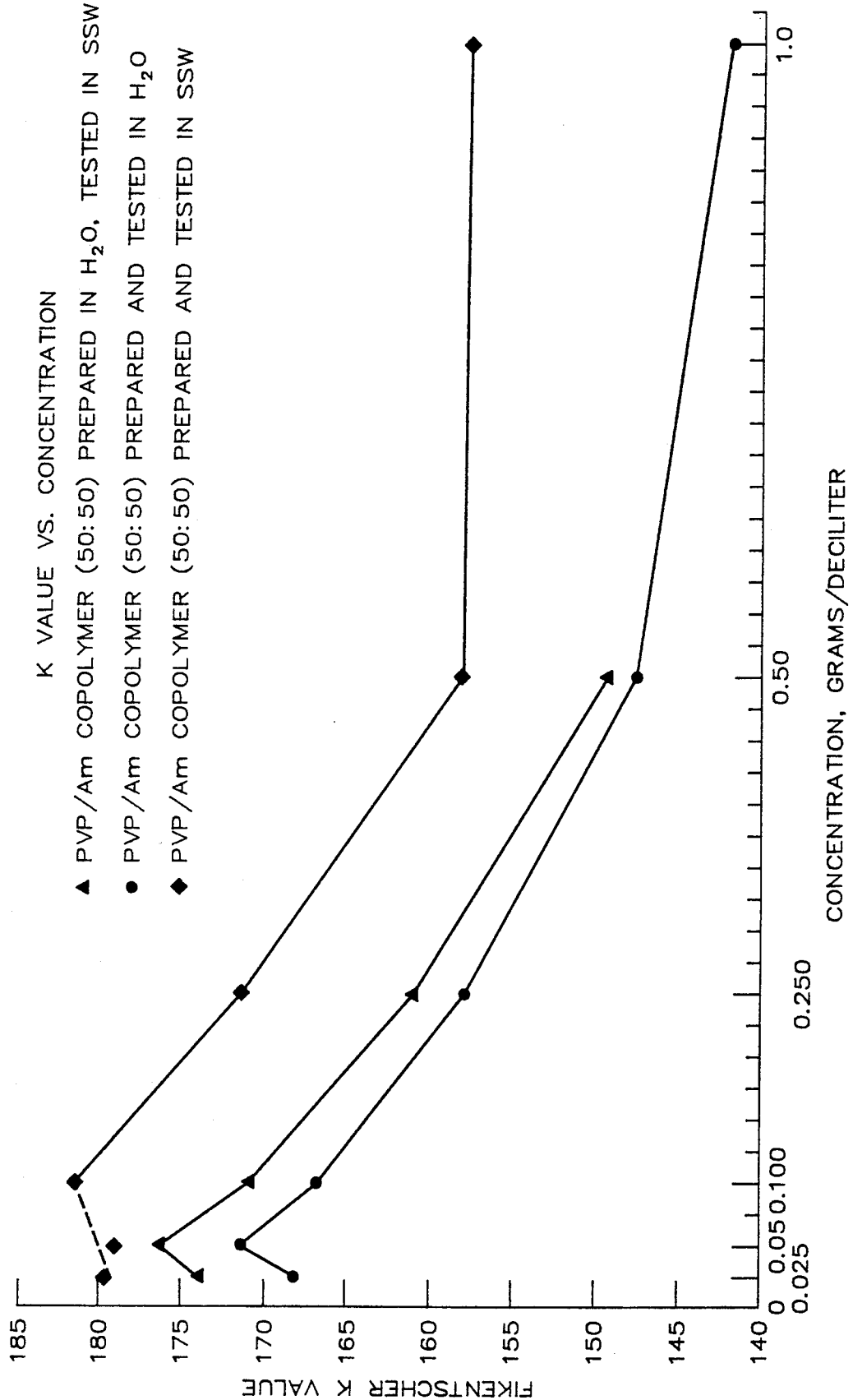
FIG. 8 shows K values for copolymers of the invention at various concentrations compared with copolymers of the prior art.

FIG. 8 describes the variation of the K value with the polymer concentration in test solution for copolymers prepared in water. Since it was indicated in some sources in the literature that measurements for K values were made with a concentration equal to 1.0 g per deciliter of solution, one of these samples was tested in water at this concentration and a K value of 141.8 was obtained for it. In these aqueous systems, the concentrations in grams/deciliter and weight percent are approximately equal. Identical samples were tested in various electrolyte solutions at concentrations of 0.5 g/dL and below. As can be seen in FIG. 8, the K values obtained were generally higher than those calculated for samples tested in water at the same concentrations. The maximum values were seen for samples tested in synthetic sea water, with K values ranging from 149 to 176; samples tested in water produced K values 3 to 5 units lower. For clarity, only the values for samples tested in SSW and $H_2O$ have been plotted, with all data listed in Table X. Those samples tested in saline solution produced K values ranging from 150 to 179, with samples tested in solutions of magnesium chloride and calcium chloride producing K values slightly below these figures.

Samples of VP:Am (50:50) copolymer were also prepared in SSW and tested in SSW for comparison with the copolymers prepared in water. The results of relative viscosity measurements and calculated K values are tabulated in Table XI. The K values for concentrations in the range from 0.025 to 1.0 g/deciliter are plotted in FIG. 8 for comparison with the copolymers prepared in water and tested in water. The K value of 157.7 obtained for C=1.0 g/dL is substantially higher than the K of 141.8 obtained with the $H_2O/H_2O$ copolymer, and this advantage persists over most of the concentration range, even compared to the samples made in water and tested in solutions of various electrolytes. (The notation $H_2O/H_2O$ means the copolymer was prepared in water and its viscosity was determined in water.) The K values of about 178 for C=0.05 and 0.025 are inconsistent with this trend, and may represent the limit of errors in weighing or other measurements.

Figure 9:
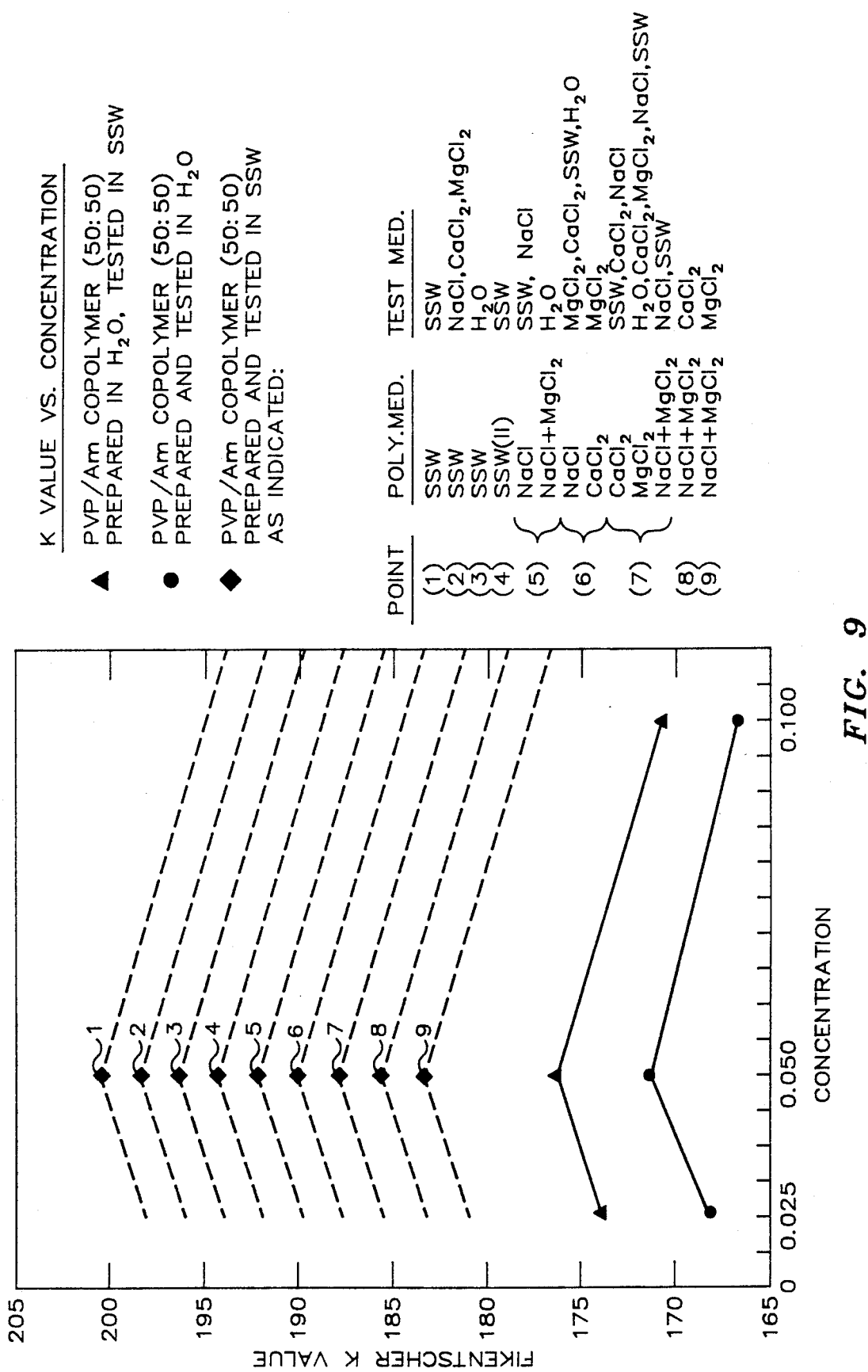
FIG. 9 shows K values for copolymers of the invention as well as copolymers of the prior art at various concentrations and for various polymerization and test media.

FIG. 9 shows plots of K values versus concentration from FIG. 8 for a limited range of concentrations equal to 0.025 to 0.1 grams/deciliter. Several of the samples prepared in water displayed an apparent maximum K value at a concentration of 0.05 g/dL. Samples of copolymers of the same 50:50 composition were then prepared in various aqueous polymerization media containing electrolytes, tested for relative viscosity at concentrations of 0.05 g/dL, and the K values calculated. As seen in FIG. 9 and Table XII, the K values for these copolymers were substantially higher than for the samples made in water. A smaller amount of variation was observed depending on the solution medium in which the polymers were tested. Maximum values were obtained for the sample prepared and tested in synthetic sea water, giving a K value of 200.4. A second polymer sample of the same composition (SSW II) prepared and tested in synthetic sea water gave a K value of 194.3. The average of these K values, 197.4, is comparable to the values obtained for other samples prepared in synthetic sea water and tested in various electrolyte solutions, and is substantially higher than the values obtained for the polymers prepared and tested in other electrolyte solutions. Tested in water, this material produced a K value of about 196. Samples prepared in saline solution produced a K value of about 192, regardless of the test medium. Samples prepared in a polymerization medium containing a mixture of NaCl and MgCl₂ produced K values ranging from 183 to 192, with the maximum being obtained for the samples tested in a solution of H₂O. While not all the differences in K values for samples prepared and tested in various media can be explained, and some differences may be due to statistical variations and/or operator error, the copolymers prepared in electrolytes, particularly synthetic sea water, NaCl or a mixture of salts, produced significantly higher K values than those copolymer samples prepared in H₂O. These polymers were of significantly higher K value than many commercial polymers, including polyvinylpyrrolidone and the polymers claimed in U.S. Pat. No. 3,500,925. Thus, while the inventive copolymers prepared in synthetic sea water or mixed electrolyte solutions are superior as reflected by their relative viscosities and K values, the copolymers prepared in H₂O or other electrolyte solutions are sufficiently viscous to be useful in certain process embodiments of the invention.

TABLE X

Calculated K values for VP-Am copolymer (50:50 wt. percent) prepared in distilled water with 0.5 wt. percent AIBN and tested in various media

| Conc. (g/dL) | Medium | $\eta_{rel}$ | K Value |
|---|---|---|---|
| 1.0 | H₂O | 24.3 | 141.8 |
| 0.5 | H₂O | 6.44 | 147.6 |
| 0.25 | H₂O | 3.02 | 157.8 |
| 0.10 | H₂O | 1.66 | 166.7 |
| 0.05 | H₂O | 1.31 | 171.4 |
| 0.025 | H₂O | 1.14 | 168.2 |
| 0.5 | SSW | 6.70 | 149.3 |
| 0.25 | SSW | 3.15 | 161.0 |
| 0.10 | SSW | 1.70 | 170.8 |
| 0.05 | SSW | 1.33 | 176.3 |
| 0.025 | SSW | 1.15 | 173.9 |
| 0.5 | MgCl₂ | 7.04 | 151.4 |
| 0.25 | MgCl₂ | 3.20 | 162.1 |
| 0.10 | MgCl₂ | 1.64 | 164.6 |
| 0.05 | MgCl₂ | 1.32 | 173.9 |
| 0.025 | MgCl₂ | 1.15 | 173.9 |
| 0.5 | CaCl₂ | 6.86 | 150.3 |
| 0.25 | CaCl₂ | 3.18 | 161.7 |
| 0.10 | CaCl₂ | 1.63 | 163.6 |
| 0.05 | CaCl₂ | 1.32 | 173.9 |
| 0.025 | CaCl₂ | 1.14 | 168.2 |
| 0.5 | NaCl | 6.94 | 150.8 |
| 0.25 | NaCl | 3.21 | 162.4 |
| 0.10 | NaCl | 1.73 | 173.8 |

TABLE X-continued

Calculated K values for VP-Am copolymer (50:50 wt. percent) prepared in distilled water with 0.5 wt. percent AIBN and tested in various media

| Conc. (g/dL) | Medium | $\eta_{rel}$ | K Value |
|---|---|---|---|
| 0.05 | NaCl | 1.30 | 168.8 |
| 0.025 | NaCl | 1.16 | 179.5 |

TABLE XI

Calculated K values for VP:Am copolymer (50:50) wt. percent) prepared in SSW with 0.5 wt. percent AIBN and tested in SSW.

| Conc. (g/dl) | $\eta_{rel}$ | K Value |
|---|---|---|
| 1.0 | 46.36 | 157.7 |
| 0.5 | 8.24 | 158.0 |
| 0.25 | 3.63 | 171.2 |
| 0.10 | 1.81 | 181.1 |
| 0.05 | 1.34 | 178.7 |
| 0.025 | 1.16 | 178.2 |

TABLE XII

Calculated K values for VP-Am copolymers (50:50 composition) prepared in various media with 0.5 wt. percent AIBN and tested in various media. (All concentrations 0.05 g/dl)

| Polymerization Medium | Test Medium | $\eta_{rel}$ | K Value |
|---|---|---|---|
| SSW | SSW | 1.44 | 200.4 |
| SSWII | SSWII | 1.41 | 194.3 |
| SSW | NaCl | 1.43 | 198.4 |
| SSW | CaCl₂ | 1.43 | 198.4 |
| SSW | MgCl₂ | 1.43 | 198.4 |
| SSW | H₂O | 1.42 | 196.4 |
| NaCl | SSW | 1.40 | 192.2 |
| NaCl | NaCl | 1.40 | 192.2 |
| NaCl | CaCl₂ | 1.39 | 190.0 |
| NaCl | MgCl₂ | 1.39 | 190.0 |
| NaCl | H₂O | 1.39 | 190.0 |
| NaCl/MgCl₂ | SSW | 1.38[a] | 187.9 |
| NaCl/MgCl₂ | NaCl | 1.38 | 187.9 |
| NaCl/MgCl₂ | H₂O | 1.40 | 192.2 |
| NaCl/MgCl₂ | CaCl₂ | 1.37 | 185.6 |
| NaCl/MgCl₂ | MgCl₂ | 1.36 | 183.4 |
| CaCl₂ | MgCl₂ | 1.39 | 190.0 |
| CaCl₂ | SSW | 1.38 | 187.9 |
| CaCl₂ | CaCl₂ | 1.38 | 187.9 |
| CaCl₂ | NaCl | 1.38 | 187.9 |
| CaCl₂ | H₂O | 1.37 | 185.9 |
| MgCl₂ | SSW | 1.38 | 187.9 |
| MgCl₂ | NaCl | 1.38 | 187.9 |
| MgCl₂ | MgCl₂ | 1.38 | 187.9 |
| MgCl₂ | CaCl₂ | 1.38 | 187.9 |
| MgCl₂ | H₂O | 1.38 | 187.9 |

[a] Average of two runs using separate polymer batches

EXAMPLE IX

Screen Factor Tests

A series of 50/50 VP/Am copolymers was prepared in 0.7 I.S. SSW at 50° C. as previously described using AIBN as the initiator. Each copolymer solution was produced with a different amount of initiator, the range extending from 0.13 to 1.0 weight percent AIBN based on monomer weight. Each polymer solution was further diluted with SSW to provide solutions having from about 0.2 to 1 weight percent polymer. The screen factors for the various solutions were determined at 78° F. and at 180° F. by measuring the time required for passage of an aliquot of the polymer solution by gravity flow through five 100-mesh stainless steel screens at the designated temperature and dividing this time by the time required for passage of the same amount of SSW through these screens under identical conditions. This method is described by Foshee, et al, as previously cited.

Figure 10:
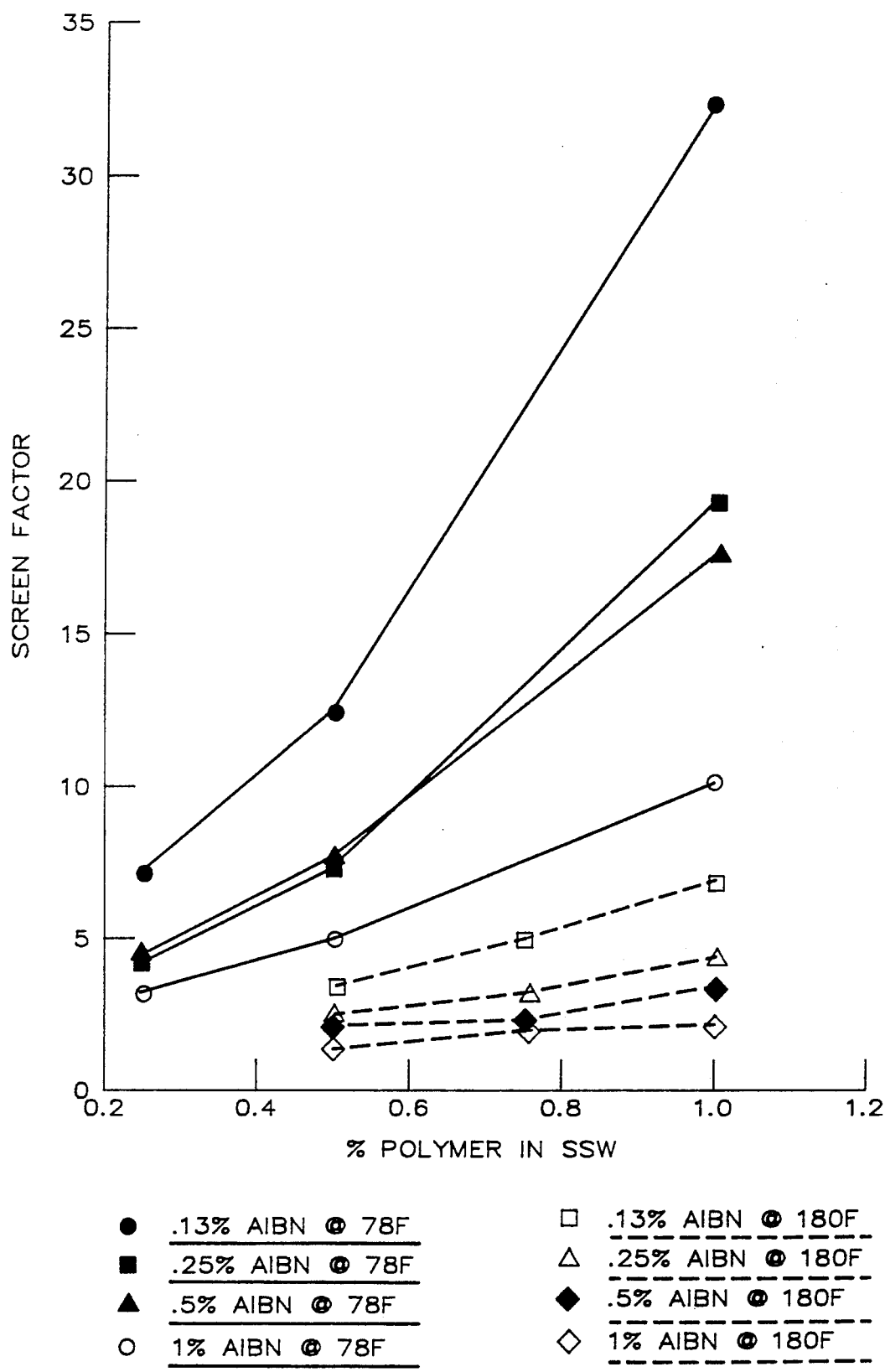
FIG. 10 illustrates Screen Factors for copolymers of the invention tested at various concentrations in SSW.

The results obtained are plotted in FIG. 10. The screen factors are directly related to the molecular weight of the polymer, e.g. how much AIBN was used in its preparation, and accordingly to its solution viscosity. The higher the molecular weight (higher the solution viscosity) the higher the screen factor over the range studied. Polymer molecular weight is inversely related to initiator concentration, as is known in the art. Consequently, the highest screen factor is obtained with the polymer prepared with the least amount of initiator. Screen factors at 180° F. are smaller than their counterparts at 78° F., as expected. For example, a solution containing 1 weight percent copolymer (copolymer prepared with 0.13 weight percent AIBN) has a screen factor of about 32 at 78° F. and about 7 at 180° F.

Screen factors are easier and faster to obtain than resistance factors and they can be used to estimate the relative magnitudes of the resistance factors at the same temperatures. A resistance factor describes a decrease in mobility of a polymer solution in comparison with the flow of the aqueous medium in which it is prepared. With chemically similar polymers, as the screen factor increases the resistance factor also increases. For example, screen factors measured for 0.5 weight percent solutions of the 50/50 VP/Am copolymers (prepared with 0.13, 0.25 and 1.0 weight percent AIBN in SSW) in SSW at 180° F. are 3.3, 2.4, and 1.3, while preliminary average resistance factors for identical solutions measured in Berea cores are 12.1, 9.8 and 5.0, respectively. These values result in an average ratio of resistance factor to screen factor of about 3.9. From this ratio and the screen factor for another copolymer in this group, one can estimate its resistance factor under the same conditions.

Detailed information relating to screen factors, resistance factors and the like are given by Jennings, R. R.; Rogers, J. H. and West, T. J. "Factors Influencing Mobility by Polymer Solutions", J. Pet. Tech. (March 1971), 391–401.

EXAMPLE X

Drilling Mud Additives

A series of five VP/Am 50/50 weight percent copolymers was prepared. Two of the samples were prepared in t-butyl alcohol using 1 weight percent t-BPP, based on the monomers, as the initiator. The remaining three samples were each prepared in saturated NaCl water, using AIBN as the initiator at weight percent levels, based on the monomers, of 1.0, 0.5 and 0.25, respectively. The samples prepared in NaCl water are comparison polymers.

The samples were tested in various drilling muds, as specified, for low and high temperature water loss properties, plastic viscosity, yield point value and gel strength.

The initial evaluation of the polymers was done in muds by adding 3.5 weight percent attapulgite clay to either 5 weight percent NaCl solution (base mud A) or saturated NaCl water (base mud B). Polymers submitted as solids were first ground and sifted into mud aliquots while they were stirred with a Hamilton Beach Multimixer to minimize lumping. Provision was made for polymers submitted as solutions by withholding the corresponding volume of water from the base mud when it was prepared. Water was added as necessary depending on the concentrations of the particular polymer samples. After the polymers were added to 280 mL aliquots of mud, the mud samples were stirred for 20 minutes with the Multimixer.

Before any tests were made, the mud samples were cooled to room temperature (about 25° C.) while standing a minimum of 2 hours. Next, the samples were stirred 2 minutes with the Multimixer and tested with a Fann Model 35 VG meter to determine plastic viscosity, yield point value and gel strength. These tests, and a water loss test at room temperature, were made in accordance with API RP 13B. The mud pH values were also recorded. All tests were repeated after the muds were aged for 16 hours at 80° C. in the absence of oxygen. Apparent viscosity was determined at 600 RPM with the VG meter assuming Newtonian flow.

For the high temperature tests, base mud A was treated with 12 lbs/bbl bentonite clay and a 2 lbs/bbl Desco® thinner, Phillips Petroleum Co., a blend of sulfomethylated quebracho and sodium dichromate, along with sufficient NaOH to obtain the desired pH before addition of the polymers. Polymer addition and initial testing were done at room temperature as in the low temperature tests. After the initial tests, the mud samples were aged in brass bombs in the absence of oxygen for 16 hours at 360° F. After aging, the muds were cooled to room temperature, stirred for 2 minutes with the Multimixer, and tests on plastic viscosity, yield point value, pH, and water loss were repeated. The final test on these muds was a high temperature water loss test performed at 325° F. and 500 psi differential pressure.

In the Tables the polymers are identified as follows:

Polymer 1, made in t-butyl alcohol with 1 weight percent t-BPP based on the monomers.

Polymer 2, like 1, except submitted as a solid for testing.

Polymer 3, made in saturated NaCl water, 1 weight percent AIBN based on the monomers.

Polymer 4, like 3 except used 0.5 weight percent AIBN.

Polymer 5, like 3 except used 0.25 weight percent AIBN.

The results are reported in Tables XIII, XIV, and XV. The results presented in Tables XIII and XIV indicate that at low polymer concentrations, e.g. about 1 lb/bbl mud, made with 3.5 weight percent attapulgite clay in 5 weight percent NaCl water or in saturated NaCl water, relatively poor water loss performance in both unaged and in aged test samples was noted. However, when the amount of polymer was increased to about 3 or 4 lbs polymer/bbl mud, water loss values for the unaged and aged samples were low, e.g. about 5–7 mL/30 minutes at room temperature.

Table XV summarizes the performance of the copolymers in hard brine muds. The hard brine was a synthetic brine prepared by dissolving 1235 g NaCl, 308 g $CaCl_2$ and 78.5 g $MgCl_2.6H_2O$ in 5000 mL of tap water. The calculated calcium ion concentration in this brine is 1.68 weight percent.

The results in Part A of Table XV indicate that in mud prepared by mixing 2 lbs/bbl of asbestos fiber and 16 lbs/bbl of P95 illite clay from Roger Lake, California in the hard brine, the water loss values of an inventive copolymer prepared in t-butyl alcohol were equivalent or better than those obtained with a commercially available mud additive (Driscal ® II) when the polymers are used at 2 lbs/bbl under conditions employed. With lesser amounts of polymer, the commercial polymer is superior under such test conditions. (Driscal ® II is a 50/50 weight percent mixture of carboxymethylhydroxyethyl cellulose and polyethylene glycol having a molecular weight of about 8,000, available from Drilling Specialties Co., Bartlesville, OK 74004).

The data in part B of Table XV show that inventive polymer 2 is more effective (lower water loss results) than comparison polymer 4 in the mud absent the Flosal ® fiber (asbestos fiber) but in the presence of added bentonite clay. However, in this test the commercial polymer gave somewhat better results, e.g. lower water loss, than inventive polymer 2.

The high temperature water loss values for a mud composed of 12 lbs/bbl bentonite clay, 2 lbs/bbl Desco ® thinner and sufficient NaOH to give a pH of about 10-12 admixed with base mud A (3.5 weight percent attapulgite clay in 5 weight percent NaCl water), in the presence or absence of 1 lb/bbl of gypsum, are presented in Table XVI. The water loss data show that inventive polymer 2 initially gives somewhat higher results at room temperature than those obtained with the commercial polymer Drispac ® Superlo, a carboxymethyl cellulose of Drilling Specialties Co. However, after aging the polymers for 16 hours at 360° F. and retesting them at room temperature, the data show the inventive polymer to be clearly superior to Superlo in the absence or presence of added gypsum. The water loss data also show the inventive polymer to perform better in the absence of gypsum, both initially and after aging, than the commercial polymer, Cypan ® sodium polyacrylate of American Cyanamide. However, aged Cypan performs somewhat better than the aged invention copolymer in mud containing gypsum.

The water loss data additionally show the comparison polymers to be equivalent or better in performance than inventive polymer 2 in initial testing and especially after aging the polymers, both in the absence or presence of gypsum. Very low high temperature water loss results are also obtained with the comparison polymer. Based on superior results presented before with the inventive polymers prepared in SSW, whether aged or unaged, relative to those made in NaCl or other aqueous solution containing one or two electrolytes, it is believed that said inventive polymers will outperform the comparison polymers in drilling mud applications as well.

TABLE XIII

Screening Tests in Base Mud A

| Polymer Conc., lb/bbl | Initial Properties | | | | | Aged 16 Hours at 80 C. | | | | |
|---|---|---|---|---|---|---|---|---|---|---|
| | AV* | PV/YP** | Gels** | pH | WL** | AV | PV/YP | Gels | pH | WL* |
| Base Mud*** | 5.5 | 2/7 | 7/9 | 8.2 | 173. | 6 | 3/6 | 5/6 | 8.2 | 174. |
| Polymer 1 | | | | | | | | | | |
| 1 | 11 | 6/10 | 4/8 | 8.0 | 26. | 16 | 7/18 | 8/14 | 8.3 | 100. |
| 3 | 12 | 10/4 | 2/3 | 8.0 | 7.5 | 13 | 10/6 | 0/0 | 8.3 | 9.1 |
| Polymer 3 | | | | | | | | | | |
| 1 | 10.5 | 8/5 | 3/5 | 8.1 | 42. | 10 | 7/6 | 4/5 | 8.2 | 159. |
| Polymer 5 | | | | | | | | | | |
| 1 | 16. | 9/14 | 7/7 | 8.2 | 40. | 17.5 | 8/19 | 7/7 | 8.1 | 138. |

*Apparent viscosity, cP (assuming Newtonian flow and a shear rate of 1022 reciprocal seconds).
**PV — Plastic viscosity, cp
YP — Yield point, lb/100 sq. ft.
WL — API water loss, mL/30 minutes
***Base Mud A - 3.5 percent attapulgite clay in 5 percent NaCl solution.

TABLE XIII

Screening Tests in Base Mud B

| Polymer Conc., lb/bbl | Initial Properties | | | | | Aged 16 Hours at 80 C. | | | | |
|---|---|---|---|---|---|---|---|---|---|---|
| | AV* | PV/YP | Gels | pH | WL*** | AV | PV/YP | Gels | pH | WL*** |
| Base Mud** | 8 | 4/8 | 6/9 | 7.7 | 138 | 9.5 | 4/9 | 5/5 | 7.7 | 129 |
| Polymer 1 | | | | | | | | | | |
| 1 | 12.5 | 8/9 | 6/8 | 7.6 | 75. | — | — | — | — | — |
| 3 | 16.5 | 14/5 | 1/1 | 7.8 | 5.4 | — | — | — | — | — |
| Polymer 2 | | | | | | | | | | |
| 1 | 21.5 | 10/23 | 11/15 | 7.8 | 105. | — | — | — | — | — |
| 3 | 23 | 17/12 | 2/3 | 7.5 | 6.8 | 27 | 20/14 | 1/2 | 7.9 | 5.5 |
| Polymer 3 | | | | | | | | | | |
| 1.00 | 14 | 10/8 | 5/5 | 7.6 | 56. | 14.5 | 10/9 | 6/6 | 7.6 | 146. |
| 1.25 | 15 | 12/6 | 2/4 | 7.3 | 21. | 12.5 | 8/7 | 3/4 | 7.8 | 85. |
| 3.75 | 43.5 | 30/27 | 3/4 | 7.3 | 5.6 | 35. | 31/8 | 2/2 | 7.8 | 6.3 |
| Polymer 4 | | | | | | | | | | |
| 1.25 | 15 | 11/8 | 3/4 | 7.4 | 16. | 13.5 | 9/9 | 4/6 | 7.9 | 64. |
| 3.75 | 44.5 | 31/27 | 3/3 | 7.4 | 5.7 | 35.5 | 28/15 | 2/2 | 7.7 | 5.5 |
| Polymer 5 | | | | | | | | | | |
| 1 | 13.5 | 9/9 | 4/6 | 7.6 | 47. | 13 | 8/10 | 6/7 | 7.6 | 150. |
| 1.25 | 14. | 12/4 | 1/3 | 7.4 | 18.5 | 12.5 | 9/7 | 3/4 | 7.6 | 111. |
| 3.75 | 46. | 32/28 | 2/3 | 7.4 | 5.5 | 37.5 | 28/19 | 2/2 | 7.7 | 5.0 |

*AV — Apparent viscosity, cP (assuming Newtonian flow and a shear rate of 1022 reciprocal seconds.)
**Base Mud B - 3.5 percent attapulgite clay in saturated NaCl water
***Water loss, mL/30 minutes

TABLE XV

Screening Tests in Hard Brine* Muds

| Materials Conc., lb/bbl | | Initial Properties | | | Aged 16 Hours at 80 C. | | |
|---|---|---|---|---|---|---|---|
| AM/VP | Driscal ® II | PV/YP | Gels (pH 6.4–7.0) | WL | PV/YP | Gels (pH 6.1–6.4) | WL |
| Part A - Muds Prepared with 2 lb/bbl Flosal ® fiber and 16 lb/bbl P95 illite clay from Rogers Lake, California. | | | | | | | |
| — | — | 6/15 | 18/14 | 180. | — | — | — |
| — | 1 | 8/10 | 14/10 | 14.5 | 6/9 | 5/5 | 18.0 |
| — | 2 | 12/22 | 29/20 | 7.9 | 11/19 | 3/5 | 8.0 |
| Polymer 2 | | | | | | | |
| 1 | — | 7/16 | 19/15 | 23.0 | 8/18 | 11/12 | 95. |
| 2 | — | 10/7 | 14/10 | 7.0 | 7/10 | 5/7 | 6.0 |
| Part B - Muds Prepared without Flosal fiber but treated with 16 lb/bbl P95 clay and other clays as specified | | | | | | | |
| (16 lb/bbl bentonite clay added) | | | | | | | |
| — | — | 3/1 | 1/2 | 95. | — | — | — |
| — | 1 | 4/6 | 1/10 | 25. | — | — | — |
| Polymer 2 | | | | | | | |
| 1 | — | 3/1 | 1/1 | 57. | — | — | — |
| 10 lb/bbl bentonite clay added | | | | | | | |
| Polymer 4 | | | | | | | |
| 1 | — | 4/1 | 1/1 | 82** | — | — | — |
| No additional clay added | | | | | | | |
| Polymer 4 | | | | | | | |
| — | 1 | 6/2 | 1/1 | 14.8 | — | — | — |
| .5 | .5 | 4/1 | 1/1 | 21.0 | — | — | — |
| 1 | — | 5/0 | 0/1 | 98.** | — | — | — |
| 1 | — | 4/1 | 1/1 | 137.** | — | — | — |
| The above test was repeated with the opposite order of addition | | | | | | | |
| 1 | — | 4/1 | 1/1 | 82** | — | — | — |

*Hard Brine-Synthetic brine prepared by adding 1235 g NaCl, 308 g $CaCl_2$, and 78.5 g $MgCl_2 \cdot 6H_2O$ to 5000 ml tap water. The calcium ion concentration is calculated to be 1.675 percent by weight
**These WL values were calculated after a one minute test.

TABLE XVI

High Temperature Tests - Effect of Gypsum

| Materials Conc., lb/bbl. | | Initial Properties | | | | Aged 16 Hours at 360 F. | | | | |
|---|---|---|---|---|---|---|---|---|---|---|
| Polymer | Gypsum | PV/YP | Gels | pH | WL | PV/YP | Gels | pH | WL | HTWL |
| Base Mud* | | | | | | | | | | |
| — | — | 3/4 | 5/11 | 10.0 | 86. | 3/6 | 10/31 | 7.9 | 137. | — |
| — | 1 | 3/3 | 4/10 | 9.7 | 100 | 3/4 | 5/14 | 7.8 | 130. | — |
| Part A - Commercial Drilling Mud Additives | | | | | | | | | | |
| Drispac ® Superlo | | | | | | | | | | |
| 3 | — | 31/20 | 2/6 | 9.3 | 6.0 | 5/5 | 5/13 | 7.0 | 90. | — |
| 3 | 1 | 27/15 | 2/5 | 9.2 | 5.0 | 3/5 | 5/10 | 7.6 | 110. | — |
| Cypan ® - sodium polyacrylate | | | | | | | | | | |
| 3 | — | 6/2 | 2/5 | 11.6 | 14.0 | 4/2 | 0/1 | 8.7 | 54. | — |
| 3 | 1 | 5/3 | 2/6 | 11.6 | 17.2 | 2/4 | 1/1 | 8.7 | 37. | 74. |
| Part B - Experimental VP/Am Copolymers | | | | | | | | | | |
| Polymer 2 | | | | | | | | | | |
| 3 | — | 18/22 | 7/11 | 9.5 | 9.2 | 17/42 | 12/12 | 7/5 | 17.0 | — |
| 3 | 1 | 17/22 | 7/12 | 9.8 | 10.0 | 14/46 | 14/16 | 7.3 | 64.0 | — |
| Polymer 3 | | | | | | | | | | |
| 2 | — | 14/10 | 3/6 | 11.7 | 8.9 | 16/14 | 2/3 | 9.1 | 8.4 | 54. |
| 2 | 1 | 15/7 | 2/6 | 11/6 | 10.4 | 17/14 | 2/3 | 9.1 | 8.6 | 36. |
| 3.75 | — | 26/34 | 3/10 | 11.5 | 5.5 | 31/44 | 6/7 | 8.5 | 6.0 | 23. |
| 3.75 | 1 | 26/29 | 3/9 | 11.2 | 5.7 | 29/40 | 6/8 | 8.2 | 6.0 | 27. |
| Polymer 4 | | | | | | | | | | |
| 3.75 | — | 29/33 | 4/8 | 11.4 | 5.7 | 30/44 | 5/6 | 8.5· | 5.8 | 28. |
| 3.75 | 1 | 27/31 | 4/9 | 11.3 | 5.8 | 28/41 | 7/8 | 8.2 | 5.5 | 29. |
| Polymer 5 | | | | | | | | | | |
| 2 | — | 16/10 | 2/6 | 11.7 | 8.4 | 16/12 | 2/3 | 9.0 | 9.6 | 50. |
| 2 | 1 | 14/10 | 3/6 | 11.6 | 9.7 | 13/12 | 2/3 | 9.0 | 9.3 | 48. |
| 3.75 | — | 27/37 | 4/8 | 11.5 | 5.9 | 30/48 | 6/7 | 8.4 | 6.0 | 24. |
| 3.75 | 1 | 28/36 | 4/7 | 11.4 | 6.3 | 25/40 | 6/6 | 8.3 | 6.1 | 26. |

*The mud for these tests was prepared by adding 12 lb/bbl bentonite clay, 2 lb/bbl Desco ® thinner, and NaOH to Base Mud A. Base Mud A is 3.5% attapulgite clay in 5 percent NaCl water.
**HTWL - High temperature, high pressure water loss, API, mL/30 min. at 325° F. and 500 psi

EXAMPLE XI

Preparation and Properties of PVP Homopolymer

This example describes the preparation and the aqueous solution viscosity behavior of poly(N-vinyl-2-pyrrolidone). This homopolymer sample of N-vinyl-2-pyrrolidone was prepared in accordance with the inventive polymerization procedure described previously herein, i.e., polymerization of N-vinyl-2-pyrrolidone (VP) in synthetic seawater (0.7 ionic strength) initiated by azobisisobutyronitrile (AIBN).

A charge of 20.0 g N-vinyl-2-pyrrolidone was placed in a 10-ounce crown top polymerization bottle with 0.10 g azobisisobutyronitrile (AIBN) initiator and a 200 g portion of synthetic seawater. The initiator level was 0.5 wt. % AIBN, based on the weight of monomers charged. A stock solution of the synthetic sea water was prepared by dissolving the approximate amounts of the specified electrolytes in sufficient deionized water to prepare 18 liters of solution:

| Electrolyte | Approximate Wt. Electrolyte (g) | Approximate Electrolyte Concentration (g/liter) |
|---|---|---|
| $NaHCO_3$ | 3.7 | 0.2 |
| $Na_2SO_4$ | 77.2 | 4.3 |
| NaCl | 429 | 23.8 |
| $CaCl_2.2H_2O$ | 29.6 | 1.6 |
| $MgCl_2.6H_2O$ | 193.9 | 10.8 |

The ionic strength of the synthetic seawater was about 0.7. The reaction mixture was degassed for 20 minutes before the polymerization vessel was placed in a 50° C. constant temperature water bath. The polymerization reaction vessel was secured in a rack and rotated continuously for 25 hours at 50° C. At the end of the reaction period, the reaction mass was homogeneous and mobile, and very viscous.

A suitable experimetal sample for viscosity measurements was prepared by combining a 100 g portion of the polymerization reaction mass with 400 g of synthetic seawater. This dilution gave a mixture which was about 1.8 wt. percent polymer. Before combining the polymer sample with the synthetic seawater, the latter was purged with $N_2$ in a dry box for 2 hours. The oxygen content of the synthetic seawater after the $N_2$ purge was about 5 ppb (parts per billion). After mixing the polymer sample and synthetic sea water, the solution was further purged with $N_2$ for 3 hours in a dry box before any solution viscosities were determined. A similar solution of a commercially available poly(N-vinyl-2-pyrrolidone) (GAF PVP K-100) was also prepared for viscosity measurements for comparison.

The respective solutions of experimental and commercial poly(N-vinyl-2-pyrrolidone) polymers were aged at 200° F. and 250° F. to determine the effect of thermal aging on solution viscosities. After a specified aging period, individual sample solutions were cooled to ambient temperature before measuring Brookfield viscosity at the designated rpm. Results are summarized in Table XVII. The initial viscosity of the experimental solution was 16.1 cp at 6 rpm, whereas the initial viscosity of the commercial polymer solution was about 13.1 cp at 5 rpm.

TABLE XVII

| | Viscosities of PVP* Solutions After Thermal Aging | | | | | |
|---|---|---|---|---|---|---|
| Type of Run | Aging Period (Days) @ 200 F. | Viscosity (cP) | % Initial Viscosity Lost (200 F.) | Aging Period (Days) @ 250 F. | Viscosity (cP) | % Initial Viscosity Lost (250 F.) |
| Control | 0 | 13.1 | 0.0 | 0 | 13.1 | 0.0 |
| (Commercial | 6 | 10.4 | 20.6 | 6 | 9.2 | 29.8 |
| K-100 PVP) | 19 | 9.2 | 29.8 | 19 | 11.8 | 9.9 |
| | 41 | 7.9 | 39.7 | 40 | 10.5 | 19.8 |
| | 118 | 9.2 | 29.8 | 118 | 9.2 | 29.8 |
| Invention | 0 | 16.1 | 0.0 | 0 | 16.1 | 0.0 |
| (Experi- | 21 | 14.2 | 11.8 | 21 | 13.8 | 14.3 |
| mental PVP) | 48 | 14.0 | 13.0 | 48 | 13.6 | 15.5 |
| | 95 | 13.5 | 16.1 | 95 | 13.2 | 18.0 |
| | 139 | 13.8 | 14.3 | 129 | 13.5 | 16.1 |
| | 245 | 13.7 | 14.9 | 245 | 13.6 | 15.5 |

*PVP represents poly(N-vinyl-2-pyrrolidone).

Figure 11:
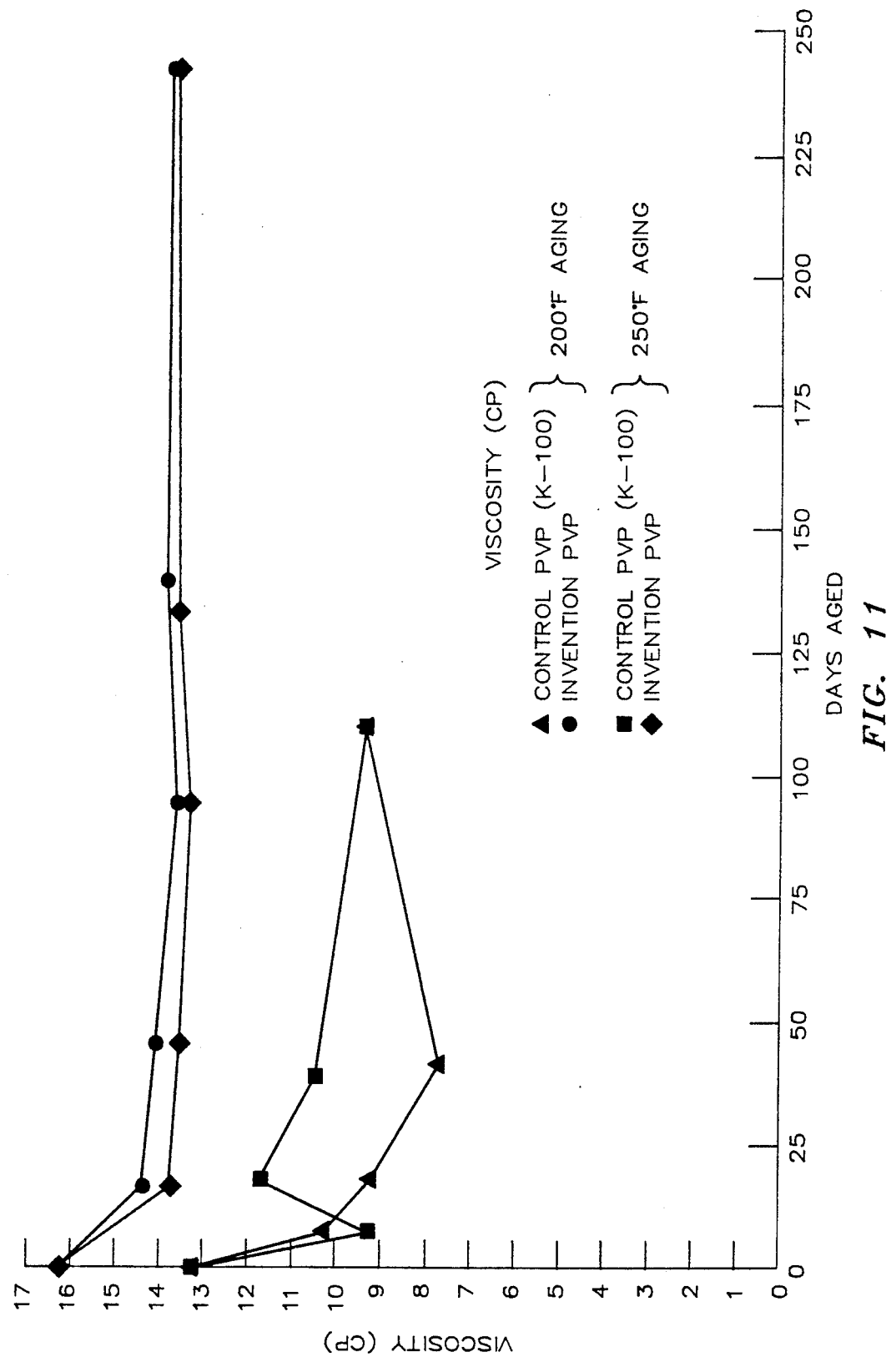
FIG. 11 illustrates the viscosity of homopolymers of this invention which are subjected to heat aging.

Referring to the results in Table XVII, it is evident that the initial viscosity of the experimental polymer solution was not only higher than that of the control run (16.1 centipoise vs. 13.1 centipoise) but on thermal aging at either 200° F. or 250° F., the experimental polymer solution exhibited a lower percentage loss of the initially observed solution viscosity than did the commercially available polymer solution. See FIG. 11, in which the viscosities of these samples are plotted versus aging time. It is noteworthy that the control system solution viscosity aged at either 200° F. or at 250° F. had diminished by about 30 percent of the initial viscosity in a time period of 118 days, whereas the solution viscosity of the experimental system even on aging for 245 days at either 200° F. or 250° F. had diminished by only about 15 percent of the initial viscosity.

EXAMPLE XII

PVP Viscosities

N-Vinyl-2-pyrrolidone was polymerized in synthetic seawater at three initiator levels of AIBN in a procedure essentially the same as described in Example XI. A control run was carried out involving the polymerization of N-vinyl-2-pyrrolidone in distilled water. Samples of the poly(N-vinyl-2-pyrrolidone) polymers as 2 wt. percent solutions in synthetic sea water were used in Brookfield viscosity determinations and the results are summarized in Table XVIII.

TABLE XVIII

| | Solution Viscosities of PVP Samples | | | |
|---|---|---|---|---|
| Run No. | AIBN Initiator Level (wt %) | Type of Run | Viscosity (cP) | Polymerization Medium |
| 1 | 1.0 | Control | 9.0 | Distilled $H_2O$ |
| 2 | 1.0 | Invention | 18.5 | SSW* |
| 3 | 0.5 | Invention | 23.4 | SSW* |

TABLE XVIII-continued

Solution Viscosities of PVP Samples

| Run No. | AIBN Initiator Level (wt %) | Type of Run | Viscosity (cP) | Polymerization Medium |
|---|---|---|---|---|
| 4 | 0.25 | Invention | 25.8 | SSW* |

*The preparation of the synthetic sea water is given in Example XI.

Referring to the results in Table XVIII (see runs 1 and 2), it is evident that the solution viscosity of the poly(N-vinyl-2-pyrrolidone) prepared in synthetic seawater with 1.0 percent AIBN initiator was approximately twice that observed for the PVP similarly prepared in distilled water. Runs 3 and 4 illustrate that greater solution viscosities for the inventive poly(N-vinyl-2-pyrrolidone) samples resulted on the use of lower levels of AIBN initiator, presumably because of the higher molecular weights obtained in runs 3 and 4 relative to the molecular weight obtained in run 1. (This effect has been noted previously in other examples and in the detailed description).

EXAMPLE XIII

In Situ Polymerization for Permeability Correction

This example describes the in situ copolymerization of N-vinyl-2-pyrrolidone and acrylamide to effect a permeability correction in a high salinity, high temperature oil-bearing subterranean formation. Suitable ratios of monomers, for example, N-vinyl-2-pyrrolidone and acrylamide, vary over the broad range as disclosed earlier herein. In the following calculated example, the weight ratio of N-vinyl-2-pyrrolidone (VP) to acrylamide (Am) is 60:40, which corresponds to about 1 mole of VP to 1 mole of Am.

Calculated Example

Two pore volumes (based upon the intended area of treatment) of a one weight percent aqueous solution of sodium-1-naphthylamine-4-sulfonate polymerization inhibitor is introduced through an injection well into an exhaustively waterflooded, oil-bearing subterranean formation with a reservoir temperature in the range of about 250° F. and a connate water salinity on the order of 200,000 ppm total dissolved solids containing up to 60,000 ppm or higher of divalent cations such as $Ca^{++}$ and $Mg^{++}$. Said formation has been subjected to secondary waterflooding prior to injection of the polymerization inhibitor to such an extent that the injected water is channeling through the high permeability zones and the water to oil ratio at the producing wells is very high, e.g. greater than about 100:1.

After all of the polymerization inhibitor slug has been introduced, a 0.5 pore volume slug of predominantly aqueous sodium chloride containing about 15000 ppm total dissolved solids is used to flush the previously injected polymerization inhibitor from the more permeable zones without completely removing same from the less permeable zones.

An in situ copolymerization treatment slug comprising about 90 weight percent saline water based on total weight of the slug, admixed with an equimolar mixture of N-vinyl-2-pyrrolidone (VP) and acrylamide (Am) (60 parts by weight VP and 40 parts by weight Am), and 0.5 weight percent AIBN (azobisisobutyronitrile or other suitable initiator; based on total weight of monomers) is injected following the flushing of the polymerization inhibitor from the high permeability zones. The saline water used in preparing the in situ copolymerization treatment slug can be any available water compatible with the formation, but is preferably characterized by an ionic strength of about 0.7 and contains a mixture of electrolytes such as, e.g., $NaHCO_3$, $NaCl$, $CaCl_2$, $Na_2SO_4$, and $MgCl_2$. The in situ copolymerization is allowed to progress undisturbed for a period of approximately 24 hours.

At the end of 24 hours, a tertiary oil recovery surfactant flood is carried out, e.g., in a manner as described in U.S. Pat. No. 4,343,711. Oil recovery is increased as evidenced by a lower water to oil ratio at the producing wells.

EXAMPLE XIV

Preparation of Terpolymers

As previously disclosed, this invention encompasses terpolymer compositions. Specific terpolymers prepared and tested can be described by the formula VP/Am/X, wherein VP represents N-vinyl-2-pyrrolidone derived units as an N-vinyl lactam, Am represents acrylamide derived units as an unsaturated amide, and termonomer X represents units derived from various monomers such as methyl methacrylate (MMA), methyl acrylate (MA), butyl acrylate (BA), hydroxyethyl acrylate (HEA), lauryl methacrylate (LMA), acrylonitrile (AN), vinyl acetate (VA), styrene (STY), 4-vinyl pyridine (4-VPy), 5-methyl-2-vinylpyridine (MVPy), and mixtures thereof. The chemically-initiated preparations of representative terpolymers in various polymerization media are described hereinbelow.

(A) Deionized Water Polymerization Medium (Control)

A charge of 27.9 g N-vinyl-2-pyrrolidone (VP), 27.9 g acrylamide (Am) and 4.2 g methyl methacrylate (MMA) was placed in a one quart crown top beverage bottle together with 600 g deionized water and 0.08 g azobisisobutyronitrile initiator (AIBN, 0.13 wt. percent based on total weight of charged monomers). Reaction mixtures were routinely degassed for 20 to 30 minutes before sealing. The charged bottle was rotated for about 16 hours in a constant temperature bath at 50° C. On removing the bottle from the bath and cooling to room temperature, the instant product mixture appeared to be a viscous fluid somewhat cloudy and whitish in color. This procedure yielded a 46.5:46.5:7.0 weight percent VP/Am/MMA terpolymer.

Table XIX (below) disclosed a variety of VP/Am/MMA terpolymers prepared in deionized water.

TABLE XIX

| | Deionized Water Polymerization Medium | | |
|---|---|---|---|
| Run | Wt % VP | Wt % Am | Wt % MMA |
| 1 | ca. 49.88 | ca. 49.88 | 0.25 |
| 2 | 49.75 | 49.75 | 0.50 |
| 3 | 49.5 | 49.5 | 1.00 |
| 4 | 49.0 | 49.0 | 2.00 |
| 5 | 48.5 | 48.5 | 3.00 |
| 6 | 47.5 | 47.5 | 5.00 |
| 7 | 46.5 | 46.5 | 7.00 |
| 8 | 45.0 | 45.0 | 10.00 |

*Initiator was 0.13 wt. percent AIBN based on total monomers charged

(B) Synthetic Sea Water Polymerization Medium (Invention)

The preparative procedure was essentially the same as that described in (A) except for the use of synthetic seawater (SSW) as the polymerization medium. The composition and preparation of the synthetic seawater is described hereinabove.

For example, the following charge was placed in a 10 oz. crown top reactor bottle to prepare a 48.5:48.5:3.0 weight percent VP/Am/MMA terpolymer:
- 9.7 g N-vinyl-2-pyrrolidone (VP)
- 9.7 g Acrylamide (Am)
- 0.6 g Methyl Methacrylate (MMA)
- 0.025 g Azobisisobutyronitrile (AIBN, 0.125 wt. percent)
- 200 g Synthetic Seawater (SSW)

Table XX (below) discloses a variety of VP/Am/MMA terpolymers prepared in synthetic seawater.

TABLE XX

Synthetic Seawater Polymerization Medium (0.7 ionic strength)

| Run No. | Wt % VP | Wt % Am | Wt % MMA | Wt % AIBN[a] |
|---|---|---|---|---|
| 9 | 49.5 | 49.5 | 1.0 | 0.125 |
| 10 | 47.5 | 47.5 | 5.0 | 0.125 |
| 11 | 49.5 | 49.5 | 1.0 | 0.250 |
| 12 | 48.5 | 48.5 | 3.0 | 0.250 |
| 13 | 48.0 | 48.0 | 4.0 | 0.250 |
| 14 | 47.5 | 47.5 | 5.0 | 0.250 |
| 15 | 47.0 | 47.0 | 6.0 | 0.250 |
| 16 | 49.5 | 49.5 | 1.0 | 0.50 |
| 17 | 48.5 | 48.5 | 3.0 | 0.50 |
| 18 | 48.0 | 48.0 | 4.0 | 0.50 |
| 19 | 47.5 | 47.5 | 5.0 | 0.50 |
| 20 | 47.0 | 47.0 | 6.0 | 0.50 |

[a]Azobisisobutyronitrile initiator (AIBN, wt percent based on total monomers charged).

(C) Sodium Chloride Solution Polymerization Medium (Control) (0.7 ionic strength)

The preparative procedure was essentially the same as that described in (A) except for the use of aqueous sodium chloride solution as the polymerization medium. The 1.5 liter batches of 0.7 ionic strength salt stock solution were prepared by dissolving 61.36 g NaCl in 1440 mL of deionized water.

For example, the following charge was placed in a one quart crown top reactor bottle to prepare a 48.5:48.5:3.0 weight percent VP/Am/MMA terpolymer:
- 29.1 g N-vinyl-2-pyrrolidone (VP)
- 29.1 g Acrylamide (Am)
- 1.8 g Methyl Methacrylate (MMA)
- 0.08 g Azobisisobutyronitrile (AIBN, 0.130 wt. percent)
- 600 g Sodium Chloride Solution (0.7 ionic strength)

Table XXI (below) discloses a variety of VP/Am/MMA terpolymers prepared in 0.7 ionic strength aqueous sodium chloride solution.

Table XXII (below) discloses additional terpolymers prepared in 0.7 ionic strength aqueous sodium chloride solution.

TABLE XXI

Aqueous NaCl Polymerization Medium (0.7 ionic strength)

| Run[a,b] | Wt % VP | Wt % Am | Wt % MMA |
|---|---|---|---|
| 21 | ca. 49.88 | ca. 49.88 | 0.25 |
| 22 | 49.75 | 49.75 | 0.50 |
| 23 | 49.5 | 49.5 | 1.00 |
| 24 | 49.0 | 49.0 | 2.00 |
| 25 | 48.5 | 48.5 | 3.00 |
| 26 | 47.5 | 47.5 | 5.00 |
| 27 | 46.5 | 46.5 | 7.00 |
| 28 | 45.0 | 45.0 | 10.00 |
| 29 | 49.5 | 49.5 | 1.00 |

[a]Initiator was 0.13 wt. percent AIBN based on total monomers charged (Runs 21-28).
[b]Initiator was 0.125 wt percent AIBN based on total monomers charged (Run 29).

TABLE XXII

Terpolymers Prepared in Aqueous NaCl Solution (0.7 ionic strength)

| Run | Wt % VP | Wt % Am | Termonomers[a,c] |
|---|---|---|---|
| 41 | 49.5 | 49.5 | Methyl Acrylate (MA) |
| 42 | 49.5 | 49.5 | Butyl Acrylate (BA) |
| 43 | 49.5 | 49.5 | Hydroxyethyl Acrylate (HEA) |
| 44 | 49.5 | 49.5 | Lauryl Methacrylate (LMA) |
| 45 | 49.5 | 49.5 | Acrylonitrile (AN) |
| 46 | 49.5 | 49.5 | Vinyl Acetate (VA) |
| 47 | 49.5 | 49.5 | Styrene (STY) |
| 48 | 49.5 | 49.5 | 4-Vinyl Pyridine (4-VPy) |
| 49 | 49.5 | 49.5 | 5-Methyl-2-Vinyl Pyridine (MVPy) |
| 50 | 49.5 | 49.5 | Mixture (MMA + VA)[b] |

[a]The termonomer was present in 1.00 wt percent based on total weight of monomers charged.
[b]0.5 wt. percent methyl methacrylate + 0.5 wt percent vinyl acetate based on total weight of monomers charged
[c]0.130 wt. percent AIBN initiator

(D) Tertiary-Butyl Alcohol Polymerization Medium (Invention)

The preparative procedure was essentially the same as that described in (A) except for the use of tert-butyl alcohol as the polymerization medium and the use of tert-butyl peroxypivalate as the initiator. Terpolymer products were precipitated by dilution of the reaction mixture with hexane and removed by suction filtration.

In a typical run, e.g., the following charge was placed in a 10 oz crown top reactor bottle to prepare a 47.5:47.5:5.0 weight percent VP/Am/MMA terpolymer:
- 9.5 g N-vinyl-2-pyrrolidone (VP)
- 9.5 g Acrylamide (Am)
- 1.0 g Methyl Methacrylate (MMA)
- 0.025 g Tert-butyl peroxypivalate (0.125 wt percent)
- 200 mL Tert-butyl alcohol At the end of a 27 hour reaction period, the reaction mixture was poured into stirring hexane to precipitate the terpolymer product. The product was isolated by suction filtration and dried in vacuo (20.45 g, ca. quantitative).

Tables XXIII and XXIV (below) disclose a variety of VP/Am/MMA terpolymers prepared in tert-butyl alcohol.

TABLE XXIII

Tertiary-Butyl Alcohol Polymerization Medium

| Run No. | Wt % VP | Wt % Am | Wt % MMA | Wt % I[a] |
|---|---|---|---|---|
| 30 | 47.5 | 47.5 | 5.0 | 0.125 |
| 31 | 45.0 | 45.0 | 10.0 | 0.125 |
| 32 | 47.5 | 47.5 | 5.0 | 0.250 |
| 33 | 45.0 | 45.0 | 10.0 | 0.250 |
| 34 | 47.5 | 47.5 | 5.0 | 0.50 |
| 35 | 45.0 | 45.0 | 10.0 | 0.50 |
| 36 | 65.0 | 30.0 | 5.0 | 0.50 |

TABLE XXIII-continued

Tertiary-Butyl Alcohol Polymerization Medium

| Run No. | Wt % VP | Wt % Am | Wt % MMA | Wt % I[a] |
|---|---|---|---|---|
| 37 | 65.0 | 25.0 | 10.0 | 0.50 |
| 38 | 47.5 | 47.5 | 5.0 | 0.50 |
| 39 | 30.0 | 65.0 | 5.0 | 0.50 |
| 40 | 25.0 | 65.0 | 10.0 | 0.50 |

[a]Initiator was t-butyl peroxypivalate (Wt percent based on total weight of charged monomers).

TABLE XXIV

Terpolymerization[a] Using Styrene, Vinyl Acetate And Lauryl Methacrylate Termonomers

| Run No. | Wt % VP | Wt % Am | Termonomer[b,c,d] | Wt % I[e] |
|---|---|---|---|---|
| 51 | 65.0 | 30.0 | 5.0 | 0.50 |
| 52 | 65.0 | 20.0 | 10.0 | 0.50 |
| 53 | 30.0 | 65.0 | 5.0 | 0.50 |
| 54 | 25.0 | 65.0 | 10.0 | 0.50 |
| 55 | 47.5 | 47.5 | 5.0 | 0.50 |
| 56 | 45.0 | 45.0 | 10.0 | 0.50 |
| 57 | 47.5 | 47.5 | 5.0 | 0.25 |
| 58 | 45.0 | 45.0 | 10.0 | 0.25 |
| 59 | 47.5 | 47.5 | 5.0 | 0.25 |
| 60 | 47.5 | 47.5 | 5.0 | 0.125 |
| 61 | 48.75 | 48.75 | 2.5 | 0.50 |

[a]Tert-butyl alcohol was the polymerization medium.
[b]Termonomer was vinyl acetate (Runs 51–58).
[c]Termonomer was styrene (Runs 59, 60).
[d]Termonomer was lauryl methacrylate (Runs 61–64).
[e]Wt. percent t-butyl peroxypivalate initiator (based on total monomers)

The following examples demonstrate the thermal stability of various terpolymer compositions (see Example XIV) in synthetic seawater at elevated temperatures. Solution Brookfield viscosities were measured in the thermal aging tests and retention of solution viscosity was taken as a manifestation of terpolymer stability under the test conditions. Selected data are tabulated hereinbelow.

EXAMPLE XV

Thermal Aging of Terpolymers

Test samples, e.g., of VP/Am/MMA terpolymer solutions were prepared by combining sufficient terpolymer with synthetic seawater (SSW; 0.7 ionic strength) to give a 0.5 wt. percent (5000 ppm) solution of the terpolymer (active basis). The test solution was purged of oxygen by inert gas entrainment before running the thermal aging tests. Aging tests were routinely carried out by incubating sealed samples at 200° F., 250° F. and 300° F. for specified time periods. After cooling the samples, Brookfield viscosities of the thermally aged samples were determined at 77° F. to determine viscosity retention of the solution after subjection to elevated temperatures in the presence of electrolytes. The results are shown in Table XXV.

All of the tests shown in Table XXV involved the use of terpolymers prepared in synthetic seawater with an initiator level of 0.5 wt percent AIBN (based on total monomers).

TABLE XXV

| Aging Period (Days) | 200 F. Aging Viscosity (cP) | 250 F. Aging Viscosity (cP) | 300 F. Aging Viscosity (cP) |
|---|---|---|---|
| Thermal Aging of 47.5/47.5/5.00 Weight Percent VP/Am/MMA Terpolymer | | | |
| 0 days | 7.5 | 7.5 | 7.5 |
| 22 days | 9.9 | 8.7 | 8.5 |
| 56 days | 9.7 | 7.7 | 5.6 |
| 112 days | 9.4 | 8.0 | 6.4 |
| 190 days | 9.3 | 8.3 | 4.5 |
| Thermal Aging of 48.5/48.5/3.0 Weight Percent VP/Am/MMA Terpolymer | | | |
| 0 days | 9.0 | 9.0 | 9.0 |
| 12 days | 11.7 | 11.4 | 7.1 |
| 42 days | 12.5 | 11.0 | 5.1 |
| 68 days | 11.4 | 10.3 | 7.0 |
| 118 days | 12.4 | 10.2 | 7.5 |
| Thermal Aging of 49.5/49.5/1.00 Weight Percent VP/Am/MMA Terpolymer | | | |
| 0 days | 10.3 | 10.3 | 10.3 |
| 17 days | 14.1 | 12.6 | 7.1 |
| 57 days | 14.2 | 12.6 | 6.2 |
| 83 days | 14.0 | 12.0 | 7.9 |
| 133 days | 13.9 | 12.4 | 8.1 |

Referring to the results in Table XXV, it is evident that good retention of solution viscosity was noted in all three terpolymer compositions after aging at 200° F. and 250° F. Attention is called to the fact that the terpolymers containing 1 wt percent and 3 wt percent methyl methacrylate (MMA) retained a greater percentage of the initial solution viscosity in the 300° F. tests than did the terpolymer containing 5 wt. percent MMA, viz., 79 percent viscosity retention and about 83 percent viscosity retention compared to 60 percent viscosity retention.

EXAMPLE XVI

Thermal Aging of Terpolymers

All of the tests shown in Table XXVI involved the use of terpolymers prepared in synthetic seawater with an initiator level of 0.125 wt. percent AIBN (based on total monomers). Test samples were 0.5 weight percent terpolymer in synthetic seawater for viscosity measurements taken at 77° F. after aging at the indicated elevated temperature.

TABLE XXVI

| Aging Period (Days) | 200 F. Aging Viscosity (cP) | 250 F. Aging Viscosity (cP) | 300 F. Aging Viscosity (cP) |
|---|---|---|---|
| Thermal Aging of 47.5/47.5/5.0 Weight Percent VP/Am/MMA Terpolymer | | | |
| 0 | 12.1 | 12.1 | 12.1 |
| 13 | 15.6 | 15.6 | 12.0 |
| 41 | 17.1 | 11.3 | 6.5 |
| 101 | 16.9 | 13.5 | 6.7 |
| 147 | 9.7 | 13.2 | 7.7 |
| Thermal Aging of 48.5/48.5/3.0 Weight Percent VP/Am/MMA Terpolymer | | | |
| 0 | 13.8 | 13.8 | 13.8 |
| 18 | 17.6 | 16.7 | 9.9 |
| 46 | 19.6 | 16.3 | 9.0 |
| 105 | 19.6 | 15.1 | 9.3 |
| 148 | 19.0 | 15.8 | 8.2 |
| Thermal Aging of 49.5/49.5/1.00 weight percent VP/Am/MMA Terpolymer | | | |
| 0 | 14.2 | 14.2 | 14.2 |
| 15 | 20.0 | 17.5 | 4.6 |
| 47 | 17.3 | 17.5 | 12.4 |
| 106 | 21.2 | 18.5 | 7.8 |
| 149 | 16.5 | 14.4 | 10.2 |

Referring to the results in Table XXVI, it is evident that the initial solution viscosity values for the three terpolymers (12.1; 13.8; 14.2) are significantly greater than the corresponding values in Table XXV (7.5; 9.0; 10.3). Presumably, this is due to the higher average molecular weights of the Table XXVI terpolymers, which can be attributed to lower levels of initiator, viz., 0.125 wt. percent AIBN compared to 0.50 wt. percent AIBN. It is evident that the solution sample containing 1 wt. percent methyl methacrylate terpolymer retained a greater percentage of the initial solution viscosity in the 300° F. tests than did the terpolymers containing 3 wt. percent and 5 wt. percent MMA, viz., about 72 percent viscosity retention compared to about 59 percent viscosity retention and about 65 percent viscosity retention. The viscosity of 9.7 obtained upon aging the 5 wt. percent MMA terpolymer for 147 days at 200° F. appears lower than would be expected, probably due to the presence of oxygen or other operator error.

In general, it is believed that the apparent fluctuations of solution viscosities noted throughout the thermal aging tests are related to the extent of the percent hydrolysis of pendant —$CONH_2$ groups, since it is well known that the viscosifying effectiveness of polyacrylamides passes through a maximum as a function of the degree of hydrolysis of amide moieties along the polymer backbone. The variously structured terpolymers could well vary in their inherent tendency to undergo hydrolysis of pendant amide groups along the polymer backbone.

EXAMPLE XVII

Terpolymer Cloud Point Temperatures

This example discloses cloud point determinations of terpolymer compositions prepared as hereinbefore described in Examples XV and XVI which had been aged in synthetic seawater at temperatures in the range of 200°-300° F. Results are summarized in Table XXVII.

TABLE XXVII

Cloud Point Determinations of VP/Am/MMA Terpolymer Prepared in Synthetic Seawater

| Thermal Aging | Cloud Points °F. (After Aging) | | |
|---|---|---|---|
| Days @ F. | 1% MMA | 3% MMA | 5% MMA |
| 157 @ 300 F.[a] | | | 275.6 |
| 160 @ 300 F. | 300.7 | 289 | |
| 182 @ 300 F. | 297.6 | | 282.0 |
| 186 @ 300 F. | | 293.6 | |
| 202 @ 300 F. | >298 | | |
| 214 @ 300 F. | | 295.6 | |
| 181 @ 250 F.[a] | 254.4 | | |
| 186 @ 250 F. | | 239.0 | |
| 202 @ 250 F. | 255.8 | | |
| 214 @ 250 F. | | 239.8 | |
| 181 @ 200 F.[a] | 253.5 | | |
| 202 @ 200 F. | 282.1 | | |
| 51 @ 300 F.[b] | | | 243.5 |
| 66 @ 300 F. | | 262.2 | |
| 76 @ 300 F. | | | 258.6 |
| 79 @ 300 F. | 285.6 | | |
| 84 @ 300 F. | 273.5 | | |
| 98 @ 300 F. | 288.8 | | |
| 113 @ 300 F. | 289.3 | | |
| 113 @ 250 F.[b] | 255.9 | | |
| 112 @ 200 F.[b] | >300 | | |

[a]Azobisisobutyronitrile initiator level was 0.125 wt. percent
[b]Azobisisobutyronitrile initiator level was 0.5 wt. percent Referring to the results in Table XXVII, it is evident that the terpolymers containing 1 wt. percent MMA and 3 wt. percent MMA exhibit somewhat higher cloud points under comparable conditions than terpolymers containing 5 wt. percent MMA. This observation was apparent for terpolymerization initiated by 0.125 wt. percent AIBN or 0.50 wt. percent AIBN.

EXAMPLE XVIII

Stability of Thermally Aged Terpolymers

This example demonstrates the thermal stability of terpolymer compositions containing varying amounts of methyl methacrylate (MMA), the balance being equal weights of acrylamide (Am) and N-vinyl-2-pyrrolidone (VP). Solution viscosities were determined at different temperatures by capillary viscometry as is well known in the art. In general, 0.25 weight percent solutions of the terpolymers were aged at 300° F. for seven days before viscosities were determined. Two terpolymers were studied: (1) a VP/Am/MMA polymer (49.5 wt % VP, 49.5 wt % Am, 1.0 wt % MMA) prepared in synthetic seawater with an AIBN level of 0.125 wt. percent based on total monomers charged, and (2) a VP/Am/MMA terpolymer (47.5 wt % VP, 47.5 wt % Am, 5.0 wt % MMA) prepared in synthetic seawater with an AIBN level of 0.13 wt percent. Results are summarized in Table XXVIII.

TABLE XXVIII

Capillary Viscometer Results on Aged VP/Am/MMA Terpolymers

| Approximate Temp. F.[a] | 1% MMA[b] | 5% MMA[b] |
|---|---|---|
| 105 | 4.00 | 3.27 |
| 130 | 3.02 | 2.32 |
| 155 | 2.01 | 1.69 |
| 185 | 1.34 | 1.19 |
| 205 | 0.92 | 0.85 |
| 230 | 0.61 | 0.61 |
| 255 | 0.42 | 0.43 |
| 280 | 0.31 | 0.34 |
| 305 | 0.25 | 0.26 |

[a]Temperature of viscosity measurement.
[b]Terpolymerization was carried out in synthetic seawater.

Referring to the results in Table XXVIII, it is evident that the MMA level can be as high as at least 5 weight percent without adversely affecting solution viscosity or thermal stability of the terpolymer systems. In the temperature range of 105° F. to 205° F., the viscosity of the terpolymer system containing 1 wt percent MMA was slightly higher than that of the 5 wt percent MMA system.

EXAMPLE XIX

Thermal Stability of Unaged Terpolymers

This example compares the thermal stability of 0.25 weight percent solutions of unaged VP/Am/MMA terpolymers (49.5/49.5/1.00 weight percent) as evidenced by solution viscosities determined by capillary viscometry. One of the terpolymers was prepared in deionized water whereas the other terpolymer was prepared in synthetic seawater. Results are summarized in Table XXIX.

TABLE XXIX

Solution Viscosities of VP/Am/MMA Terpolymers By Programmed Capillary Viscometry

| Approximate Temp. F.[c] | Viscosity (cP) | |
|---|---|---|
| | 1% MMA[a] | 1% MMA[b] |
| 105 | 3.65 | 2.62 |
| 130 | 2.81 | 1.95 |
| 155 | 1.99 | 1.48 |
| 185 | 1.48 | 1.07 |
| 205 | 1.10 | 0.93 |
| 230 | 0.92 | 0.76 |
| 255 | 0.69 | 0.61 |
| 280 | 0.57 | 0.50 |

TABLE XXIX-continued

Solution Viscosities of VP/Am/MMA Terpolymers
By Programmed Capillary Viscometry

| Approximate Temp. F.[c] | Viscosity (cP) | |
|---|---|---|
| | 1% MMA[a] | 1% MMA[b] |
| 305 | 0.46 | 0.44 |

[a]Prepared in synthetic seawater
[b]Prepared in deionized water
[c]Temperature of viscosity measurement Referring to the results in Table XXIX, it is evident that the viscosities in the polymer system containing the terpolymer prepared in synthetic seawater are somewhat higher than the viscosities observed in the system containing the terpolymer prepared in deionized water.

EXAMPLE XX

Viscosities of Solutions Containing VP/Am/X Terpolymers by programmed Capillary Viscometry This example discloses temperature-programmed capillary viscometer results on 0.25 weight percent solutions of control terpolymers consisting of N-vinyl-2-pyrrolidone (VP) and acrylamide (Am) and a third termonomer X (1 wt percent) selected from the group of methyl acrylate (MA), butyl acrylate (BA), hydroxyethyl acrylate (HEA), lauryl methacrylate (LMA), acrylonitrile (AN), vinyl acetate (VA), styrene (STY), 4-vinylpyridine (4-VPy), 5-methyl-2-vinyl pyridine (MVPy) and mixtures thereof. Solutions were aged for 7 days at 300° F. before carrying out the capillary viscosity measurements. Results are summarized in Table XXX. The terpolymers were prepared in 0.7 ionic strength aqueous sodium chloride solution initiated by 0.25 wt percent AIBN (based on total monomers). Although not prepared in polymerization media comprising mixed salts or synthetic sea water, as preferred for the inventive polymers, the properties of these terpolymers are expected to reflect the influence of the different termonomers used. The properties of terpolymers prepared in preferred media, e.g. SSW, should be similarly affected by the type and amount of termonomer used. Each terpolymer resulted from a reactor charge of 49.5 wt percent VP, 49.5 wt percent Am and 1.0 wt percent of the termonomer designated in Table XXX.

containing hydroxyethyl acrylate (HEA), lauryl methacrylate (LMA), and vinyl acetate (VA) termonomers were significantly lower than systems containing the other designated termonomers. Perhaps this indicates the greater inherent tendency of the pendant moieties in these three terpolymers to hydrolyze during the 7 day thermal aging at 300° F. before measuring solution viscosities by programmed capillary viscometry. All of the systems in Table XXX showed greatly reduced viscosities at elevated temperatures, particularly at temperatures above 180° F. However, these viscosities are still greater than that of synthetic sea water at comparable temperatures. At temperatures up to 250° F., higher viscosities were exhibited by systems containing pyridine-derived termonomers such as 4-vinylpyridine (4VPy) and 5-methyl-2-vinylpyridine (MVPy).

This observation perhaps is related to the fact that the pyridine moiety is probably the least readily altered grouping under the test conditions. A similar rationale may account for the less dramatic effects in the terpolymer systems derived, respectively, from VP, Am and styrene; and VP, Am and acrylonitrile (AN). In general, the test conditions appear severe enough to cause significant hydrolysis of pendant ester moieties.

Calculations show that between 85° F. and 300° F., the terpolymer containing MA lost 89.6 percent of its viscosity and the BA terpolymer lost 82.6 percent of its viscosity, while the terpolymers containing 4-VPy and MVPy lost 94.3 and 95.1 percent, respectively, of their viscosities.

EXAMPLE XXI

Viscosities of Unaged Terpolymers

This example discloses viscosities of *unaged* 0.25 weight percent solutions containing VP/Am/MMA terpolymers. Terpolymers contained methyl methacrylate (MMA) at levels of 0.25 to 10 weight percent, with the balance of the terpolymer consisting of equal weights of units derived from N-vinyl-2-pyrrolidone (VP) and acrylamide (Am). Relative viscosities as well as Brookfield viscosities are presented for the series of control terpolymer compositions prepared in 0.7 ionic strength aqueous sodium chloride solution. Brookfield viscosities are given for similar control terpolymer

TABLE XXX

Solution Viscosities of Aged Terpolymers VP/Am/X*
Viscosity (cP)

| Approximate Temp. F.[k] | (MA)[a] | (BA)[b] | (HEA)[c] | (LMA)[d] | (AN)[e] | (VA)[f] | (STY)[g] | (4-VPy)[h] | (MVPy)[i] | T[j] |
|---|---|---|---|---|---|---|---|---|---|---|
| 85 | 3.57 | 3.44 | 1.67 | 1.3 | 3.13 | 1.05 | 3.75 | 4.2 | 4.3 | 3.30 |
| 145 | 1.62 | 1.57 | 0.81 | 0.61 | 1.82 | 0.7 | 2.0 | 2.65 | 2.0 | 1.97 |
| 180 | 0.79 | 0.99 | 0.61 | 0.56 | 1.10 | 0.44 | 1.09 | 1.49 | 1.25 | 1.31 |
| 225 | 0.47 | 0.64 | 0.40 | 0.40 | 0.60 | 0.32 | 0.58 | 0.65 | 0.7 | 0.55 |
| 250 | 0.31 | 0.43 | 0.38 | 0.37 | 0.42 | 0.26 | 0.38 | 0.50 | 0.48 | 0.40 |
| 275 | 0.21 | 0.40 | 0.3 | 0.32 | 0.27 | 0.23 | 0.25 | 0.34 | 0.33 | 0.30 |
| 300 | 0.37 | 0.60 | NM** | NM** | 0.26 | 0.22 | 0.19 | 0.24 | 0.21 | 0.26 |

*X represents termonomer as defined in footnotes a through j.
[a]MA represents methyl acrylate
[b]BA represents butyl acrylate
[c]HEA represents hydroxyethyl acrylate
[d]LMA represents lauryl methacrylate
[e]AN represents acrylonitrile
[f]VA represents vinyl acetate
[g]STY represents styrene
[h]4-VPy represents 4-vinylpyridine
[i]MVPy represents 5-methyl-2-vinyl pyridine
[j]T represents a 1:1 wt/wt mixture of methyl methacrylate (MMA) and vinyl acetate (VA)
[k]Temperature of viscosity measurement
**NM represents Not Measured Referring to the results in Table XXX, it is evident that the initial viscosities of the thermally aged system compositions prepared in deionized water and selected inventive terpolymers prepared in synthetic seawater. Results are summarized in Table XXXI.

TABLE XXXI

Viscosities of Unaged Terpolymer Solutions

| Wt % MMA[a] | Deionized H$_2$O[b] Terpolymer Viscosity (cP) | 0.7 Ionic Strength[c] Terpolymer Viscosity (cP) | Synthetic Seawater[d] Terpolymer Viscosity (cP) | 0.7 Ionic Strength[c] Terpolymer Relative Viscosity[e] |
|---|---|---|---|---|
| 0.25 | 3.6 | 5.1 | NM[i] | 1.79 |
| 0.50 | 3.9 | 5.1 | NM[i] | 1.74 |
| 1.0 | 3.8 | 5.4 | 5.3 | 1.73 |
| 2.0 | 3.7 | 5.1 | NM | 1.67 |
| 3.0 | 3.6 | 4.5 | 5.1 | 1.56 |
| 5.0[f] | 3.6 | 4.6 | 5.0 | 1.57 |
| 7.0[g] | 3.4 | 4.7 | NM[i] | 1.63 |
| 10.0[h] | 3.0 | 4.4 | NM[i] | 1.48 |

[a]Balance of terpolymer comprised equal weight proportions of VP and Am units.
[b]Terpolymer was prepared in deionized water.
[c]Terpolymer was prepared in 0.7 ionic strength aqueous sodium chloride solution.
[d]Terpolymer was prepared in synthetic seawater.
[e]Relative viscosity is calculated by dividing the time required for a solutin to pass through a capillary viscometer by the time required for the solvent to pass through the same capillary viscometer.
[f]Sample contained haze or water insoluble material.
[g]Sample more hazy than that referenced in footnote e; contained a considerable amount of water insoluble material.
[h]Sample contained a white precipitate.
[i]Not measured.

Referring to the results in Table XXXI, it is evident that the viscosities of the control terpolymers prepared in the 0.7 ionic strength aqueous sodium chloride solution and the inventive terpolymers prepared in synthetic seawater were somewhat higher than the measurements for the control terpolymers prepared in deionized water. It is noteworthy that the terpolymer compositions containing less than 1 weight percent methyl methacrylate (MMA) imparted significant viscosities to water solutions of electrolytes. As noted in footnotes f, g, and h of Table XXXI, attention is called to the fact that terpolymer compositions containing more than about 5 weight percent methyl methacrylate (MMA) exhibited greatly reduced water solubilities.

EXAMPLE XXII

Radiation Polymerization in SOW

A series of VP/Am copolymers was prepared in substitute ocean water at about 80° F. (27° C.) under an argon atmosphere by irradiation with gamma rays from a cobalt 60 source having a maximum dose rate of about 5 MRad/hour. Three of the samples were 10 weight percent each Am and VP and 80 weight percent SSW (50/50 VP/Am). The remaining 20 samples were each 12 weight percent Am, 18 weight percent VP and 70 weight percent SOW. The substitute ocean water employed was made using the sea salt described in Table I at a concentration of about 4.2 weight percent, with a calculated ionic strength of about 0.8.

Each sample solution was contained in a closable polyethylene bag, the sample was degassed by bubbling argon through it to displace the air and the bag was closed. Each bag was placed into an open top paste board box for convenience during the irradiation process and for later processing. To insure more even penetration of the gamma rays into the sample each sample was irradiated for about half of the total exposure time on each side by turning the sample 180° midway through the process. Each comonomer-SOW solution was converted into a viscous mass of water soluble copolymer (gel log) by the irradiation unless specified otherwise.

Relative viscosities of each sample were determined at 25° C. in a No. 1 Ubbelohde viscometer as 0.25 weight percent copolymer in SSW.

Inherent viscosities were determined from relative viscosities by employing the conventional relationship:

$$\text{inherent viscosity} = \frac{\ln(\text{relative viscosity})}{\text{concentration (g/dL)}}$$

K values of each sample were calculated as described in Example VIII from the relative solution viscosities. Since all viscosities herein were measured for solutions of 0.25 weight percent copolymers (equivalent to 0.25 gram/deciliter), to compare the K values computed therefrom with other K values it may be desirable to compensate for copolymer concentration. That is, as seen by the curves in FIG. 8, at concentrations of less than 0.25 g/dL the K values for the same copolymers could be expected to be higher, while at higher concentrations the K values should be lower. To estimate such K values, the values obtained at a concentration of 0.25 g/dL could be extrapolated using the slopes of the existing curves for similar copolymers.

The relative weights of the monomers and SOW employed, the total dose given each sample and corresponding dose rate employed, the percent conversion obtained, the Brookfield, inherent and relative viscosities of each copolymer prepared and the calculated K values are given in Table XXXII. Conversion of monomers to copolymers were determined in each run by either NMR and/or gravimetric practices as known in the art. Conversions ranged from 90 to 100 percent.

TABLE XXXII

Radiation Conditions Employed and Results Obtained for Copolymers

| Sample No[a] | Weight Percent | | | Total Dose kRad | Dose Rate kRad/hr | Percent Conversion | Viscosities | | Calculated K Value |
| | AM | VP | SOW | | | | Relative | Inherent dL/g | |
|---|---|---|---|---|---|---|---|---|---|
| 1 | 10 | 10 | 80 | 16.0 | 18.9 | 90 | 2.31 | 3.35 | 135.9 |

TABLE XXXII-continued

Radiation Conditions Employed and Results Obtained for Copolymers

| Sample No[a] | Weight Percent | | | Total Dose kRad | Dose Rate kRad/hr | Percent Conversion | Viscosities | | Calculated K Value |
|---|---|---|---|---|---|---|---|---|---|
| | AM | VP | SOW | | | | Relative | Inherent dL/g | |
| 2 | 10 | 10 | 80 | 48.0 | 18.9 | 95 | 3.40 | 4.94 | 166.6 |
| 3 | 10 | 10 | 80 | 48.0 | 33.1 | 97 | 3.22 | 4.68 | 162.6 |
| 4[b] | 12 | 18 | 70 | 107.6 | 47.7 | 96 | — | — | — |
| 5 | 12 | 18 | 70 | 48.0 | 33.0 | 90 | 3.61 | 5.13 | 170.9 |
| 6 | 12 | 18 | 70 | 48.0 | 63.8 | 96 | 3.51 | 5.02 | 168.9 |
| 7[b] | 12 | 18 | 70 | 144.0 | 63.8 | 100 | — | — | — |
| 8 | 12 | 18 | 70 | 50.0 | 958 | 90 | 3.01 | 4.41 | 157.5 |
| 9 | 12 | 18 | 70 | 50.0 | 4730 | 99 | 2.48 | 3.63 | 142.0 |
| 10 | 12 | 18 | 70 | 100.0 | 600 | 95 | 3.41 | 4.91 | 166.8 |
| 11[b] | 12 | 18 | 70 | 200.0 | 600 | 95 | — | — | — |
| 12[c] | 12 | 18 | 70 | 100.0 | 600 | 95 | 3.91 | 5.45 | 176.5 |
| 13[d][b] | 12 | 18 | 70 | 200.0 | 600 | 96 | — | — | — |

Notes:
[a]Volume size for samples 1 to 3 is 1 liter, for remainder is 2 liters.
[b]Crosslinked, sample did not completely dissolve.
[c]Initial temperature before irradiation about 48 F. (9 C.)
[d]Initial temperature before irradiation about 52 F. (11 C.)
[e]A dash signifies no determination made.

The results in Table XXXII indicate the molecular weights of the various copolymers prepared by gamma irradiation in SOW, as reflected by the inherent viscosity data, are related to concentration of the monomers, total dose given the system, the dose rate used and polymerization temperature. For the 50/50 VP/Am copolymers prepared at a total monomer concentration of 20 weight percent, the low inherent viscosity of 3.35 dL/g and K value of about 136 obtained with a total dose of 16 kRad and a dose rate of about 19 kRad/hr for sample 1 show substantially lower viscosity compared to samples 2 and 3. However, sample 2 shows an inherent viscosity of 4.94 dL/g and K value of about 167. The dose rate was the same as for example 1 but the total dose was tripled to 48 kRad. On the other hand, the inherent viscosity of 4.68 dL/g and K value of about 163 obtained with sample 3 shows that maintaining a medium total dose of about 48 kRad coupled with a higher dose rate of about 33 kRad/hr has yielded a slightly less desirable copolymer (lower viscosity) for EOR than that of sample 2.

Similarly, inspecting the conditions used and results obtained for samples 4 to 13, the 60/40 VP/Am copolymers, a similar trend is noted. For example, sample 5 shows that a medium dose rate of about 33 kRad/hr coupled with a medium total dose of 48 kRad yields a copolymer having an inherent viscosity of about 5.13 dL/g and K value of about 171. The total monomer concentration in preparing samples 4 to 13 was 30 weight percent. This concentration and/or difference in VP/Am weight ratio has apparently shifted the most desirable dose rate from about 19 kRad/hr for sample 2 to about 33 kRad/hr for sample 5.

In comparing inherent viscosities and K values of sample 6 (5.02 dL/g and 169), sample 8 (4.41 dL/g and 158) and sample 9 (3.63 dL/g and 142) with those of sample 5 (5.13 dL/g and 171), it is noted that all samples received a medium total dose of 48 to 50 kRad. However, increasing the dose rate from a medium value of about 33 kRad/hr to higher values ranging from about 64 to 4700 kRad/hr resulted in the formation of copolymers having decreasing inherent viscosities, i.e. the higher the dose rate under these conditions, the lower the polymer viscosity. The irradiation applied in the preparation of samples 4 and 7 was excessive and crosslinking was noted, e.g. insoluble or nearly insoluble polymers were made.

The effects of total dose at a high dose rate of 600 kRad/hr and polymerization temperature are shown in the results obtained for samples 10-13. The inherent viscosity of 4.91 dL/g and K value of about 167 obtained for sample 10, at total dose of 100 kRad and polymerization temperature of about 80° F., is somewhat lower than the inherent viscosity of 5.45 dL/g and K value of about 176 obtained for sample 12 at a total dose of 100 kRad and polymerization temperature of about 48° F. This suggests that the molecular weight of the copolymers can be increased by decreasing the polymerization temperature to a temperature below ambient, provided that freezing of the system is avoided. The temperature can be lowered prior to, during or after irradiation. This temperature will vary, depending upon the concentration of monomers and the nature of the polymerization medium. For the monomer concentrations and polymerization medium employed in this Example, a minimum temperature of about 20° F. can be employed. The results obtained for samples 11 and 13 indicate that the total dose of 200 kRad was excessive under the conditions employed. Thus, some crosslinking (gellation) occurred and the polymer samples did not dissolve enough to obtain meaningful viscosity values and K values.

In this Example, the results show that the copolymer having the highest inherent viscosity (5.45 dL/g) was made at 52° F. by irradiating the monomer solution to obtain a total dose of 100 kRad by employing a dose rate of 600 kRad/hr. This copolymer would be expected to provide acceptable performance in EOR. In addition, copolymers having somewhat lower inherent viscosities, e.g. 5.13 dL/g and 5.02 dL/g, were made by employing total doses and dose rates of 48 kRad and 33 kRad/hr and 48 kRad and about 64 kRad/hr. These copolymers would also be expected to perform creditably in EOR. Manipulation of total dose, dose rate, temperature and other variables can be practiced as needed to obtain polymers having the desired properties for the end uses contemplated. Polymerization is most desirably carried out in the absence of molecular oxygen. Similar selected doses/dose rates or conditions can be used for preparing these polymers in the tertiary alkanol media referred to elsewhere herein.

EXAMPLE XXIII

VP-Am Copolymers as Flocculants

Several invention copolymers and several commercially available polymers as controls were tested for efficacy as flocculating agents in Caney River (Oklahoma) water containing 250 ppm added bentonite clay of 325 mesh particle size. The river water had an initial turbidity of about 87 nephelos units. The procedures of ASTM-D 2035-80 and ASTM Standards cited therein were followed.

The inventive copolymers consisting of VP/Am weight ratios of 40/60, 30/70 and 20/80 were prepared in SSW at 49° C. in the presence of 0.5 weight percent AIBN based on the weight of the monomers. A portion of each copolymer was subsequently diluted with SSW to form a 1 weight percent solution and the Brookfield viscosities of the solutions were determined at 25° C. at 6 rpm.

Sample 1, 40/60 VP/Am, had a Brookfield viscosity of about 73 cP as determined with a U.L. spindle.

Sample 2, 30/70 VP/Am, had a Brookfield viscosity of about 157 cP as determined with a No. 1 spindle.

Sample 3, 20/80 VP/Am, had a Brookfield viscosity of about 232 cP determined with a No. 1 spindle.

In the procedure followed, each 1500 mL jar, containing 1000 mL of the water-clay mixture and 0.5 ppm of the test polymer based on the contents of the jar, was stirred for 1 minute at a flash mix speed of 105 rpm. The speed was reduced to 20 rpm and stirring continued for 20 minutes. The stirrer was withdrawn and results then determined in accordance with the ASTM procedure except for color of the water which was not recorded.

The results are set forth in Table XXXIII.

EXAMPLE XXIV

Comparative Properties of Polymers Prepared by Radiation Polymerization in SOW and $H_2O$ A series of VP/Am copolymers was prepared in substitute ocean water at about 80° F. (27° C.) under an argon atmosphere by irradiation with gamma rays from a cobalt 60 source employing a dose rate of about 2530–2600 KRad/hour. These samples were each 18 weight percent VP, 12 weight percent Am and 70 weight percent $H_2O$ (control) or SOW (invention) (60/40 VP/Am). The substitute ocean water employed was made using the sea salt described in Table 1 at a concentration of about 4.2 weight percent, with a calculated ionic strength of about 0.8.

Each sample solution was contained in a closable polyethylene bag, the sample was degassed by bubbling argon through it to displace the air and the bag was closed. Each bag was placed into an open top paste board box for convenience during the irradiation process and for later processing. To insure more even penetration of the gamma rays into the sample each sample was irradiated for about half of the total exposure time on each side by turning the sample 180° midway through the process. Each comonomer-SOW solution was converted into a viscous mass of water soluble copolymer (gel log) by the irradiation.

The Brookfield viscosity of each sample diluted in 0.7 Ionic Strength SSW (as described earlier herein) was determined at 25° C. at 6 rpm using a #1 spindle. The diluted sample was prepared by dissolving 16.50 g gel in 483.5 g SSW, equivalent to about 1.0 weight percent copolymer.

Relative viscosities of each sample were determined

TABLE XXXIII

| | VP/Am Copolymers As Flocculating Agents | | | | | | | |
|---|---|---|---|---|---|---|---|---|
| | Remarks | | | | | | | |
| | Invention | | | | | | Controls[a] | |
| | Run No. | | | | | | | |
| | 1 | 2 | 3 | 4 | 5 | 6 | 7[b] | 8[c] |
| Sample Description | 40/60 VP/Am | | 30/70 VP/Am | | 20/80 VP/Am | | 1125L | 1180 |
| Initial sample pH | 7.11 | 7.11 | 7.11 | 7.11 | 7.11 | 7.06 | 7.06 | 7.06 |
| Initial turbidity, nephelos units | 87 | 87 | 87 | 87 | 87 | 87 | 86 | 86 |
| Test temp. °C. | 27.2 | 27.2 | 27.2 | 27.2 | 27.2 | 27.2 | 23.8 | 23.8 |
| Time, first floc, min. | 0.5 | 0.5 | 0.5 | 0.5 | 0.5 | 0.5 | 0.1 | 0.5 |
| Floc size | medium fine | medium fine | medium fine | medium fine | medium fine | medium fine | coarse | medium fine |
| Settling rate. min. | 5.5 | 5.5 | 5.5 | 5.5 | 5.5 | 5.5 | 0.2 | 4.0 |
| Turbidity, 15 min, settle; nephelos | 2.9 | 3.0 | 3.5 | 3.8 | 3.4 | 3.2 | 3.8 | 1.5 |
| Final sample pH | 7.15 | 7.14 | 7.21 | 7.20 | 7.27 | 7.31 | 7.69 | 6.83 |

[a]Results are averages of 2 runs
[b]Betz Poly-Floc ® 1125L, Betz Laboratories, Inc., Trevose, PA
[c]Betz Poly-Floc ® 1180

The results obtained with the inventive copolymers are comparable to those obtained with commercial flocculant, Betz Poly-Floc ® 1180. Although the tests were conducted in river water containing an unknown concentration of dissolved salts (The water is considered to be hard water based on its reaction with soap), it is expected that the inventive copolymers will serve as effective flocculating agents for processes involving the clarification of water containing suspended matter. Specific applications might be in clarification of brackish water, removal of fines in mineral processing i.e., phosphate mining, uranium or coal mining, or removal of clay from potash ores suspended in concentrated brines.

at 25° C. in a No. 1 Ubbelohde viscometer as 0.1 and 0.25 weight percent copolymer in SSW.

Inherent viscosities were determined from relative viscosities by employing the conventional relationship:

$$\text{inherent viscosity} = \frac{\ln(\text{relative viscosity})}{\text{concentration (g/dL)}}$$

K values of each sample were calculated as described in Example VIII from the relative solution viscosities. Since the relative viscosities herein were measured for solutions of 0.1 and 0.25 weight percent copolymers (equivalent to 0.1 or 0.25 gram/deciliter), to compare the K values computed therefrom with other K values it may be desirable to compensate for copolymer concentration. That is, as seen by the curves in FIG. 8, at concentrations of less than 0.25 g/dL the K values for the same copolymers could be expected to be higher, while at higher concentrations the K values should be lower. To estimate such K values, the values obtained at concentration of 0.1 or 0.25 g/dL could be extrapolated using the slopes of the existing curves for similar copolymers.

The relative weights of the monomers and SOW polymerization medium employed, the total dose given each sample and corresponding dose rate employed, the percent conversion obtained, the concentrations used for testing the Brookfield, calculated inherent and relative viscosities of each copolymer prepared and the calculated K values are given in Table XXXIV. Conversion of monomers to copolymers was determined in each run by gravimetric practices as known in the art. Conversions ranged from 95 to 100 percent.

line approximately parallel to the lower curve for 50:50 VP/Am copolymers prepared in H$_2$O. By extrapolating this line to a concentration of 1.0 weight percent (approximately equivalent to 1.0 grams/deciliter), a K value of about 135–140 can be estimated, which is typical of superior polymers of the prior art. However, by plotting K values for sample 2 and extrapolating in the same manner, an estimated K value of at least about 145–150 is obtained.

Thus, the use of a polymerization medium containing electrolytes, preferably a mixture of electrolytes as in the SOW or SSW described herein, in preparing the polymers of this invention by radiation polymerization improves their viscosity properties, analogous to the results described in the previous examples for chemical initiation. Furthermore, other properties comprising cloud point and the resistance to loss of viscosity in hostile environments (high temperature, salinity and/or hardness) would also be improved, as shown in the

TABLE XXXIV

Radiation Conditions Employed and Results Obtained for Copolymers

| Sample No[a] | Invention/ Control | Weight Precent | | Medium[b] | Total Dose kRad | Dose Rate kRad/hr | Percent Conversion | Concentration, Wt. Percent | Viscosities | | | Calculated K Value |
|---|---|---|---|---|---|---|---|---|---|---|---|---|
| | | PV | Am | | | | | | Brookfield cP | Relative | Inherent dL/g | |
| 1 | I[d] | 18 | 12 | 70 (SOW) | 100 | 2600 | 95 | 0.25 | —[c] | 3.18 | 4.63 | 161.7 |
| 2 | I | 18 | 12 | 70 (SOW) | 100 | 2530 | 99.7 | 1.0 | 48 | — | — | — |
| 2 | I | 18 | 12 | 70 (SOW) | 100 | 2530 | 99.7 | 0.1 | — | 1.71 | 5.19 | 171.8 |
| 2 | I | 18 | 12 | 70 (SOW) | 100 | 2530 | 99.7 | 0.25 | — | 3.24 | 4.69 | 163.1 |
| 3 | C[e] | 18 | 12 | 70 (H$_2$O) | 100 | 2530 | 100 | 1.0 | 24 | — | — | — |
| 3 | C | 18 | 12 | 70 (H$_2$O) | 100 | 2530 | 100 | 0.1 | — | 1.60 | 4.67 | 160.3 |
| 3 | C | 18 | 12 | 70 (H$_2$O) | 100 | 2530 | 100 | 0.25 | — | 2.88 | 4.13 | 154.1 |

Notes:
[a]Volume size for samples 1 to 3 was 1 liter.
[b]Substitute Ocean Water (SOW) or distilled water (H$_2$O), as indicated.
[c]A dash signifies no determination made.
[d]Invention polymer.
[e]Control polymer.

Samples 1 and 2 of inventive polymers were prepared in different batches with the same monomer proportions and reaction conditions, except for a slightly different radiation dose rate. The values obtained for relative and inherent viscosities at concentrations of 0.25 weight percent correlate closely. Comparing sample 2 (prepared in SOW) to control polymer sample 3 (prepared in H$_2$O), at a concentration of 1.0 weight percent, a Brookfield viscosity twice as high was obtained for sample 2. At a concentration of 0.1 weight percent, the relative viscosity was about 7 percent higher and the inherent viscosity was about 10 percent higher for inventive polymer sample 2, prepared in SOW. Similarly, when tested at concentrations of 0.25 weight percent, the sample 2 solution gave a relative viscosity about 13 percent higher and an inherent viscosity about 14 percent higher than those obtained from sample 3, prepared in H$_2$O.

The K values for the inventive polymer sample 2 (SOW) solution were about 11 units higher than those for sample 3 (H$_2$O) solution when tested at 0.1 weight percent concentration, and about 9 units higher when tested at 0.25 weight percent. This further indicates the superiority of the polymers prepared in accordance with the invention (in SOW) compared with those prepared in H$_2$O (control). The greater numerical difference in K values observed at the lower concentration is consistent with the variation in K value with concentration, noted in Example VIII. The K values obtained for sample 3 at concentrations of 0.1 and 0.25 weight percent can be plotted on a graph such as FIG. 8 to form a previous examples when such polymerization media were used with chemical initiators. Thus, the use of radiation with polymerization media comprising mixed electrolytes, such as a synthetic sea water, is a preferred method of preparing the polymers of this invention because it is believed, based partly upon the work carried out thus far, that polymers produced according to the present invention using radiation initiation will produce polymers having a higher viscosity compared to chemical initiated polymers of the invention.

ADDITIONAL EXPERIMENTAL

The general experimental procedure used to prepare the polymers of the following examples involved the charging of monomers and water (either distilled water or saline water) to crown top bottles along with suitable initiators. The reaction mixtures were degassed with an inert gas for approximately 20 minutes before capping and allowing polymerization to take place at a specified temperature depending on the chemical initiator used. For radiation induced polymerizations, no chemical initiator was added and the reaction mixture in the crown top bottles was irradiated with suitable radiation dosages. At the end of the reaction period, the entire reaction mass was usually in the form of a gel.

Characterization of reaction products was carried out by addition of sufficient amounts of synthetic North Sea water to the gel to prepare 0.1 weight percent and 0.25 weight percent polymer solutions for viscosity measurements. Relative viscosities of the 0.1 weight percent solutions at 25° C. were determined in a capillary viscometer. The unaged viscosities of the 0.25 weight percent polymer solutions were determined by high pressure capillary viscometry. In order to measure the aged viscosity of a polymer solution, the solution was aged in a sealed bomb at 300° F. for 7 days as described hereinbefore. The aged viscosity of the sample was then determined by high pressure capillary viscometry. The formation of precipitate in the aging test indicated that the polymer lacked sufficient thermal stability in the hard salinity test medium to merit any further consideration as a mobility control agent in hostile environments (i.e., temperature > 170° F., hardness cations > 500 ppm).

Since the viscosity of the synthetic North Sea water at 250° F. was found to be on the order of 0.28 centipoise this value was used to indicate the relative effectiveness of the polymer solutions to mobilize crude oil over that which would be expected using sea water as a flooding medium.

The examples presented hereinbelow are representative of the instant teaching. Unless otherwise noted, the compositions were prepared and tested in accordance with the above general experimental procedure. Reaction times were usually on the order of 24 hours and reaction mixtures were usually neither stirred nor tumbled during the polymerizations. The total solids level generally was in the range of 5% to 50% with most of the preparations being carried out in the range of 20% to 35% total solids.

EXAMPLE XXV

NaAMPS Polymers For Hostile Environments

This example presents in summary form representative polymer compositions which are potentially useful as mobility control agents under hostile environment conditions. These samples are characterized by the presence of sodium 2-acrylamido-2-methylpropanesulfonate (NaAMPS) units. Solutions of these polymers in synthetic North Sea water (2500 ppm polymer) at 250° F. exhibited unaged viscosities in the range of 1.50 to 7.05 centipoise. After thermal aging of these solutions in synthetic North Sea water at 300° F. for 7 days, the aged viscosities of these solutions varied in the range of 1.28 to 4.59 centipoise. The viscosity of sea water at 250° F. is about 0.28 centipoise.

TABLE XXXV

Hostile Environment Polymers Containing Sodium 2-Acrylamido-2-Methylpropanesulfonate (NaAMPS) Units

| Sample No. | Wt. % NaAMPS[a] | Wt. % VP[b] | Wt. % Am[c] | Wt. % DMAm[d] | Inherent Viscosity (dL/g)[g] | Viscosity (cP) 250 F. (2500 ppm) Unaged | Aged | VR* |
|---|---|---|---|---|---|---|---|---|
| 1 | 100[e] | 0 | 0 | 0 | 11.04 | 7.05 | 4.59 | 16.4 |
| 2 | 70[e] | 0 | 0 | 30 | 8.90 | 3.80 | 2.50 | 8.9 |
| 3 | 55[e] | 30 | 15 | 0 | 9.01 | 2.19 | 1.85 | 6.6 |
| 4 | 100[f] | 0 | 0 | 0 | 7.82 | 1.92 | 1.79 | 6.4 |
| 5 | 100[f] | 0 | 0 | 0 | 7.39 | 2.45 | 1.42 | 5.1 |
| 6 | 55[f] | 30 | 15 | 0 | 8.38 | 2.08 | 1.40 | 5.0 |
| 7 | 70[f] | 0 | 0 | 30 | 7.85 | 2.07 | 1.37 | 4.9 |
| 8 | 65[f] | 35 | 0 | 0 | 6.28 | 1.50 | 1.35 | 4.8 |
| 9 | 25[f] | 50 | 25 | 0 | 8.19 | 1.56 | 1.28 | 4.6 |

[a] NaAMPS represents sodium 2-acrylamido-2-methylpropanesulfonate.
[b] VP represents N-vinyl-2-pyrrolidone.
[c] Am represents acrylamide.
[d] DMAm represents N,N-dimethylacrylamide.
*VR represents Viscosity Ratio and is calculated by dividing the aged viscosity of the polymer solution by 0.28 (the viscosity of sea water at 250° F.).
[e] Refined grade 2-acrylamido-2-methylpropanesulfonic acid was neutralized to prepare the sodium salt (NaAMPS) used in synthesizing the polymers.
[f] Commercial grade AMPS materials were used in these polymerizations.
[g] In this and subsequent examples, unless otherwise noted, viscosity was determined on 0.1 wt percent solutions in Synthetic North Sea Water at 25° C.

Referring to the results in Table XXXV, it is evident that the use of refined grade AMPS in homopolymer sample 1 (cf. Nos. 4 and 5) gave the homopolymer system with the highest aged viscosity, i.e., 4.59 cP compared to 1.79 cP (Sample No. 4) and 1.42 cP (Sample No. 5). These systems, respectively, exhibited aged viscosities which were 16.4, 6.4 and 5.1 times as viscous as sea water at 250° F.

Referring to samples 2 and 7, it is apparent that the 30/70 DMAm/NaAMPS copolymer (Sample 2) made with refined grade AMPS material exhibited a higher aged viscosity than did the copolymer prepared from commercial AMPS material (Sample 7).

The same conclusion applies to the three component polymer samples, numbers 3 (from refined grade AMPS) and 6 containing 30 weight percent VP, 15 weight percent acrylamide and 55 weight percent NaAMPS. Sample 9 (VP/Am/NaAMPS polymer 50/25/25) is another example of a polymer system which exhibited a significant aged viscosity value. In each three component polymer (i.e., samples 3, 6 and 9), the relative weight percent ratio of VP and Am was 2:1. In the course of this work, the weight ratio of VP to Am in three component polymer compositions is preferably not less than 1:1.

Referring to sample 8, it is evident that copolymers of VP and NaAMPS are useful in hostile environments for enhanced oil recovery: the aged viscosity at 250° F. being 4.8 times the viscosity of sea water at 250° F.

Attention is called to the fact that the aged viscosities of samples 1–9 in Table XXXV were 4.6 to 16.4 times the viscosity of sea water at 250° F. Polymerfloods with such polymeric viscosifiers under hostile environment conditions would be expected to be significantly more effective in mobilizing crude oil than waterflooding with sea water.

EXAMPLE XXVI

Sodium 2-Acrylamido-2-Methylpropanesulfonate (NaAMPS) and Homopolymers of NaAMPS This example describes the preparation of NaAMPS from refined grade 2-acrylamido-2-methylpropanesulfonic acid as well as the preparation and thermal aging of NaAMPS homopolymer. The low temperature VAZO® 33 chemical initiator was used in the ambient temperature polymerization. VAZO® 33 is 2,2'-azobis(2,4-dimethyl-4-methoxyvaleronitrile).

The sodium salt of 2-acrylamido-2-methylpropanesulfonic acid was prepared by dissolving 60 g of the sulfonic acid (refined grade) (0.29 mole) in an aerated alkaline solution which had been prepared by dissolving 12 g (0.3 mole) of sodium hydroxide in 60 g of distilled water. The pH of the mixture at this point was approximately 13 and 0.89 g (4.3 mmoles) of 2-acrylamido-2-methylpropanesulfonic acid (refined grade) was added to adjust the pH to about 9. An additional 1.8 g of water was added to give a total mixture of about 135 grams (50 wt % NaAMPS). A 50 weight percent aqueous solution of NaAMPS monomer was routinely used as a stock solution for homopolymer, copolymer and three component polymer preparations.

A 60 g portion of a 50 weight percent aqueous solution of NaAMPS (30 g NaAMPS), 25.7 g distilled water and 15 mg of solid VAZO® 33 was charged to a 10 ounce crown top bottle. After degassing the mixture with argon for 20 minutes, the bottle was capped and stored for 24 hours at ambient temperature. This reaction charge contained 35% total solids and 0.05 phm of initiator.

The gelled reaction mass was mixed with sufficient synthetic North Sea water to prepare 0.1 weight percent and 0.25 weight percent solutions for viscosity measurements. The homopolymer solution exhibited an inherent viscosity of 11.04 dL/g, an unaged viscosity of 7.05 centipoise and an aged viscosity of 4.59 centipoise. This aged viscosity is approximately 16 times greater than the viscosity of sea water at 250° F.

EXAMPLE XXVII

Poly(N-Vinyl-2-Pyrrolidone-co-Sodium-2-acrylamido-2-Methylpropanesulfonate)

This example describes the preparation of VP/NaAMPS copolymers containing, respectively, 25/75; 33/67 and 35/65 weight ratios of the respective comonomers. VAZO® 33 was used as the initiator at a level of 0.10 phm in the first two runs and in the 35/65 run the initiator was 0.10 phm t-butyl hyponitrite.

For the 25/75 copolymer, a 45 g portion of a 50 weight percent solution of NaAMPS (prepared from commercial grade 2-acrylamido-2-methylpropanesulfonic acid), 97.5 g distilled water, 3.0 g VP and 4.5 g of a stock solution of initiator prepared by dissolving 0.267 g of VAZO® 33 in 40 g VP was charged to a 10 ounce crown top bottle. After degassing the mixture with argon for 20 minutes, the bottle was capped and stored for 24 hours at ambient temperature. The reaction charge was 20% total solids. The 33/67 and 35/65 copolymers were similarly prepared.

The gelled reaction masses were individually mixed with sufficient synthetic North Sea water to give 0.1 weight percent and 0.25 weight percent solutions for viscosity measurements. The results are shown in Table XXXVI.

TABLE XXXVI

Aging Results on VP/NaAMPS Copolymers Aged In Synthetic North Sea Water

| Wt/Wt VP/NaAMPS | Inherent Viscosity (dL/g) | Viscosity (cP) 250° F. (2500 ppm) Unaged | Viscosity (cP) 250° F. (2500 ppm) Aged |
|---|---|---|---|
| 25/75 | 6.93 | 1.80 | 1.07 |
| 33/67 | 6.31 | 1.22 | 1.23 |
| 35/65 | 6.28 | 1.50 | 1.35 |

Referring to the results in Table XXXVI, it is evident that the aged viscosities of the copolymer solutions at 250° F. were several times greater than the viscosity of sea water (0.28 cP) at 250° F. These copolymers, therefore, are potential candidates for polymerfloods in hostile environments.

EXAMPLE XXVIII

N-Vinyl-2-Pyrrolidone/Acrylamide/Sodium 2-Acrylamido-2-Methylpropanesulfonate Polymers This sample describes the preparation of polymers of VP, Am and NaAMPS using VAZO® 33 as the initiator (0.10 phm). Appropriate quantities of monomers were used to prepare VP/Am/NaAMPS polymers of the following compositions: 33/11/56; 25/10/65; 30/15/55; and 25/15/60.

The gelled reaction masses were individually mixed with sufficient synthetic sea water to prepare 0.1 weight percent and 0.25 weight percent solutions for viscosity measurements. The results are summarized in Table XXXVII.

TABLE XXXVII

Aging Results on VP/Am/NaAMPS Polymers Aged in Synthetic North Sea Water

| Wt/Wt/Wt VP/Am/NaAMPS | Inherent Viscosity (dL/g) | Viscosity (cP) 250° F. (2500 ppm) Unaged | Viscosity (cP) 250° F. (2500 ppm) Aged |
|---|---|---|---|
| 33/11/56 | 7.02 | 1.37 | 1.08 |
| 25/10/65 | 7.98 | 1.65 | 1.20 |
| 30/15/55 | 8.38 | 2.19 | 1.85 |
| 25/15/60 | 7.45 | 1.46 | 1.05 |

Referring to the results in Table XXXVII, it is apparent that the VP/Am/NaAMPS polymers are candidates for mobility control agents in hostile environments because the aged viscosities of the three component polymer solutions of 3.5 to 6.5 times the viscosity of sea water at 250° F. indicates excellent stability. The weight ratio of VP to Am in these hostile environment terpolymers varied over the range of 1.66:1 to 3:1 in these 250° F. tests. At temperatures of 250° F. and above a ratio of at least 1:1 N-vinyl lactam:unsaturated amide is preferred. A lower ratio, for instance as low as 0.11:1 can be used in lower temperature applications such as at 170° F.

EXAMPLE XXIX

Polymerization With Low Temperature Initiator

This example demonstrates that copolymers and three component polymers of NaAMPS as well as VP/Am copolymers can be prepared with tertiary butyl hyponitrite as the chemical initiator. These preparations were carried out in essentially the same manner as the runs using VAZO® 33 and the inherent viscosities of the reaction products were of the same order of magnitude as observed in the VAZO® 33 runs. The aged viscosities of several VP/Am copolymers are shown in Table XXXVIII.

TABLE XXXVIII

Solution Viscosities of Polymers Initiated by Tertiary Butyl Hyponitrite (Measured in Synthetic North Sea Water)

| Wt/Wt/Wt VP/Am/NaAMPS | Inherent Viscosity (dL/g) | Viscosity (cP) 250° F. (2500 ppm) Unaged | Viscosity (cP) 250° F. (2500 ppm) Aged |
|---|---|---|---|
| 60/40/0 | 10.31 (5% T.S.)[a] | 2.82 | 1.23 |
| 60/40/0 | 9.18 (20% T.S.)[a] | 1.53 | 1.05 |
| 60/40/0 | 7.36 (30% T.S.)[a] | 1.39 | 0.86 |
| 30/15/55 | 7.60 | NM* | NM* |
| 30/18/52 | 7.58 | NM* | NM* |
| 30/20/50 | 7.51 | NM* | NM* |
| 30/0/70 | 6.27 | NM* | NM* |
| 35/0/65 | 6.28 | 1.50 | 1.35 |
| PVP/PAm (60/40)[b] | NM* | 0.97 | Pptd[c] |

*NM represents Not Measured.
[a]T.S. represents total solids.
[b]This control sample was prepared by blending 60 parts by weight of polyvinyl pyrrolidone with 40 parts by weight of polyacrylamide.
[c]The solution of the PVP/PAm homopolymer blend failed the high temperature aging test as evidenced by the formation of a precipitate.

The results on the 60/40 VP/Am copolymers in Table XXXVIII indicate that initiation with tertiary butyl hyponitrite gave copolymers which did not precipitate on aging and exhibited aged solution viscosities at 250° F. which were at least several times the viscosity of sea water at 250° F. By contrast, a 60/40 wt/wt blend of PVP/PAm homopolymers failed the thermal aging test as evidenced by precipitate formation.

Referring to the NaAMPS derived polymers in Table XXXVIII, it is evident that the polymers exhibited inherent viscosities which are similar in magnitude to those polymers prepared hereinabove by VAZO ® 33 initiation.

EXAMPLE XXX

N-Vinyl-2-Pyrrolidone/Acrylamide/Diacetone Acrylamide Polymers (VP/Am/DAAm)

This example describes the preparation and testing of VP/Am/DAAm polymers. The polymerizations were carried out either in synthetic sea water or distilled water in accordance with the general experimental procedure described hereinabove (20% total solids; VAZO ® 33 initiator at 0.06±0.015 phm).

The gelled reaction masses were individually dissolved in sufficient synthetic North Sea water to give 0.1 weight percent and 0.25 weight percent polymer solutions for viscosity measurements. Results are summarized in Table XXXIX.

TABLE XXXIX

Aging Results on VP/Am/DAAm Polymers Aged in Synthetic North Sea Water

| Wt/Wt/Wt VP/Am/DAAm | Inherent Viscosity (dL/g) | Viscosity (cP) 250 F. (2500 ppm) Unaged | Viscosity (cP) 250 F. (2500 ppm) Aged |
|---|---|---|---|
| 50/45/5 | 8.58 | 1.54 | 0.74 |
| 50/43/7 | 7.48 | 1.20 | 0.84 |
| 50/40/10 | 6.63[a] | 1.09 | 0.89 |
| 50/35/15 | 6.32[a] | 1.03 | 0.97 |
| 48/38/14 | 7.44 | 1.66 | 0.97 |
| 45/45/10 | 8.22 | 1.72 | 0.90 |
| 40/50/10 | 7.40[a] | 2.04 | Pptd[b] |
| 30/50/20 | 7.18[a] | 1.95 | Pptd[b] |

[a]Inherent viscosities were determined on 2500 ppm polymer solutions in synthetic North Sea water
[b]These samples failed the hostile environment thermal aging tests because precipitates formed in the polymer solutions.

Referring to the results in Table XXXIX, it is evident that the first six entries performed well in the thermal aging tests exhibiting aged viscosities on the order of 2.5 to 3.5 times the viscosity of synthetic sea water at 250° F. The last two entries of Table XXXIX failed to perform well in the thermal aging tests resulting in the formation of precipitates.

In regard to the last two entries of Table XXXIX, it should be noted that the weight ratio of N-vinyl-2-pyrrolidone to acrylamide in the three component polymers was less than 1:1. Referring again to the first six three component polymers of Table XXXIX, it should be noted that the weight ratio of N-vinyl-2-pyrrolidone to acrylamide varied over the range of 1:1 to about 1.4:1 in these 250° F. tests. At temperatures of 250° F. and above a ratio of at least 1:1 N-vinyl lactam:unsaturated amide is preferred. A lower ratio, for instance as low as 0.11:1 can be used in lower temperature applications such as at 170° F. This observation suggests that thermal stabilization of the three component polymer systems is related to the weight ratio of VP to Am in the polymer.

EXAMPLE XXXI

Homopolymerization of NaAMPS

This example describes the homopolymerization of NaAMPS without the addition of any conventional chemical initiator. In this procedure advantage is taken of the fact that the free acid, 2-acrylamido-2-methylpropanesulfonic acid spontaneously polymerizes in the presence of water and/or initiates the polymerization of NaAMPS in aqueous solution.

To a solution of 43.6 g of NaOH (1.09 moles) in 230.5 g of distilled water was added 226.0 g (1.0904 moles) of 2-acrylamido-2-methylpropanesulfonic acid (commercial grade) slowly with stirring. With external cooling and a slow rate of addition, the temperature was maintained at 30° C. or below. The concentrated solution was transferred to a stoppered flask and kept at room temperature for 30 minutes. The flask was then cooled to 5° C. for 48 hours. A high viscosity clear gel was obtained. Optionally, the homopolymerization may be carried out by substituting either a saline or a sea water formulation for the distilled water.

The homopolymer solution in synthetic North Sea water exhibited an inherent viscosity of 7.39 dL/g; an unaged viscosity of 2.45 cP and an aged viscosity of 1.42 cP (see sample number 5 in Table XXXV).

EXAMPLE XXXII

Poly(N-Vinyl-2-Pyrrolidone-co-Sodium-2-Acrylamido-2-Methylpropanesulfonate) Initiated by Radiation This example describes the copolymerization of NaAMPS and VP initiated by cobalt 60 irradiation. The NaAMPS monomer was prepared by the neutralization of commercial grade 2-acrylamido-2-methylpropanesulfonic acid.

A 354 g portion of a 50 weight percent aqueous solution of NaAMPS, 220 g of distilled water and 87 g N-vinyl-2-pyrrolidone were placed in a 26 ounce crown top bottle. After degassing the mixture for 20 minutes with argon, the bottle was capped. The reactor charge contained 40 weight % total solids. Polymerization was initiated by using a dose rate of 100 Krad/hour for 0.4 hour (dose of 40 Krad). The viscous reaction mass was dissolved in sufficient synthetic North Sea water to give a 0.25 weight percent solution of copolymer for viscosity measurements.

The inherent viscosity of the copolymer solution was 6.05 dL/g at 25° C. The unaged viscosity was 1.30 centipoise and the aged viscosity was 1.2 centipoise. This aged viscosity is about 4.3 times the viscosity of sea water at 250° F. Copolymers of NaAMPS and VP initiated by irradiation are potentially useful as mobility buffers in hostile environments.

EXAMPLE XXXIII

Preparation of VP/Am Copolymers by Radiation Initiation

This example describes the preparation of VP/Am copolymers [poly(N-vinyl-2-pyrrolidone-co-acrylamide] in synthetic sea water with radiation initiation. The samples of 50/50 wt/wt copolymers were prepared at 20% total solids and the samples of 60/40 wt/wt copolymers were prepared at 30% total solids. The reaction mixtures were charged to crown top bottles, degassed with argon and capped. The bottles were exposed to gamma radiation from a $Co^{60}$ source at the intensity and dosage noted in Table XL below. Polymerization was signaled by warming of the reaction mixture (reaction exotherm) and the thickening of the reaction mass to a gel.

The gelled reaction masses were individually dissolved in synthetic sea water to give 1000 ppm copolymer solutions for determining relative and inherent viscosities at 25° C. Additional copolymer solutions were prepared at 2500 ppm for thermal aging study. The relative and inherent viscosities were determined from measurements made in a capillary viscometer. The unaged viscosities of the 2500 ppm copolymer solutions were determined by high pressure capillary viscometry at 250° F. The copolymer solutions (2500 ppm) were aged for seven days at 300° F. before determining aged viscosities by high pressure capillary viscometry at 250° F. Results are summarized in Table XL.

TABLE XL

Aging Results on VP/Am (Radiation Initiated) Copolymers Aged in Synthetic North Sea Water

| Wt/Wt VP/Am | % Total Solids | K-Value | Intensity Krad/hr | Dose Krad | Inherent Viscosity (dL/g) | Viscosity (cP) 250 F. (2500 ppm) Unaged | Aged |
|---|---|---|---|---|---|---|---|
| 50/50 | 20 | 204 | 24 | 14 | 7.46 | 1.93 | 0.80 |
| 50/50 | 20 | 213 | 100 | 40 | 8.13 | 1.86 | 0.93 |
| 60/40 | 30 | 200 | 50 | 38 | 7.17 | 1.32 | 0.89 |
| 60/40 | 30 | 199 | 50 | 46 | 7.14 | 1.48 | 0.96 |
| 60/40 | 30 | 190 | 80 | 40 | 6.48 | 1.35 | 0.96 |
| 60/40 | 30 | 204 | 80 | 48 | 7.44 | 1.29 | 0.84 |
| SNSW* | — | — | — | — | — | — | 0.28 |

*SNSW represents synthetic North Sea water.

Referring to the aged viscosities in the above table, it is evident that the copolymer solution values were 3 to 3.5 times the viscosity of synthetic sea water at 250° F. The slightly higher inherent viscosities of the 50/50 copolymers is attributable to the higher percentage of acrylamide units compared to the 60/40 copolymer. The whole range of radiation dosages appear to result in copolymer samples giving approximately the same aged viscosities in the thermal aging tests. In general, these results indicate that the radiation initiated copolymers would be suitable for enhanced oil recovery operations under hostile environment conditions.

EXAMPLE XXXIV

Polymerization With Low Temperature Initiator

In this example the preparation of a series of 60/40 wt/wt N-vinyl-2-pyrrolidone/acrylamide copolymers at different solids level is described. The copolymerization was initiated by VAZO® 33 [2,2'-azobis(2,4-dimethyl-4-methoxyvaleronitrile)] in the range of 0.05 to 0.10 phm.

The polymer samples were characterized by determining relative and inherent viscosities of polymer solutions (1000 ppm) in synthetic sea water at 25° C. The unaged viscosities of the polymer (2500 ppm) in synthetic sea water were determined by high pressure capillary viscometer at 250° F. Polymer solutions (2500 ppm) were aged for 7 days at 300° F. before determining aged viscosities by high pressure capillary viscometry at 250° F. Results are summarized in the table below.

TABLE XLI

Aging Results on VAZO® 33 Initiated 60/40 Wt/Wt Copolymers of N-Vinyl-2-Pyrrolidone and Acrylamide in Synthetic North Sea Water (0.05 phm Initiator Level)

| % Total Solids | Relative Viscosity | Inherent Viscosity (dL/g) | Viscosity (cP) 250° F. (2500 ppm) Unaged | Aged |
|---|---|---|---|---|
| 5.0$^a$ | 2.10 | 7.42 | 1.57 | 0.84 |
| 9.1 | 1.99 | 6.87 | 0.98 | 0.87 |
| 15.0 | 1.99 | 6.87 | 1.09 | 0.83 |
| 20.0 | 2.07 | 7.29 | 1.17 | 0.91 |
| 25.0 | 2.05 | 7.16 | 1.10 | 0.85 |
| 30.0 | 1.92 | 6.55 | 0.95 | 0.72 |
| SNSW* | 1.00 | — | — | 0.28 |

*SNSW represents synthetic North Sea water.
$^a$In this run VAZO® 33 was used at 0.1 phm.

Referring to the results in the above table, it can be seen that the VP/Am copolymers performed well in the thermal aging test exhibiting aged viscosities on the order of 2.5 to 3.5 times the viscosity of synthetic sea water at 250° F.

EXAMPLE XXXV

N-Vinyl-2-Pyrrolidone/N,N-Dimethylacrylamide/Sodium 2-Acrylamido-2-Methylpropanesulfonate Polymers This example describes the preparation of polymers of NaAMPS, VP and DMAm using VAZO® 33 as the initiator (0.10 phm). Appropriate quantities of monomers were used to prepare NaAMPS/VP/DMAm polymers of the following compositions: 25/10/65 and 15/15/60. Reaction time was 24 hours at ambient temperature and the total solids level was 20%.

The gelled reaction masses were individually mixed with sufficient synthetic North Sea water to prepare 0.1 weight percent and 0.25 weight percent solutions for viscosity measurements. The results are summarized in Table XLII.

TABLE XLII

Aging Results on NaAMPS/VP/DMAm Polymers Aged in Synthetic North Sea Water

| Wt/Wt/Wt VP/DMAm/NaAMPS | Inherent Viscosity (dL/g) | Viscosity (cP) 250 F. (2500 ppm) | |
|---|---|---|---|
| | | Unaged | Aged |
| 25/10/65 | 6.70 | 1.24 | 1.05 |
| 25/15/60 | 6.88 | 1.26 | 0.95 |

Referring to the viscosity results in Table XLII, it is evident that the polymers would be useful as mobility buffers in hostile environments because the aged viscosities are about 3.3 to 3.8 times the viscosity of sea water at 250° F.

EXAMPLE XXXVI

VP/DMAm (50/50) and (40/60) Polymers and VP/Am/DMAm Polymers

This example describes the preparation and testing of N-vinyl-2-pyrrolidone/N,N-dimethylacrylamide polymers and N-vinyl-2-pyrrolidone/acrylamide/N,N-dimethylacrylamide polymers. The copolymers were prepared in synthetic North Sea water, respectively, at 9.1% and 20% total solids, with 0.10 phm VAZO® 33 initiator. Two polymers: 47.5/47.5/5 VP/Am/DMAm and 45/45/10 VP/Am/DMAm were similarly prepared and tested.

The gelled reaction masses were individually mixed with sufficient synthetic sea water to prepare 0.1 weight percent and 0.25 weight percent solutions for viscosity measurements. The results are summarized in Table XLIII.

TABLE XLIII

Aging Results on VP/DMAm Copolymers and VP/Am/DMAm Polymers Aged in Synthetic North Sea Water

| Wt/Wt/Wt VP/Am/DMAm | Inherent Viscosity (dL/g) | Viscosity (cP) 250° F. (2500 ppm) | |
|---|---|---|---|
| | | Unaged | Aged |
| 40/0/60 | 6.12 | 0.60 | 0.64 |
| 50/50/0 | 8.70 | 1.78 | 0.75 |
| 47.5/47.5/5 | 7.96 | 1.60 | 0.80 |
| 45/45/10 | 8.10 | 1.62 | 0.67 |
| 50/0/50 | 5.83 | 0.68 | 0.73 |

Referring to the results in Table XLIII, it can be seen that the compositions listed are suitable for use as mobility buffers in hostile environments because the aged viscosities are on the order of 2 to 3 times the viscosity of sea water at 250° F.

EXAMPLE XXXVII

N,N-Dimethylacrylamide/Sodium 2-Acrylamido-2-Methylpropanesulfonate Copolymers

This example describes the preparation and testing of copolymers of DMAm and NaAMPS using VAZO® 33 as the initiator (0.10 phm). The copolymerizations were carried out in distilled water at ambient temperatures for a period of 24 hours. The following DMAm/NaAMPS copolymers were prepared: 60/40; 70/30; and 80/20.

The gelled reaction masses were mixed individually with sufficient synthetic North Sea water to prepare 0.1 weight percent and 0.25 weight percent solutions for viscosity measurements. The results are summarized in Table XLIV.

TABLE XLIV

Aging Results on DMAm/NaAMPS Copolymers Aged in Synthetic North Sea Water

| Wt/Wt DMAm/NaAMPS | Inherent Viscosity (dL/g) | Viscosity (cP) 250° F. (2500 ppm) | |
|---|---|---|---|
| | | Unaged | Aged |
| 40/60 | 8.48 | 2.08 | 0.86 |
| 30/70 | 7.85 | 2.07 | 1.37 |

The results in Table XLIV indicate that the DMAm/NaAMPS copolymers are potentially useful as mobility control agents in hostile environments because the aged viscosities of 3 to 5 times the viscosity of sea water at 250° F. indicates excellent stability. In a related experiment, a 25/75 acrylamide/NaAMPS copolymer failed the thermal aging test (aged viscosity 0.33 cP). However, a 10/90 acrylamide/NaAMPS copolymer solution exhibited an aged viscosity of 0.53 cP which is about 2 times the viscosity of sea water at 250° F.

EXAMPLE XXXVIII

VP/AM/NaAMPS Polymers

This example presents in tabular form (see Table XLV) a variety of VP/Am/NaAMPS polymer compositions which performed well enough in thermal aging tests to merit consideration as mobility control agents in hostile environments.

TABLE XLV

Aging Results on Representative VP/Am/NaAMPS Polymers Aged in Synthetic North Sea Water

| Wt/Wt/Wt VP/Am/NaAMPS | Inherent Viscosity (dL/g) | Viscosity (cP) 250° F. (2500 ppm) | |
|---|---|---|---|
| | | Unaged | Aged |
| 30/15/55 | 9.01 | 2.19 | 1.85 |
| 30/15/55 | 8.38 | 2.08 | 1.40 |
| 50/25/25 | 8.19 | 1.56 | 1.28 |
| 25/10/65 | 7.98 | 1.65 | 1.20 |
| 35/25/40 | 7.97 | 1.76 | 1.09 |
| 30/23/47 | 8.05 | 2.20 | 1.05 |
| 30/20/50 | 7.98 | 1.90 | 0.99 |
| 50/45/5 | 8.70 | 1.73 | 0.99 |
| 50/43/7 | 8.19 | 1.77 | 0.93 |
| 42.5/50/7.5 | 5.35 | 1.37 | 0.34 |

The last entry in Table XLV is a 42.5/50/7.5 VP/Am/NaAMPS polymer which performed very poorly in the thermal aging test (aged viscosity 0.34 cP; the viscosity of sea water at 250° F. is about 0.28 cP). Part of this lack of thermal stability is believed related to the weight ratio of VP to Am in the polymer. Part is believed related to something which went wrong during the sample preparation. This polymer would be useful in lower temperature applications. It should be noted that in the first nine entries of Table XLV which all performed well in the thermal aging tests the polymers contained >1:1 wt/wt ratio of VP:Am. The last polymer entry in the table contained <1:1 wt/wt ratio of VP:Am.

EXAMPLE XXXVIX

Potassium styrene Sulfonate/N,N-Dimethylacrylamide Copolymer

This example describes the preparation and testing of a 30/70 weight percent potassium styrene sulfonate/N,N-dimethylacrylamide copolymer. The sample was prepared using practical grade potassium styrene sulfonate (4-vinyl benzene sulfonic acid potassium salt) available from Tridom Chemical Inc/Fluka A. G. Copolymerization was carried out at 35% total solids in distilled water with VAZO ® 33 initiator at ambient temperature for a period of 24 hours.

The gelled reaction mass was mixed with sufficient synthetic North Sea water to prepare 0.1 weight percent and 0.25 weight percent solutions for viscosity measurements. An inherent viscosity of 3.44 dL/g and an aged viscosity of 0.77 cP were measured on the 0.1 weight percent and 0.25 weight percent solutions respectively.

EXAMPLE XL

Inverse Emulsion Polymerization For Preparing Hostile Environment Polymers

This example describes the preparation of poly(-sodium 2-acrylamido-2-methylpropanesulfonate) (NaAMPS homopolymer), poly(N-vinyl-2-pyrrolidone-co-sodium 2-acrylamido-2-methylpropanesulfonate) (VP/NaAMPS copolymer) and poly(N-vinyl-2-pyrrolidone-co-acrylamide-co-sodium 2-acrylamido-2-methyl-propanesulfonate) (VP/Am/NaAMPS polymer) by inverse emulsion polymerization.

The recipes for the polymerizations are summarized in Table XLVI.

TABLE XLVI

Receipes For Inverse Emulsion Polymerizations
(Reaction Temperature 5° C.; Reaction Time 120 Hours)

| Sample No. | Toluene (g) | $H_2O$ (g) | Tetronic 1102 (g) | VP (g) | Am (g) | 50 Wt % AQ.NaAMPS | Wt/Wt/Wt VP/Am/NaAMPS |
|---|---|---|---|---|---|---|---|
| 1[a] | 40 | 20 | 5 | 9 | 4.5 | 33 | 30/15/55 |
| 2[a] | 40 | 16.5 | 5 | 10 | 0 | 40 | 33/0/67 |
| 3[a] | 40 | 6.5 | 0 | 0 | 0 | 60 | 0/0/100 |

[a]The initiator was VAZO ® 33 (0.20 phm) and the surfactant was a propoxylated ethoxylated ethylenediamine available from BASF Wyandotte under the tradename Tetronic 1102.

The above reaction charges were placed in individual 10 ounce crown top bottles to prepare, respectively, VP/Am/NaAMPS (30/15/55) polymer, VP/NaAMPS (33/67) polymer and NaAMPS homopolymer by inverse emulsion polymerization. The necessary amount of VAZO ® 33 was added as an aliquot of a stock solution of initiator in toluene. The surfactant was dissolved in toluene and added to the reactor bottle followed by the specified amounts of monomers and water. After degassing the reaction mixture for 20 minutes with argon, the bottle was capped and tumbled for about 5 days in a 5° C. constant temperature bath. The reaction products were milky fluids.

Portions of the milky fluids were individually mixed with sufficient synthetic North Sea water to give 0.1 wt % and 0.25 wt % solutions for viscosity measurements. The results are shown in Table XLVII.

TABLE XLVII

Aging Results in Synthetic North Sea Water With Polymers Prepared by Inverse Emulsion Polymerization

| Sample No. | Wt/Wt/Wt VP/Am/NaAMPS | Inherent Viscosity (dL/g) | Viscosity (cP) 250 F. (2500 ppm) Unaged | Aged |
|---|---|---|---|---|
| 1 | 30/15/55 | 9.31 | 2.66 | 0.99 |
| 2 | 33/0/67 | 6.22 | 1.56 | 1.06 |
| 3 | 0/0/100 | 6.17 | 1.52 | 0.94 |

Referring to the results in Table XLVII, it is apparent that the disclosed polymers prepared by emulsion polymerization are potential candidates for mobility control agents in hostile environments because of their enhanced thermal stability indicated by the fact that their aged viscosities were on the order of 3 to 4 times the viscosity of seawater at 250° F.

FURTHER EXPERIMENTAL

EXAMPLE XLI

This example describes the preparation and thermal aging testing of two polymers prepared, respectively, by the copolymerization of N-methyl-N-vinyl acetamide (NMVA) with acrylamide (Am) and by the terpolymerization of NMVA with Am and sodium 2-acrylamido-2-methylpropanesulfonate (NaAMPS).

Appropriate quantities of monomers were used to prepare the NMVA/Am 50/50 wt/wt copolymer and the NMVA/Am/NaAMPS 30/15/55 wt/wt/wt terpolymer. The polymerizations were carried out in accordance with conventional solution polymerization technology using a total solids level of 30% in distilled water at ambient temperature with 0.1 phm of initiator.

The gelled reaction masses were mixed with sufficient synthetic North Sea water to prepare 0.1 weight percent and 0.25 weight percent solutions for solution viscosity measurements. The NMVA/Am 50/50 wt/wt copolymer solution exhibited an inherent viscosity of 11.1 dL/g and an aged solution viscosity of 1.3 centipoise. The NMVA/Am/NaAMPS 30/15/55 wt/wt/wt terpolymer solution exhibited inherent viscosity of 9.6 dL/g and an aged solution viscosity of 1.7 centipoise. In Table XLVIII the performance of these polymers is compared to that of previously described hostile environment (HE) polymers VP/Am 50/50 wt/wt and VP/Am/NaAMPS 30/15/55.

TABLE XLVIII

N-Methyl-N-Vinyl Acetamide Derived Polymers For Use in Hostile Environments

| Run No. | Monomer Units (Wt %) | | | | IV (0.10)[e] SNSW 25° C. | Aged Viscosity[f] SNSW (0.25) |
|---|---|---|---|---|---|---|
| | NMVA[a] | VP[b] | Am[c] | NaAMPS[d] | | |
| 1 | 50 | 0 | 50 | 0 | 11.1 | 1.3 |
| 2* | 0 | 50 | 50 | 0 | 8.9 | 1.2 |
| 3 | 30 | 0 | 15 | 55 | 9.6 | 1.7 |
| 4 | 0 | 30 | 15 | 55 | 8.5 | 1.7 |

*A representative gel log sample of a 50/50 VP/Am copolymer was used in this test.
[a]NMVA represents N-methyl-N-vinyl acetamide.
[b]VP represents N-vinyl-2-pyrrolidone.
[c]Am represents acrylamide.
[d]NaAMPS represents sodium 2-acrylamido-2-methylpropanesulfonate.
[e]IV represents Inherent Viscosity (dL/g) in Synthetic North Sea water.
[f]Aged viscosity is the observed solution viscosity after the solution was aged for one week at 300 F.

Referring to the aged solution viscosity results in runs 1 and 2 of Table XLVIII, it is evident that a solution of the 50/50 wt/wt NMVA/Am copolymer in SNSW exhibited a solution viscosity comparable to that of a solution of the 50/50 wt/wt VP/Am copolymer in SNSW. Perhaps this result reflects the comparable thermal stability of the NMVA/Am and VP/Am copolymers in SNSW solution. This behavior may be attributable to the capacity, respectively, of the NMVA and VP moieties to disproportionately retard the hydrolysis rate of the pendant acrylamide amide function. This is particularly remarkable since these compounds do not have the cyclic lactam structure which has been shown to enhance stability.

Referring to the aged solution viscosity results in runs 3 and 4 of Table XLVIII, it is evident that a solution of the 30/15/55 wt/wt/wt terpolymer in SNSW exhibited thermal stability comparable to that of a solution of the 30/15/55 wt/wt/wt/ VP/Am/NaAMPS terpolymer in SNSW. As indicated above, this result demonstrates the capacity of the NMVA and VP moieties to retard the hydrolysis rate of the pendant acrylamide amide function.

EXAMPLE XLII

This example describes hostile environment polymers derived from methacrylate esters of hydroxyalkanesulfonic acids. This example is divided into three parts to cover (a) the homopolymer of 3-methacryloyloxypropanesulfonic acid and water soluble salts thereof (SPM), (b) copolymers of SPM with (i) N,N-dimethylacrylamide (DMAm), (ii) sodium 2-acrylamido-2-methylpropanesulfonate (NaAMPS), (iii) N-methylacrylamide (NMAm), (iv) N-(methacryloyloxyethyl)-N,N-dimethylaminopropanesulfonate betaine (SPED), (v) potassium 3-acryloyloxypropanesulfonate (SPA) and (vi) N-vinyl-2-pyrrolidone (VP) and (c) terpolymers of SPM with (i) DMAm/NaAMPS, (ii) VP/Am and (iii) VP/NaAMPS.

All of the above polymers were prepared in accordance with conventional solution polymerization technology using total solids levels of 20–45% in distilled water at ambient temperature with about 0.1 phm of initiator. The cited weight percentages of polymer compositions reflects the relative weights of monomers charged to the polymerization zone.

(a) Homopolymers of SPM (potassium 3-methacryloyloxypropane sulfonate)

The gelled reaction masses from the homopolymerization runs were mixed with sufficient synthetic North Sea Water to prepare 0.1 weight percent and 0.25 weight percent solutions for solution viscosity measurements. Test results are summarized in Table XLIX.

TABLE XLIX

| | | SPM Homopolymer Performance In SNSW | | | | |
|---|---|---|---|---|---|---|
| Run No. | % TS* | Units (Wt %) SPM$^a$ | SPA$^b$ | IV (0.1) SNSW 25° C. | Viscosity 250 F. (0.25 SNSW) cP Unaged | Aged |
| 1 | 30 | 100 | 0 | 7.4 | 1.8 | 1.6 |
| 2 | 35 | 100 | 0 | 8.3 | 1.9 | 1.5 |
| 3 | 45 | 100 | 0 | 8.6 | 2.3 | 1.8 |
| 4 | 30 | 0 | 100 | 8.5 | 3.1 | Pptd# |

*% TS represents % Total Solids in the polymerization medium.
$^a$SPM represents potassium 3-methacryloyloxy propanesulfonate.
$^b$SPA represents potassium 3-acryloyloxypropanesulfonate.
SPA homopolymer system failed the thermal aging test (Precipitation).

Referring to runs 1, 2 and 3 in Table XLIX, it is evident that the SPM homopolymer in SNSW provided a solution which retained a significant percentage of its viscosity after thermal aging and the average solution viscosity of the thermally aged solution was 5.7 times that of sea water at 250° F. This behavior indicates that SPM homopolymer is potentially useful in mobility control under hostile environment conditions.

Attention is called to the unexpected result observed in run 4 of Table XLIX. The homopolymer of SPA (the lower homolog of SPM) failed to impart thermally stable viscosity to the solution in the high temperature test: precipitation accompanied the loss of solution viscosity.

(b) Copolymers of SPM
(i) DMAm/SPM (wt/wt): 10/90, 20/80, 30/70, 40/60, 50/50, 65/35, 80/20

TABLE L

| Performance Test Results on DMAm/SPM Copolymers* | | | | |
|---|---|---|---|---|
| Run No. | Monomer Units (Wt %) DMAm$^a$ | SPM$^b$ | IV (0.1) SNSW 25° C. | Viscosity 250 F. (0.25 SNSW) cP Unaged | Aged |
| C | 100 | 0 | NM# | 0.76 | 0.44 |
| 4 | 10 | 90$^c$ | 7.2 | 3.0 | 2.3 |
| 5 | 20 | 80 | 8.0 | 3.2 | 2.2 |
| 6 | 30 | 70 | 8.0 | 3.5 | 2.4 |
| 7 | 40 | 60 | 8.3 | 3.7 | 2.5 |
| 8 | 50 | 50 | 8.8 | 3.4 | 2.5 |
| 9 | 65 | 35 | 8.8 | 2.8 | 1.3 |
| 10 | 80 | 20 | 8.9 | 1.8 | 0.9 |

*Copolymers in runs 4–10 were prepared at 30% Total Solids.
$^a$DMAm represents N,N-dimethylacrylamide.
$^b$SPM represents potassium 3-methacryloyloxypropanesulfonate.
$^c$This copolymer was prepared at 30% Total Solids. Another sample prepared at 40% Total Solids gave an aged viscosity of 2.9 cP.
NM represents Not Measured.

Referring to the results in Table L, it is evident that copolymers of DMAm and SPM, especially those compositions containing 50 or more weight percent SPM are good candidates for mobility control under hostile environment conditions: the average aged solution viscosity, e.g., in runs 4–8 being 8.5 times the viscosity of sea water at 250° F. The homopolymer (see run C) of DMAm in SNSW exhibited an aged solution viscosity which was only about 1.6 times the aged viscosity of sea water at 250° F.

(ii) NaAMPS/SPM (wt/wt): 10/90, 15/85, 25/75, 30/70, 50/50, 65/35

TABLE L

| Performance Test Results on NaAMPS/SPM Copolymers* | | | | |
|---|---|---|---|---|
| Run No. | Monomer Units (Wt %) NaAMPS$^a$ | SPM$^b$ | IV (0.1) SNSW 25° C. | Viscosity 250 F. (0.25 SNSW) cP Unaged | Aged |
| 11 | 10 | 90$^c$ | 6.7 | 2.1 | 1.9 |
| 12 | 15 | 85 | 6.4 | 1.9 | 1.8 |
| 13 | 25 | 75 | 6.2 | 1.8 | 1.6 |
| 14 | 30 | 70 | 6.5 | 1.6 | 0.7 |
| 15 | 50 | 50 | 6.1 | 1.1 | 1.1 |
| 16 | 65 | 35 | 5.3 | 1.2 | 1.1 |

*Copolymers in runs 11–16 were prepared at 30% Total Solids.
$^a$NaAMPS represents sodium 2-acrylamido-2-methylpropanesulfonate.
$^b$SPM represents potassium 3-methacryloyloxypropanesulfonate.
$^c$This copolymer was prepared at 30% Total Solids. Another sample prepared at 35% Total Solids gave an aged solution viscosity of 1.7 cP.
**Viscosity of sea water at 250 F. is about 0.28 cP.

Referring to the results in Table LI, it is evident that copolymers of NaAMPS and SPM over a range of compositions are good candidates for mobility control under hostile environment conditions: the average aged viscosity being about 4.9 times the viscosity of sea water at 250° F.

(iii) NMAm/SPM (wt/wt): 10/90
(iv) SPED/SPM (wt/wt): 30/70
(v) SPA/SPM (wt/wt): 30/70
(Vi) VP/SPM (wt/wt): 20/80, 10/90

TABLE LII

Performance Test Results on NMAm/SPM, SPED/SPM, SPA/SPM and VP/SPM Copolymers*

| Run No. | Monomer Units (Wt %) | | | | | IV (0.1) SNSW 25° C. | Viscosity 250 F. (0.25 SNSW) cP | |
|---|---|---|---|---|---|---|---|---|
| | NMAm[a] | SPED[b] | SPA[c] | SPM[d] | VP[e] | | Unaged | Aged |
| 17 | 10 | 0  | 0  | 90 | 0  | 6.5 | 1.6 | 0.9 |
| 18 | 0  | 30 | 0  | 70 | 0  | 7.6 | 2.4 | 1.2 |
| 19 | 0  | 0  | 30 | 70 | 0  | 6.7 | 1.6 | 1.1 |
| 20 | 0  | 0  | 0  | 80 | 20 | 6.5 | 1.6 | 0.9 |
| 21 | 0  | 0  | 0  | 90 | 10 | 7.5 | 1.6 | 1.3 |

*Copolymers in runs 17-19 were prepared at 30% Total Solids.
[a]NMAm represents N-methylacrylamide.
[b]SPED represents N-(methacryloyloxyethyl)-N,N-dimethylaminopropanesulfonate betaine.
[c]SPA represents potassium 3-acryloyloxypropanesulfonate.
[d]SPM represents potassium 3-methacryloyloxypropanesulfonate.
[e]VP represents N-vinyl-2-pyrrolidone.

Referring to the results in Table LII, it is evident that the various copolymers of SPM are potentially useful in hostile environments because the aged solution viscosities were 3.2 to 4.6 times the viscosity of sea water at 250° F. It is noteworthy that in spite of the fact that the SPM homopolymer is effective a 10/90 Am/SPM copolymer in SNSW on aging at 250° F. was not effective as evidenced by an aged solution viscosity of 0.3 cP which is essentially the same as the viscosity of SNSW at 250° F.

(c) Terpolymers of SPM
(i) DMAm/NaAMPS/SPM (wt/wt): 80/10/10, 60/20/20, 30/30/40, 20/60/20, 15/15/70

TABLE LIII

Performance Test Results on DMAm/NaAMPS/SPM Terpolymers*

| Run No. | Monomer Units (Wt %) | | | IV (0.1) SNSW 25° C. | Viscosity 250 F. (0.25 SNSW) cP | |
|---|---|---|---|---|---|---|
| | DMAm[a] | NaAMPS[b] | SPM[c] | | Unaged | Aged |
| 22 | 80 | 10 | 10 | 9.2 | 2.1 | 0.7 |
| 23 | 60 | 20 | 20 | 8.8 | 3.2 | 1.5 |
| 24 | 30 | 40 | 30 | 7.7 | 2.7 | 1.6 |
| 25 | 20 | 20 | 60 | 8.2 | 3.2 | 2.0 |
| 26 | 15 | 70 | 15 | 6.8 | 1.7 | 1.3 |

*Terpolymers were prepared at 30% Total Solids.
[a]DMAm represents N,N-dimethylacrylamide.
[b]NaAMPS represents sodium 2-acrylamido-2-methylpropanesulfonate.
[c]SPM represents potassium 3-methacryloyloxypropanesulfonate.

Referring to the results in Table LIII, it is evident that the various terpolymers of SPM are potentially useful in hostile environments because the aged solution viscosities were 2.5 to 7 times the viscosity of sea water at 250° F.

(ii) VP/Am/SPM (wt/wt): 50/30/20, 30/10/60, 40/15/45, 40/30/30
(iii) VP/NaAMPS/SPM (wt/wt): 20/60/20

TABLE LIV

Performance Test Results on VP/Am/SPM and VP/NaAMPS/SPM Terpolymers*

| Run No. | Monomer Units (Wt %) | | | | IV (0.1) SNSW 25° C. | Viscosity 250 F. (0.25 SNSW) cP | |
|---|---|---|---|---|---|---|---|
| | VP[a] | Am[b] | NaAMPS[c] | SPM[d] | | Unaged | Aged |
| 27 | 50 | 30 | 0  | 20 | 7.1 | 1.3 | 0.7 |
| 28 | 30 | 10 | 0  | 60 | 7.5 | 2.5 | 0.7 |
| 29 | 40 | 15 | 0  | 45 | 7.2 | 1.5 | 0.6 |
| 30 | 40 | 30 | 0  | 30 | 8.3 | 1.3 | 0.5 |
| 31 | 20 | 0  | 60 | 20 | 7.2 | 1.6 | 1.3 |

*Terpolymers in runs 28-31 were prepared at 30% Total Solids.
[a]VP represents N-vinyl-2-pyrrolidone.
[b]Am represents acrylamide.
[c]NaAMPS represents sodium 2-acrylamido-2-methylpropanesulfonate.
[d]SPM represents potassium 3-methacryloyloxypropanesulfonate.

Referring to the results in Table LIV, it is evident that the various terpolymers of SPM are potentially useful in hostile environments because the aged solution viscosities were about 1.8 to 4.6 times the viscosity of sea water at 250° F. Referring to run 31 in Table LIV, it can be concluded that the 20/60/20 VP/NaAMPS/SPM terpolymer (see aged solution viscosity) performed better than the VP/Am/SPM terpolymers of runs 27-30.

EXAMPLE XLIII

This example describes the use of selected hostile environment polymers as high temperature high pressure water loss control agents in drilling muds. The following polymers were tested as water loss control agents:

(a) Poly(N-vinyl-2-pyrrolidone-co-sodium 2-acrylamido-2-methylpropanesulfonate) (VP/NaAMPS) (10/90 wt/wt)

(b) Poly(N-vinyl-2-pyrrolidone-co-acrylamide-co-sodium 2-acrylamido-2-methylpropanesulfonate) (VP/Am/NaAMPS) (30/15/55 wt/wt/wt)

(c) Poly(N-vinyl-2-pyrrolidone-co-acrylamide-co-sodium 2-acrylamido-2-methylpropanesulfonate-co-sodium acrylate) (VP/Am/NaAMPS/NaAA)

Polymer samples received as gel logs were diluted to four percent solutions to assure good dispersion in muds. The high solids muds were cooled to ambient temperature and allowed to stand for 2 hours before any tests were carried out. Plastic viscosity (PV), yield point (YP), gel strength (Gels) and water loss at room temperature (RTWL mL/30 min) were determined in accordance with API RP 13B.

After the initial tests, the mud samples were aged at a specified temperature for 16 hours before repeating the above tests. The most severe test carried out on the muds was a water loss test at 325° F. and 500 psi (HTWL, High Temperature Water Loss).

The tests were carried out in 12.2 lb/gal saltwater muds. The base mud contained 2.7 percent bentonite, 9.15 percent P95 illite clay and 30 percent barite in 4 percent salt water. An additional 20 lb/bbl salt was added after treatment with 5 lb/bbl Tannathin lignite, 2 lb/bbl Desco ® thinner, NaOH and polymer. The tests were carried out as described in the previous example. Results are summarized in Table LVI.

TABLE LVI

Comparison of 10/90 VP/NaAMPS HTWL Additive With Commercial Additives (2 lb/bbl Additive)

| Additive | Run No. | Initial Properties | | | | Final Properties (aged 16 Hrs @ 360 F.) | | | | |
|---|---|---|---|---|---|---|---|---|---|---|
| | | PV$^a$/YP$^b$ | Gels$^c$ | pH | WL$^d$ | PV$^a$/YP$^b$ | Gels$^c$ | pH | WL$^d$ | HTWL$^e$ |
| 10/90 VP/NaAMPS | 1 | 29/36 | 18/53 | 10.2 | 4.7 | 27/51 | 20/58 | 7.4 | 6.1 | 26.0 |
| Base Mud | 2 | 10/13 | 12/33 | 10.4 | 27.0 | 9/20 | 14/19 | 7.7 | 46.0 | NM# |
| Milchem Kem Seal | 3 | 21/22 | 13/48 | 10.5 | 5.9 | 21/22 | 5/30 | 7.5 | 7.7 | 36.0 |
| Baroid Therma-Chek | 4 | 15/6 | 2/12 | 10.2 | 7.1 | 12/13 | 3/15 | 7.5 | 18.5 | 80.0 |
| Imco Duralon | 5 | 12/8 | 1/8 | 9.8 | 7.0 | 13/9 | 2/11 | 7.2 | 16.3 | 78.0 |
| Nat'l Starch Versa TL 600 | 6 | 11/16 | 13/48 | 10.2 | 11.6 | 13/21 | 22/40 | 7.6 | 16.9 | 35.0 |
| Henkel Rheothik 80-11 | 7 | 19/22 | 16/36 | 10.2 | 18.4 | 22/20 | 2/5 | 7.4 | 6.2 | 25.0 |
| Hoechst Hostadrill 2825 | 8 | 15/6 | 1/8 | 9.9 | 5.7 | 13/7 | 2/9 | 7.1 | 13.7 | 70.0 |
| Hostadrill V3118 | 9 | 14/3 | 1/7 | 9.7 | 7.0 | 15/8 | 1/8 | 7.0 | 9.6 | 46.0 |

NM represents Not Measured.
$^{a-e}$See footnotes a, b, c, d and e in Example XLIII (Table LV).

Referring to the results in Table LVI, it is evident that the 10/90 VP/NaAMPS copolymer additive in run 1 imparted better water loss control properties both at ambient temperature (WL values) and at elevated temperature (HTWL values) than did the commercially available additives of runs 3, 4, 5, 6, 8 and 9. The commercial additive in run 7 proved to be comparable in performance to the 10/90 VP/NaAMPS copolymer.

TABLE LV

Hostile Environment Polymers To Control Water Loss in 12.2 lb/gal Saltwater Mud*
(2 lb/bbl polymer)

| Polymer Additive | Run No. | Initial Properties | | | | Final Properties (aged 16 Hrs @ 360 F.) | | | | |
|---|---|---|---|---|---|---|---|---|---|---|
| | | PV$^a$/YP$^b$ | Gels$^c$ | pH | WL$^d$ | PV$^a$/YP$^b$ | Gels$^c$ | pH | WL$^d$ | HTWL$^e$ |
| VP/NaAMPS (10/90) | 1 | 32/56 | 25/65 | 9.7 | 4.0 | 29/53 | 22/53 | 7.3 | 6.2 | 22.0 |
| VP/Am/NaAMPS (30/15/55) | 2 | 19/13 | 7/56 | 10.1 | NM# | 21/33 | 12/78 | 7.4 | 6.5 | 29.0 |
| VP/Am/NaAMPS/NaAA (30/10/55/5) | 3 | 20/50 | 38/95 | 10.1 | 3.6 | 23/57 | 23/98 | 7.4 | 5.6 | 27.0 |

NM represents Not Measured.
$^a$PV represents Plastic Viscosity, centipoise.
$^b$YP represents Yield Point, lb/100 ft$^2$.
$^c$Gels represent Gel Strength, 10 sec/10 min, lb/100 ft$^2$.
$^d$WL represents Water Loss (mL/30 min; @ ambient temperature).
$^e$HTWL represents High Temperature Water Loss (mL/30 min; @ 325 F. and 500 psi). The thermally aged sample (16 hrs @ 360 F.) was cooled to ambient temperature and Water Loss was determined at room temperature (see values under WL on right hand side of Table VIII). A thermally aged sample was then taken to 325 F. and 500 psi to determine the HTWL values.
*Saltwater mud contained 2.7 percent bentonite, 9.15 percent P95 illite clay and 30 percent barite in 4 percent salt water. An additional 10 lb/bbl NaCl was added after treatment with 5 lb/bbl Tannathin lignite, 2 lb/bbl Desco ® thinner, NaOH and polymer.

Referring to the water loss values in Table LV, it is evident that the mud system of run 1 containing the 10/90 VP/NaAMPS copolymer additive was somewhat more effective than the polymer additives of runs 2 and 3 for controlling water loss particularly at high temperature.

EXAMPLE XLIV

This example compares the performance of poly(N-vinyl-2-pyrrolidone-co-sodium 2-acrylamido-2-methylpropanesulfonate) (VP/NaAMPS) (10/90 wt/wt) in drilling muds with the performance of several commercially available drilling mud additives.

EXAMPLE XLV

This example describes the modification of VP and/or AMPS copolymers or terpolymers with acrylic acid in order to incorporate sufficient carboxylic acid groups in the polymer structure so that gelation of these polymers, i.e., crosslinking of these polymers with polyvalent metal cations such as Cr(III), is facilitated. Incorporation of the acrylic acid units into the polymer is preferably carried out by copolymerizing acrylic acid with the appropriate monomers to produce "acrylic acid modified" polymers such as, e.g., poly(N-vinyl-2-pyrrolidone-co-acrylamide-co-sodium 2-acrylamido-2-methylpropanesulfonate-co-acrylic acid) (30/10/55/5)

(VP/Am/NaAMPS/AA) and poly(N-vinyl-2-pyrrolidone-co-acrylamide-co-acrylic acid) (50/45/5) (VP/Am/AA).

These acrylic acid modified polymers were prepared in accordance with conventional solution polymerization technology using total solids levels of 20–30% in distilled water at ambient temperature with about 0.1 phm of initiator. The cited weight percentages in the polymer compositions reflect the relative weights of monomers charged to the polymerization zone, e.g., the 50/45/5 VP/Am/AA polymer was prepared by charging, respectively, 50, 45 and 5 parts by weight of VP, Am and AA to the polymerization zone.

The dichromate-thiosulfate redox couple was used in the laboratory experiments to demonstrate the gelation of the acrylic acid modified polymers. The Cr(III) crosslinking agent is generated from the redox couple as indicated by either of the equations:

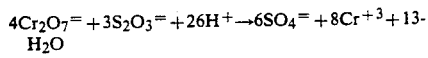

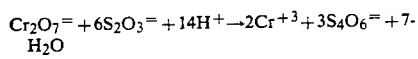

The polyvalent metal cation crosslinking agent presumably coordinates with the pendant carboxylic acid groups. It is contemplated that acrylic acid modified polymers can be gelled with other conventional crosslinking agents such as, e.g., chromium(III) propionate, aluminum citrate, chromium(III) acetate, chromium(III) citrate and the like as well as other known redox couples such as dichromate-bisulfite and the like.

In the experimental test runs, stock solutions of dichromate, thiosulfate and acrylic acid modified polymer were used to charge the respective components to the gelation vessel. In order to maintain anaerobic test conditions, capped 10 ounce pop bottles were used as gelation vessels. Three hole metal caps with rubber seals provided a means for injecting reagents into the vessel and withdrawing samples from the vessel with syringes thereby minimizing contact of the system with oxygen. Laboratory manipulations were routinely carried out in a glove box with an inert gas atmosphere such as helium or nitrogen to further minimize the possibility of contact with oxygen. The pop bottles containing the aqueous test mixtures of polymer, dichromate and thiosulfate were incubated at a specified temperature such as 120° F. At specified time intervals, pop bottles were removed from the constant temperature or incubation zone and examined for the extent of gelation before returning the vessel for further incubation.

As the work progressed, it was established that procedures could be done at the lab bench provided that all systems were purged with an inert gas before capping the bottles and all transfers of materials were made by syringe.

Gels were qualitatively evaluated by noting the tendency of the gels to flow as reflected by tongue length measurements. Zero on the tongue length scale being defined by the fluid level in the bottle when the bottle is in the upright position. Initial tongue length measurements were taken to the nearest sixteenth of an inch with the bottle in a horizontal position. If the gel fluid touched the inside of the bottle cap with the bottle in a horizontal position, the fluid was considered not gelled (NG). In the horizontal position, tongue lengths of 4 to 5 inches were considered light to very light gels. These are gel systems that still flowed quite readily but the "gel tongue" did not contact the cap when the bottle was in the horizontal position. As gelation progressed, the measured tongue length became shorter.

As the gel assumed a firmer character, the bottle was tilted downward 15° from the horizontal before measuring the tongue length. Tongue lengths of 0 to 2 inches were considered hard gels; tongue lengths of 2 to 4 inches were considered medium gels; and tongue lengths of 4 to 5½ inches were considered light gels.

The dichromate stock solution was prepared by dissolving 20 grams of $Na_2Cr_2O_7.2H_2O$ in sufficient water to give 100 mL of stock solution. The polymer stock solution was prepared by dissolving sufficient polymer in water to give a 1 weight percent solution of polymer (active basis). The thiosulfate stock solution was prepared by dissolving 50 grams of $Na_2S_2O_3.5H_2O$ in sufficient water to give 100 mL of solution.

One hundred gram portions of the polymer solution were usually used in the test runs. A test level of 600 ppm $Na_2Cr_2O_7.2H_2O$ required the addition of 0.3 mL of the dichromate stock solution. A sufficient amount of the thiosulfate stock solution was added to the system so that the ppm ratio of $Na_2S_2O_3.5H_2O$ to $Na_2Cr_2O_7.2H_2O$ was on the order of 5:1, viz., about 3000 ppm reductant to 600 ppm oxidant. Synthetic Arkansas-Burbank river water was used in the preparations of all the experimental solutions. In many runs, the dichromate level was increased to 1200 ppm and the thiosulfate level was increased to 6000 ppm.

Representative gel test results are summarized in Tables LVII and LVIII.

Referring to the results in Table LVII, it is evident that the unmodified VP/Am (50/50) polymer failed to gel in the fresh water medium at 120° F. (run 1). Apparently this was due to the lack of carboxyl groups in the polymer.

Referring to runs 2 through 5, it is evident that the polymers gelled apparently due to the presence of pendant carboxylic acid groups on the acrylic acid units. In run 3, the concentration of dichromate and thiosulfate were doubled relative to the concentrations used in run 2 resulting in the formation of hard gel in a short time (1 day) at the higher concentration. The VP/Am/AA (50/45/5) system (run 4) produced a hard gel (H) in 2 days whereas the VP/Am/AA (50/40/10) system (run 5) required 8 days for the formation of a hard gel.

Referring to the results in Table LVIII, it is evident that the unmodified VP/Am/NaAMPS (30/15/55) polymer failed to gel in the fresh water medium at 120° F. (run 6). Presumably this was due to the lack of carboxyl groups in the polymer. Referring to runs 7-11, it is evident that polymers bearing the carboxylic acid groups on the acrylic acid units were gelable under the conditions of the test. Runs 9 and 11 (compared to 8 and 10) indicate that gelation was more extensive if the dichromate and thiosulfate concentrations were doubled. Referring to runs 10 and 11, it appears that polymers with higher levels of acrylic acid are less readily gelled. Higher concentration levels of the redox components may be necessary at the higher acrylic acid loadings. Presently, it is preferred that the acrylic acid monomer level be in the range of 1 to 15 weight percent.

TABLE LVII

Gelation* Studies On Acrylic Acid Modified VP$^a$/Am$^b$ Polymer (Fresh Water 120 F.)

| Polymer | Run No. | Character of Gel$^d$ Period of Days | | | | | | | | | | | | | | |
|---|---|---|---|---|---|---|---|---|---|---|---|---|---|---|---|---|
| | | <1 | 1 | 2 | 3 | 4 | 8 | 14 | 16 | 22 | 23 | 27 | 31 | 34 | 42 | 50 | 65 |
| VP$^a$/Am$^b$ (50/50) | 1 | L | L | L | L | | L | L | | | L | L | | | | | |
| VP/Am/AA (50/49/1) | 2 | L | M | M | M | M | M | | M | M | | | | M | | M | |
| VP/Am/AA# (50/49/1) | 3 | L | H | H | H | H | H | | H | H | | | | H | | H | |
| VP/Am/AA (50/45/5) | 4 | | M | H | H | H | H | | H | H | | | | H | | H | |
| VP/Am/AA (50/40/10) | 5 | | L | L | M | | H | H | | H | H | | | H | | H | H |

*The redox couple of sodium dichromate (oxidant) and sodium thiosulfate (reductant) was used as the gelling system (600 ppm oxidant; 2880 ppm reductant).
In this run 1200 ppm oxidant and 5760 ppm reductant was used.
$^a$VP represents N-vinyl-2-pyrrolidone.
$^b$Am represents acrylamide.
$^c$AA represents acrylic acid.
$^d$Gels are characterized as hard (H), medium (M) and light (L). The tongue length ranges for these designations are, respectively, 0 to 2 inches, 2 to 4 inches and 4 to 5¼ inches in a 10 ounce bottle tilted downward 15° below horizontal. In the horizontal position, tongue lengths of 3 to 5¼ inches are designated as light (L) gels. Firm gels which peeled away from the walls of the pop bottle but otherwise maintained their integrity during the test were still considered or designated as H gels.

TABLE LVIII

Gelation* Studies On Acrylic Acid Modified VP$^a$/Am$^b$/NaAMPS$^c$/AA$^e$ terpolymer (Fresh Water 120 F.)

| Polymer | Run No. | Character of Gel$^d$ Period of Days | | | | | | | | | | | | | |
|---|---|---|---|---|---|---|---|---|---|---|---|---|---|---|---|
| | | <1 | 1 | 2 | 3 | 4 | 8 | 14 | 16 | 22 | 23 | 27 | 31 | 34 | 42 | 90 | 128 |
| VP/Am/NaAMPS (30/15/55) | 6 | L | L | L | L | L | L | L | | | | L | L | | L | L | | |
| VP/Am/NaAMPS/AA (30/14/55/1) | 7 | L | | | | H | H$^f$ | H$^g$ | | H | | H | | H | | H$^i$ | |
| VP/Am/NaAMPS/AA (30/10/55/5) | 8 | L | L | | L | M | M | | H | H | | | H | | H | H | H |
| VP/Am/NaAMPS/AA# (30/10/55/5) | 9 | L | M | | H | H | H | | H | H | | | H | | H | | |
| VP/Am/NaAMPS/AA (30/15/55/10) | 10 | NG$^k$ | NG | NG | NG | | NG | | NG | NG | | | | | L$^m$ | | |
| VP/Am/NaAMPS/AA# (30/5/55/10) | 11 | NG | NG | NG | NG | L | | L | M | | | | | | H$^m$ | | |

*See * footnote in Table LVII.
See # footnote in Table LVII.
$^{a,b}$See footnotes a and b in Table LVII.
$^c$NaAMPS represents sodium 2-acrylamido-2-methylpropanesulfonate.
$^d$See footnote d in Table LVII.
$^e$AA represents acrylic acid.
$^f$Seven days.
$^g$Twelve days: Hard gel (H) had peeled from walls of bottle but the gel exhibited no syneresis.
$^i$Seventy-four days: Same condition as footnote g.
$^k$NG represents not gelled: fluid flowed to bottle cap in horizontal orientation of the bottle.
$^m$Fifty-three days.

EXAMPLE XLVI

This example describes the modification of polymers with sodium acrylate in order to incorporate sufficient carboxylate groups in the polymer structure so that gelation of these polymers, i.e., crosslinking of these polymers with polyvalent metal cations such as Cr(III), is facilitated. Incorporation of the sodium acrylate units into the polymer is preferably carried out by copolymerizing sodium acrylate with the appropriate monomers to produce "sodium acrylate modified" polymers such as, e.g., poly(N-vinyl-2-pyrrolidone-co-acrylamide-co-sodium 2-acrylamido-2-methylpropanesulfonate-co-sodium acrylate) (30/10/55/5) (VP/Am/NaAMPS/NaAA) and poly(N-vinyl-2-pyrrolidone-co-acrylamide-co-sodium acrylate) (50/45/5) (VP/Am/NaAA), and poly(N-vinyl-2-pyrrolidone-co-sodium 2-acrylamido-2-methylpropanesulfonate-co-sodium acrylate) (VP/NaAMPS/NaAA) (30/50/10).

These sodium acrylate modified polymers were prepared in accordance with conventional solution polymerization technology using total solids levels of 20–40% in distilled water at ambient temperature with about 0.1 phm initiator. The cited weight percentages in the polymer compositions reflect the relative weights of monomers charged to the polymerization zone, e.g., the 50/45/5 VP/Am/NaAA polymer was prepared by charging, respectively, 50, 45 and 5 parts by weight of VP, Am and NaAA to the polymerization zone. It was highly preferred to use aliquots of a 25 weight percent aqueous solution of sodium acrylate for introducing the desired amount of NaAA. Alternatively, the proper relative amounts of VP, Am and acrylic acid could be charged to the polymerization zone and the pH adjusted to convert the acrylic acid to sodium acrylate prior to the polymerization. The experimental procedures described in Example XLV were used in this example to prepare and evaluate the gels derived from sodium acrylate modified polymers. Results are summarized in Tables LIX and LX.

dium acrylate modified polymers were gelable under the test conditions. The slower gelation rate observed in

TABLE LIX

Gelation* Studies On Sodium Acrylate Modified VP$^a$/Am$^b$ Polymer (Fresh Water 200 F.)

| Polymer | Run No. | Character of Gel$^d$ Period of Days | | | | | | | | | | | | | |
|---|---|---|---|---|---|---|---|---|---|---|---|---|---|---|---|
| | | <1 | 1 | 2 | 5 | 6 | 8 | 11 | 14 | 16 | 21 | 24 | 29 | 41 | 42 | 47 | 71 |
| VP/Am (50/50) | 12 | | | | | | | | NG$^f$ | | | | | | | | |
| VP/Am/NaAA$^c$ (50/49/1) | 13 | H | H | H | | H | | | H | H | | | | H | | H | |
| VP/Am/NaAA (50/40/10) | 14 | H | H | | H | H | H | | | H | H | | H | | | H | |
| VP/Am/NaAA (50/30/20) | 15 | L | M | | H | H | H | | | H | H | | H | | | H | |
| VP/Am/NaAA (50/10/40) | 16 | NG$^e$ | NG | NG | | | | H | | H | | H | | H | | | |

*The redox couple of sodium dichromate (oxidant) and sodium thiosulfate (reductant) was used as the gelling system (1200 ppm oxidant; 6000 ppm reductant).
$^{a,b}$See footnotes a and b in Example XLV (Table LVII).
$^c$NaAA represents sodium acrylate.
$^d$See footnote d in Example XLV (Table LVII).
$^e$NG represents Not Gelled: fluid flowed to bottle cap when bottle was positioned in a horizontal orientation.
$^f$Not gelled (NG) after 14 days in fresh water @ 200 F.; not gelled (NG) after 14 days in Synthetic North Sea water @ 200 F.

TABLE LX

Gelation* Studies On Sodium Acrylate Modified VP$^a$/Am$^b$/NaAMPS$^c$/AA$^e$ terpolymer (Fresh Water 200 F.)

| Polymer | Run No. | Character of Gel$^d$ Period of Days | | | | | | | | | | | | | |
|---|---|---|---|---|---|---|---|---|---|---|---|---|---|---|---|
| | | <1 | 1 | 2 | 4 | 5 | 9 | 18 | 25 | 35 | 38 | 61 | 64 | 71 | 90 | 93 | 100 |
| VP/Am/NaAMPS (30/15/55) | 18 | | | | | | NG$^g$ | | | | | | | | | | |
| VP/Am/SA$^c$/NaAA (30/10/55/5) | 19 | M | H | H | H | | | M | | M | | | | M | | | M |
| VP/Am/SA/NaAA (30/10/50/10) | 20 | M | H | H | H | | H | H | | | M | M | | | M | | |
| VP/Am/SA/NaAA (30/10/40/20) | 21 | NG$^f$ | NG | | | H | | | H | H | H | | | H | | | |
| VP/SA/NaAA (30/60/10) | 22$^h$ | L | | H | | | | H$^i$ | | | | | | | | | H$^j$ |

*The redox couple of sodium dichromate (oxidant) and sodium thiosulfate (reductant) was used as the gelling system (1200 ppm oxidant; 6000 ppm reductant).
$^{a,b}$See footnotes a and b in Example XLV (Table LVII).
$^c$SA and NaAMPS represent sodium 2-acrylamido-2-methylpropanesulfonate.
$^d$See footnote d in Example XLV (Table LVII).
$^e$NaAA represents sodium acrylate.
$^f$NG represents Not Gelled: fluid flowed to bottle cap when bottle was positioned in a horizontal orientation.
$^g$Not gelled (NG) after 11 days in fresh water @ 200 F.; not gelled (NG) after 11 days in Synthetic North Sea water @ 200 F.
$^h$Time period was 24 days.
$^j$Time period was 167 days.

It was noteworthy that the shelf-life of the sodium acrylate modified polymers was significantly longer than the shelf-life of the acrylic acid modified polymers described in Example XLV. This was reflected by the loss of water solubility in the acrylic acid modified polymers. This behavior is presumably due to the acid promoted imidization of pendant —CONH$_2$ groups wherein the pendant —CO$_2$H groups of the acrylic acid units are sufficiently acidic to promote the imidization. Since the sodium acrylate modified polymers lacked pendant —CO$_2$H groups, no built-in acidic promoter was present to trigger the imidization reaction between pendant —CONH$_2$ groups. Of the modified polymers, the sodium acrylate modified compositions are presently preferred over the analogous acrylic acid modified compositions.

Referring to the results in Table LIX, it is evident that the unmodified VP/Am (50/50) polymer failed to gel in either the fresh water medium at 200° F. (run 12) or in the synthetic North Sea water medium at 200° F. (footnote f). Presumably this was due to the absence of carboxylate groups in the polymer. Referring to the results in runs 13 through 16, it is evident that the sodium acrylate modified polymers were gelable under the test conditions. The slower gelation rate observed in run 16 may be due to the relatively high level of sodium acrylate in the polymer, i.e., 40 weight percent. Once again the gelation capacity of the various polymers was probably due to the presence of carboxylate groups pendant from the sodium acrylate units.

Referring to the results in Table LX, it is evident that the unmodified VP/Am/NaAMPS (30/15/55) polymer failed to gel in either the fresh water medium at 200° F. (run 18) or in the Synthetic North Sea water medium at 200° F. (footnote g). Apparently this was due to the absence of carboxylate groups in the polymer. Referring to the results in runs 19 through 21, it is evident that the sodium acrylate modified polymers were gelable under the test conditions. In run 22, a sodium acrylate modified polymer was gelled in Synthetic North Sea water at 200° F. The slower gelation rate noted in run 21 may have been due to the relatively higher level of sodium acrylate, i.e., 20 weight percent. Even higher levels of the redox components may be necessary to gel polymers with higher carboxylate loadings. Presently, it is preferred that the carboxylate monomer level be in the range of 1 to 15 weight percent.

EXAMPLE XLVII

This example describes the preparation of magnesium 2-acrylamido-2-methylpropanesulfonate 4-hydrate [Mg(AMPS)$_2$.4H$_2$O] from the reaction of magnesium acetate 4-hydrate [Mg(OAc)$_2$.4H$_2$O] with either (a) refined grade 2-acrylamido-2-methylpropanesulfonic acid (AMPS) or (b) commercial grade AMPS.

Thermal aging test data are also presented in this example for (i) poly(magnesium 2-acrylamido-2-methylpropanesulfonate), (ii) poly(magnesium 2-acrylamido-2-methylpropanesulfonate-co-sodium 2-acrylamido-2-methylpropanesulfonate) (50/50 wt/wt) [Mg(AMPS)$_2$/Na(AMPS)], and (iii) poly(magnesium 2-acrylamido-2-methylpropanesulfonate-co-sodium 2-acrylamido-2-methylpropanesulfonate) (10/90 wt/wt) [Mg(AMPS)$_2$/Na(AMPS)]. The cited weight percentages of monomers in these polymer compositions reflects the relative weights of monomers charged to the polymerization zone, e.g., for the 50/50 wt/wt [Mg(AMPS)$_2$/Na(AMPS)] polymer, equal weights of magnesium 2-acrylamido-2-methylpropanesulfonate and sodium 2-acrylamido-2-methylpropanesulfonate were charged to the polymerization zone.

(a) Preparation of Mg(AMPS)$_2$.4H$_2$O from refined grade AMPS.

In a glass reactor equipped with an inlet tube for purging the system continuously with air was placed 60 g distilled water and 26.6 g (0.12 mole) of magnesium acetate 4-hydrate. This solution was stirred and maintained under air blanket as 50 g (0.24 mole) of refined grade 2-acrylamido-2-methylpropanesulfonic acid (AMPS) was slowly added and the reaction mixture temperature was kept below 30° C.

After addition of the refined grade AMPS, the entire reaction mass was poured into a 3:1 volume/volume mixture of acetone (1500 mL) and cyclohexane (500 mL) to precipitate magnesium 2-acrylamido-2-methylpropanesulfonate 4-hydrate, Mg(AMPS)$_2$.4H$_2$O (FWt 508). This mixture was chilled in an ice bath for one hour before removing the precipitate by suction filtration. The product was washed twice with 100 mL portions of cyclohexane and dried in vacuo at ambient temperature to give approximately a quantitative yield of Mg(AMPS)$_2$.4H$_2$O.

(b) Preparation of Mg(AMPS)$_2$.4H$_2$O from commercial grade AMPS.

In a glass reactor equipped with an inlet tube for purging the system continuously with air was placed 80 g distilled water and 39.5 g (0.18 mole) of magnesium acetate 4-hydrate. This solution was stirred and maintained under air as 78 g (0.36 mole active basis) of commercial grade 2-acrylamido-2-methylpropanesulfonic acid (AMPS) was slowly added and the reaction mixture temperature was kept below 30° C. The reaction mixture was stirred an additional 15 minutes after all the AMPS had been added. In order to solubilize all the components in the mixture, the stirred mixture was allowed to warm to ambient temperature.

The entire reaction mass was poured into a 5:1 volume/volume mixture of acetone (2500 mL) and cyclohexane (500 mL) to precipitate Mg(AMPS)$_2$.4H$_2$O. This mixture was chilled in an ice bath for one hour before removing the precipitate by suction filtration. The product was washed three times with 100 mL portions of cyclohexane and dried in vacuo at 40° C. to give about a 95% yield of Mg(AMPS)$_2$.4H$_2$O.

The polymers used in the thermal aging tests were prepared in accordance with conventional solution polymerization technology using total solids levels of 20–30% in distilled water at ambient temperature with about 0.1 phm of initiator. The samples of sodium 2-acrylamido-2-methylpropanesulfonate (NaAMPS) and Mg(AMPS)$_2$.4H$_2$O used in the polymerizations were prepared from refined grade AMPS. The gelled reaction masses from the polymerizations were mixed with sufficient synthetic North Sea water to prepare 0.1 weight percent and 0.25 weight percent solutions for solution viscosity measurements. Test results are summarized in Table LXI.

TABLE LXI

| Mg(AMPS)$_2$ Polymers in Synthetic North Sea Water (SNSW) | | | | |
|---|---|---|---|---|
| Run No. | Monomer Units (Wt %) | | IV (0.1) SNSW 25° C. | Viscosity 250 F. (0.25 SNSW) cP | |
| | Mg(AMPS)$_2$ | NaAMPS | | Unaged | Aged |
| 1 | 100 | 0 | 9.99 | 2.42 | 1.76 |
| 2 | 50 | 50 | 9.89 | 2.71 | 1.97 |
| 3 | 10 | 90 | 8.65 | 2.18 | 1.73 |

Referring to the results in Table LXI, it is evident that the Mg(AMPS)$_2$-containing polymers in SNSW provided solutions which retained a significant percentage of solution viscosity after thermal aging and the average solution viscosity of the thermally aged solutions was about 6 times that of sea water at 250° F. This behavior indicates that the polymers are potentially useful in mobility control under hostile environment conditions.

Preliminary investigations of the analogous systems with calcium 2-acrylamido-2-methylpropanesulfonate [Ca(AMPS)$_2$] and aluminum 2-acrylamido-2-methylpropanesulfonate [Al(AMPS)$_3$] indicated that these salts were significantly less soluble in aqueous systems than the Mg(AMPS)$_2$ monomer. In view of this finding, the Ca(AMPS)$_2$ and Al(AMPS)$_3$ compositions were not extensively studied.

EXAMPLE XLVIII

This example describes the preparation of diamine salts of 2-acrylamino-2-methylpropanesulfonic acid (AMPS). The isolated salts or solutions of these salts can be prepared by neutralizing AMPS with selected diamines such as N,N,N',N'-tetramethylethylene diamine (TMEDA), N,N,N',N'-tetramethyl-1,4-butanediamine (TMEBA) and N,N,N',N'-tetramethyl-1,6-hexanediamine (THDA).

Thermal aging test data are also presented in this example for polymers derived from the diamine/AMPS salts.

(a) Preparation of TMEDA(AMPS)$_2$

A solution of AMPS was prepared in a 500 mL Erlenmeyer flask by mixing 250 mL of N,N-dimethylformamide (DMF) with 50 g (0.24 mole) AMPS. A separate solution of N,N,N',N'-tetramethylethylenediamine (TMEDA) in DMF was prepared by mixing 14.6 g (0.12 mole) TMEDA with 50 mL of DMF in a 250 mL flask. The stirred DMF solution of AMPS was cooled in an ice bath during the dropwise addition of the TMEDA/DMF solution. After this addition was complete, the reaction mixture was stirred for another 15 minutes.

The total reaction mass was poured into 1000 mL of cyclohexane and the addition of 280 mL of methanol gave a two phase mixture. The top phase was separated, diluted with 1000 mL of acetone and allowed to stand 16 hours to complete the precipitation of the diamine-/AMPS salt. The precipitate was removed by suction filtration and dried in vacuo at ambient temperature to give 43.8 g of TMEDA(AMPS)$_2$ (68% yield).

(b) Preparation of TMEBA(AMPS)$_2$

A solution of N,N,N',N'-tetramethylbutanediamine (TMEBA) was prepared in a 500 mL Erlenmeyer flask by mixing 300 mL of DMF with 22.2 g (0.15 mole) of TMEBA. This solution was stirred in an ice bath and to this cold solution was added portion-wise a total of 60 g (0.29 mole) of powdered AMPS (commercial grade). After all the AMPS had been added, a thick slurry was obtained.

This slurry was diluted with 150 mL of methylethyl ketone before pouring the entire reaction mass into a mixture of 500 mL of cyclohexane and 350 mL of methylethyl ketone. Precipitation of the TMEBA(AMPS)$_2$ salt was allowed to continue for one hour and forty-five minutes before suction filtration. The product was washed twice with 100 mL portions of cyclohexane and dried in vacuo at 35° C. to give 76.8 g TMEBA-(AMPS)$_2$ (95% yield).

(c) Preparation of THDA(AMPS)$_2$

This salt N,N,N',N'-tetramethylhexanediammonium 2-acrylamido-2-methylpropanesulfonate [THDA-(AMPS)$_2$] was prepared in essentially the same manner as the above TMEDA(AMPS)$_2$ and TMEBA(AMPS)$_2$ salts.

Polymers of the various diamine/AMPS salts were prepared in accordance with conventional solution polymerization technology using total solids levels of 20-30% in distilled water at ambient temperature with about 0.1 phm of initiator. As indicated hereinabove the cited weight percentages of monomer units in the polymer compositions reflects the relative weights of monomers charged to the polymerization zone.

The gelled reaction masses from the polymerizations were mixed with sufficient synthetic North Sea water to prepare 0.1 weight percent and 0.25 weight percent solutions for solution viscosity measurements. Test results are summarized in Table LXII.

TABLE LXII

Polymers of Diamine/(AMPS)$_2$ Salts in Synthetic North Sea Water (SNSW)

| Run No. | Monomer Units (Wt %) | | | | IV (0.1) SNSW 25° C. | (0.25 SNSW) cP | |
|---|---|---|---|---|---|---|---|
| | TMEDA$^a$ (AMPS)$_2$ | NaAMPS$^b$ | TMEBA$^c$ (AMPS)$_2$ | THDA$^d$ (AMPS)$_2$ | | Unaged | Aged |
| 1 | 5 | 95 | 0 | 0 | 9.55 | 3.13# | 2.87# |
| 2 | 10 | 90 | 0 | 0 | 8.81 | 2.93+ | 1.35+ |
| 3* | 10 | 45 | 0 | 0 | 8.23 | 1.67 | 0.95 |
| 4 | 0 | 100 | 0 | 0 | 5.8 | 1.30 | 0.98 |
| 5 | 0 | 97 | 3 | 0 | 6.2 | 1.53 | 1.42 |
| 6** | 0 | 95 | 5 | 0 | 6.0 | 1.36 | 1.25 |
| 7 | 0 | 90 | 10 | 0 | 5.9 | 1.40 | 1.31 |
| 8 | 0 | 85 | 15 | 0 | 6.3 | 1.50 | 1.43 |
| 9 | 0 | 100 | 0 | 0 | 6.3 | 1.44 | 1.41 |
| 10 | 0 | 95 | 0 | 5 | 6.2 | 1.39 | 1.34 |
| 11 | 0 | 90 | 0 | 10 | 6.0 | 1.36 | 1.30 |

*This composition was 30 wt % VP, 15 wt % Am, 10 wt % TMEDA (AMPS)$_2$ and 45 wt % NaAMPS.
**A duplicate sample of this composition prepared from refined grade AMPS gave an unaged solution viscosity of 5.81 and an aged solution viscosity of 5.51.
Unaged value on a duplicate sample was 2.43 and aged value was 1.94.
+Unaged value on duplicate sample was 2.40 and aged value was 1.94.
$^a$TMEDA(AMPS)$_2$ represents the salt of 2-acrylamido-2-methylpropanesulfonic acid (AMPS) and N,N,N',N'-tetramethylethylenediamine.
$^b$NaAMPS represents sodium 2-acrylamido-2-methylpropanesulfonate.
$^c$TMEBA(AMPS)$_2$ represents the salt of AMPS and N,N,N'N'-tetramethyl-1,4-butanediamine.
$^e$THDA(AMPS)$_2$ represents the salt of AMPS and N,N,N'N'-tetramethyl-1,6-hexanediamine.

Referring to the results in Table LXII, it is evident that relatively small loadings of the diamine (AMPS)$_2$ monomer in copolymerizations with NaAMPS (from commercial grade AMPS) provided potentially useful modified polymers. After thermal aging, solutions of these modified polymers in SNSW exhibited good retention of solution viscosity (see aged and unaged viscosity values). The average aged viscosity of the diamine (AMPS)$_2$/NaAMPS copolymer solutions was about 5 times the viscosity of SNSW at 250° F. This behavior shows that the polymers are useful in mobility control under hostile environment conditions.

The best performer in Table LXII is found in run 6**. In the preparation of the 5/95 TMEBA/(AMPS)$_2$ salt, refined grade AMPS was used. The copolymerization was carried out at 35% total solids with 5 parts by weight of TMEBA/(AMPS)$_2$ and 95 parts by weight of NaAMPS prepared from refined grade AMPS. The aged solution viscosity value of 5.51 is about 19 times the viscosity of sea water at 250° F. which indicates that this system possesses potential as a mobility control agent under hostile environment conditions.

EXAMPLE XLIX

This example describes the preparation of AMPS salts of diamines which are characterized by the presence of an oligomeric moiety between the amino groups. These compounds are poly(oxyethylene) diamines derived from propylene oxide-capped polyethylene glycol. The AMPS salts of these diamines have the structures shown below:

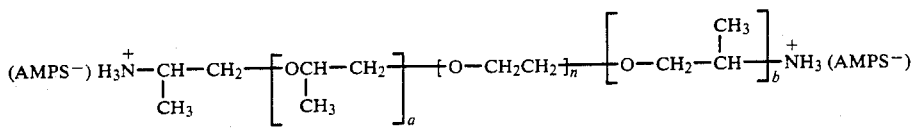

AMPS⁻ represents

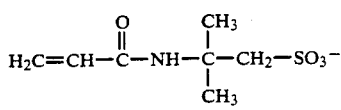

The diamines used in neutralizing AMPS are available from Texaco Chemical Co. and are known as Jeffamine Ed Compounds. The diamines ED-600, ED-900 and ED-2001 were used and their descriptiors are shown below:

| Diamine | n Range | (a + b) Range | Approx. Mol. Wt. |
|---|---|---|---|
| ED-600 | 8–9 | 2–3 | 600 |
| ED-900 | 15–16 | 2–3 | 900 |
| ED-2001 | 40–41 | 2–3 | 2000 |

Thermal aging test data are also presented in this example for polymers derived from the oligomeric diamine/AMPS salts.

(a) Preparation of ED-600/(AMPS)₂ monomer

A charge of 63.3 g (0.202 equivalent, 4.7% excess) of ED-600 and 97.6 g of distilled water was placed in a 400 mL beaker. This stirred mixture was chilled in an ice bath during the gradual addition of 40 g (0.193 equivalent) of 2-acrylamido-2-methylpropanesulfonic acid (AMPS). The reaction mixture temperature was maintained at a temperature of less than 30° C. as the AMPS was added. After all the AMPS had been added, the reaction mixture was stirred for an additional 30 minutes. The measured pH of this mixture was 7.68. This procedure provided an aqueous mixture of ED-600/(AMPS)₂ containing approximately 50 weight percent of the ED-600/(AMPS)₂ monomer. Aliquots of this solution were used in the solution polymerizations.

(b) Preparation of ED-900/(AMPS)₂ monomer

This monomer was prepared in essentially the same manner as the ED-600/(AMPS)₂ monomer described above. A stock solution of ED-900/(AMPS)₂ in water (50 weight percent) was prepared. Aliquots of this solution were used in the solution polymerizations. The pH of this stock solution was 7.78.

(c) Preparation of ED-2001/(AMPS)₂ monomer

This monomer was prepared in essentially the same manner as the ED-600/(AMPS)₂ and ED-900/(AMPS)₂ monomers. A stock solution of ED-2001/(AMPS)₂ in water (50 weight percent) was prepared. Aliquots of this solution were used in the solution polymerizations. The pH of this stock solution was 8.56.

Polymers of the various oligomeric diamine AMPS salts were prepared in accordance with conventional solution polymerization technology using total solids levels of 20–35% in distilled water at ambient temperature with about 0.1 phm of initiator. As indicated above, the cited weight percentages of monomer units in the polymer compositions reflects the relative weights of monomers charged to the polymerization zone.

The gelled reaction masses from the polymerizations were mixed with sufficient synthetic North Sea water to prepare 0.1 weight percent and 0.25 weight percent solutions for solution viscosity measurements. Test results are summarized in Table LXIII.

Referring to the results in Table LXIII, it is evident that the oligomeric diamine/AMPS salts in relatively small amounts yielded copolymers with NaAMPS which are useful as hostile environment polymers. After thermal aging in synthetic North Sea water, solutions of these modified polymers exhibited good retention of solution viscosity (cf. aged and unaged viscosity values). The average aged viscosity values of the modified polymer solutions was about 3.5 times the viscosity of SNSW at 250° F. This behavior indicates that the subject polymers are useful in hostile environments, i.e., at temperatures in excess of 170° F. and in the presence of greater than 500 ppm divalent metal cations. Most remarkable is the essentially 100 percent retention of viscosity on high temperature aging.

TABLE LXIII

Polymers of Diamine/(AMPS)₂ Salts in Synthetic North Sea Water (SNSW)

| Run No. | Monomer Units (Wt %) | | | | IV (0.1) SNSW 25° C. | (0.25 SNSW) cP | |
|---|---|---|---|---|---|---|---|
| | ED-600ᵃ (AMPS)₂ | ED-900ᵇ (AMPS)₂ | NaAMPS | ED-2001ᶜ (AMPS)₂ | | Unaged | Aged |
| 12 | 2 | 0 | 98 | 0 | 6.3 | 1.29 | 1.46 |
| 13 | 5 | 0 | 95 | 0 | 5.8 | 1.16 | 1.14 |
| 14 | 10 | 0 | 90 | 0 | 5.2 | 0.95 | 1.10 |
| 15 | 0 | 2 | 98 | 0 | 5.6 | 1.17 | 1.08 |
| 16 | 0 | 10 | 90 | 0 | 5.0 | 0.9 | 0.87 |
| 17 | 0 | 0 | 98 | 2 | 5.5 | 1.11 | 1.08 |
| 18 | 0 | 0 | 90 | 10 | 4.9 | 1.0 | 0.9 |

ᵃED-600 (MW ca. 600) is an oligomeric diamine described by the formula:

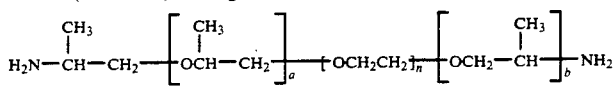

wherein n is in the range of 8–9 and (a + b) is in the range of 2–3.
ᵇED-900 (MW ca. 900) is described by the above formula wherein n is 5–16 and (a + b) is 2–3.
ᶜED-2001 (MW ca. 2000) is described by the above formula wherein n is 40–41 and (a + b) is 2–3.

EXAMPLE L

This example describes the organic crosslinking (gelation) of polymers useful in a hostile environment characterized by the presence of pendant —$CONH_2$ groups along the polymer chain. The preferred crosslinking system is a combination of phenol and formaldehyde. The following polymers were tested: (a) poly(N-vinyl-2-pyrrolidone-co-acrylamide-co-sodium 2-acrylamido-2-methylpropanesulfonate) (35/25/40) (wt/wt/wt) (VP/Am/NaAMPS), (b) poly(N-vinyl-2-pyrrolidone-co-acrylamide-co-sodium 2-acrylamido-2-methylpropanesulfonate) (30/15/55) (wt/wt/wt) (VP/Am/NaAMPS), (c) poly(acrylamide-co-sodium 2-acrylamido-2-methylpropanesulfonate) (40/60) (wt/wt) (Am/NaAMPS) and (d) poly(N-vinyl-2-pyrrolidone-co-acrylamide) (60/40) (wt/wt) (VP/Am).

Synthetic North Sea water was used as the aqueous medium in all of the experimental work. Synthetic North Sea water was prepared by dissolving the following amounts of salt in sufficient distilled water to give 18 liters of solution (SNSW):

| | |
|---|---|
| NaCl | 429.0 g |
| $Na_2SO_4$ | 77.2 g |
| $NaHCO_3$ | 3.7 g |
| $MgCl_2.6H_2O$ | 193.9 g |
| $CaCl_2.2H_2O$ | 29.6 g |

Stock solutions of polymers were prepared in SNSW. In general, sufficient gel log polymer was dissolved in SNSW to give a polymer concentration of 10,000 ppm. For example, an 18.5 g sample of gel log polymer containing 35 weight percent polymer can be dissolved in sufficient SNSW to give about 647 g of 10,000 ppm polymer solution. This proved to be a convenient concentration for use in these gelation experiments.

Stock solutions of phenol and formaldehyde were prepared by mixing formalin solution (37 weight percent formaldehyde, 13.9 weight percent $CH_3OH$ and 49.1 weight percent $H_2O$) and phenol (88 weight percent phenol, 12 weight percent water). The weight ratio of formaldehyde to phenol is preferably about 1:1 which corresponds to about a 3:1 molar ratio of formaldehyde to phenol. In order to obtain, e.g., a 1:1 wt/wt ratio of phenol to formaldehyde, 29.6 g of phenol (88 wt % $C_6H_5OH$) is combined with 70.4 g of formalin (37 wt % HCHO):

$29.6 \times 0.88 = 26.0$ g $C_6H_5OH$ $70.4 \times 0.37 = 26.0$ g HCHO

The 100 g of solution exhibited a density of about 1.076 g/mL. This stock solution contains about 260,000 ppm $C_6H_5OH$ and about 260,000 ppm HCHO.

The preparation and thermal aging of $HCHO/C_6H_5OH$ crosslinked HE polymer gels was carried out in ampoules with a capacity of about 62.5 mL. The cylindrical glass ampoules were 23 mm OD×225 mm in length; one end was sealed and to the other end was sealed a 6 mm OD×80 mm long glass tube. This tube was sealed by a torch prior to incubation of the test samples. The total test sample in each run amounted to about 20 mL.

After the introduction of the polymer solution and the $HCHO/C_6H_5OH$ gelling agent, the ampoule was alternately purged with nitrogen and evacuated by a vacuum means 3 times at ambient temperature. The system was then chilled for 2 minutes in a salt water-ice bath and the purge/evacuation cycle was repeated.

The ice-salt water bath was replaced with an 85° F. water bath and the system was allowed to warm up for about 2 minutes. The ampoule was gently shaken which resulted in the controlled bubbling of the polymer test sample. The ampoule was removed from the warm water bath and the system was adjusted to 1 atmosphere $N_2$ pressure.

The ampoule was re-cooled in the salt water-ice bath before repeating the $N_2$ purge/evacuation cycle. Before sealing off the ampoule with a torch, the pressure in the ampoule was adjusted to about 0.8 atmosphere $N_2$.

The sealed ampoules containing about 20 mL of the polymer solution and the $HCHO/C_6H_5OH$ gelling system were incubated in an air-circulating temperature controlled oven. The ampoules were placed in an aluminum container equipped with a clamp-fastened top and the container was placed in the oven. Ampoules were removed from the oven at specified time intervals and the test fluids were observed in regard to their tendency to flow. Samples were incubated at 200° F., 250° F. and 300° F.

If the gel fluid flowed the entire 225 mm length of the ampoule with the ampoule in a horizontal orientation, the fluid was considered not gelled (NG). As gelation progressed the gels were qualitatively evaluated by noting the tendency of the gels to flow as reflected by "tongue lengths". Zero on the tongue length scale being defined by the fluid level in the ampoule when the ampoule is in an upright position. Once the gelation had progressed to the point at which tongue lengths were on the order of ¼" in the horizontal position, the gel was designated as hard (H—). If the tongue lengths were on the order of 1" in a tilted position 45° from the horizontal, the gel was designated as hard (H). If no gel movement was detectable with the ampoule in an inverted orientation, the gel was designated as very hard (VH).

Sample mixtures of polymers and the $HCHO/C_6H_5OH$ organic crosslinking (gelation) agent were prepared, e.g., by mixing appropriate amounts of SNSW polymer solution and a gelling agent solution containing equal concentrations of formaldehyde and phenol. The total sample mixture in each run was on the order of 20 mL.

In the systems studied, the relative concentrations of formaldehyde and phenol (ppm) were about the same. The concentration of polymer in the test samples was about 10,000 ppm. In runs 1–6 and 10–12 (Table LXIV) the formaldehyde and phenol concentrations were in the range of 450 to 600 ppm. In runs 7–9 the phenol and formaldehyde concentrations were in the range of 2750 ppm.

Referring to the 200° F. results in Table LXIV, i.e., runs 1, 4, 7 and 10, it is evident that all the polymers crosslinked to hard to very hard gels which exhibited good stability over a long period of time at 200° F. None of these gels had lost stability when the tests were terminated, respectively, at 35, 35, 155 and 99 days.

Referring to the 250° F. results in Table LXIV, i.e., runs 2, 5, 8 and 11, it is evident that all the polymers except for Am/NaAMPS (40/60) (see run 8) crosslinked to hard or very hard gels which exhibited good stability over a long period of time at 250° F. None of the stable gels in runs 2, 5, and 11 had degraded when the tests were terminated, respectively, at 40, 40 and 99 days. The system in run 8 gave a relatively fast gelation rate but the gel exhibited significant syneresis and the test was terminated in about 19 days.

Referring to the 300° F. results in Table LXIV, i.e., runs 3, 6, 9 and 12, it is evident that all the polymers except for Am/NaAMPS (40/60) (see run 9) crosslinked to hard or very hard gels which exhibited good stability over a long period of time at 300° F. None of the hard gels in runs 3, 6 and 13 had exhibited any syneresis when the tests were terminated, respectively, at 40, 40 and 99 days. The system in run 9 gave a fast gelation rate but the gel exhibited severe syneresis and the test was terminated in less than 3 days.

Attention is called to the relatively high concentrations of formaldehyde (2542 ppm) and phenol (2942 ppm) used with the Am/NaAMPS (40/60) copolymer in runs 7, 8 and 9. In runs 1-6 and 10-12 the formaldehyde and phenol concentrations varied over the range of about 450 ppm to about 600 ppm. Perhaps the higher concentrations of the HCHO and phenol at the higher temperatures of 250° F. and 300° F. resulted in an undesirable overtreatment reflected in the syneresis of the gel. The syneresis sometimes results if the gel is too highly crosslinked. At 200° F., however, the higher concentrations of HCHO and phenol (see run 7) resulted in a very hard gel which had exhibited no syneresis after 155 days at 200° F.

In preliminary studies the polymers in Table XVII were crosslinked with HCHO/C$_6$H$_5$OH in fresh water at 200° F., 250° F. and 300° F. The very hard gels exhibited no syneresis in aging studies at 200° F., 250° F. and 300° F.

The results in Table LXIV, especially in runs 1-6 and 10-12 indicate that the gels produced by the HCHO/C$_6$H$_5$OH crosslinking of stable polymers bearing pendant —CONH$_2$ groups in SNSW are useful for permeability contrast corrections under harsh environment conditions, i.e., temperatures in excess of 170° F. and hardness cation concentrations in excess of 500 ppm.

While this invention has been described in detail for the purpose of illustration, it is not to be construed as limited thereby, but is intended to cover all the changes and modifications within the spirit and scope thereof.

We claim:

1. A method comprising:
   introducing a water-soluble polymer, produced from a monomer composition comprising at least one of a hydrophilic N-vinyl amide or a hydrophilic component of the formula

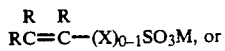

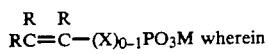

R is methyl, ethyl or H, provided further that at least one of the R groups on the terminal carbon of the vinyl group is H and the other is H or methyl, M is H, Na$^+$, K$^+$, Li$^+$, R''''$_4$N$^+$, Ca$^{++}$, Mg$^{++}$, Zn$^{++}$, Sr$^{++}$, Fe$^{++}$, Mn$^{++}$, and $^+$NH$_3$R$^1$NH$_3$$^+$ where R$^1$ is a 1-20 carbon atom divalent hydrocarbon radical, R'''' is H, —ROH or a 1-3 carbon atom alkyl group, wherein X is selected from

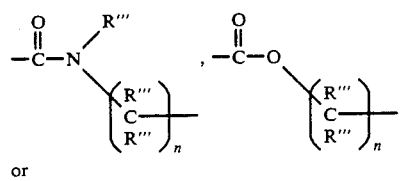

or

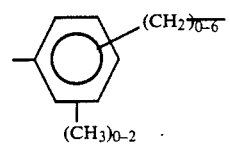

where n is an integer of 1-5 preferably 1-3 and R''' is a 1-3 carbon atom alkyl group or H,

TABLE LXIV

Organic Crosslinked Polymers in Synthetic North Sea Water

| HE Polymer | Run No. | Oven Temp. °F. | Detectable Gel (Days)$^d$ | Gelation Appeared Completed$^e$ | Character of Gel$^f$ | Length of Test (Days) |
|---|---|---|---|---|---|---|
| VP$^a$/Am$^b$/NaAMPS$^c$ | 1$^h$ | 200 | 4 | 9.0 | Hard | 35 |
| (35/25/40) | 2 | 250 | 1.5 | 3.5 | Very Hard | 40 |
|  | 3 | 300 | 0.75 | 2.8 | Very Hard | 40 |
| VP/Am/NaAMPS | 4$^i$ | 200 | 6.0 | 11.0 | Hard | 35 |
| (30/15/55) | 5 | 250 | 1.8 | 4.0 | Hard | 40 |
|  | 6 | 300 | 0.85 | 3.0 | Hard | 40 |
| Am/NaAMPS | 7$^j$ | 200 | 3.0 | 20 | Very Hard | 155 |
| (40/60) | 8 | 250 | <1.0 | <3.0 | Syneresed$^g$ | <19 |
|  | 9 | 300 | <0.6 | 0.6 | Syneresed$^g$ | <2.7 |
| VP/Am | 10$^k$ | 200 | 20 | 64 | Hard | 99 |
| (60/40) | 11 | 250 | 3 | 14 | Very Hard | 99 |
|  | 12 | 300 | 1 | 3 | Hard | 99 |

$^a$VP represents N-vinyl-2-pyrrolidone.
$^b$Am represents acrylamide.
$^c$NaAMPS represents sodium 2-acrylamido-2-methylpropanesulfonate.
$^d$These times indicate the approximate number of days of incubation required before the gel fluid did not flow the 225 mm length of the cylindrical ampoule in the horizontal orientation.
$^e$These times indicate the approximate number of days of incubation required to reach the maximum firmness of the gel.
$^f$The H or hard gels provided tongue lengths on the order of ⅛" with the ampoule in a tilted orientation of 45° from the horizontal. The VH or very hard gels showed no gel movement with the ampoule in a 90° inverted orientation.
$^g$The gels undergoing syneresis exhibited a layer of fluid which had separated from the body of the gel. The more severe the syneresis, the greater the relative volume of the separated fluid phase. Aging tests were terminated as soon as syneresis was detectable.
$^h$Concentrations of polymer, formaldehyde and phenol, respectively, were 9977 ppm, 592 ppm and 598 ppm.
$^i$Concentrations of polymer, formaldehyde and phenol, respectively, were 9978 ppm, 577 ppm and 583 ppm.
$^j$Concentrations of polymer, formaldehyde and phenol, respectively, were 9898 ppm, 2542 ppm and 2942 ppm.
$^k$Concentrations of polymer, formaldehyde and phenol, respectively, were 9976 ppm, 454 ppm and 451 ppm.

into a subterranean formation so that said polymer is exposed to a hostile environment defined as having a temperature and multivalent cation concentration above the infinite days line of FIG. 14.

2. A method according to claim 1 wherein said N-vinyl amide is an N-vinyl lactam and wherein said component of the formula $$RC=C-(X)_{0-1}SO_3M \text{ or}$$

$$RC=C-X_{0-1}PO_3M \text{ is}$$

(with R R above each C=C)

a sulfonate or sulfonic acid.

3. A method according to claim 2 wherein said monomer composition contains in addition an unsaturated amide of the formula $$R''-\overset{O}{\underset{\|}{C}}-NH_2$$

wherein R'' is a 1-alkenyl group and wherein said multivalent cations are present in an amount greater than 1,000 ppm by weight.

4. A method according to claim 2 wherein said multivalent cations are present in an amount greater than 1,000 ppm by weight and comprise calcium and magnesium.

5. A method according to claim 2 wherein said polymer in an aqueous surfactant solution, and also steam are injected into said subterranean formation to effect permeability correction by transporting foamed surfactant into high permeability zones to thus divert steam to relatively oil-rich less permeable zones.

6. A method according to claim 2 wherein said polymer is used as a thickening agent in a hydraulic fracturing process.

7. A method according to claim 6 wherein said polymer contains carboxylate groups and said polymer composition is crosslinked to give fracture plugging by means of the sequential injection of (1) an oxidant composition containing a reducible polyvalent metal and (2) a water-soluble sulfur-containing reducing agent.

8. A method according to claim 2 wherein said polymer is crosslinked by the sequential injection of (1) an oxidant composition containing a reducible polyvalent metal and (2) a water-soluble sulfur-containing reducing agent.

9. A method according to claim 2 wherein said polymer is gelled in-situ for the purpose of permeability correction.

10. A method according to claim 2 wherein said is consolidated by means of in-situ gelation of said polymer.

11. A method according to claim 2 wherein said polymer is crosslinked using a sodium dichromate/sodium bisulfite redox system in order to plug high permeability zones.

12. A method according to claim 2 wherein said polymer is formed by radiation initiation in containers with center holes which are submerged in a cooling bath to facilitate cooling.

13. A method according to claim 2 wherein said polymer is crosslinked with a crosslinking agent selected from formaldehyde, acetaldehyde, chromium$^{+3}$, and aluminum$^{+3}$.

14. A method according to claim 2 wherein said monomer composition contains in addition an unsaturated amide of the formula $$R''-\overset{O}{\underset{\|}{C}}-NH_2$$

wherein R'' is a 1-alkenyl group and wherein said polymer is gelled with a mixture of a phenolic compound and formaldehyde.

15. A method according to claim 14 wherein said phenolic compound is phenol and wherein said phenol and phenolic compound are each used in an amount within the range of 1-10 weight percent based on the weight of said polymer.

16. A method according to claim 14 wherein said polymer is gelled after being introduced into said formation by withholding at least one of the phenolic compound, the formaldehyde, or the polymer, the withheld agent being subsequently injected.

17. A method according to claim 16 wherein said unsaturated amide is acrylamide.

18. A method according to claim 2 wherein said monomer composition contains in addition an unsaturated amide of the formula $$R''-\overset{O}{\underset{\|}{C}}-NH_2$$

wherein R'' is a 1-alkenyl group and wherein said polymer is gelled with a urea-formaldehyde crosslinking system.

19. A method according to claim 2 wherein said polymer is produced at a polymerization temperature within the range of $-10°$ to $50°$ C.

20. A method according to claim 18 wherein said polymerization temperature is within the range of $5°$ C. to $25°$ C.

21. A method according to claim 20 wherein polymerization is initiated with a chemical initiator.

22. A method according to claim 21 wherein said initiator is 2,2'-azobis(2,4-dimethyl-4-methoxyvaleronitrile).

23. A method according to claim 20 wherein said polymer is produced by radiation initiation.

24. A method according to claim 2 wherein said monomer composition consists essentially of said N-vinyl lactam.

25. A method according to claim 24 wherein said N-vinyl lactam is N-vinyl-2-pyrrolidone.

26. A method according to claim 2 wherein said monomer composition consists essentially of said hydrophilic vinyl-containing sulfonate.

27. A method according to claim 26 wherein said polymer is formed at a pH of greater than 7.

28. A method according to claim 26 wherein said vinyl-containing sulfonate is selected from sodium vinyl sulfonate, sodium 2-acrylamido-2methyl-propanesulfonate, sodium styrene sulfonate, sodium p-vinylbenzenyl sulfonate and sodium vinyltoluene sulfonate.

29. A method according to claim 28 wherein said vinyl-containing sulfonate is sodium 2-acrylamido-2-methylpropanesulfonate.

30. A method according to claim 2 wherein said monomer composition comprises a mixture of said N-vinyl lactam and said vinyl-containing sulfonate.

31. A method according to claim 30 wherein said polymer is produced at a pH of greater than 7.

32. A method according to claim 30 wherein said vinyl-containing sulfonate is selected from sodium vinyl sulfonate, sodium 2-acrylamido-2-methylpropane sulfonate, sodium styrene sulfonate, sodium p-vinylbenzenyl sulfonate and sodium vinyltoluene sulfonate.

33. A method according to claim 32 wherein said vinyl-containing sulfonate is sodium 2-acrylamido-2-methylpropanesulfonate and said N-vinyl lactam is N-vinyl-2-pyrrolidone.

34. A method according to claim 33 wherein said polymer is produced at a pH within the range of 7 to 10.5.

35. A method according to claim 2 wherein said monomer composition comprises a mixture of said N-vinyl lactam and in addition an unsaturated amide.

36. A method according to claim 35 wherein said polymer is produced at a pH within the range of 5 to 10.5 and said monomer composition consists essentially of N-vinyl-2-pyrrolidone and acrylamide.

37. A method according to claim 35 wherein said polymer is produced utilizing a chemical initiator.

38. A method according to claim 34 wherein said polymer is produced by radiation initiation.

39. A method according to claim 35 wherein said polymer is produced utilizing a combination of chemical initiator and radiation.

40. A method according to claim 35 wherein said polymer is produced at a polymerization temperature within the range of minus 10° to 50° C.

41. A method according to claim 2 wherein said polymer has a composition within the area represented by area B of FIG. 15.

42. A method according to claim 2 wherein said monomer composition comprises said hydrophilic N-vinyl lactam, said hydrophilic vinyl-containing sulfonate salt and in addition a hydrophilic unsaturated amide, said polymer being further characterized as being stable for 7 days at a 0.25 wt. % concentration in synthetic sea water at 300° F.

43. A method according to claim 42 wherein said N-vinyl lactam is N-vinyl-2-pyrrolidone, said such unsaturated amide is acrylamide and said vinyl-containing sulfonate is sodium 2-acryl-amido-2-methylpropanesulfonate.

44. A method according to claim 42 wherein said unsaturated amide is an N-substituted acrylamide.

45. A method according to claim 42 wherein said N-substituted acrylamide is N,N-dimethylacrylamide.

46. A method according to claim 45 wherein said polymer is produced at a pH greater than 7.

47. A method according to claim 46 wherein said polymer has a composition within the area represented by area B of FIG. 16.

48. A method according to claim 2 wherein said monomer composition comprises a mixture of a major portion of said hydrophilic vinyl-containing sulfonate and a minor amount of a hydrophilic unsaturated amide.

49. A method according to claim 48 wherein said unsaturated amide is acrylamide and said vinyl-containing sulfonate is selected from sodium vinyl sulfonate, sodium 2-acrylamido-2-methylpropanesulfonate, sodium styrene sulfonate, sodium vinylbenzenyl sulfonate and sodium vinyltoluene sulfonate.

50. A method according to claim 49 wherein said vinyl-containing sulfonate monomer is sodium 2-acrylamido-2-methylpropanesulfonate.

51. A method according to claim 50 wherein said unsaturated amide is present in an amount up to about 10 weight percent.

52. A method according to claim 50 wherein said unsaturated amide is an N-substituted acrylamide.

53. A method according to claim 47 wherein said monomer composition comprises sodium 2-acrylamido-2-methylpropanesulfonate, N-vinyl-2-pyrrolidone and acrylamide, said acrylamide being present in an amount within the range of 10 to 90 wt. % based on the total weight of the monomers incorporated in said polymer, and wherein M is $^+NH_3R^1NH_3{^+}$.

54. A method according to claim 53 wherein said polymer is produced at a pH of greater than 7.

55. A method according to claim 2 wherein said polymer is produced by an inverse emulsion process.

56. A method according to claim 1 wherein said N-vinyl amide is N-methyl-N-vinyl acetamide.

57. A method according to claim 1 wherein said component of the formula

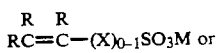
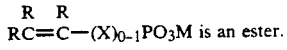 is an ester.

58. A method according to claim 57 wherein said ester is (3-sulfopropyl)methacrylic ester salt.

59. A method according to claim 58 wherein said salt is a salt of K or Na.

60. A method according to claim 1 wherein said component of the formula

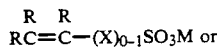
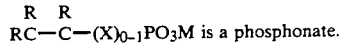 is a phosphonate.

61. A method according to claim 60 wherein said phosphonate is a salt of 2-acrylamido-2-methylpropane phosphonic acid.

62. A method according to claim 61 wherein said salt is a sodium salt.

63. A method according to claim 1 wherein said monomer composition contains in addition a carboxylic acid or a carboxylic acid salt.

64. A method according to claim 63 wherein said composition contains a carboxylic acid and wherein said polymer is produced by emulsion polymerization.

65. A method according to claim 63 wherein said composition contains a carboxylic acid salt.

66. A method according to claim 65 wherein said carboxylic acid salt is an acrylic acid salt.

67. A method according to claim 66 wherein said salt is sodium acrylate.

68. A method according to claim 66 wherein said polymer is a polymer of N-vinyl pyrrolidone/acrylamide/2-acrylamido-2-methylpropane sulfonate/sodium acrylate in a weight ratio of about 30/10/55/5 and is used in conjunction with a gelling agent.

69. A method according to claim 2 wherein said composition contains in addition a carboxylic acid salt and is gelled with a polyvalent metal composition.

70. A method according to claim 2 wherein said sulfonate is a purified 2-acrylamido-2-methylpropane sulfonate.

71. A method according to claim 2 wherein said monomer composition contains in addition an unsaturated amide of the formula $$R''-\overset{O}{\underset{\|}{C}}-NH_2$$

wherein R'' is a 1-alkenyl group and wherein said polymer is injected under steam flood conditions and wherein said polymer is used in conjunction with a gelling agent.

72. A method according to claim 2 wherein said polymer is injected with carbon dioxide.

73. A method comprising introducing a water-soluble polymer, produced from a monomer composition comprising at least one of a hydrophilic N-vinyl amide or a hydrophilic component of the formula $$RC\overset{R}{=}\overset{R}{C}-(X)_{0-1}SO_3M \text{ or}$$

$$RC\overset{R}{=}\overset{R}{C}-(X)_{0-1}PO_3M \text{ wherein}$$

R is methyl, ethyl or H, provided further that at least one of the R groups on the terminal carbon of the vinyl group is H and the other is H or methyl, M is H, Na+, K+, Li+, R''''$_4$N+, Ca++, Mg++, Zn++, Sr++, Fe++, Mn++, and +NH$_3$R$^1$NH$_3$+ where R$^1$ is a 1-20 carbon atom divalent hydrocarbon radical, R'''' is H, —ROH or a 1-3 carbon atom alkyl group, wherein X is selected from

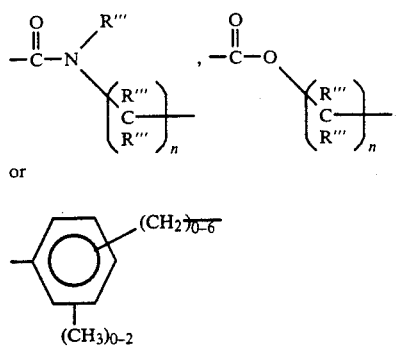

where n is an integer of 1–5 preferably 1–3 and R''' is a 1–3 carbon atom alkyl group, or H, R'''' is H, —ROH or a 1–3 carbon atom alkyl group, into a subterranean formation where said polymer is exposed to a hostile environment defined as including a temperature within the range of 170° to 300° F. and a multivalent cation concentration within the range of 500 to 220,000 parts per million by weight.

74. A method comprising introducing a polymer produced from a monomer composition comprising at least one of a hydrophilic N-vinyl lactam and a hydrophilic vinyl-containing sulfonate salt or the corresponding acid, into a subterranean formation where said polymer is exposed to a hostile environment defined as including a temperature within the range of 170° to 300° F. and a multivalent cation concentration within the range of 500 to 220,000 parts per million by weight.

75. A process according to claim 2 wherein an aqueous solution of said water soluble polymer is injected into said subterranean formation through at least one injection well to displace oil through said formation to at least one production well where it is recovered.

76. A process according to claim 75 wherein said monomer composition comprises at least one of N-vinyl-2-pyrrolidone and sodium 2-acrylamido-2-methyl-propanesulfonate.

77. A process according to claim 76 wherein said monomer composition contains in addition acrylamide.

* * * * *

UNITED STATES PATENT AND TRADEMARK OFFICE
CERTIFICATE OF CORRECTION

PATENT NO. : 5,080,809

DATED : January 14, 1992

INVENTOR(S) : G. Allan Stahl, et al

It is certified that error appears in the above-identified patent and that said Letters Patent is hereby corrected as shown below:

Col. 125, line 54, claim 10, after "wherein" and before "is", delete "said" and insert therefor --- sand ---.

Signed and Sealed this

Fourteenth Day of September, 1993

Attest:

BRUCE LEHMAN

Attesting Officer     Commissioner of Patents and Trademarks